US012794968B2

(12) United States Patent
Young et al.

(10) Patent No.: US 12,794,968 B2
(45) Date of Patent: Nov. 10, 2026

(54) USER INTERFACES FOR MANAGING ACCOUNT INFORMATION

(71) Applicant: Apple Inc., Cupertino, CA (US)

(72) Inventors: Trevor W. Young, Livermore, CA (US); Alla Kholmatova, Cambridge (GB)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 19/097,615

(22) Filed: Apr. 1, 2025

(65) Prior Publication Data

US 2025/0379905 A1 Dec. 11, 2025

Related U.S. Application Data

(60) Provisional application No. 63/656,419, filed on Jun. 5, 2024.

(51) Int. Cl.
*H04L 67/06* (2022.01)
*G06F 21/10* (2013.01)

(52) U.S. Cl.
CPC .......... *H04L 67/06* (2013.01); *G06F 21/1085* (2023.08)

(58) Field of Classification Search
None
See application file for complete search history.

(56) References Cited

U.S. PATENT DOCUMENTS 6,957,339 B2 10/2005 Shinzaki et al.
7,630,937 B1 12/2009 Mo et al.
7,783,564 B2 8/2010 Mullen et al.
7,784,684 B2 8/2010 Labrou et al.
8,180,705 B2 5/2012 Kowalchyk et al.
8,827,153 B1 9/2014 Rhoades et al.
9,509,686 B2 11/2016 Anantha et al.
9,767,329 B2 9/2017 Forster
10,032,100 B2 7/2018 Mullen et al.
10,095,276 B2 10/2018 Faith et al.
10,223,631 B2 3/2019 Mullen et al.
10,223,743 B2 3/2019 Walker et al.
10,255,545 B2 4/2019 Mullen et al.
(Continued)

FOREIGN PATENT DOCUMENTS

KR 10-2002-0052156 A 7/2002
KR 10-0475654 B1 3/2005
KR 10-2007-0013048 A 1/2007

OTHER PUBLICATIONS

Advisory Action received for U.S. Appl. No. 12/286,410, mailed on Jun. 25, 2012, 2 pages.
(Continued)

*Primary Examiner* — Fadi Haj Said
(74) *Attorney, Agent, or Firm* — YHE Law LLP

(57) ABSTRACT

The present disclosure generally relates to user interfaces for managing account information. In some embodiments, the user interfaces are directed to techniques for customizing information that is shared when transferring account resources. In some embodiments, the user interfaces are directed to techniques for providing visual feedback for instructing a resource transfer process. In some embodiments, the user interfaces are directed to techniques for performing a resource transfer process. In some embodiments, the user interfaces are directed to techniques for managing a digital pass.

39 Claims, 69 Drawing Sheets

(56) References Cited

U.S. PATENT DOCUMENTS

| | | | | |
|---|---|---|---|---|
| 10,296,889 | B2 | 5/2019 | Lin et al. | |
| 11,265,370 | B1 * | 3/2022 | Akkapeddi | H04L 67/06 |
| 11,367,125 | B1 * | 6/2022 | Gau | G06Q 30/0635 |
| 2003/0110097 | A1 | 6/2003 | Lei et al. | |
| 2003/0169881 | A1 | 9/2003 | Niedermeyer | |
| 2004/0061913 | A1 | 4/2004 | Takiguchi et al. | |
| 2004/0143547 | A1 | 7/2004 | Mersky et al. | |
| 2005/0043996 | A1 | 2/2005 | Silver et al. | |
| 2005/0193054 | A1 | 9/2005 | Wilson et al. | |
| 2005/0261968 | A1 | 11/2005 | Randall et al. | |
| 2006/0053079 | A1 | 3/2006 | Edmonson et al. | |
| 2006/0229984 | A1 | 10/2006 | Miyuki et al. | |
| 2006/0235795 | A1 | 10/2006 | Johnson et al. | |
| 2006/0235796 | A1 | 10/2006 | Johnson et al. | |
| 2007/0125838 | A1 | 6/2007 | Law et al. | |
| 2007/0203836 | A1 | 8/2007 | Dodin | |
| 2007/0254712 | A1 | 11/2007 | Chitti | |
| 2007/0255662 | A1 | 11/2007 | Tumminaro | |
| 2008/0004964 | A1 | 1/2008 | Messa et al. | |
| 2008/0010215 | A1 | 1/2008 | Rackley, III et al. | |
| 2008/0011825 | A1 | 1/2008 | Giordano et al. | |
| 2008/0041936 | A1 | 2/2008 | Vawter | |
| 2008/0052091 | A1 | 2/2008 | Vawter et al. | |
| 2008/0059323 | A1 | 3/2008 | Chang et al. | |
| 2008/0147561 | A1 | 6/2008 | Euchner et al. | |
| 2008/0167988 | A1 | 7/2008 | Sun et al. | |
| 2008/0208742 | A1 | 8/2008 | Arthur et al. | |
| 2008/0208743 | A1 | 8/2008 | Arthur et al. | |
| 2009/0006217 | A1 | 1/2009 | Smith | |
| 2009/0037286 | A1 | 2/2009 | Foster et al. | |
| 2009/0089193 | A1 | 4/2009 | Paintin et al. | |
| 2009/0099961 | A1 | 4/2009 | Ogilvy et al. | |
| 2009/0106160 | A1 | 4/2009 | Skowronek | |
| 2009/0182634 | A1 | 7/2009 | Park et al. | |
| 2009/0192911 | A1 | 7/2009 | Graf | |
| 2009/0192937 | A1 | 7/2009 | Griffin et al. | |
| 2009/0254479 | A1 | 10/2009 | Pharris | |
| 2010/0008535 | A1 | 1/2010 | Abulafia et al. | |
| 2010/0023449 | A1 | 1/2010 | Skowronek et al. | |
| 2010/0049619 | A1 | 2/2010 | Beck | |
| 2010/0051689 | A1 | 3/2010 | Diamond et al. | |
| 2010/0057624 | A1 | 3/2010 | Hurt et al. | |
| 2010/0078471 | A1 | 4/2010 | Lin et al. | |
| 2010/0078472 | A1 | 4/2010 | Lin et al. | |
| 2010/0082481 | A1 | 4/2010 | Lin et al. | |
| 2010/0174647 | A1 | 7/2010 | Kowalchyk et al. | |
| 2010/0191646 | A1 * | 7/2010 | Smith | G06Q 20/42 705/40 |
| 2016/0275475 | A1 | 9/2016 | Lin et al. | |
| 2018/0335928 | A1 * | 11/2018 | Van Os | G06Q 20/204 |
| 2018/0336543 | A1 * | 11/2018 | Van Os | G06Q 20/223 |
| 2019/0266587 | A1 | 8/2019 | Lin et al. | |
| 2022/0222647 | A1 | 7/2022 | Lin et al. | |
| 2024/0296435 | A1 | 9/2024 | Lin et al. | |

OTHER PUBLICATIONS

Applicant-Initiated Interview Summary received for U.S. Appl. No. 16/413,402, mailed on Mar. 29, 2021, 4 pages.
Applicant-Initiated Interview Summary received for U.S. Appl. No. 17/527,942, mailed on Dec. 26, 2023, 5 pages.
Balaban Dan, "The Brave New World Of Contactless Mobile Credit", Nov. 2005, Iss 11 p. 20, 6 pages.
Bay Area Clipper Official, "How to Add Your Plastic Clipper Card to Apple Wallet", Available Online at: https://www.youtube.com/watch?v=Gxa6aRmqfJs, Mar. 25, 2023, 2 pages.
Bernier Patrick, "FeliCa", Wikipedia, Jan. 1, 2007, 3 pages.
Bernier Patrickl., "File:Sony PaSoRi RC-S320.jpeg", Online Available at <http://en.wikipedia.org/wiki/File:Sony_PaSoRi_RCS320.jpeg>, Jan. 1, 2007, 4 pages.
Extended European Search Report (includes Supplementary European Search Report and Search Opinion) received for European Patent Application No. 09818165.4, mailed on Jun. 22, 2012, 5 pages.
Final Office Action received for U.S. Appl. No. 12/286,410, mailed on Apr. 9, 2012, 15 pages.
Final Office Action received for U.S. Appl. No. 12/286,410, mailed on Jun. 12, 2014, 16 pages.
Final Office Action received for U.S. Appl. No. 12/286,488, mailed on Aug. 23, 2018, 30 pages.
Final Office Action received for U.S. Appl. No. 12/286,488, mailed on Jun. 6, 2011, 28 pages.
Final Office Action received for U.S. Appl. No. 12/286,488, mailed on Mar. 10, 2015, 16 pages.
Final Office Action received for U.S. Appl. No. 12/286,494, mailed on Dec. 27, 2013, 21 pages.
Final Office Action received for U.S. Appl. No. 12/286,494, mailed on Feb. 3, 2016, 19 pages.
Final Office Action received for U.S. Appl. No. 12/286,494, mailed on Mar. 9, 2012, 20 pages.
Final Office Action received for U.S. Appl. No. 16/413,402, mailed on May 18, 2021, 17 pages.
Final Office Action received for U.S. Appl. No. 17/527,942, mailed on Feb. 15, 2024, 19 pages.
Handheld, MacMillian Publishers, Online Available at: <http://www.macmillandictionary.com/dictionary/american/handheld>, retrieved on May 27, 2011, 1 page.
International Preliminary Report on Patentability received for PCT Patent Application No. PCT/US2009/053441, mailed on Apr. 14, 2011, 6 pages.
International Search Report and Written Opinion received for PCT Patent Application No. PCT/US2009/053441, mailed on May 25, 2010, 7 pages.
Non-Final Office Action received for U.S. Appl. No. 12/286,410, mailed on Dec. 11, 2012, 17 pages.
Non-Final Office Action received for U.S. Appl. No. 12/286,410, mailed on May 15, 2013, 15 pages.
Non-Final Office Action received for U.S. Appl. No. 12/286,410, mailed on Oct. 11, 2013, 17 pages.
Non-Final Office Action received for U.S. Appl. No. 12/286,410, mailed on Oct. 27, 2011, 12 pages.
Non-Final Office Action received for U.S. Appl. No. 12/286,488, mailed on Apr. 25, 2014, 29 pages.
Non-Final Office Action received for U.S. Appl. No. 12/286,488, mailed on Feb. 9, 2018, 21 pages.
Non-Final Office Action received for U.S. Appl. No. 12/286,488, mailed on Jan. 26, 2011, 20 pages.
Non-Final Office Action received for U.S. Appl. No. 12/286,488, mailed on Nov. 12, 2014, 9 pages.
Non-Final Office Action received for U.S. Appl. No. 12/286,494, mailed on Aug. 20, 2015, 16 pages.
Non-Final Office Action received for U.S. Appl. No. 12/286,494, mailed on Jan. 9, 2015, 13 pages.
Non-Final Office Action received for U.S. Appl. No. 12/286,494, mailed on Jul. 29, 2013, 21 pages.
Non-Final Office Action received for U.S. Appl. No. 12/286,494, mailed on Jun. 3, 2014, 13 pages.
Non-Final Office Action received for U.S. Appl. No. 12/286,494, mailed on Sep. 13, 2011, 17 pages.
Non-Final Office Action received for U.S. Appl. No. 15/145,633, mailed on Jun. 14, 2018, 19 pages.
Non-Final Office Action received for U.S. Appl. No. 16/413,402, mailed on Jan. 21, 2021, 14 pages.
Non-Final Office Action received for U.S. Appl. No. 17/527,942, mailed on Oct. 4, 2023, 16 pages.
Notice from the European Patent Office dated Oct. 1, 2007 Concerning Business Methods, Official Journal EPO, available online at <http://archive.epo.org/epo/pubs/oj007/11_07/11_5927.pdf>, Nov. 2007, pp. 592-593.
Notice of Allowance received for U.S. Appl. No. 12/286,488, mailed on Jun. 12, 2019, 17 pages.
Notice of Allowance received for U.S. Appl. No. 15/145,633, mailed on Jan. 8, 2019, 14 pages.
Office Action received for European Patent Application No. 09818165.4, mailed on Aug. 3, 2016, 7 pages.
Pfaffenberger Bryan, "Webster's New World Computer Dictionary", 10th Edition, Wiley Publishing, Inc., 2003, 3 pages.

(56) References Cited

OTHER PUBLICATIONS

Quicken 2003 for MAC User Guide, 2002, 47 pages.
Stripe Developers, "No-code payments with Payment Links & NFC tags", Online available at: https://www.youtube.com/watch?v=F8zX1qYgLg8, May 11, 2022, 2 pages.
Tewari et al., "Multiparty Micropayments for Ad Hoc Networks", IEEE, 2003, pp. 2033-2040.

* cited by examiner

FIG. 7I
FRANCESCO'S DEVICE
10:09
5G
SENDING $20...
STAY NEAR RECIPIENT
600
600a
600e
742
744
746
705-9
SALLY'S DEVICE
10:09
5G
$20
"THANK YOU"
FROM FRANCESCO
DECLINE
ACCEPT
ACCEPT AS SALLY
601
601a
601c
601e
748
752
754
756
758
758-1
758-2
759
760
707-1
750
750-1

FIG. 7M
SALLY'S DEVICE
601c
752
748
772
10:09
5G
$20
"THANK YOU"
FROM FRANCESCO
601
601a
FRANCESCO'S DEVICE
744-1
SENDING $ 20 TO
SALLY APPLESEED
STAY NEAR RECIPIENT
600
600a
742
744

FIG. 7N
SALLY'S DEVICE
601c
748
772
10:09
5G
$20
"THANK YOU"
FROM FRANCESCO
601
601a
FRANCESCO'S DEVICE
705-13
DONE
YOU SENT $20 TO
SALLY APPLESEED
600
600a
742
744

*FIG. 7Z*
SALLY'S DEVICE
5G
THURSDAY, MARCH 16
10:09
SET UP FUNDS
NOW
COMPLETE SETUP WITHIN
7 DAYS TO RECEIVE FUNDS
799
601
601a
SALLY'S WATCH
NOW
SET UP FUNDS
ON PHONE
COMPLETE SETUP
WITHIN 7 DAYS TO
RECEIVE FUNDS
OK
701
701a
797

USER INTERFACES FOR MANAGING ACCOUNT INFORMATION

CROSS-REFERENCE TO RELATED APPLICATIONS

This application claims priority to U.S. Provisional Application No. 63/656,419, entitled "USER INTERFACES FOR MANAGING ACCOUNT INFORMATION," filed on Jun. 5, 2024, which is hereby incorporated by reference in its entirety.

FIELD

The present disclosure relates generally to computer user interfaces, and more specifically to techniques for managing account information.

BACKGROUND

Electronic devices can be used to manage an account provisioned on the electronic device. Various features of an account can be controlled, performed, or managed using an electronic device.

BRIEF SUMMARY

Some techniques for managing account information using electronic devices, however, are generally cumbersome and inefficient. For example, some existing techniques require the transmission of user identification information that a user may wish not to share with another user. As another example, some existing techniques require the use of certain applications that may not be commonly used by a user of a device, which may unnecessarily cause the user to open a seldom-used application or navigate a seldom-used interface. As another example, some existing techniques provide limited options to easily and conveniently manage resources associated with an account. As another example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing account information. Such methods and interfaces optionally complement or replace other methods for managing account information. Such methods and interfaces reduce the cognitive burden on a user and produce a more efficient human-machine interface. For battery-operated computing devices, such methods and interfaces conserve power and increase the time between battery charges.

In accordance with some embodiments, a method is described. The method is performed at a computer system that is in communication with one or more display generation components and one or more input devices. The method comprises: while displaying a resource transfer interface that includes a resource transfer amount and user identification information for a first party of the resource transfer, receiving, via the one or more input devices, a first set of one or more inputs that includes a selection of one or more user identification options for the first party; and in response to receiving the first set of one or more inputs: in accordance with a determination that the first set of one or more inputs corresponds to selection of a first set of user identification options for the first party of the resource transfer, initiating a process to perform a resource transfer that includes transmitting user identification information for the first party with a first set of identification information that is based on the selected first set of user identification options for the first party of the resource transfer, wherein the first set of identification information includes first identification information; and in accordance with a determination that the first set of one or more inputs corresponds to selection of a second set of user identification options, different from the first set of user identification options, for the first party of the resource transfer, initiating a process to perform a resource transfer that includes transmitting user identification information for the first party with a second set of identification information that is based on the selected second set of user identification options for the first party of the resource transfer, without including the first identification information.

In accordance with some embodiments, a method is described. The method is performed at a computer system that is in communication with one or more display generation components and one or more input devices, wherein the one or more input devices includes a first component that is located at a first region of the computer system. The method comprises: receiving, via the one or more input devices, one or more inputs corresponding to a request to initiate a process for performing a resource transfer between a first resource account associated with the computer system and a second resource account associated with an external computer system; and in response to receiving the one or more inputs corresponding to the request to initiate the process for performing the resource transfer, displaying, via the one or more display generation components, a resource transfer interface that is associated with a process for positioning the first component of the computer system to initiate the resource transfer between the first resource account associated with the computer system and the second resource account associated with the external computer system, wherein displaying the resource transfer interface includes: in accordance with a determination that the computer system is initiating a resource transfer from the first resource account to the second resource account: displaying, via the one or more display generation components, a representation of a resource transfer amount; and displaying, via the one or more display generation components, a first visual effect that includes animated movement of particles from the representation of the resource transfer amount towards the first region of the computer system.

In accordance with some embodiments, a method is described. The method is performed at a computer system that is in communication with one or more display generation components and one or more input devices, wherein the one or more input devices includes a short-range communication component. The method comprises: receiving, via the short-range communication component, short-range communication data corresponding to a request to transfer resources to a resource account associated with a short-range communication code; after receiving the short-range communication data corresponding to the request to transfer resources to the resource account associated with the short-range communication code, displaying, via the one or more display generation components, a resource transfer interface, including: an indication of the resource account associated with the short-range communication code; and a resource transfer amount interface that is selectable to specify an amount of the resource transfer; while displaying the resource transfer interface, receiving, via the one or more input devices, a set of one or more inputs, wherein the set of one or more inputs includes a request to initiate the resource transfer; and in response to receiving the set of one or more inputs: in accordance with a determination that the set of one or more inputs specify a first amount for the resource transfer, initiating a process for transferring the first amount of resources to the resource account associated with the short-range communication code; and in accordance with a determination that the set of one or more inputs specify a second amount for the resource transfer different from the first amount, initiating a process for transferring the second amount of resources to the resource account associated with the short-range communication code.

In accordance with some embodiments, a method is described. The method is performed at a computer system that is in communication with one or more display generation components and one or more input devices. The method comprises: displaying, via the one or more display generation components, a graphical representation of a digital pass for a live event, wherein the digital pass is stored in an electronic wallet of the computer system; receiving, via the one or more input devices, data corresponding to the digital pass for the live event; after receiving the data corresponding to the digital pass for the live event, detecting, via the one or more input devices, a request to display the graphical representation of the digital pass; and in response to detecting the request to display the graphical representation of the digital pass, displaying, via the one or more display generation components, the graphical representation of the digital pass having an updated appearance, wherein displaying the graphical representation of the digital pass having the updated appearance includes: in accordance with a determination that the received data includes updated information for the live event, displaying the graphical representation of the digital pass including a representation of the updated information for the live event; and in accordance with a determination that the received data includes data collected at the live event using a respective application available at the computer system, displaying an item associated with the live event generated using the data collected at the live event using the respective application.

In accordance with some embodiments, a method is described. The method is performed at a computer system that is in communication with one or more display generation components and one or more input devices. The method comprises: storing, in an electronic wallet of the computer system, a digital pass corresponding to a plurality of live events; while the electronic wallet of the computer system is storing the digital pass, receiving, via the one or more input devices, a request to display a graphical representation of a digital pass; and in response to receiving the request to display the graphical representation of a digital pass, displaying, via the one or more display generation components, the graphical representation of the digital pass, wherein displaying the graphical representation of the digital pass includes: in accordance with a determination that a first set of one or more time conditions are met, including a first condition that is met when the current date is not after a first date, displaying a representation of a first live event at a first location of the graphical representation of the digital pass; and in accordance with a determination that a second set of one or more time conditions are met, different from the first set of one or more conditions, including a second condition that is met when the current date is after the first date and not after a second date, displaying a representation of a second live event, different from the first live event, at the first location of the graphical representation of the digital pass.

In accordance with some embodiments, a non-transitory computer-readable storage medium is described. The non-transitory computer-readable storage medium stores one or more programs configured to be executed by one or more processors of a computer system that is in communication with one or more display generation components and one or more input devices, the one or more programs including instructions for: while displaying a resource transfer interface that includes a resource transfer amount and user identification information for a first party of the resource transfer, receiving, via the one or more input devices, a first set of one or more inputs that includes a selection of one or more user identification options for the first party; and in response to receiving the first set of one or more inputs: in accordance with a determination that the first set of one or more inputs corresponds to selection of a first set of user identification options for the first party of the resource transfer, initiating a process to perform a resource transfer that includes transmitting user identification information for the first party with a first set of identification information that is based on the selected first set of user identification options for the first party of the resource transfer, wherein the first set of identification information includes first identification information; and in accordance with a determination that the first set of one or more inputs corresponds to selection of a second set of user identification options, different from the first set of user identification options, for the first party of the resource transfer, initiating a process to perform a resource transfer that includes transmitting user identification information for the first party with a second set of identification information that is based on the selected second set of user identification options for the first party of the resource transfer, without including the first identification information.

In accordance with some embodiments, a non-transitory computer-readable storage medium is described. The non-transitory computer-readable storage medium stores one or more programs configured to be executed by one or more processors of a computer system that is in communication with one or more display generation components and one or more input devices, wherein the one or more input devices includes a first component that is located at a first region of the computer system, the one or more programs including instructions for: receiving, via the one or more input devices, one or more inputs corresponding to a request to initiate a process for performing a resource transfer between a first resource account associated with the computer system and a second resource account associated with an external computer system; and in response to receiving the one or more inputs corresponding to the request to initiate the process for performing the resource transfer, displaying, via the one or more display generation components, a resource transfer interface that is associated with a process for positioning the first component of the computer system to initiate the resource transfer between the first resource account associated with the computer system and the second resource account associated with the external computer system, wherein displaying the resource transfer interface includes: in accordance with a determination that the computer system is initiating a resource transfer from the first resource account to the second resource account: displaying, via the one or more display generation components, a representation of a resource transfer amount; and displaying, via the one or more display generation components, a first visual effect that includes animated movement of particles from the representation of the resource transfer amount towards the first region of the computer system.

In accordance with some embodiments, a non-transitory computer-readable storage medium is described. The non-transitory computer-readable storage medium stores one or more programs configured to be executed by one or more processors of a computer system that is in communication with one or more display generation components and one or more input devices, wherein the one or more input devices includes a short-range communication component, the one or more programs including instructions for: receiving, via the short-range communication component, short-range communication data corresponding to a request to transfer resources to a resource account associated with a short-range communication code; after receiving the short-range communication data corresponding to the request to transfer resources to the resource account associated with the short-range communication code, displaying, via the one or more display generation components, a resource transfer interface, including: an indication of the resource account associated with the short-range communication code; and a resource transfer amount interface that is selectable to specify an amount of the resource transfer; while displaying the resource transfer interface, receiving, via the one or more input devices, a set of one or more inputs, wherein the set of one or more inputs includes a request to initiate the resource transfer; and in response to receiving the set of one or more inputs: in accordance with a determination that the set of one or more inputs specify a first amount for the resource transfer, initiating a process for transferring the first amount of resources to the resource account associated with the short-range communication code; and in accordance with a determination that the set of one or more inputs specify a second amount for the resource transfer different from the first amount, initiating a process for transferring the second amount of resources to the resource account associated with the short-range communication code.

In accordance with some embodiments, a non-transitory computer-readable storage medium is described. The non-transitory computer-readable storage medium stores one or more programs configured to be executed by one or more processors of a computer system that is in communication with one or more display generation components and one or more input devices, the one or more programs including instructions for: displaying, via the one or more display generation components, a graphical representation of a digital pass for a live event, wherein the digital pass is stored in an electronic wallet of the computer system; receiving, via the one or more input devices, data corresponding to the digital pass for the live event; after receiving the data corresponding to the digital pass for the live event, detecting, via the one or more input devices, a request to display the graphical representation of the digital pass; and in response to detecting the request to display the graphical representation of the digital pass, displaying, via the one or more display generation components, the graphical representation of the digital pass having an updated appearance, wherein displaying the graphical representation of the digital pass having the updated appearance includes: in accordance with a determination that the received data includes updated information for the live event, displaying the graphical representation of the digital pass including a representation of the updated information for the live event; and in accordance with a determination that the received data includes data collected at the live event using a respective application available at the computer system, displaying an item associated with the live event generated using the data collected at the live event using the respective application.

In accordance with some embodiments, a non-transitory computer-readable storage medium is described. The non-transitory computer-readable storage medium stores one or more programs configured to be executed by one or more processors of a computer system that is in communication with one or more display generation components and one or more input devices, the one or more programs including instructions for: storing, in an electronic wallet of the computer system, a digital pass corresponding to a plurality of live events; while the electronic wallet of the computer system is storing the digital pass, receiving, via the one or more input devices, a request to display a graphical representation of a digital pass; and in response to receiving the request to display the graphical representation of a digital pass, displaying, via the one or more display generation components, the graphical representation of the digital pass, wherein displaying the graphical representation of the digital pass includes: in accordance with a determination that a first set of one or more time conditions are met, including a first condition that is met when the current date is not after a first date, displaying a representation of a first live event at a first location of the graphical representation of the digital pass; and in accordance with a determination that a second set of one or more time conditions are met, different from the first set of one or more conditions, including a second condition that is met when the current date is after the first date and not after a second date, displaying a representation of a second live event, different from the first live event, at the first location of the graphical representation of the digital pass.

In accordance with some embodiments, a transitory computer-readable storage medium is described. The transitory computer-readable storage medium stores one or more programs configured to be executed by one or more processors of a computer system that is in communication with one or more display generation components and one or more input devices, the one or more programs including instructions for: while displaying a resource transfer interface that includes a resource transfer amount and user identification information for a first party of the resource transfer, receiving, via the one or more input devices, a first set of one or more inputs that includes a selection of one or more user identification options for the first party; and in response to receiving the first set of one or more inputs: in accordance with a determination that the first set of one or more inputs corresponds to selection of a first set of user identification options for the first party of the resource transfer, initiating a process to perform a resource transfer that includes transmitting user identification information for the first party with a first set of identification information that is based on the selected first set of user identification options for the first party of the resource transfer, wherein the first set of identification information includes first identification information; and in accordance with a determination that the first set of one or more inputs corresponds to selection of a second set of user identification options, different from the first set of user identification options, for the first party of the resource transfer, initiating a process to perform a resource transfer that includes transmitting user identification information for the first party with a second set of identification information that is based on the selected second set of user identification options for the first party of the resource transfer, without including the first identification information.

In accordance with some embodiments, a transitory computer-readable storage medium is described. The transitory computer-readable storage medium stores one or more programs configured to be executed by one or more processors of a computer system that is in communication with one or more display generation components and one or more input devices, wherein the one or more input devices includes a first component that is located at a first region of the computer system, the one or more programs including instructions for: receiving, via the one or more input devices, one or more inputs corresponding to a request to initiate a process for performing a resource transfer between a first resource account associated with the computer system and a second resource account associated with an external computer system; and in response to receiving the one or more inputs corresponding to the request to initiate the process for performing the resource transfer, displaying, via the one or more display generation components, a resource transfer interface that is associated with a process for positioning the first component of the computer system to initiate the resource transfer between the first resource account associated with the computer system and the second resource account associated with the external computer system, wherein displaying the resource transfer interface includes: in accordance with a determination that the computer system is initiating a resource transfer from the first resource account to the second resource account: displaying, via the one or more display generation components, a representation of a resource transfer amount; and displaying, via the one or more display generation components, a first visual effect that includes animated movement of particles from the representation of the resource transfer amount towards the first region of the computer system.

In accordance with some embodiments, a transitory computer-readable storage medium is described. The transitory computer-readable storage medium stores one or more programs configured to be executed by one or more processors of a computer system that is in communication with one or more display generation components and one or more input devices, wherein the one or more input devices includes a short-range communication component, the one or more programs including instructions for: receiving, via the short-range communication component, short-range communication data corresponding to a request to transfer resources to a resource account associated with a short-range communication code; after receiving the short-range communication data corresponding to the request to transfer resources to the resource account associated with the short-range communication code, displaying, via the one or more display generation components, a resource transfer interface, including: an indication of the resource account associated with the short-range communication code; and a resource transfer amount interface that is selectable to specify an amount of the resource transfer; while displaying the resource transfer interface, receiving, via the one or more input devices, a set of one or more inputs, wherein the set of one or more inputs includes a request to initiate the resource transfer; and in response to receiving the set of one or more inputs: in accordance with a determination that the set of one or more inputs specify a first amount for the resource transfer, initiating a process for transferring the first amount of resources to the resource account associated with the short-range communication code; and in accordance with a determination that the set of one or more inputs specify a second amount for the resource transfer different from the first amount, initiating a process for transferring the second amount of resources to the resource account associated with the short-range communication code.

In accordance with some embodiments, a transitory computer-readable storage medium is described. The transitory computer-readable storage medium stores one or more programs configured to be executed by one or more processors of a computer system that is in communication with one or more display generation components and one or more input devices, the one or more programs including instructions for: displaying, via the one or more display generation components, a graphical representation of a digital pass for a live event, wherein the digital pass is stored in an electronic wallet of the computer system; receiving, via the one or more input devices, data corresponding to the digital pass for the live event; after receiving the data corresponding to the digital pass for the live event, detecting, via the one or more input devices, a request to display the graphical representation of the digital pass; and in response to detecting the request to display the graphical representation of the digital pass, displaying, via the one or more display generation components, the graphical representation of the digital pass having an updated appearance, wherein displaying the graphical representation of the digital pass having the updated appearance includes: in accordance with a determination that the received data includes updated information for the live event, displaying the graphical representation of the digital pass including a representation of the updated information for the live event; and in accordance with a determination that the received data includes data collected at the live event using a respective application available at the computer system, displaying an item associated with the live event generated using the data collected at the live event using the respective application.

In accordance with some embodiments, a transitory computer-readable storage medium is described. The transitory computer-readable storage medium stores one or more programs configured to be executed by one or more processors of a computer system that is in communication with one or more display generation components and one or more input devices, the one or more programs including instructions for: storing, in an electronic wallet of the computer system, a digital pass corresponding to a plurality of live events; while the electronic wallet of the computer system is storing the digital pass, receiving, via the one or more input devices, a request to display a graphical representation of a digital pass; and in response to receiving the request to display the graphical representation of a digital pass, displaying, via the one or more display generation components, the graphical representation of the digital pass, wherein displaying the graphical representation of the digital pass includes: in accordance with a determination that a first set of one or more time conditions are met, including a first condition that is met when the current date is not after a first date, displaying a representation of a first live event at a first location of the graphical representation of the digital pass; and in accordance with a determination that a second set of one or more time conditions are met, different from the first set of one or more conditions, including a second condition that is met when the current date is after the first date and not after a second date, displaying a representation of a second live event, different from the first live event, at the first location of the graphical representation of the digital pass.

In accordance with some embodiments, a computer system is described. The computer system is configured to communicate with one or more display generation components and one or more input devices and comprises: one or more processors; and memory storing one or more programs configured to be executed by the one or more processors, the one or more programs including instructions for: while displaying a resource transfer interface that includes a resource transfer amount and user identification information for a first party of the resource transfer, receiving, via the one or more input devices, a first set of one or more inputs that includes a selection of one or more user identification options for the first party; and in response to receiving the first set of one or more inputs: in accordance with a determination that the first set of one or more inputs corresponds to selection of a first set of user identification options for the first party of the resource transfer, initiating a process to perform a resource transfer that includes transmitting user identification information for the first party with a first set of identification information that is based on the selected first set of user identification options for the first party of the resource transfer, wherein the first set of identification information includes first identification information; and in accordance with a determination that the first set of one or more inputs corresponds to selection of a second set of user identification options, different from the first set of user identification options, for the first party of the resource transfer, initiating a process to perform a resource transfer that includes transmitting user identification information for the first party with a second set of identification information that is based on the selected second set of user identification options for the first party of the resource transfer, without including the first identification information.

In accordance with some embodiments, a computer system is described. The computer system is configured to communicate with one or more display generation components and one or more input devices, wherein the one or more input devices includes a first component that is located at a first region of the computer system, and comprises: one or more processors; and memory storing one or more programs configured to be executed by the one or more processors, the one or more programs including instructions for: receiving, via the one or more input devices, one or more inputs corresponding to a request to initiate a process for performing a resource transfer between a first resource account associated with the computer system and a second resource account associated with an external computer system; and in response to receiving the one or more inputs corresponding to the request to initiate the process for performing the resource transfer, displaying, via the one or more display generation components, a resource transfer interface that is associated with a process for positioning the first component of the computer system to initiate the resource transfer between the first resource account associated with the computer system and the second resource account associated with the external computer system, wherein displaying the resource transfer interface includes: in accordance with a determination that the computer system is initiating a resource transfer from the first resource account to the second resource account: displaying, via the one or more display generation components, a representation of a resource transfer amount; and displaying, via the one or more display generation components, a first visual effect that includes animated movement of particles from the representation of the resource transfer amount towards the first region of the computer system.

In accordance with some embodiments, a computer system is described. The computer system is configured to communicate with one or more display generation components and one or more input devices, wherein the one or more input devices includes a short-range communication component, and comprises: one or more processors; and memory storing one or more programs configured to be executed by the one or more processors, the one or more programs including instructions for: receiving, via the short-range communication component, short-range communication data corresponding to a request to transfer resources to a resource account associated with a short-range communication code; after receiving the short-range communication data corresponding to the request to transfer resources to the resource account associated with the short-range communication code, displaying, via the one or more display generation components, a resource transfer interface, including: an indication of the resource account associated with the short-range communication code; and a resource transfer amount interface that is selectable to specify an amount of the resource transfer; while displaying the resource transfer interface, receiving, via the one or more input devices, a set of one or more inputs, wherein the set of one or more inputs includes a request to initiate the resource transfer; and in response to receiving the set of one or more inputs: in accordance with a determination that the set of one or more inputs specify a first amount for the resource transfer, initiating a process for transferring the first amount of resources to the resource account associated with the short-range communication code; and in accordance with a determination that the set of one or more inputs specify a second amount for the resource transfer different from the first amount, initiating a process for transferring the second amount of resources to the resource account associated with the short-range communication code.

In accordance with some embodiments, a computer system is described. The computer system is configured to communicate with one or more display generation components and one or more input devices, and comprises: one or more processors; and memory storing one or more programs configured to be executed by the one or more processors, the one or more programs including instructions for: displaying, via the one or more display generation components, a graphical representation of a digital pass for a live event, wherein the digital pass is stored in an electronic wallet of the computer system; receiving, via the one or more input devices, data corresponding to the digital pass for the live event; after receiving the data corresponding to the digital pass for the live event, detecting, via the one or more input devices, a request to display the graphical representation of the digital pass; and in response to detecting the request to display the graphical representation of the digital pass, displaying, via the one or more display generation components, the graphical representation of the digital pass having an updated appearance, wherein displaying the graphical representation of the digital pass having the updated appearance includes: in accordance with a determination that the received data includes updated information for the live event, displaying the graphical representation of the digital pass including a representation of the updated information for the live event; and in accordance with a determination that the received data includes data collected at the live event using a respective application available at the computer system, displaying an item associated with the live event generated using the data collected at the live event using the respective application.

In accordance with some embodiments, a computer system is described. The computer system is configured to communicate with one or more display generation components and one or more input devices, and comprises: one or more processors; and memory storing one or more programs configured to be executed by the one or more processors, the one or more programs including instructions for: storing, in an electronic wallet of the computer system, a digital pass corresponding to a plurality of live events; while the electronic wallet of the computer system is storing the digital pass, receiving, via the one or more input devices, a request to display a graphical representation of a digital pass; and in response to receiving the request to display the graphical representation of a digital pass, displaying, via the one or more display generation components, the graphical representation of the digital pass, wherein displaying the graphical representation of the digital pass includes: in accordance with a determination that a first set of one or more time conditions are met, including a first condition that is met when the current date is not after a first date, displaying a representation of a first live event at a first location of the graphical representation of the digital pass; and in accordance with a determination that a second set of one or more time conditions are met, different from the first set of one or more conditions, including a second condition that is met when the current date is after the first date and not after a second date, displaying a representation of a second live event, different from the first live event, at the first location of the graphical representation of the digital pass.

In accordance with some embodiments, a computer system is described. The computer system is configured to communicate with one or more display generation components and one or more input devices, and comprises: means for, while displaying a resource transfer interface that includes a resource transfer amount and user identification information for a first party of the resource transfer, receiving, via the one or more input devices, a first set of one or more inputs that includes a selection of one or more user identification options for the first party; and means for, in response to receiving the first set of one or more inputs: in accordance with a determination that the first set of one or more inputs corresponds to selection of a first set of user identification options for the first party of the resource transfer, initiating a process to perform a resource transfer that includes transmitting user identification information for the first party with a first set of identification information that is based on the selected first set of user identification options for the first party of the resource transfer, wherein the first set of identification information includes first identification information; and in accordance with a determination that the first set of one or more inputs corresponds to selection of a second set of user identification options, different from the first set of user identification options, for the first party of the resource transfer, initiating a process to perform a resource transfer that includes transmitting user identification information for the first party with a second set of identification information that is based on the selected second set of user identification options for the first party of the resource transfer, without including the first identification information.

In accordance with some embodiments, a computer system is described. The computer system is configured to communicate with one or more display generation components and one or more input devices, wherein the one or more input devices includes a first component that is located at a first region of the computer system, and comprises: means for receiving, via the one or more input devices, one or more inputs corresponding to a request to initiate a process for performing a resource transfer between a first resource account associated with the computer system and a second resource account associated with an external computer system; and means for, in response to receiving the one or more inputs corresponding to the request to initiate the process for performing the resource transfer, displaying, via the one or more display generation components, a resource transfer interface that is associated with a process for positioning the first component of the computer system to initiate the resource transfer between the first resource account associated with the computer system and the second resource account associated with the external computer system, wherein displaying the resource transfer interface includes: in accordance with a determination that the computer system is initiating a resource transfer from the first resource account to the second resource account: displaying, via the one or more display generation components, a representation of a resource transfer amount; and displaying, via the one or more display generation components, a first visual effect that includes animated movement of particles from the representation of the resource transfer amount towards the first region of the computer system.

In accordance with some embodiments, a computer system is described. The computer system is configured to communicate with one or more display generation components and one or more input devices, wherein the one or more input devices includes a short-range communication component, and comprises: means for receiving, via the short-range communication component, short-range communication data corresponding to a request to transfer resources to a resource account associated with a short-range communication code; means for, after receiving the short-range communication data corresponding to the request to transfer resources to the resource account associated with the short-range communication code, displaying, via the one or more display generation components, a resource transfer interface, including: an indication of the resource account associated with the short-range communication code; and a resource transfer amount interface that is selectable to specify an amount of the resource transfer; means for, while displaying the resource transfer interface, receiving, via the one or more input devices, a set of one or more inputs, wherein the set of one or more inputs includes a request to initiate the resource transfer; and means for, in response to receiving the set of one or more inputs: in accordance with a determination that the set of one or more inputs specify a first amount for the resource transfer, initiating a process for transferring the first amount of resources to the resource account associated with the short-range communication code; and in accordance with a determination that the set of one or more inputs specify a second amount for the resource transfer different from the first amount, initiating a process for transferring the second amount of resources to the resource account associated with the short-range communication code.

In accordance with some embodiments, a computer system is described. The computer system is configured to communicate with one or more display generation components and one or more input devices, and comprises: means for displaying, via the one or more display generation components, a graphical representation of a digital pass for a live event, wherein the digital pass is stored in an electronic wallet of the computer system; means for receiving, via the one or more input devices, data corresponding to the digital pass for the live event; means for, after receiving the data corresponding to the digital pass for the live event, detecting, via the one or more input devices, a request to display the graphical representation of the digital pass; and means for, in response to detecting the request to display the graphical representation of the digital pass, displaying, via the one or more display generation components, the graphical representation of the digital pass having an updated appearance, wherein displaying the graphical representation of the digital pass having the updated appearance includes: in accordance with a determination that the received data includes updated information for the live event, displaying the graphical representation of the digital pass including a representation of the updated information for the live event;

and in accordance with a determination that the received data includes data collected at the live event using a respective application available at the computer system, displaying an item associated with the live event generated using the data collected at the live event using the respective application.

In accordance with some embodiments, a computer system is described. The computer system is configured to communicate with one or more display generation components and one or more input devices, and comprises: means for displaying, via the one or more display generation components, a graphical representation of a digital pass for a live event, wherein the digital pass is stored in an electronic wallet of the computer system; means for storing, in an electronic wallet of the computer system, a digital pass corresponding to a plurality of live events; means for, while the electronic wallet of the computer system is storing the digital pass, receiving, via the one or more input devices, a request to display a graphical representation of a digital pass; and means for, in response to receiving the request to display the graphical representation of a digital pass, displaying, via the one or more display generation components, the graphical representation of the digital pass, wherein displaying the graphical representation of the digital pass includes: in accordance with a determination that a first set of one or more time conditions are met, including a first condition that is met when the current date is not after a first date, displaying a representation of a first live event at a first location of the graphical representation of the digital pass; and in accordance with a determination that a second set of one or more time conditions are met, different from the first set of one or more conditions, including a second condition that is met when the current date is after the first date and not after a second date, displaying a representation of a second live event, different from the first live event, at the first location of the graphical representation of the digital pass.

In accordance with some embodiments, a computer program product is described. The computer program product comprises one or more programs configured to be executed by one or more processors of a computer system that is in communication with one or more display generation components and one or more input devices, the one or more programs including instructions for: while displaying a resource transfer interface that includes a resource transfer amount and user identification information for a first party of the resource transfer, receiving, via the one or more input devices, a first set of one or more inputs that includes a selection of one or more user identification options for the first party; and in response to receiving the first set of one or more inputs: in accordance with a determination that the first set of one or more inputs corresponds to selection of a first set of user identification options for the first party of the resource transfer, initiating a process to perform a resource transfer that includes transmitting user identification information for the first party with a first set of identification information that is based on the selected first set of user identification options for the first party of the resource transfer, wherein the first set of identification information includes first identification information; and in accordance with a determination that the first set of one or more inputs corresponds to selection of a second set of user identification options, different from the first set of user identification options, for the first party of the resource transfer, initiating a process to perform a resource transfer that includes transmitting user identification information for the first party with a second set of identification information that is based on the selected second set of user identification options for the first party of the resource transfer, without including the first identification information.

In accordance with some embodiments, a computer program product is described. The computer program product comprises one or more programs configured to be executed by one or more processors of a computer system that is in communication with one or more display generation components and one or more input devices, wherein the one or more input devices includes a first component that is located at a first region of the computer system, the one or more programs including instructions for: receiving, via the one or more input devices, one or more inputs corresponding to a request to initiate a process for performing a resource transfer between a first resource account associated with the computer system and a second resource account associated with an external computer system; and in response to receiving the one or more inputs corresponding to the request to initiate the process for performing the resource transfer, displaying, via the one or more display generation components, a resource transfer interface that is associated with a process for positioning the first component of the computer system to initiate the resource transfer between the first resource account associated with the computer system and the second resource account associated with the external computer system, wherein displaying the resource transfer interface includes: in accordance with a determination that the computer system is initiating a resource transfer from the first resource account to the second resource account: displaying, via the one or more display generation components, a representation of a resource transfer amount; and displaying, via the one or more display generation components, a first visual effect that includes animated movement of particles from the representation of the resource transfer amount towards the first region of the computer system.

In accordance with some embodiments, a computer program product is described. The computer program product comprises one or more programs configured to be executed by one or more processors of a computer system that is in communication with one or more display generation components and one or more input devices, wherein the one or more input devices includes a short-range communication component, the one or more programs including instructions for: receiving, via the short-range communication component, short-range communication data corresponding to a request to transfer resources to a resource account associated with a short-range communication code; after receiving the short-range communication data corresponding to the request to transfer resources to the resource account associated with the short-range communication code, displaying, via the one or more display generation components, a resource transfer interface, including: an indication of the resource account associated with the short-range communication code; and a resource transfer amount interface that is selectable to specify an amount of the resource transfer; while displaying the resource transfer interface, receiving, via the one or more input devices, a set of one or more inputs, wherein the set of one or more inputs includes a request to initiate the resource transfer; and in response to receiving the set of one or more inputs: in accordance with a determination that the set of one or more inputs specify a first amount for the resource transfer, initiating a process for transferring the first amount of resources to the resource account associated with the short-range communication code; and in accordance with a determination that the set of one or more inputs specify a second amount for the resource transfer different from the first amount, initiating a process for transferring the second amount of resources to the resource account associated with the short-range communication code.

In accordance with some embodiments, a computer program product is described. The computer program product comprises one or more programs configured to be executed by one or more processors of a computer system that is in communication with one or more display generation components and one or more input devices, the one or more programs including instructions for: displaying, via the one or more display generation components, a graphical representation of a digital pass for a live event, wherein the digital pass is stored in an electronic wallet of the computer system; receiving, via the one or more input devices, data corresponding to the digital pass for the live event; after receiving the data corresponding to the digital pass for the live event, detecting, via the one or more input devices, a request to display the graphical representation of the digital pass; and in response to detecting the request to display the graphical representation of the digital pass, displaying, via the one or more display generation components, the graphical representation of the digital pass having an updated appearance, wherein displaying the graphical representation of the digital pass having the updated appearance includes: in accordance with a determination that the received data includes updated information for the live event, displaying the graphical representation of the digital pass including a representation of the updated information for the live event; and in accordance with a determination that the received data includes data collected at the live event using a respective application available at the computer system, displaying an item associated with the live event generated using the data collected at the live event using the respective application.

In accordance with some embodiments, a computer program product is described. The computer program product comprises one or more programs configured to be executed by one or more processors of a computer system that is in communication with one or more display generation components and one or more input devices, the one or more programs including instructions for: storing, in an electronic wallet of the computer system, a digital pass corresponding to a plurality of live events; while the electronic wallet of the computer system is storing the digital pass, receiving, via the one or more input devices, a request to display a graphical representation of a digital pass; and in response to receiving the request to display the graphical representation of a digital pass, displaying, via the one or more display generation components, the graphical representation of the digital pass, wherein displaying the graphical representation of the digital pass includes: in accordance with a determination that a first set of one or more time conditions are met, including a first condition that is met when the current date is not after a first date, displaying a representation of a first live event at a first location of the graphical representation of the digital pass; and in accordance with a determination that a second set of one or more time conditions are met, different from the first set of one or more conditions, including a second condition that is met when the current date is after the first date and not after a second date, displaying a representation of a second live event, different from the first live event, at the first location of the graphical representation of the digital pass.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing account information, thereby increasing the effectiveness, efficiency, and user satisfaction with such devices. Such methods and interfaces may complement or replace other methods for managing account information.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 13A-130 illustrate exemplary user interfaces for managing a digital pass, in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing account information. For example, some devices provide user interfaces for transferring account resources. As another example, some devices provide user interfaces for managing digital passes. Such techniques can reduce the cognitive burden on a user who manages account information, thereby enhancing productivity. Further, such techniques can reduce processor and battery power otherwise wasted on redundant user inputs.

Figure 8:
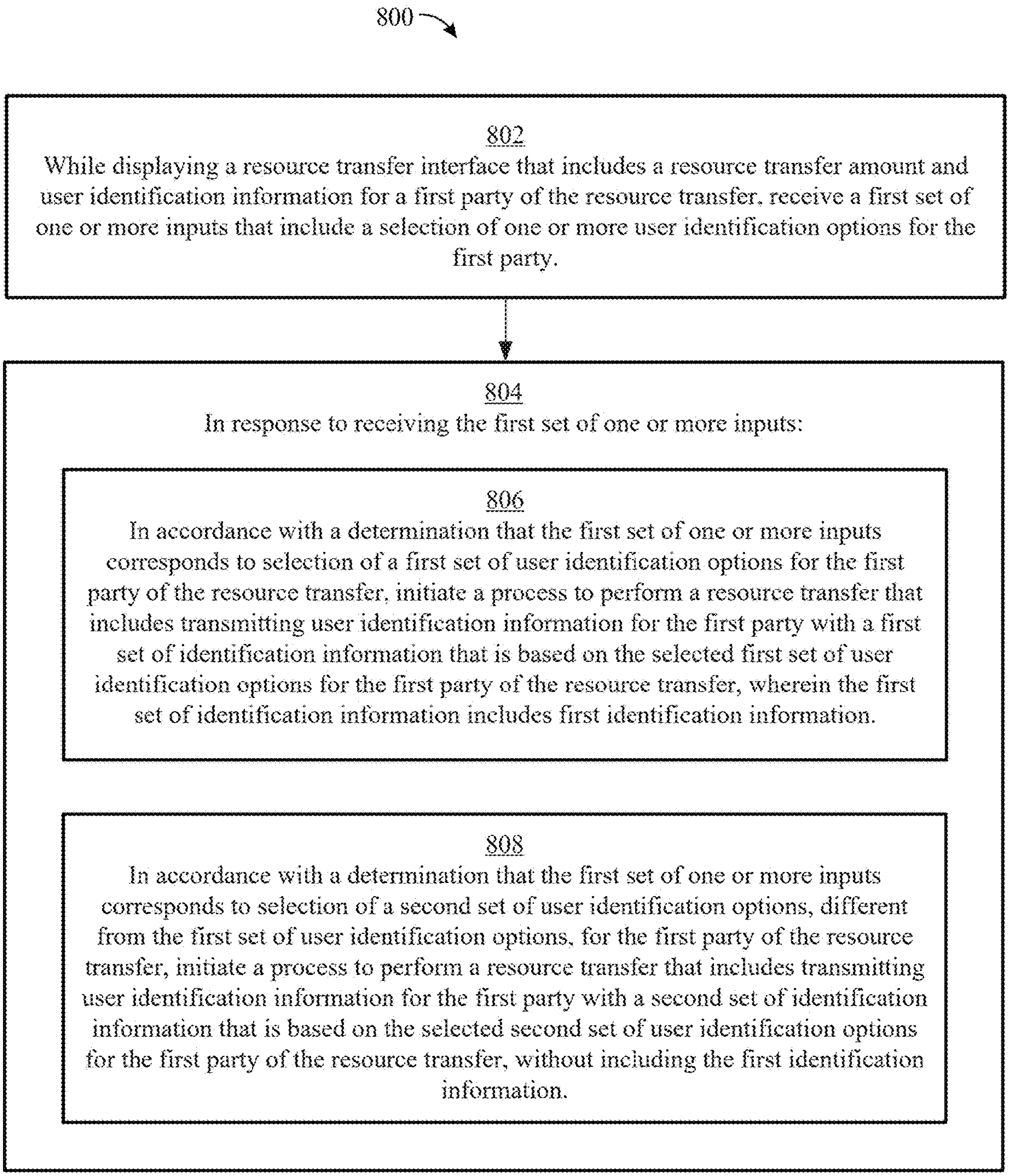
FIG. 8 is a flow diagram illustrating a method for customizing information that is shared when transferring account resources, in accordance with some embodiments.
Figure 9:
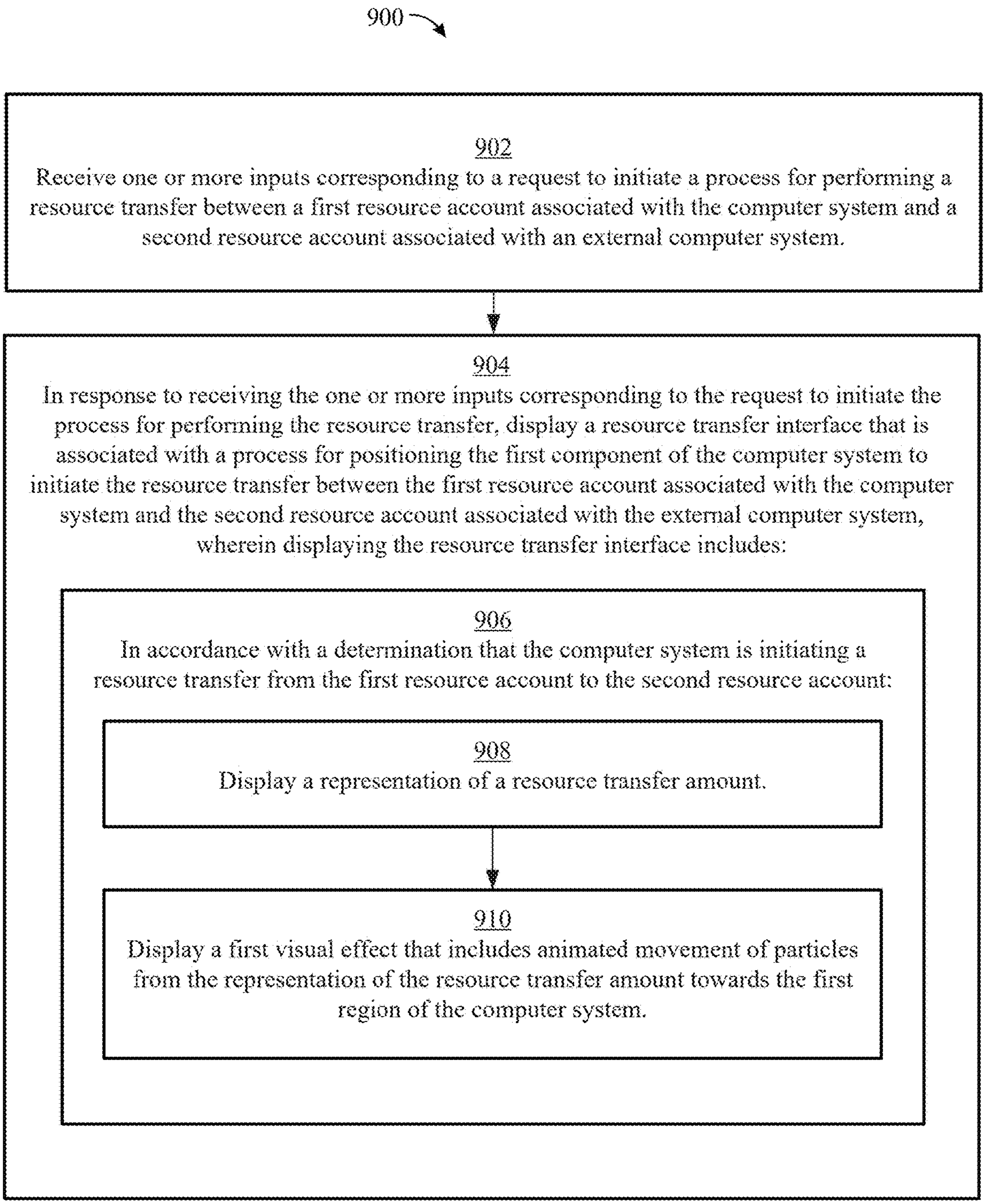
FIG. 9 is a flow diagram illustrating a method for providing visual feedback for instructing a resource transfer process, in accordance with some embodiments.
Figure 12A:
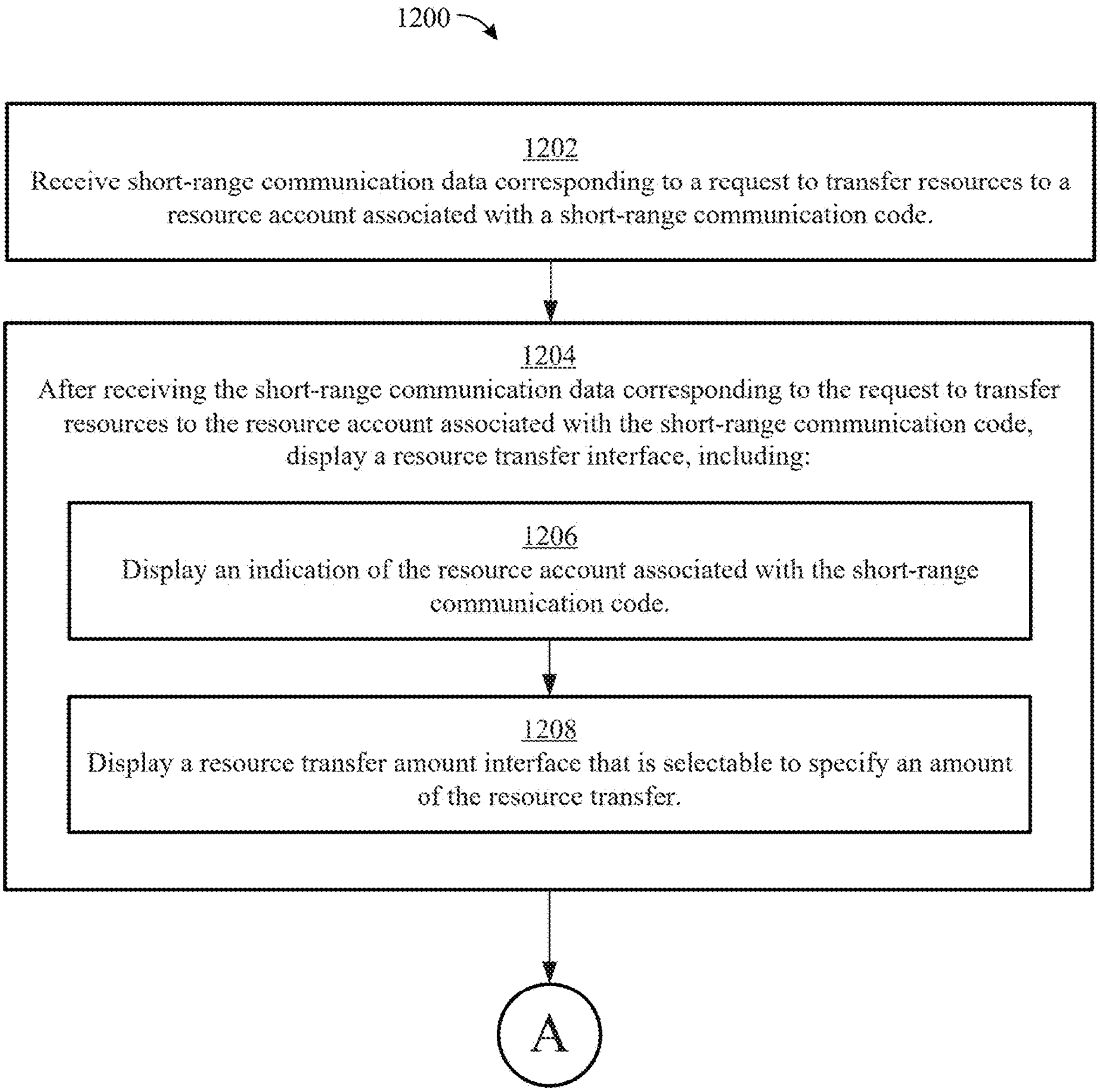
FIGS. 12A-12B are a flow diagram illustrating a method for performing a resource transfer process, in accordance with some embodiments.
Figure 12B:
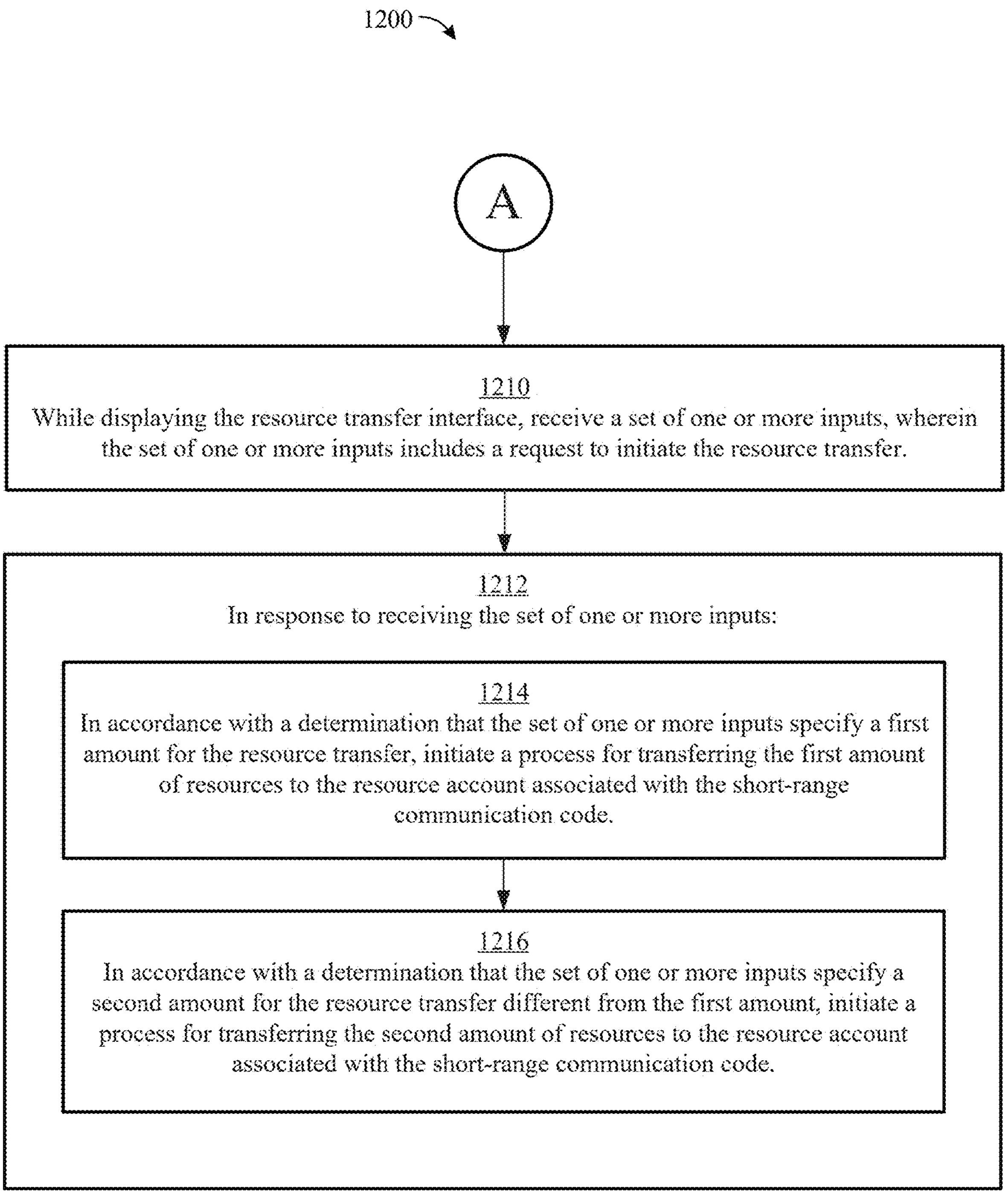
Figure 13A:
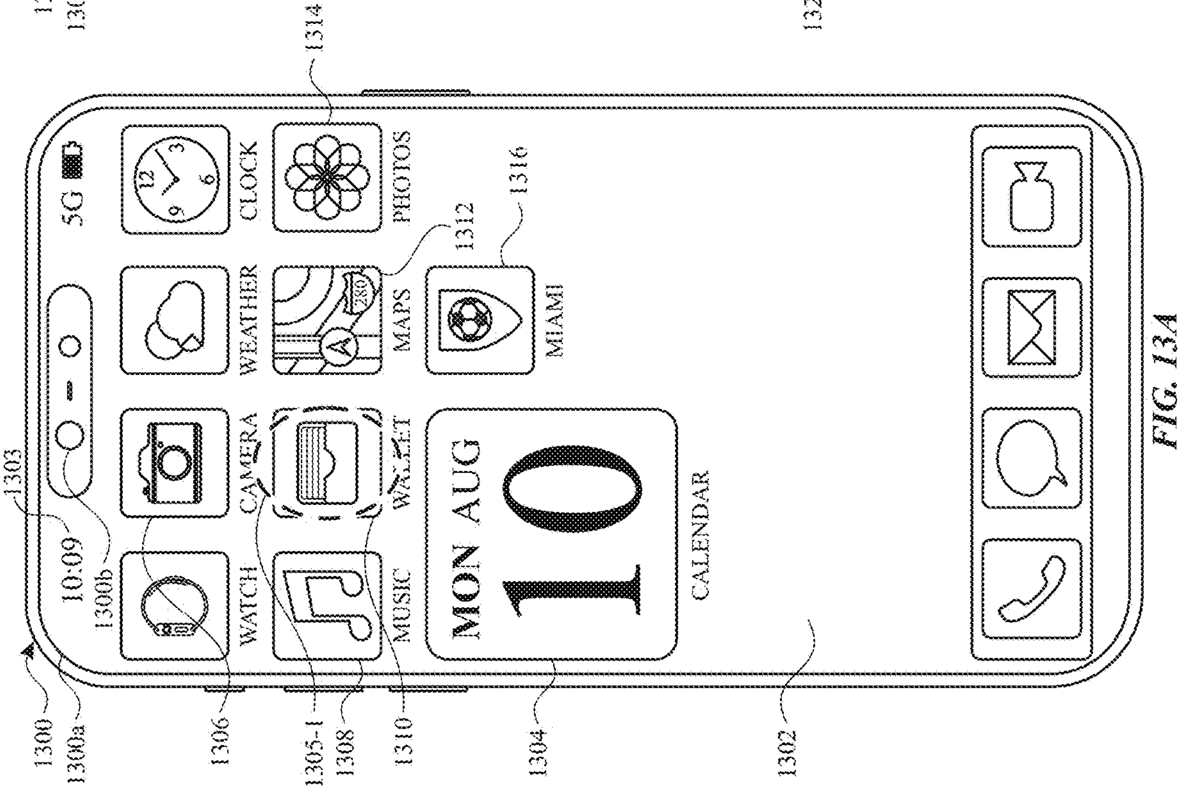
Figure 14:
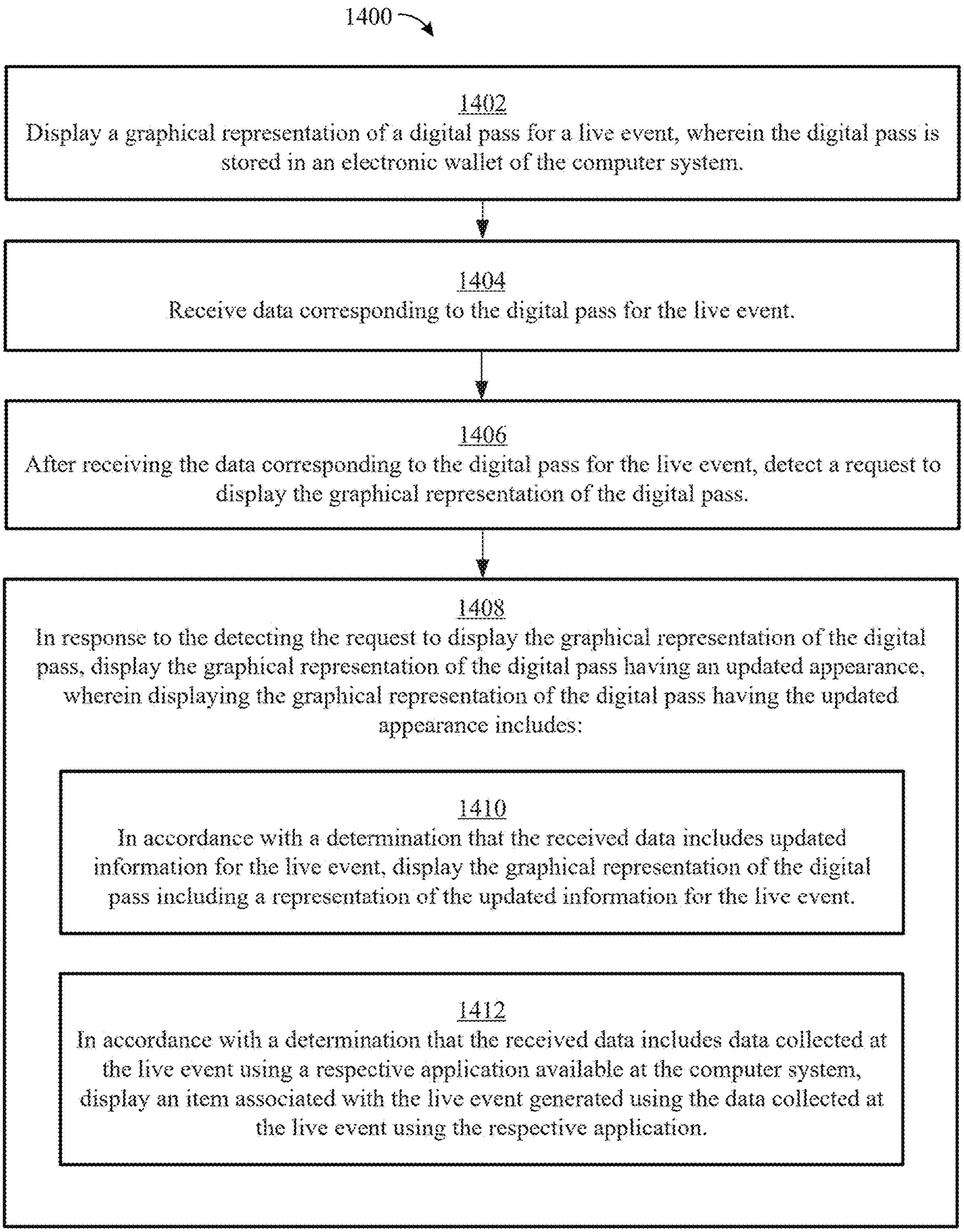
FIG. 14 is a flow diagram illustrating a method for managing a digital pass, in accordance with some embodiments.

Below, FIGS. 1A-1B, 2, 3A-3G, 4A-4B, and 5A-5C provide a description of exemplary devices for performing the techniques for managing account information. FIGS. 6A-6E and FIGS. 7A-7Z illustrate exemplary user interfaces for transferring account resources. FIG. 8 is a flow diagram illustrating a method for customizing information that is shared when transferring account resources, in accordance with some embodiments. FIG. 9 is a flow diagram illustrating a method for providing visual feedback for instructing a resource transfer process, in accordance with some embodiments. The user interfaces in FIGS. 6A-6E and FIGS. 7A-7Z are used to illustrate the processes described below, including the processes in FIGS. 8 and 9. FIGS. 10A-10B and FIGS. 11A-11N illustrate exemplary user interfaces for performing a resource transfer process, in accordance with some embodiments. FIGS. 12A-12B are a flow diagram illustrating a method for performing a resource transfer process, in accordance with some embodiments. The user interfaces in FIGS. 10A-10B and FIGS. 11A-11N are used to illustrate the processes described below, including the processes in FIGS. 12A-12B. FIGS. 13A-130 illustrate exemplary user interfaces for managing a digital pass, in accordance with some embodiments. FIG. 14 is a flow diagram illustrating a method for managing a digital pass, in accordance with some embodiments. The user interfaces in FIGS. 13A-130 are used to illustrate the processes described below, including the processes in FIG. 14. FIGS. 15A-15G illustrate exemplary user interfaces for managing a digital pass, in accordance with some embodiments. FIG. 16 is a flow diagram illustrating a method for managing a digital pass, in accordance with some embodiments. The user interfaces in FIGS. 15A-15G are used to illustrate the processes described below, including the processes in FIG. 16.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, enhancing security, increasing user privacy, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms “first,” “second,” etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms “a,” “an,” and “the” are intended to include the plural forms as well, unless the context clearly indicates otherwise. It will also be understood that the term “and/or” as used herein refers to and encompasses any and all possible combinations of one or more of the associated listed items. It will be further understood that the terms “includes,” “including,” “comprises,” and/or “comprising,” when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component (e.g., a display device such as a head-mounted display (HMD), a display, a projector, a touch-sensitive display, or other device or component that presents visual content to a user, for example on or in the display generation component itself or produced from the display generation component and visible elsewhere). The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
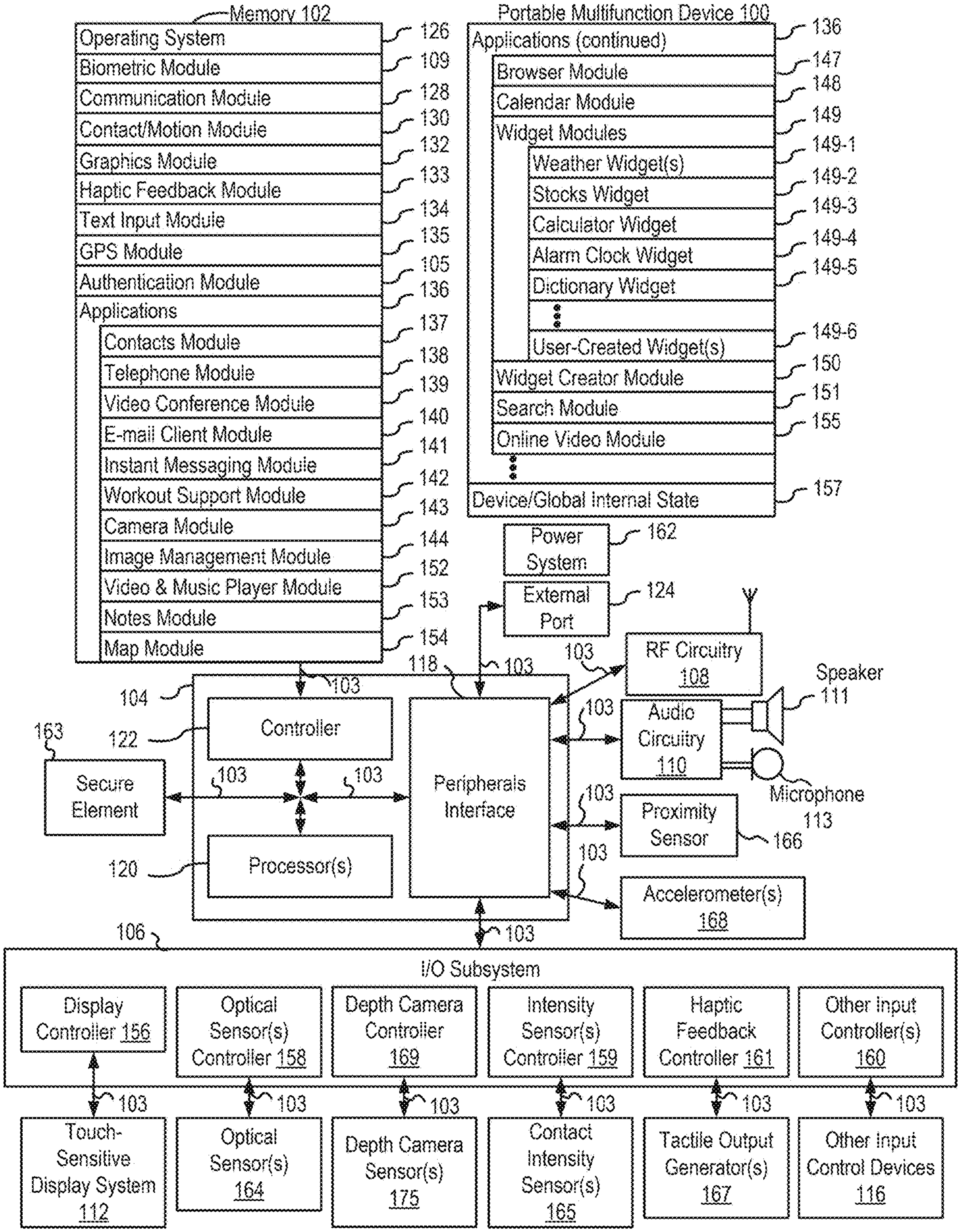
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" or "touch screen display" for convenience and is sometimes known as or called a "touch-sensitive display system." Device 100 includes memory 102 (which optionally includes one or more computer-readable storage media), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VOIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes secure element 163 for securely storing information. In some embodiments, secure element 163 is a hardware component (e.g., a secure microcontroller chip) configured to securely store data or an algorithm. In some embodiments, secure element 163 provides (e.g., releases) secure information (e.g., payment information (e.g., an account number and/or a transaction-specific dynamic security code), identification information (e.g., credentials of a state-approved digital identification), and/or authentication information (e.g., data generated using a cryptography engine and/or by performing asymmetric cryptography operations)). In some embodiments, secure element 163 provides (or releases) the secure information in response to device 100 receiving authorization, such as a user authentication (e.g., fingerprint authentication; passcode authentication; detecting double-press of a hardware button when device 100 is in an unlocked state, and optionally, while device 100 has been continuously on a user's wrist since device 100 was unlocked by providing authentication credentials to device 100, where the continuous presence of device 100 on the user's wrist is determined by periodically checking that the device is in contact with the user's skin). For example, device 100 detects a fingerprint at a fingerprint sensor (e.g., a fingerprint sensor integrated into a button) of device 100. Device 100 determines whether the detected fingerprint is consistent with an enrolled fingerprint. In accordance with a determination that the fingerprint is consistent with the enrolled fingerprint, secure element 163 provides (e.g., releases) the secure information. In accordance with a determination that the fingerprint is not consistent with the enrolled fingerprint, secure element 163 forgoes providing (e.g., releasing) the secure information.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety.

In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3A:
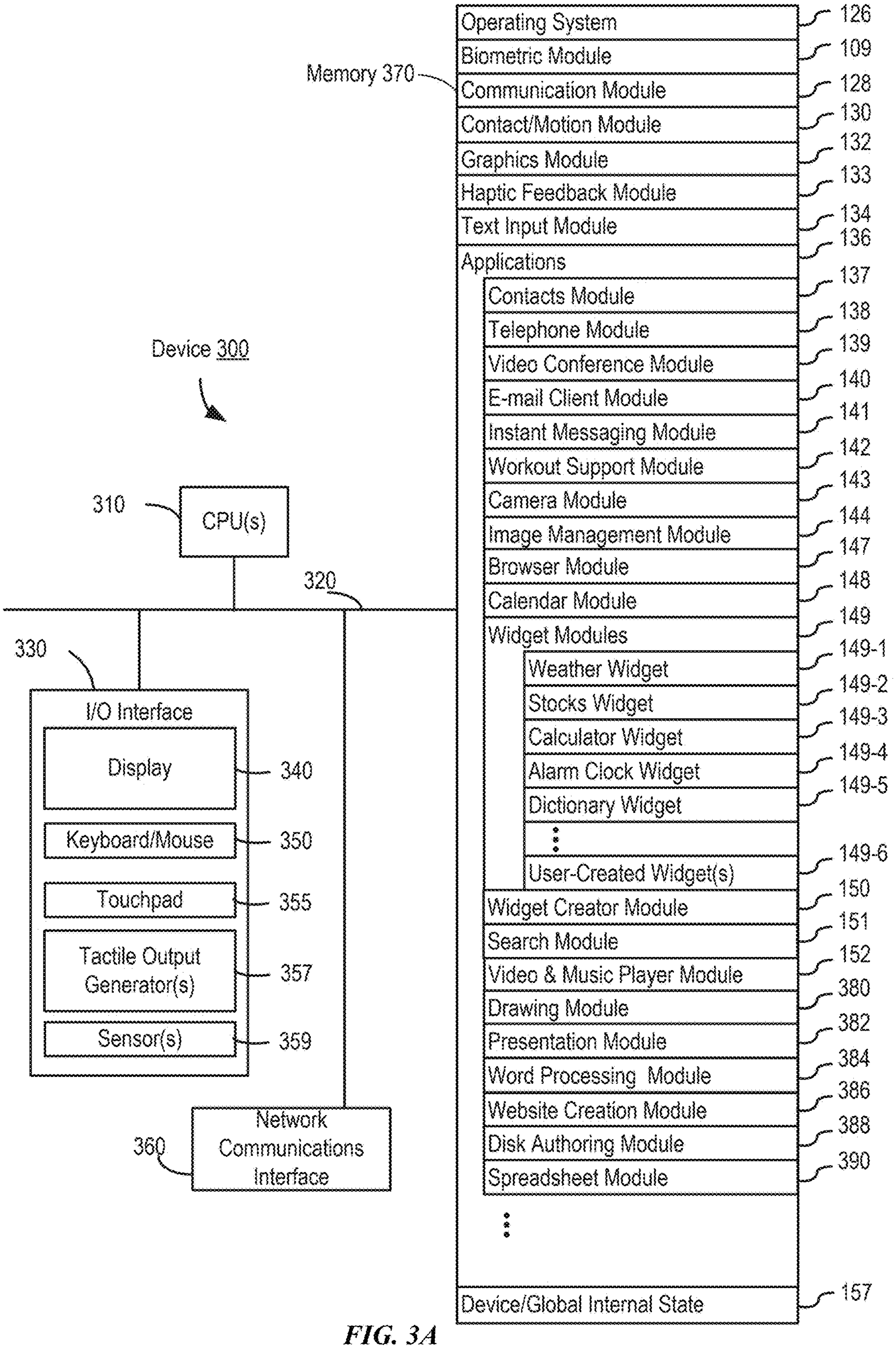
FIG. 3A is a block diagram of an exemplary multifunction device with a display and a touch-sensitive surface in accordance with some embodiments.

In some embodiments, the software components stored in memory 102 include operating system 126, biometric module 109, communication module (or set of instructions) 128, contact/motion module (or set of instructions) 130, graphics module (or set of instructions) 132, text input module (or set of instructions) 134, Global Positioning System (GPS) module (or set of instructions) 135, authentication module 105, and applications (or sets of instructions) 136. Furthermore, in some embodiments, memory 102 (FIG. 1A) or 370 (FIG. 3A) stores device/global internal state 157, as shown in FIGS. 1A and 3A. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, IOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE®, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Biometric module 109 optionally stores information about one or more enrolled biometric features (e.g., fingerprint feature information, facial recognition feature information, eye and/or iris feature information) for use to verify whether received biometric information matches the enrolled biometric features. In some embodiments, the information stored about the one or more enrolled biometric features includes data that enables the comparison between the stored information and received biometric information without including enough information to reproduce the enrolled biometric features. In some embodiments, biometric module 109 stores the information about the enrolled biometric features in association with a user account of device 100. In some embodiments, biometric module 109 compares the received biometric information to an enrolled biometric feature to determine whether the received biometric information matches the enrolled biometric feature.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device

100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Authentication module 105 determines whether a requested operation (e.g., requested by an application of applications 136) is authorized to be performed. In some embodiments, authentication module 105 receives for an operation to be perform that optionally requires authentication. Authentication module 105 determines whether the operation is authorized to be performed, such as based on a series of factors, including the lock status of device 100, the location of device 100, whether a security delay has elapsed, whether received biometric information matches enrolled biometric features, and/or other factors. Once authentication module 105 determines that the operation is authorized to be performed, authentication module 105 triggers performance of the operation.

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript® file. In some embodiments, a widget includes an XML (Extensible Markup Language) file and a JavaScript® file (e.g., Yahoo!® Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
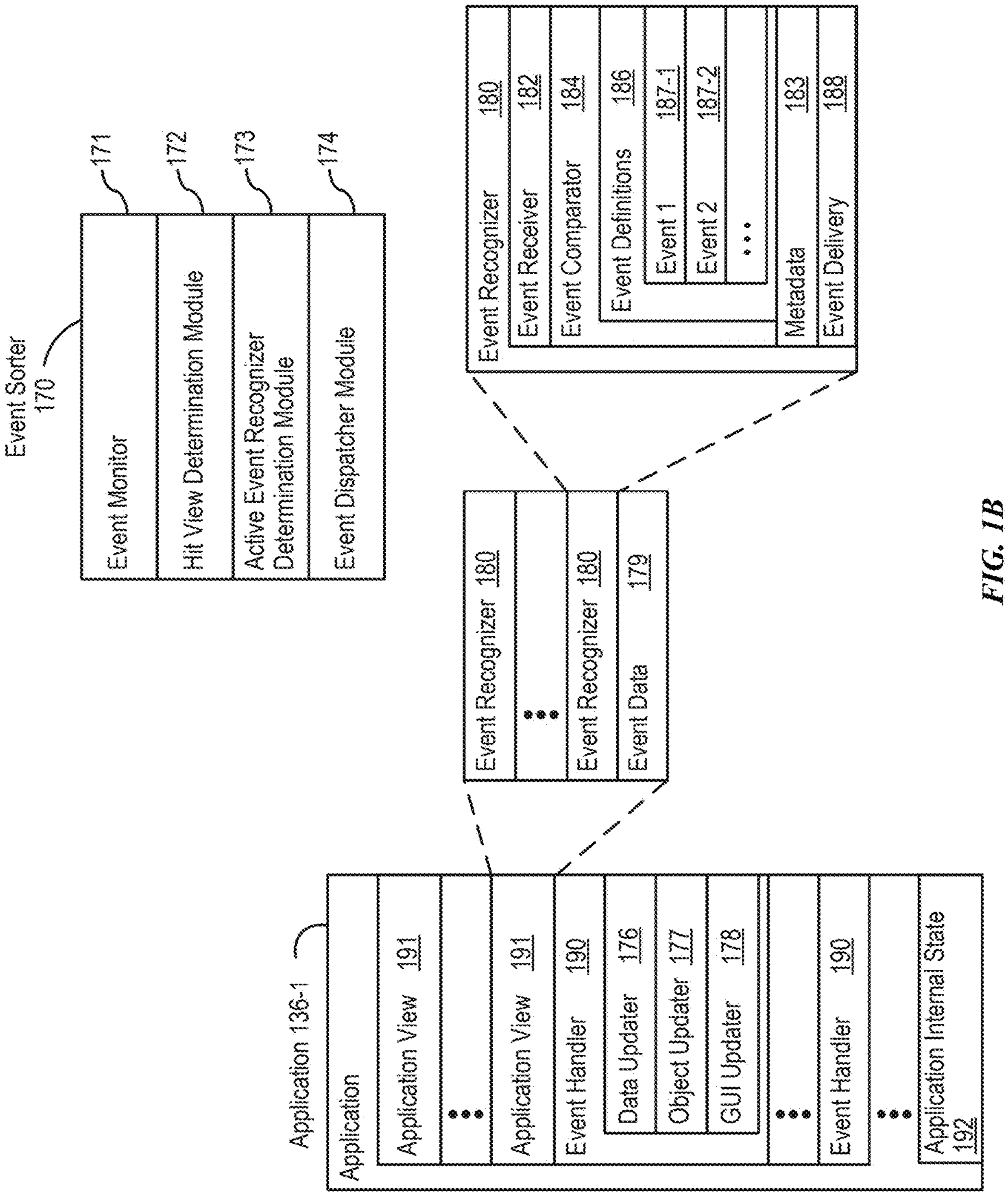
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3A) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
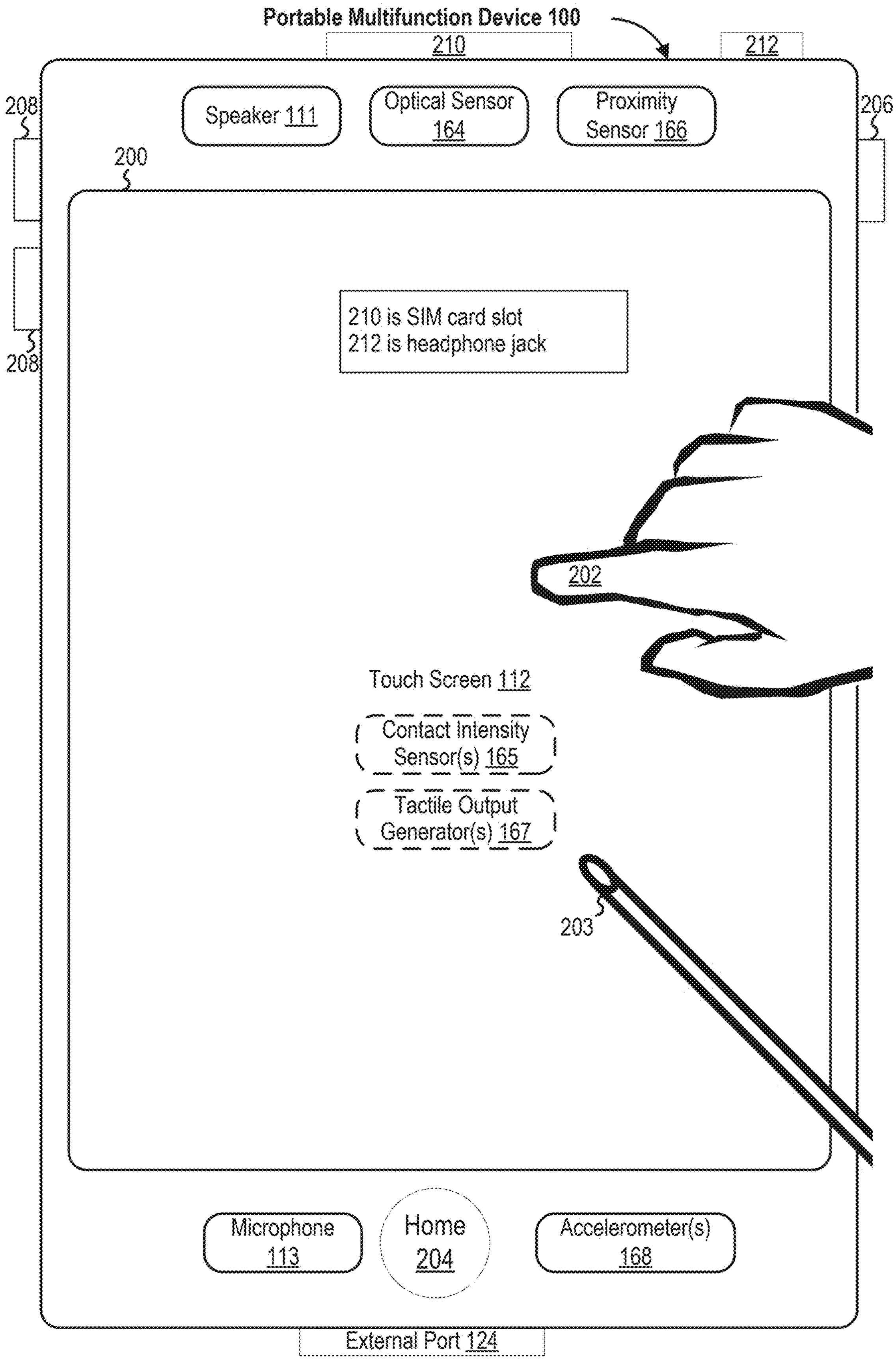
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3A is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3A is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Implementations within the scope of the present disclosure can be partially or entirely realized using a tangible computer-readable storage medium (or multiple tangible computer-readable storage media of one or more types) encoding one or more computer-readable instructions. It should be recognized that computer-readable instructions can be organized in any format, including applications, widgets, processes, software, and/or components.

Figure 3B:
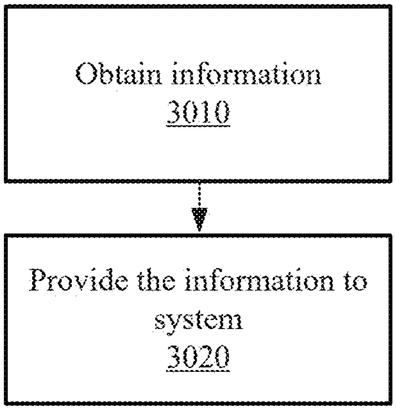
FIGS. 3B-3G illustrate the use of Application Programming Interfaces (APIs) to perform operations.
Figure 3C:
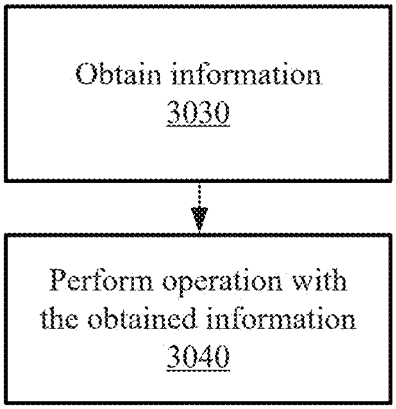

Implementations within the scope of the present disclosure include a computer-readable storage medium that encodes instructions organized as an application (e.g., application 3160) that, when executed by one or more processing units, control an electronic device (e.g., device 3150) to perform the method of FIG. 3B, the method of FIG. 3C, and/or one or more other processes and/or methods described herein.

It should be recognized that application 3160 (shown in FIG. 3D) can be any suitable type of application, including, for example, one or more of: a browser application, an application that functions as an execution environment for plug-ins, widgets or other applications, a fitness application, a health application, a digital payments application, a media application, a social network application, a messaging application, and/or a maps application. In some embodiments, application 3160 is an application that is pre-installed on device 3150 at purchase (e.g., a first-party application). In some embodiments, application 3160 is an application that is provided to device 3150 via an operating system update file (e.g., a first-party application or a second-party application). In some embodiments, application 3160 is an application that is provided via an application store. In some embodiments, the application store can be an application store that is pre-installed on device 3150 at purchase (e.g., a first-party application store). In some embodiments, the application store is a third-party application store (e.g., an application store that is provided by another application store, downloaded via a network, and/or read from a storage device).

Figure 3D:
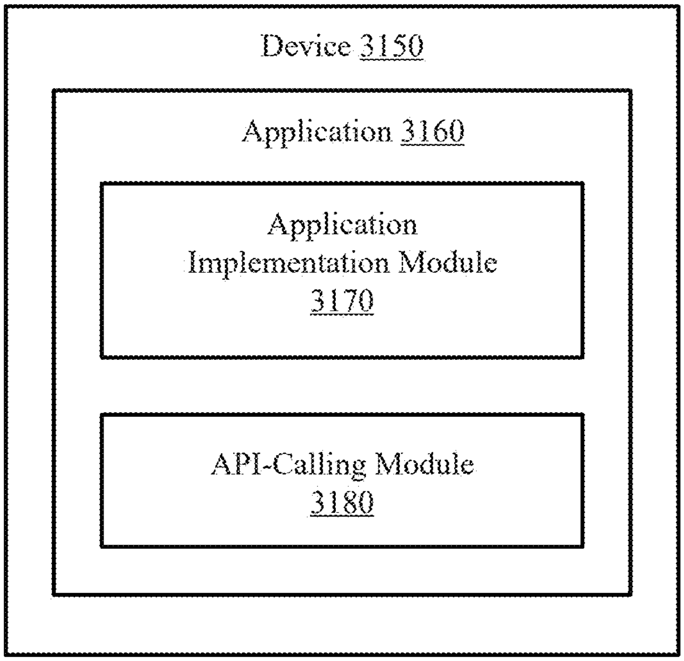
Figure 3E:
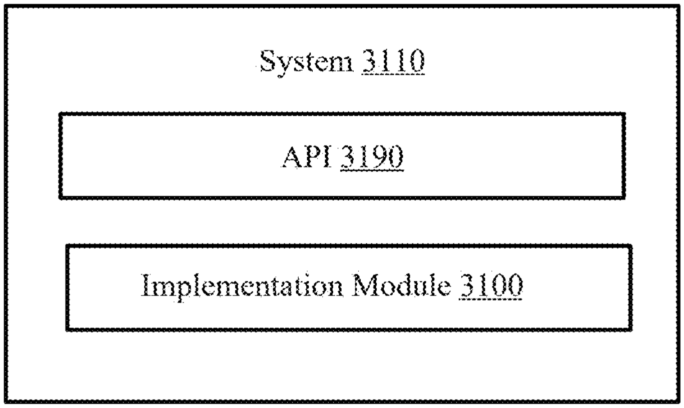
Figure 3F:
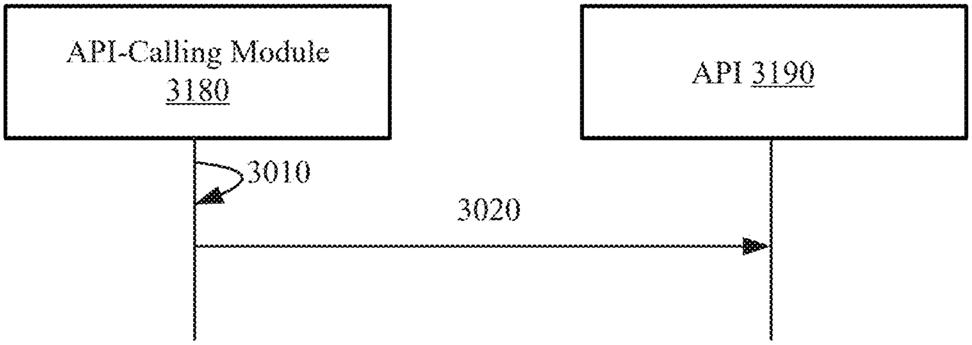

Referring to FIG. 3B and FIG. 3F, application 3160 obtains information (e.g., 3010). In some embodiments, at 3010, information is obtained from at least one hardware component of device 3150. In some embodiments, at 3010, information is obtained from at least one software module of device 3150. In some embodiments, at 3010, information is obtained from at least one hardware component external to device 3150 (e.g., a peripheral device, an accessory device, and/or a server). In some embodiments, the information obtained at 3010 includes positional information, time information, notification information, user information, environment information, electronic device state information, weather information, media information, historical information, event information, hardware information, and/or motion information. In some embodiments, in response to and/or after obtaining the information at 3010, application 3160 provides the information to a system (e.g., 3020).

In some embodiments, the system (e.g., 3110 shown in FIG. 3E) is an operating system hosted on device 3150. In some embodiments, the system (e.g., 3110 shown in FIG. 3E) is an external device (e.g., a server, a peripheral device, an accessory, and/or a personal computing device) that includes an operating system.

Figure 3G:
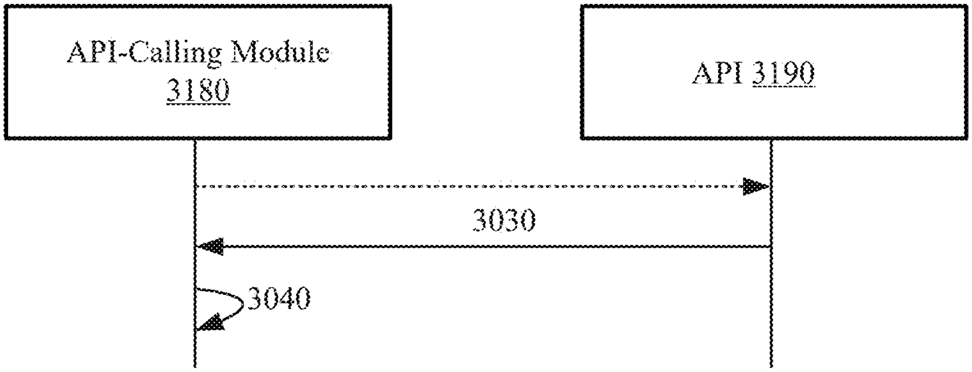

Referring to FIG. 3C and FIG. 3G, application 3160 obtains information (e.g., 3030). In some embodiments, the information obtained at 3030 includes positional information, time information, notification information, user information, environment information electronic device state information, weather information, media information, historical information, event information, hardware information, and/or motion information. In response to and/or after obtaining the information at 3030, application 3160 performs an operation with the information (e.g., 3040). In some embodiments, the operation performed at 3040 includes: providing a notification based on the information, sending a message based on the information, displaying the information, controlling a user interface of a fitness application based on the information, controlling a user interface of a health application based on the information, controlling a focus mode based on the information, setting a reminder based on the information, adding a calendar entry based on the information, and/or calling an API of system 3110 based on the information.

In some embodiments, one or more steps of the method of FIG. 3B and/or the method of FIG. 3C is performed in response to a trigger. In some embodiments, the trigger includes detection of an event, a notification received from system 3110, a user input, and/or a response to a call to an API provided by system 3110.

In some embodiments, the instructions of application 3160, when executed, control device 3150 to perform the method of FIG. 3B and/or the method of FIG. 3C by calling an application programming interface (API) (e.g., API 3190) provided by system 3110. In some embodiments, application 3160 performs at least a portion of the method of FIG. 3B and/or the method of FIG. 3C without calling API 3190.

In some embodiments, one or more steps of the method of FIG. 3B and/or the method of FIG. 3C includes calling an API (e.g., API 3190) using one or more parameters defined by the API. In some embodiments, the one or more parameters include a constant, a key, a data structure, an object, an object class, a variable, a data type, a pointer, an array, a list or a pointer to a function or method, and/or another way to reference a data or other item to be passed via the API.

Referring to FIG. 3D, device 3150 is illustrated. In some embodiments, device 3150 is a personal computing device, a smart phone, a smart watch, a fitness tracker, a head mounted display (HMD) device, a media device, a communal device, a speaker, a television, and/or a tablet. As illustrated in FIG. 3D, device 3150 includes application 3160 and an operating system (e.g., system 3110 shown in FIG. 3E). Application 3160 includes application implementation module 3170 and API-calling module 3180. System 3110 includes API 3190 and implementation module 3100. It should be recognized that device 3150, application 3160, and/or system 3110 can include more, fewer, and/or different components than illustrated in FIGS. 3D and 3E.

In some embodiments, application implementation module 3170 includes a set of one or more instructions corresponding to one or more operations performed by application 3160. For example, when application 3160 is a messaging application, application implementation module 3170 can include operations to receive and send messages. In some embodiments, application implementation module 3170 communicates with API-calling module 3180 to communicate with system 3110 via API 3190 (shown in FIG. 3E).

In some embodiments, API 3190 is a software module (e.g., a collection of computer-readable instructions) that provides an interface that allows a different module (e.g., API-calling module 3180) to access and/or use one or more functions, methods, procedures, data structures, classes, and/or other services provided by implementation module 3100 of system 3110. For example, API-calling module 3180 can access a feature of implementation module 3100 through one or more API calls or invocations (e.g., embodied by a function or a method call) exposed by API 3190 (e.g., a software and/or hardware module that can receive API calls, respond to API calls, and/or send API calls) and can pass data and/or control information using one or more parameters via the API calls or invocations. In some embodiments, API 3190 allows application 3160 to use a service provided by a Software Development Kit (SDK) library. In some embodiments, application 3160 incorporates a call to a function or method provided by the SDK library and provided by API 3190 or uses data types or objects defined in the SDK library and provided by API 3190. In some embodiments, API-calling module 3180 makes an API call via API 3190 to access and use a feature of implementation module 3100 that is specified by API 3190. In such embodiments, implementation module 3100 can return a value via API 3190 to API-calling module 3180 in response to the API call. The value can report to application 3160 the capabilities or state of a hardware component of device 3150, including those related to aspects such as input capabilities and state, output capabilities and state, processing capability, power state, storage capacity and state, and/or communications capability. In some embodiments, API 3190 is implemented in part by firmware, microcode, or other low level logic that executes in part on the hardware component.

In some embodiments, API 3190 allows a developer of API-calling module 3180 (which can be a third-party developer) to leverage a feature provided by implementation module 3100. In such embodiments, there can be one or more API-calling modules (e.g., including API-calling module 3180) that communicate with implementation module 3100. In some embodiments, API 3190 allows multiple API-calling modules written in different programming languages to communicate with implementation module 3100 (e.g., API 3190 can include features for translating calls and returns between implementation module 3100 and API-calling module 3180) while API 3190 is implemented in terms of a specific programming language. In some embodiments, API-calling module 3180 calls APIs from different providers such as a set of APIs from an OS provider, another set of APIs from a plug-in provider, and/or another set of APIs from another provider (e.g., the provider of a software library) or creator of the another set of APIs.

Examples of API 3190 can include one or more of: a pairing API (e.g., for establishing secure connection, e.g., with an accessory), a device detection API (e.g., for locating nearby devices, e.g., media devices and/or smartphone), a payment API, a UIKit API (e.g., for generating user interfaces), a location detection API, a locator API, a maps API, a health sensor API, a sensor API, a messaging API, a push notification API, a streaming API, a collaboration API, a video conferencing API, an application store API, an advertising services API, a web browser API (e.g., WebKit API), a vehicle API, a networking API, a WiFi API, a Bluetooth API, an NFC API, a UWB API, a fitness API, a smart home API, contact transfer API, photos API, camera API, and/or image processing API. In some embodiments, the sensor API is an API for accessing data associated with a sensor of device 3150. For example, the sensor API can provide access to raw sensor data. For another example, the sensor API can provide data derived (and/or generated) from the raw sensor data. In some embodiments, the sensor data includes temperature data, image data, video data, audio data, heart rate data, IMU (inertial measurement unit) data, lidar data, location data, GPS data, and/or camera data. In some embodiments, the sensor includes one or more of an accelerometer, temperature sensor, infrared sensor, optical sensor, heartrate sensor, barometer, gyroscope, proximity sensor, temperature sensor, and/or biometric sensor.

In some embodiments, implementation module 3100 is a system (e.g., operating system and/or server system) software module (e.g., a collection of computer-readable instructions) that is constructed to perform an operation in response to receiving an API call via API 3190. In some embodiments, implementation module 3100 is constructed to provide an API response (via API 3190) as a result of processing an API call. By way of example, implementation module 3100 and API-calling module 3180 can each be any one of an operating system, a library, a device driver, an API, an application program, or other module. It should be understood that implementation module 3100 and API-calling module 3180 can be the same or different type of module from each other. In some embodiments, implementation module 3100 is embodied at least in part in firmware, microcode, or hardware logic.

In some embodiments, implementation module 3100 returns a value through API 3190 in response to an API call from API-calling module 3180. While API 3190 defines the syntax and result of an API call (e.g., how to invoke the API call and what the API call does), API 3190 might not reveal how implementation module 3100 accomplishes the function specified by the API call. Various API calls are transferred via the one or more application programming interfaces between API-calling module 3180 and implementation module 3100. Transferring the API calls can include issuing, initiating, invoking, calling, receiving, returning, and/or responding to the function calls or messages. In other words, transferring can describe actions by either of API-calling module 3180 or implementation module 3100. In some embodiments, a function call or other invocation of API 3190 sends and/or receives one or more parameters through a parameter list or other structure.

In some embodiments, implementation module 3100 provides more than one API, each providing a different view of or with different aspects of functionality implemented by implementation module 3100. For example, one API of implementation module 3100 can provide a first set of functions and can be exposed to third-party developers, and another API of implementation module 3100 can be hidden (e.g., not exposed) and provide a subset of the first set of functions and also provide another set of functions, such as testing or debugging functions which are not in the first set of functions. In some embodiments, implementation module 3100 calls one or more other components via an underlying API and thus is both an API-calling module and an implementation module. It should be recognized that implementation module 3100 can include additional functions, methods, classes, data structures, and/or other features that are not specified through API 3190 and are not available to API-calling module 3180. It should also be recognized that API-calling module 3180 can be on the same system as implementation module 3100 or can be located remotely and access implementation module 3100 using API 3190 over a network. In some embodiments, implementation module 3100, API 3190, and/or API-calling module 3180 is stored in a machine-readable medium, which includes any mechanism for storing information in a form readable by a machine (e.g., a computer or other data processing system). For example, a machine-readable medium can include magnetic disks, optical disks, random access memory; read only memory, and/or flash memory devices.

An application programming interface (API) is an interface between a first software process and a second software process that specifies a format for communication between the first software process and the second software process. Limited APIs (e.g., private APIs or partner APIs) are APIs that are accessible to a limited set of software processes (e.g., only software processes within an operating system or only software processes that are approved to access the limited APIs). Public APIs that are accessible to a wider set of software processes. Some APIs enable software processes to communicate about or set a state of one or more input devices (e.g., one or more touch sensors, proximity sensors, visual sensors, motion/orientation sensors, pressure sensors, intensity sensors, sound sensors, wireless proximity sensors, biometric sensors, buttons, switches, rotatable elements, and/or external controllers). Some APIs enable software processes to communicate about and/or set a state of one or more output generation components (e.g., one or more audio output generation components, one or more display generation components, and/or one or more tactile output generation components). Some APIs enable particular capabilities (e.g., scrolling, handwriting, text entry, image editing, and/or image creation) to be accessed, performed, and/or used by a software process (e.g., generating outputs for use by a software process based on input from the software process). Some APIs enable content from a software process to be inserted into a template and displayed in a user interface that has a layout and/or behaviors that are specified by the template.

Many software platforms include a set of frameworks that provides the core objects and core behaviors that a software developer needs to build software applications that can be used on the software platform. Software developers use these objects to display content onscreen, to interact with that content, and to manage interactions with the software platform. Software applications rely on the set of frameworks for their basic behavior, and the set of frameworks provides many ways for the software developer to customize the behavior of the application to match the specific needs of the software application. Many of these core objects and core behaviors are accessed via an API. An API will typically specify a format for communication between software processes, including specifying and grouping available variables, functions, and protocols. An API call (sometimes referred to as an API request) will typically be sent from a sending software process to a receiving software process as a way to accomplish one or more of the following: the sending software process requesting information from the receiving software process (e.g., for the sending software process to take action on), the sending software process providing information to the receiving software process (e.g., for the receiving software process to take action on), the sending software process requesting action by the receiving software process, or the sending software process providing information to the receiving software process about action taken by the sending software process. Interaction with a device (e.g., using a user interface) will in some circumstances include the transfer and/or receipt of one or more API calls (e.g., multiple API calls) between multiple different software processes (e.g., different portions of an operating system, an application and an operating system, or different applications) via one or more APIs (e.g., via multiple different APIs). For example, when an input is detected the direct sensor data is frequently processed into one or more input events that are provided (e.g., via an API) to a receiving software process that makes some determination based on the input events, and then sends (e.g., via an API) information to a software process to perform an operation (e.g., change a device state and/or user interface) based on the determination. While a determination and an operation performed in response could be made by the same software process, alternatively the determination could be made in a first software process and relayed (e.g., via an API) to a second software process, that is different from the first software process, that causes the operation to be performed by the second software process. Alternatively, the second software process could relay instructions (e.g., via an API) to a third software process that is different from the first software process and/or the second software process to perform the operation. It should be understood that some or all user interactions with a computer system could involve one or more API calls within a step of interacting with the computer system (e.g., between different software components of the computer system or between a software component of the computer system and a software component of one or more remote computer systems). It should be understood that some or all user interactions with a computer system could involve one or more API calls between steps of interacting with the computer system (e.g., between different software components of the computer system or between a software component of the computer system and a software component of one or more remote computer systems).

In some embodiments, the application can be any suitable type of application, including, for example, one or more of: a browser application, an application that functions as an execution environment for plug-ins, widgets or other applications, a fitness application, a health application, a digital payments application, a media application, a social network application, a messaging application, and/or a maps application.

In some embodiments, the application is an application that is pre-installed on the first computer system at purchase (e.g., a first-party application). In some embodiments, the application is an application that is provided to the first computer system via an operating system update file (e.g., a first-party application). In some embodiments, the application is an application that is provided via an application store. In some embodiments, the application store is pre-installed on the first computer system at purchase (e.g., a first-party application store) and allows download of one or more applications. In some embodiments, the application store is a third-party application store (e.g., an application store that is provided by another device, downloaded via a network, and/or read from a storage device). In some embodiments, the application is a third-party application (e.g., an app that is provided by an application store, downloaded via a network, and/or read from a storage device). In some embodiments, the application controls the first computer system to perform methods 800, 900, 1200, 1400, and/or 1600 (FIGS. 8, 9, 12A-12B, 14, and/or 16) by calling an application programming interface (API) provided by the system process using one or more parameters.

In some embodiments, exemplary APIs provided by the system process include one or more of: a pairing API (e.g., for establishing secure connection, e.g., with an accessory), a device detection API (e.g., for locating nearby devices, e.g., media devices and/or smartphone), a payment API, a UIKit API (e.g., for generating user interfaces), a location detection API, a locator API, a maps API, a health sensor API, a sensor API, a messaging API, a push notification API, a streaming API, a collaboration API, a video conferencing API, an application store API, an advertising services API, a web browser API (e.g., WebKit API), a vehicle API, a networking API, a WiFi API, a Bluetooth API, an NFC API, a UWB API, a fitness API, a smart home API, contact transfer API, a photos API, a camera API, and/or an image processing API.

In some embodiments, at least one API is a software module (e.g., a collection of computer-readable instructions) that provides an interface that allows a different module (e.g., API-calling module 3180) to access and use one or more functions, methods, procedures, data structures, classes, and/or other services provided by an implementation module of the system process. The API can define one or more parameters that are passed between the API-calling module and the implementation module. In some embodiments, API 3190 defines a first API call that can be provided by API-calling module 3180. The implementation module is a system software module (e.g., a collection of computer-readable instructions) that is constructed to perform an operation in response to receiving an API call via the API. In some embodiments, the implementation module is constructed to provide an API response (via the API) as a result of processing an API call. In some embodiments, the implementation module is included in the device (e.g., 3150) that runs the application. In some embodiments, the implementation module is included in an electronic device that is separate from the device that runs the application.

Attention is now directed towards embodiments of user interfaces that are, optionally, implemented on, for example, portable multifunction device 100.

Figure 4A:
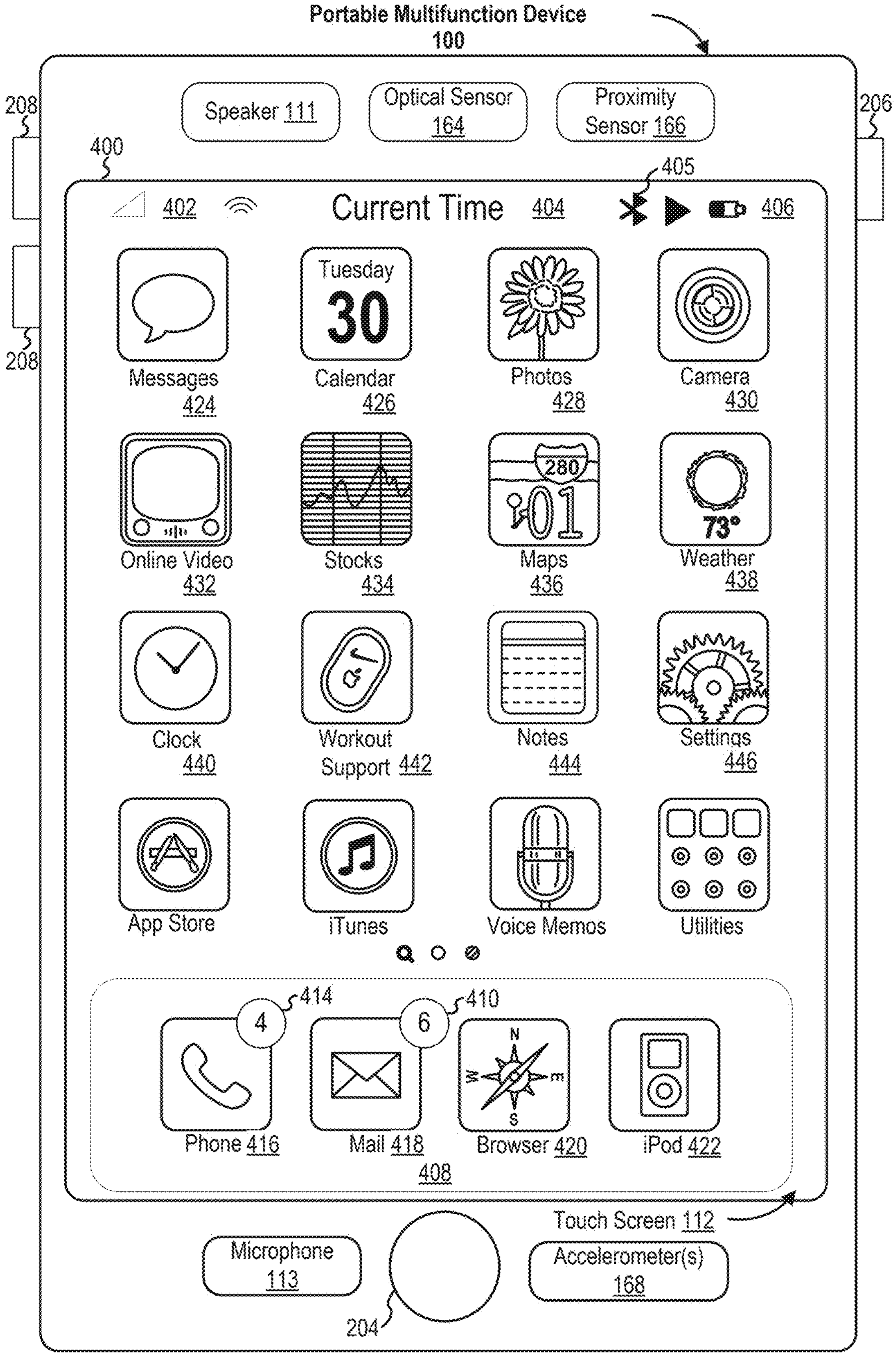
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
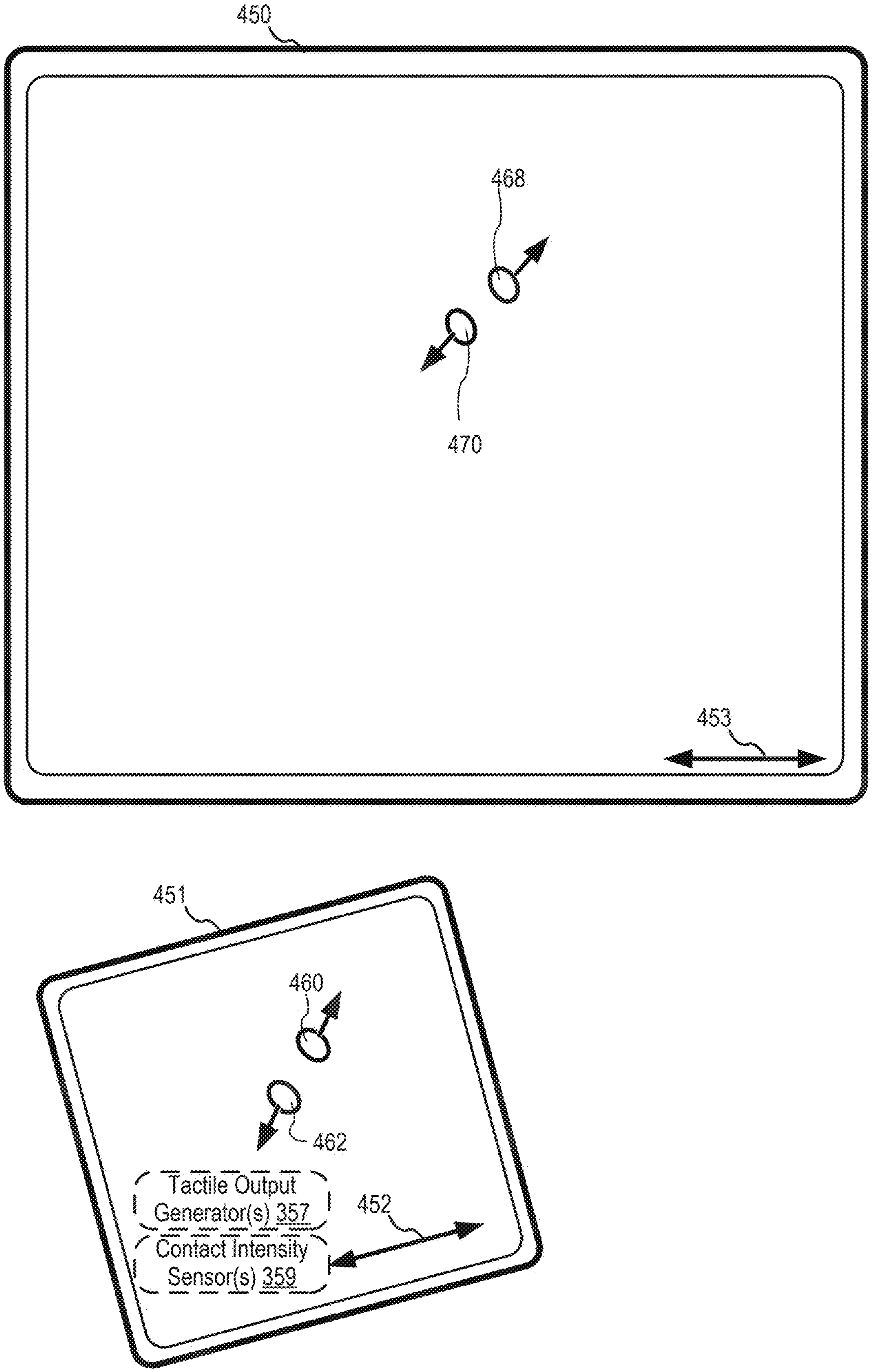
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3A) with a touch-sensitive surface 451 (e.g., a tablet or touchpad 355, FIG. 3A) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., touch-sensitive surface 451 in FIG. 4B) has a primary axis (e.g., 452 in FIG. 4B) that corresponds to a primary axis (e.g., 453 in FIG. 4B) on the display (e.g., display 450). In accordance with these embodiments, the device detects contacts (e.g., contact 460 and contact 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contacts 460 and 462, and movements thereof) detected by the device on the touch-sensitive surface (e.g., touch-sensitive surface 451 in FIG. 4B) are used by the device to manipulate the user interface on the display (e.g., display 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
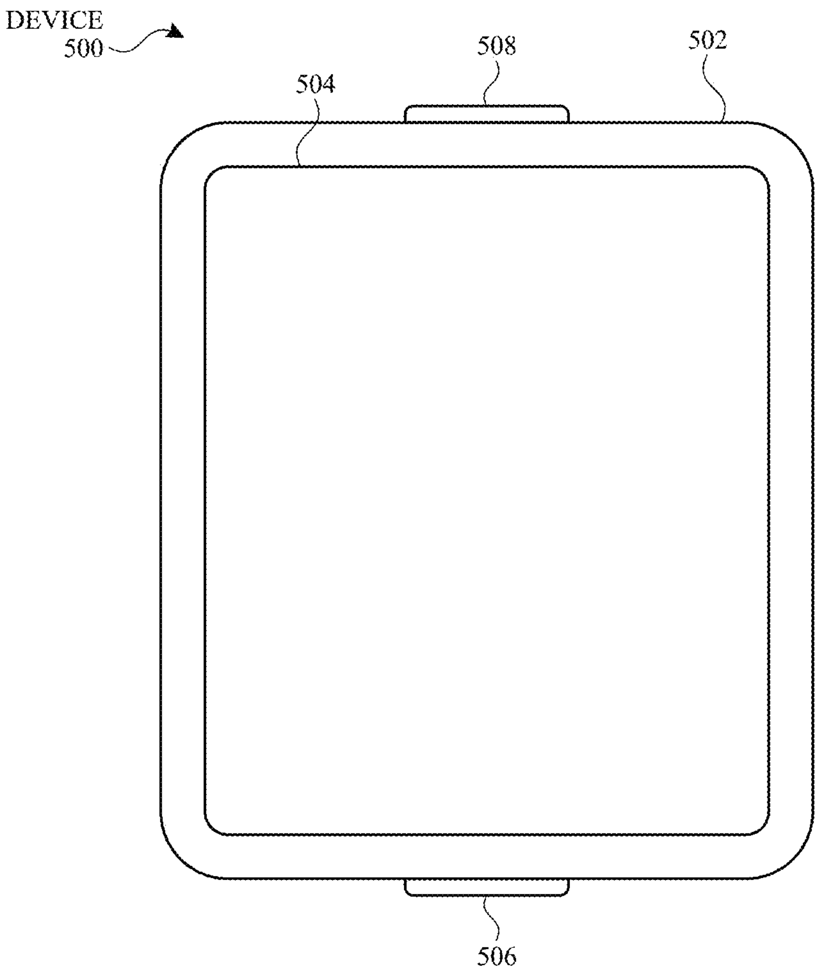
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
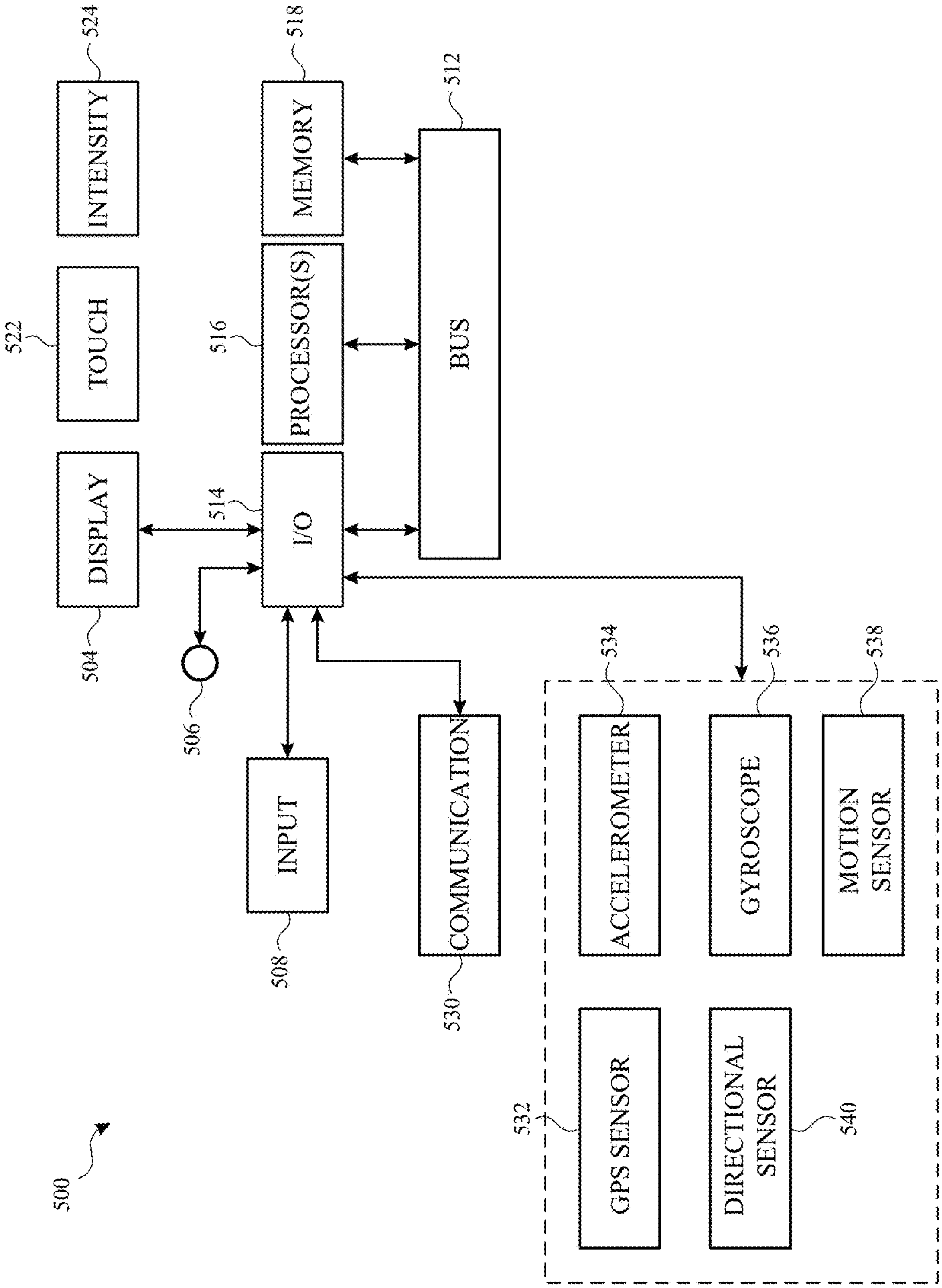
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3A. Device 500 has bus 512 that operatively couples I/O section 514 with one or more computer processors 516 and memory 518. I/O section 514 can be connected to display screen 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage media, for storing computer-executable instructions, which, when executed by one or more computer processors 516, for example, can cause the computer processors to perform the techniques described below, including processes 800, 900, 1200, 1400, and 1600 (FIGS. 8, 9, 12A-12B, 14, and 16). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray® technologies, as well as persistent solid-state memory such as flash, solid-state drives, and the like. Personal electronic device 500 is not limited to the components and configuration of FIG. 5B but can include other or additional components in multiple configurations.

As used here, the term "affordance" refers to a user-interactive graphical user interface object that is, optionally, displayed on the display screen of devices 100, 300, and/or 500 (FIGS. 1A, 3A, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3A or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
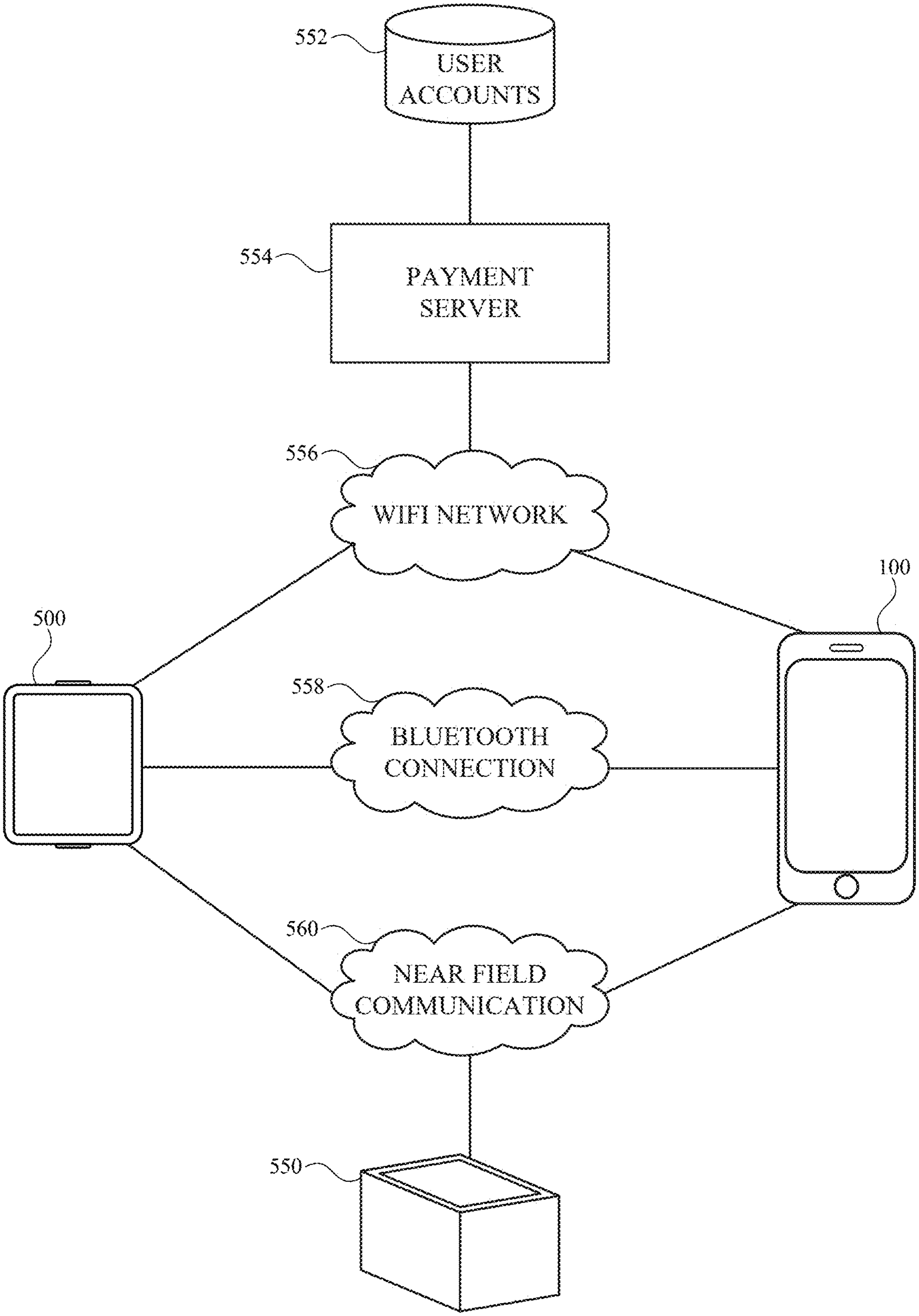
FIG. 5C illustrates exemplary devices connected via one or more communication channels, in accordance with some embodiments.

FIG. 5C illustrates exemplary devices connected via one or more communication channels to participate in a transaction in accordance with some embodiments. One or more exemplary electronic devices (e.g., devices 100, 300, and 500) are configured to optionally detect input (e.g., a particular user input, an NFC field) and optionally transmit payment information (e.g., using NFC). The one or more electronic devices optionally include NFC hardware and are configured to be NFC-enabled.

The electronic devices (e.g., devices 100, 300, and 500) are optionally configured to store payment account information associated with each of one or more payment accounts. Payment account information includes, for example, one or more of: a person's or company's name, a billing address, a login, a password, an account number, an expiration date, a security code, a telephone number, a bank associated with the payment account (e.g., an issuing bank), and a card network identifier. In some embodiments, payment account information includes include an image, such as a picture of a payment card (e.g., taken by the device and/or received at the device). In some embodiments, the electronic devices receive user input including at least some payment account information (e.g., receiving user-entered credit, debit, account, or gift card number and expiration date). In some embodiments, the electronic devices detect at least some payment account information from an image (e.g., of a payment card captured by a camera sensor of the device). In some embodiments, the electronic devices receive at least some payment account information from another device (e.g., another user device or a server). In some embodiments, the electronic device receives payment account information from a server associated with another service for which an account for a user or user device previously made a purchase or identified payment account data (e.g., an app for renting or selling audio and/or video files).

In some embodiments, a payment account is added to an electronic device (e.g., device 100, 300, and 500), such that payment account information is securely stored on the electronic device (e.g., on secure element 163). In some embodiments, after a user initiates such process, the electronic device transmits information for the payment account to a transaction-coordination server, which then communicates with a server operated by a payment network for the account (e.g., a payment server) to ensure a validity of the information. The electronic device is optionally configured to receive a script from the server that allows the electronic device to program payment information for the account onto a secure element (e.g., secure element 163).

In some embodiments, communication among electronic devices 100, 300, and 500 facilitates transactions (e.g., generally or specific transactions). For example, a first electronic device (e.g., 100) can serve as a provisioning or managing device, and can send notifications of new or updated payment account data (e.g., information for a new account, updated information for an existing account, and/or an alert pertaining to an existing account) to a second electronic device (e.g., 500). In another example, a first electronic device (e.g., 100) can send data to a second election device, wherein the data reflects information about payment transactions facilitated at the first electronic device. The information optionally includes one or more of: a payment amount, an account used, a time of purchase, and whether a default account was changed. The second device (e.g., 500) optionally uses such information to update a default payment account (e.g., based on a learning algorithm or explicit user input).

Electronic devices (e.g., 100, 300, 500) are configured to communicate with each other over any of a variety of networks. For example, the devices communicate using a Bluetooth connection 558 (e.g., which includes a traditional Bluetooth connection or a Bluetooth Low Energy connection) or using a WiFi network 556. Communications among user devices are, optionally, conditioned to reduce the possibility of inappropriately sharing information across devices. For example, communications relating to payment information requires that the communicating devices be paired (e.g., be associated with each other via an explicit user interaction) or be associated with a same user account.

In some embodiments, an electronic device (e.g., 100, 300, 500) is used to communicate with a point-of-sale (POS) payment terminal 550, which is optionally NFC-enabled. The communication optionally occurs using a variety of communication channels and/or technologies. In some embodiments, electronic device (e.g., 100, 300, 500) communicates with payment terminal 550 using an NFC channel 560. In some embodiments, payment terminal 550 communicates with an electronic device (e.g., 100, 300, 500) using a peer-to-peer NFC mode. Electronic device (e.g., 100, 300, 500) is optionally configured transmit a signal to payment terminal 550 that includes payment information for a payment account (e.g., a default account or an account selected for the particular transaction).

In some embodiments, proceeding with a transaction includes transmitting a signal that includes payment information for an account, such as a payment account. In some embodiments, proceeding with the transaction includes reconfiguring the electronic device (e.g., 100, 300, 500) to respond as a contactless payment card, such as an NFC-enabled contactless payment card, and then transmitting credentials of the account via NFC, such as to payment terminal 550. In some embodiments, subsequent to transmitting credentials of the account via NFC, the electronic device reconfigures to not respond as a contactless payment card (e.g., requiring authorization before again reconfigured to respond as a contactless payment card via NFC).

In some embodiments, generation of and/or transmission of the signal is controlled by a secure element (e.g., 163) in the electronic device (e.g., 100, 300, 500). The secure element (e.g., 163) optionally requires a particular user input prior to releasing payment information. For example, the secure element (e.g., 163) optionally requires detection that the electronic device is being worn, detection of a button press, detection of entry of a passcode, detection of a touch, detection of one or more option selections (e.g., received while interacting with an application), detection of a fingerprint signature, detection of a voice or voice command, and or detection of a gesture or movement (e.g., rotation or acceleration). In some embodiments, if a communication channel (e.g., an NFC communication channel) with another device (e.g., payment terminal 550) is established within a defined time period from detection of the input, the secure element (e.g., 163) releases payment information to be transmitted to the other device (e.g., payment terminal 550). In some embodiments, the secure element (e.g., 163) is a hardware component that controls release of secure information. In some embodiments, the secure element is a software component that controls release of secure information.

In some embodiments, protocols related to transaction participation depend on, for example, device types. For example, a condition for generating and/or transmitting payment information can be different for a wearable device (e.g., device 500) and a phone (e.g., device 100). For example, a generation and/or transmission condition for a wearable device includes detecting that a button has been pressed (e.g., after a security verification), while a corresponding condition for a phone does not require button-depression and instead requires detection of particular interaction with an application. In some embodiments, a condition for transmitting and/or releasing payment information includes receiving particular input on each of multiple devices. For example, release of payment information optionally requires detection of a fingerprint and/or passcode at the device (e.g., device 100) and detection of a mechanical input (e.g., button press) on another device (e.g., device 500).

Payment terminal 550 optionally uses the payment information to generate a signal to transmit to a payment server 554 to determine whether the payment is authorized. Payment server 554 optionally includes any device or system configured to receive payment information associated with a payment account and to determine whether a proposed purchase is authorized. In some embodiments, payment server 554 includes a server of an issuing bank. Payment terminal 550 communicates with payment server 554 directly or indirectly via one or more other devices or systems (e.g., a server of an acquiring bank and/or a server of a card network).

Payment server 554 optionally uses at least some of the payment information to identify a user account from among a database of user accounts (e.g., 552). For example, each user account includes payment information. An account is, optionally, located by locating an account with particular payment information matching that from the POS communication. In some embodiments, a payment is denied when provided payment information is not consistent (e.g., an expiration date does not correspond to a credit, debit, or gift card number) or when no account includes payment information matching that from the POS communication.

In some embodiments, data for the user account further identifies one or more restrictions (e.g., credit limits); current or previous balances; previous transaction dates, locations and/or amounts; account status (e.g., active or frozen), and/or authorization instructions. In some embodiments, the payment server (e.g., 554) uses such data to determine whether to authorize a payment. For example, a payment server denies a payment when a purchase amount added to a current balance would result in exceeding an account limit, when an account is frozen, when a previous transaction amount exceeds a threshold, or when a previous transaction count or frequency exceeds a threshold.

In some embodiments, payment server 554 responds to POS payment terminal 550 with an indication as to whether a proposed purchase is authorized or denied. In some embodiments, POS payment terminal 550 transmits a signal to the electronic device (e.g., 100, 300, 500) to identify the result. For example, POS payment terminal 550 sends a receipt to the electronic device (e.g., 100, 300, 500) when a purchase is authorized (e.g., via a transaction-coordination server that manages a transaction app on the user device). In some instances, POS payment terminal 550 presents an output (e.g., a visual or audio output) indicative of the result. Payment can be sent to a merchant as part of the authorization process or can be subsequently sent.

In some embodiments, the electronic device (e.g., 100, 300, 500) participates in a transaction that is completed without involvement of POS payment terminal 550. For example, upon detecting that a mechanical input has been received, a secure element (e.g., 163) in the electronic device (e.g., 100, 300, 500) releases payment information to allow an application on the electronic device to access the information (e.g., and to transmit the information to a server associated with the application).

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

In some embodiments, the computer system is in a locked state or an unlocked state. In the locked state, the computer system is powered on and operational but is prevented from performing a predefined set of operations in response to user input. The predefined set of operations optionally includes navigation between user interfaces, activation or deactivation of a predefined set of functions, and activation or deactivation of certain applications. The locked state can be used to prevent unintentional or unauthorized use of some functionality of the computer system or activation or deactivation of some functions on the computer system. In some embodiments, in the unlocked state, the computer system is powered on and operational and is not prevented from performing at least a portion of the predefined set of operations that cannot be performed while in the locked state. When the computer system is in the locked state, the computer system is said to be locked. When the computer system is in the unlocked state, the computer is said to be unlocked. In some embodiments, the computer system in the locked state optionally responds to a limited set of user inputs, including input that corresponds to an attempt to transition the computer system to the unlocked state or input that corresponds to powering the computer system off.

Attention is now directed towards embodiments of user interfaces ("UI") and associated processes that are implemented on an electronic device, such as portable multifunction device 100, device 300, or device 500.

Figure 6A:
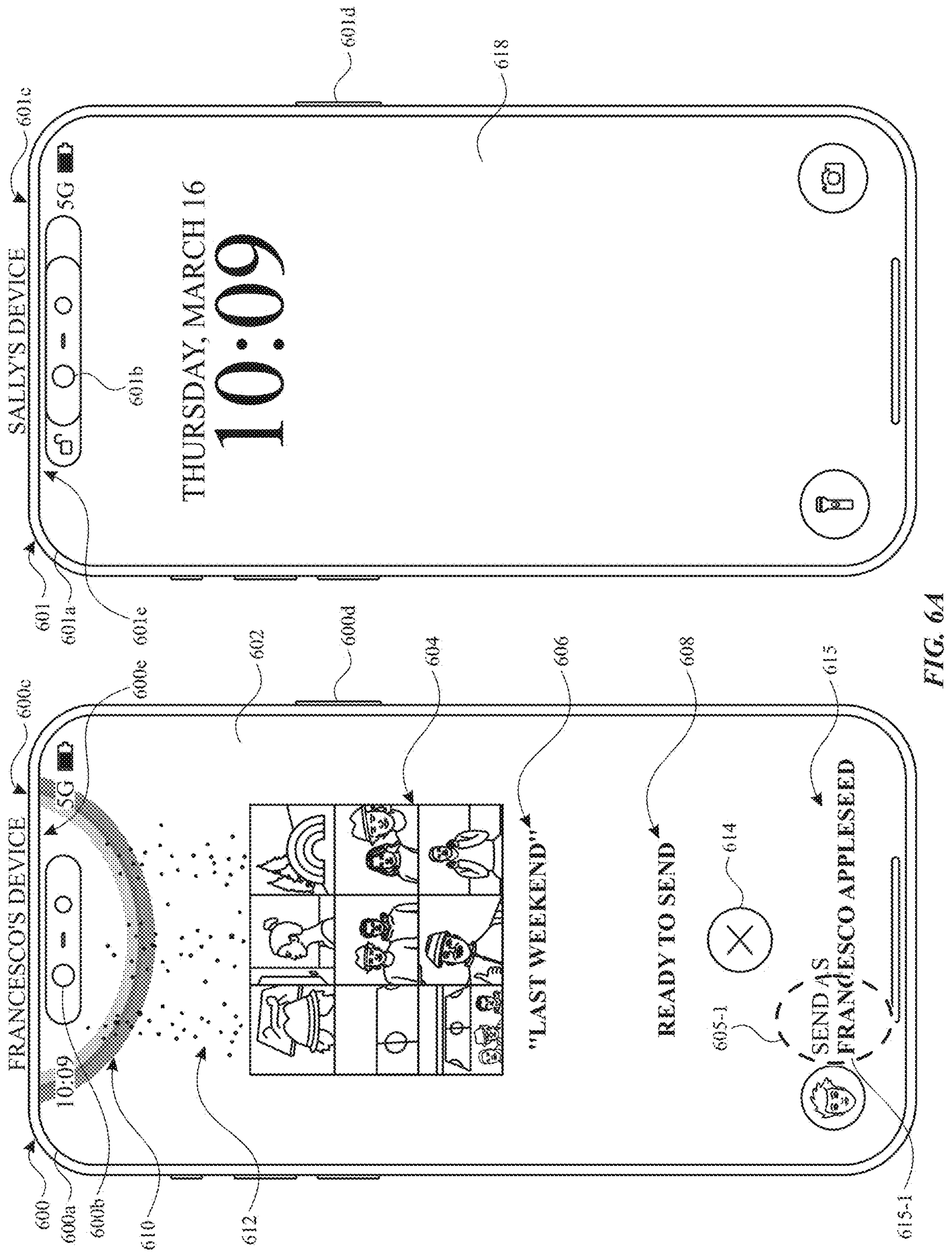
FIGS. 6A-6E illustrate exemplary user interfaces for transferring account resources, in accordance with some embodiments.
Figure 6B:
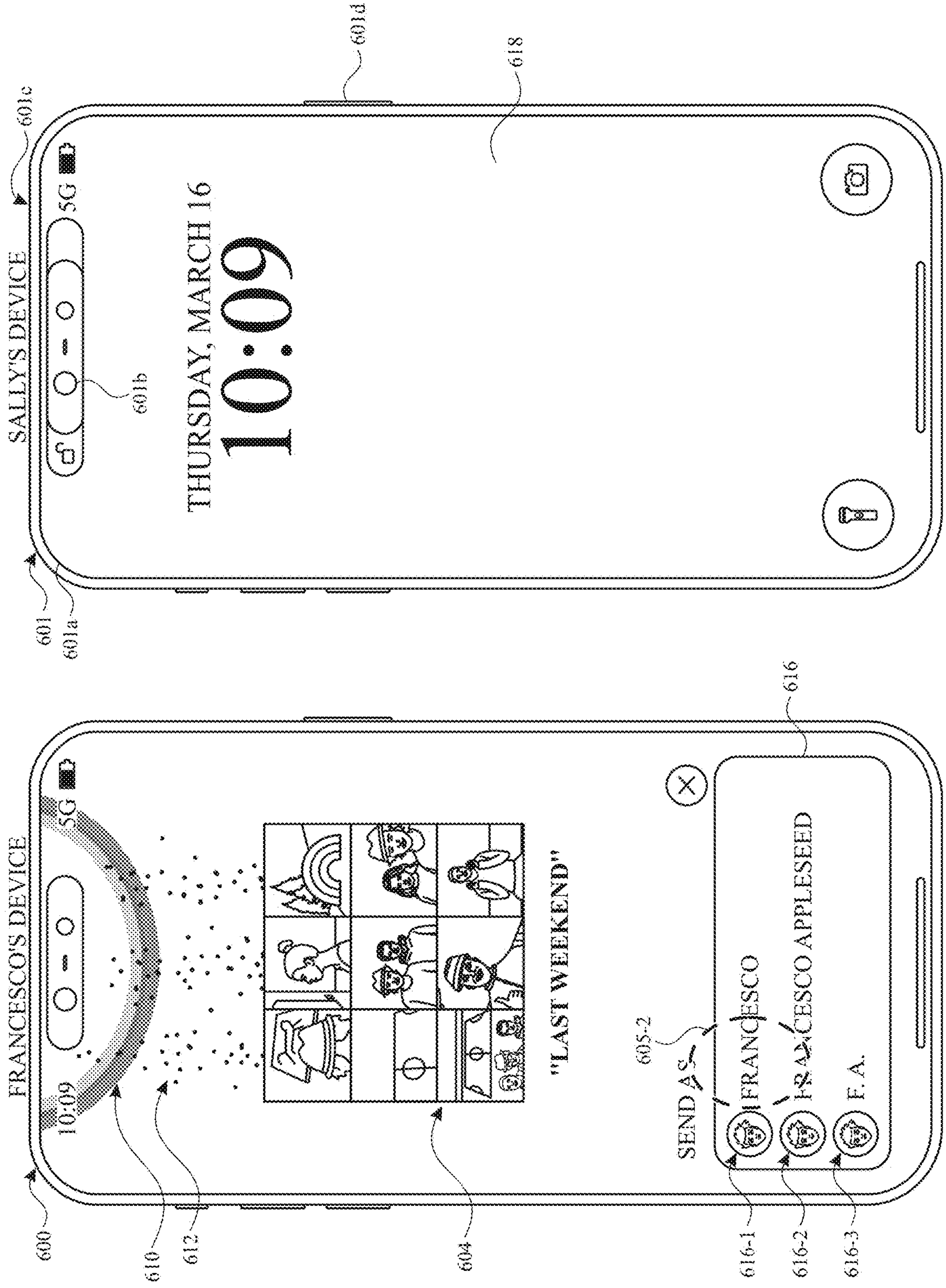
Figure 6C:
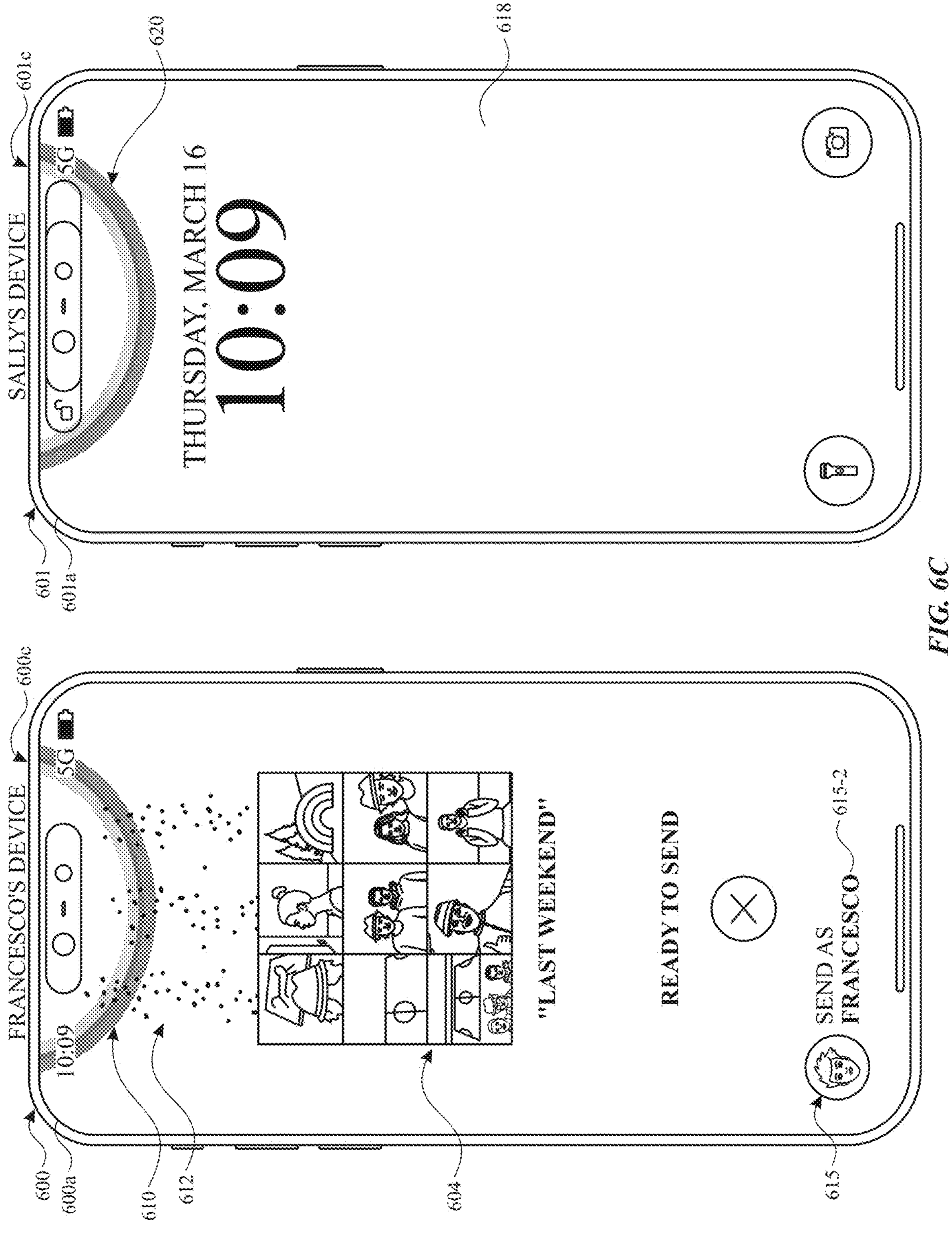
Figure 6D:
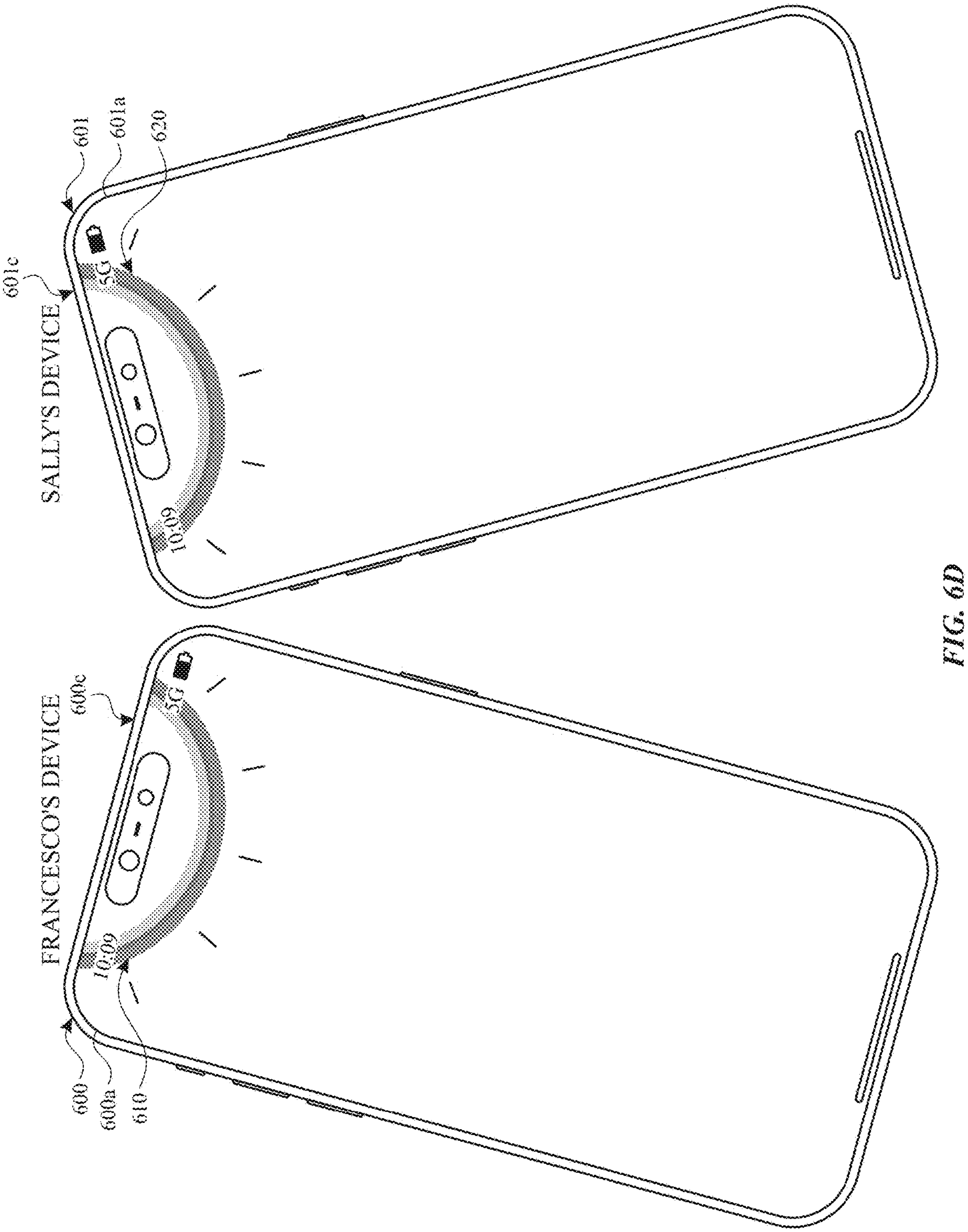
Figure 6E:
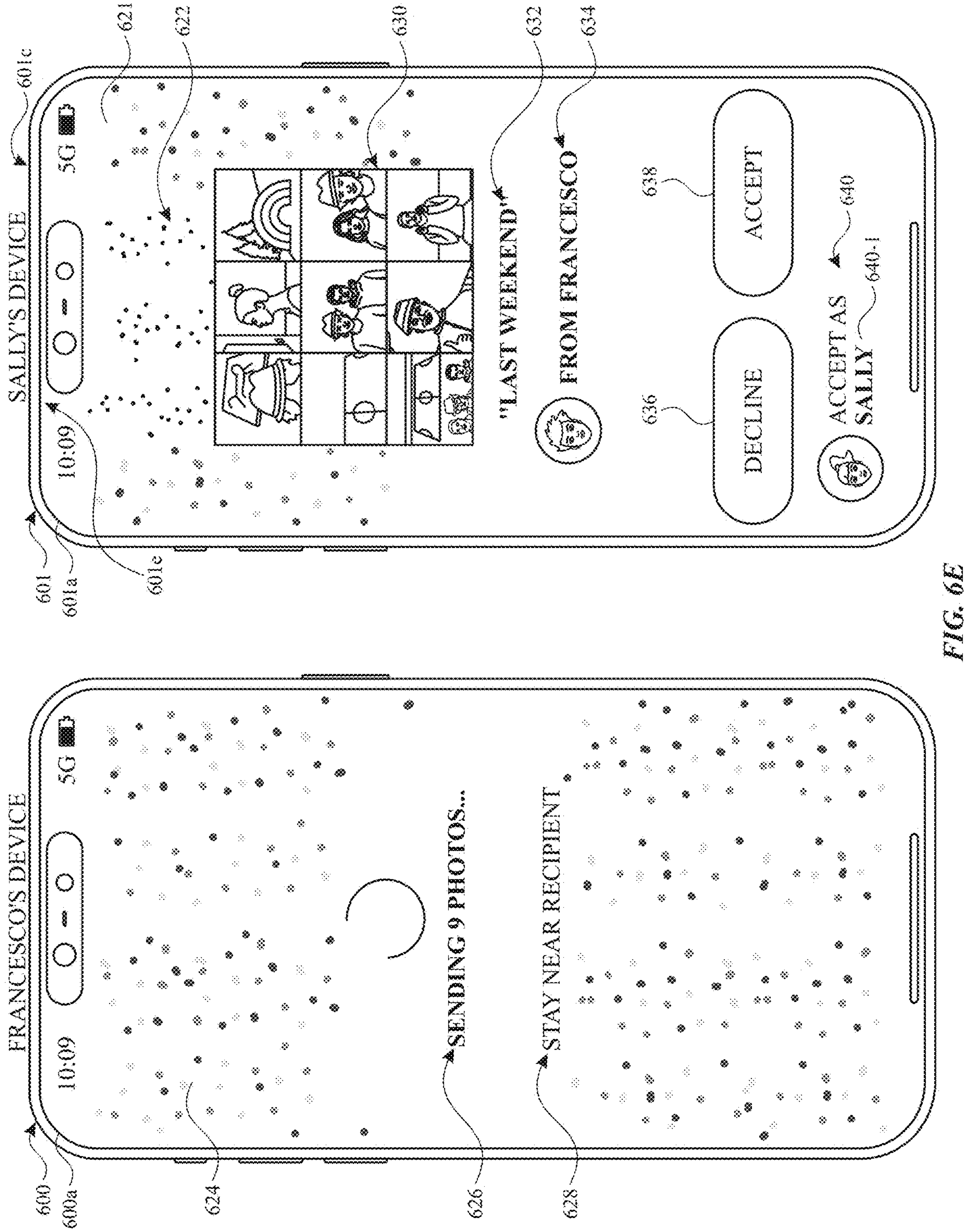
Figure 7B:
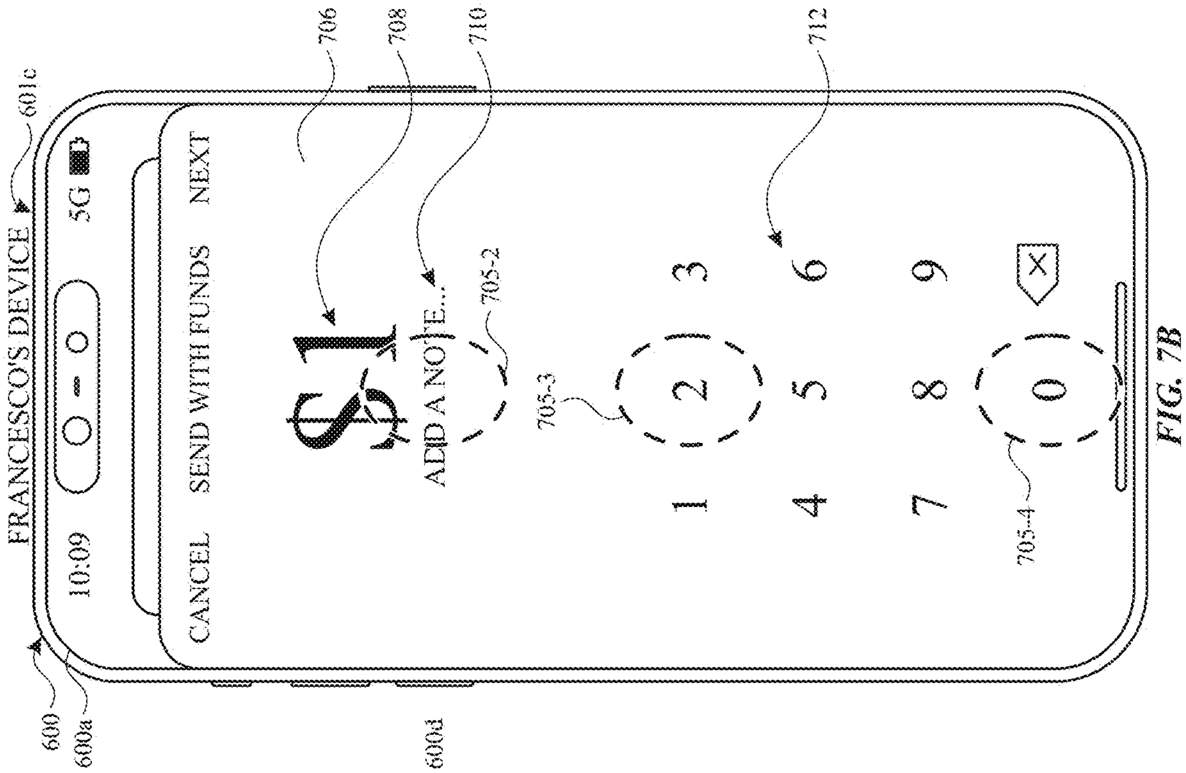
FIGS. 7A-7Z illustrate exemplary user interfaces for transferring account resources, in accordance with some embodiments.
Figure 7A:
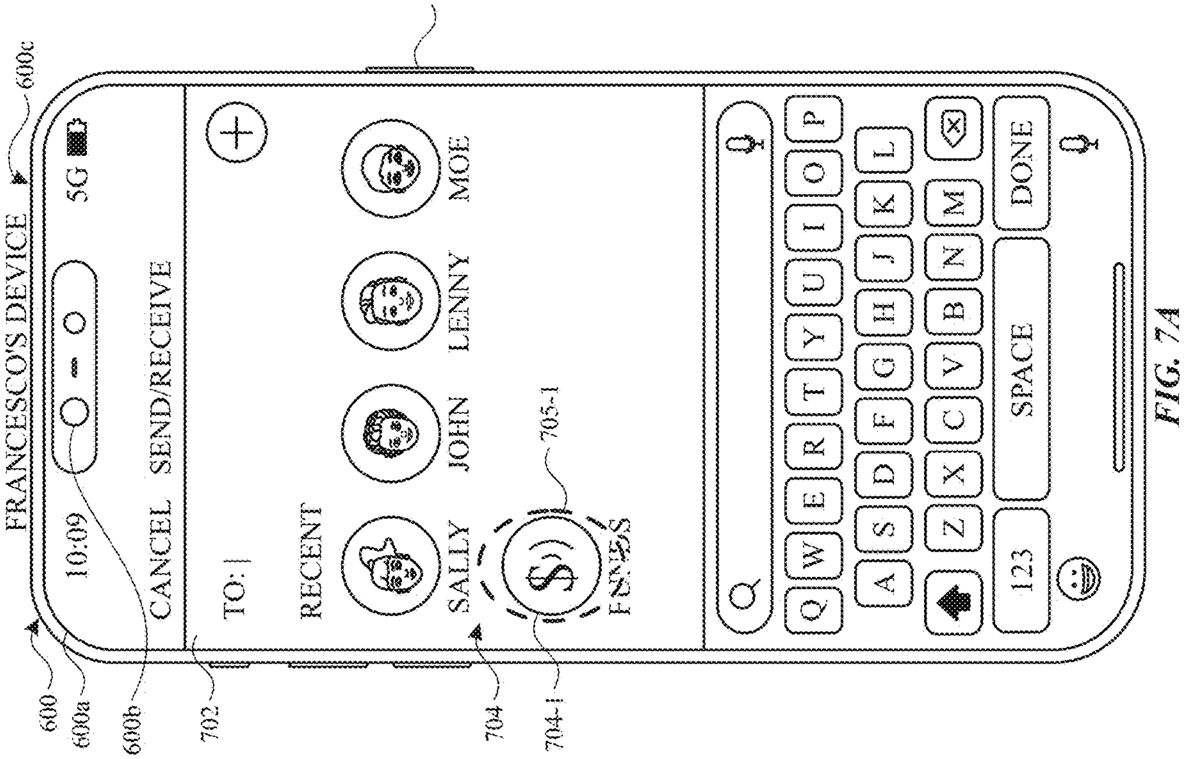
Figure 7D:
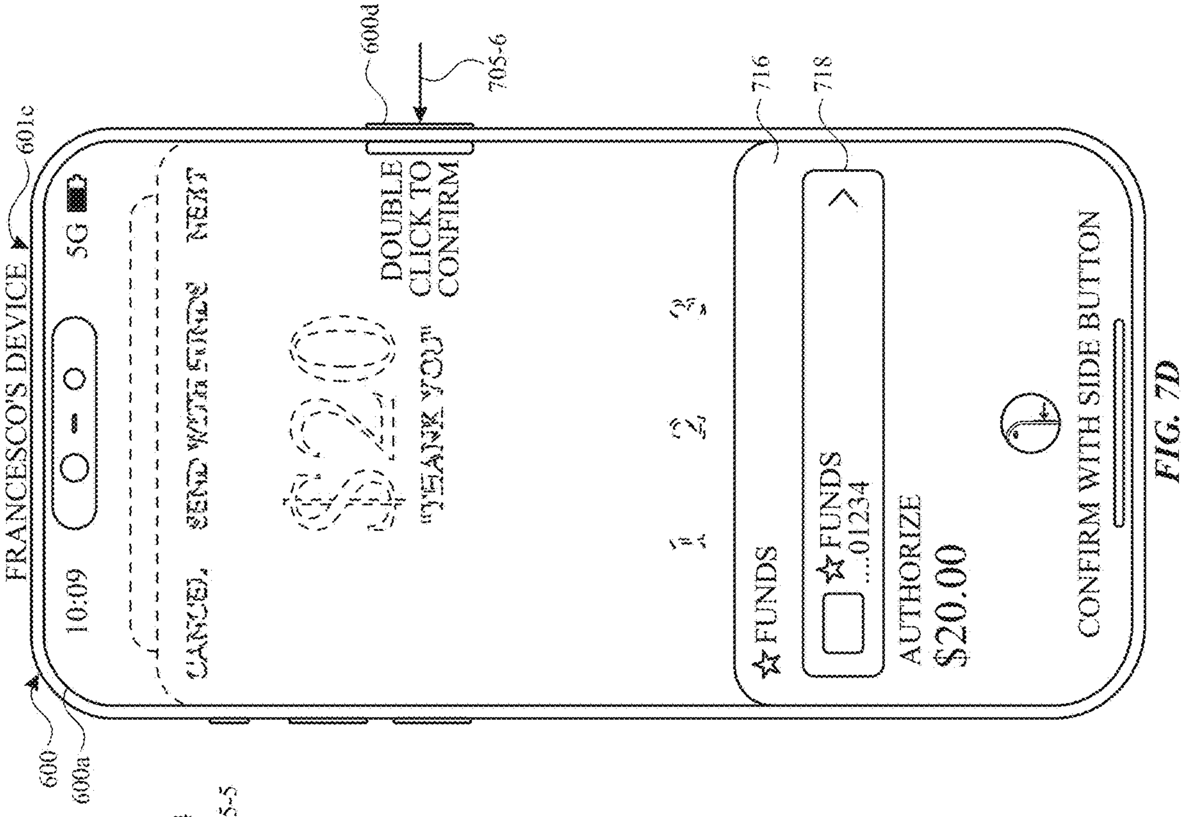
Figure 7C:
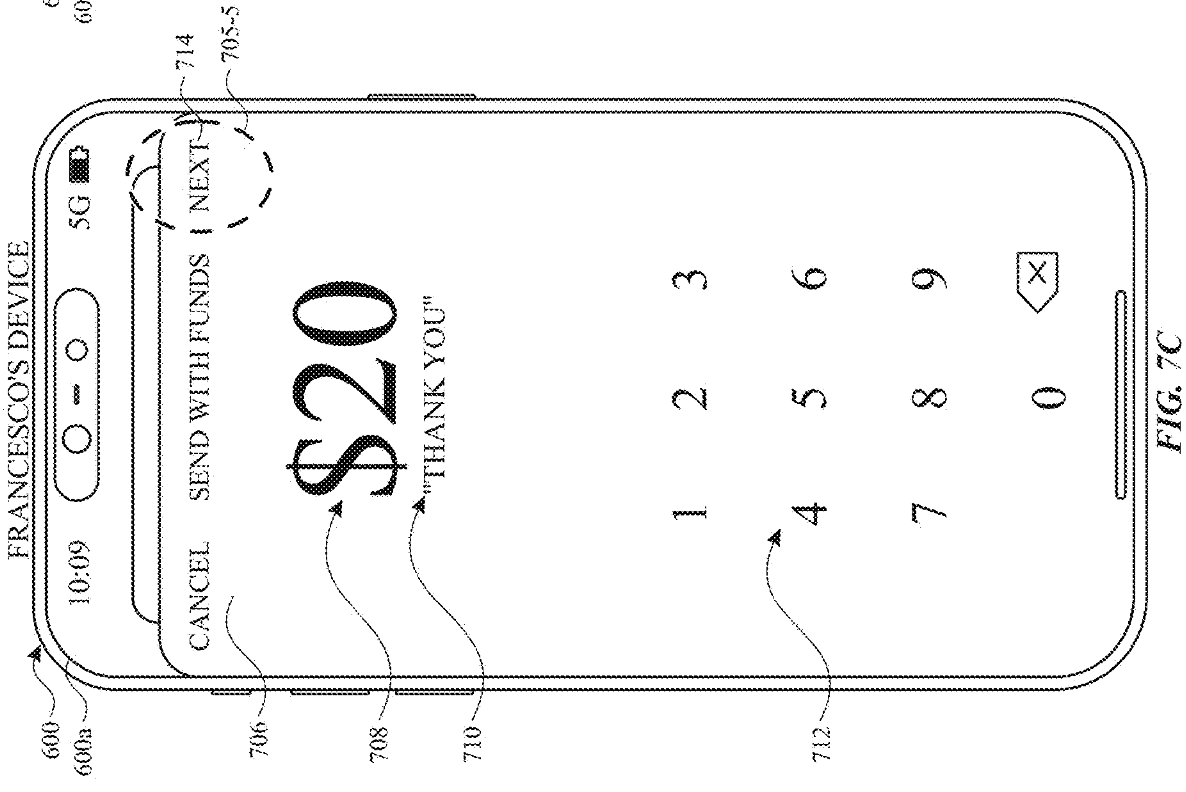
Figure 7E:
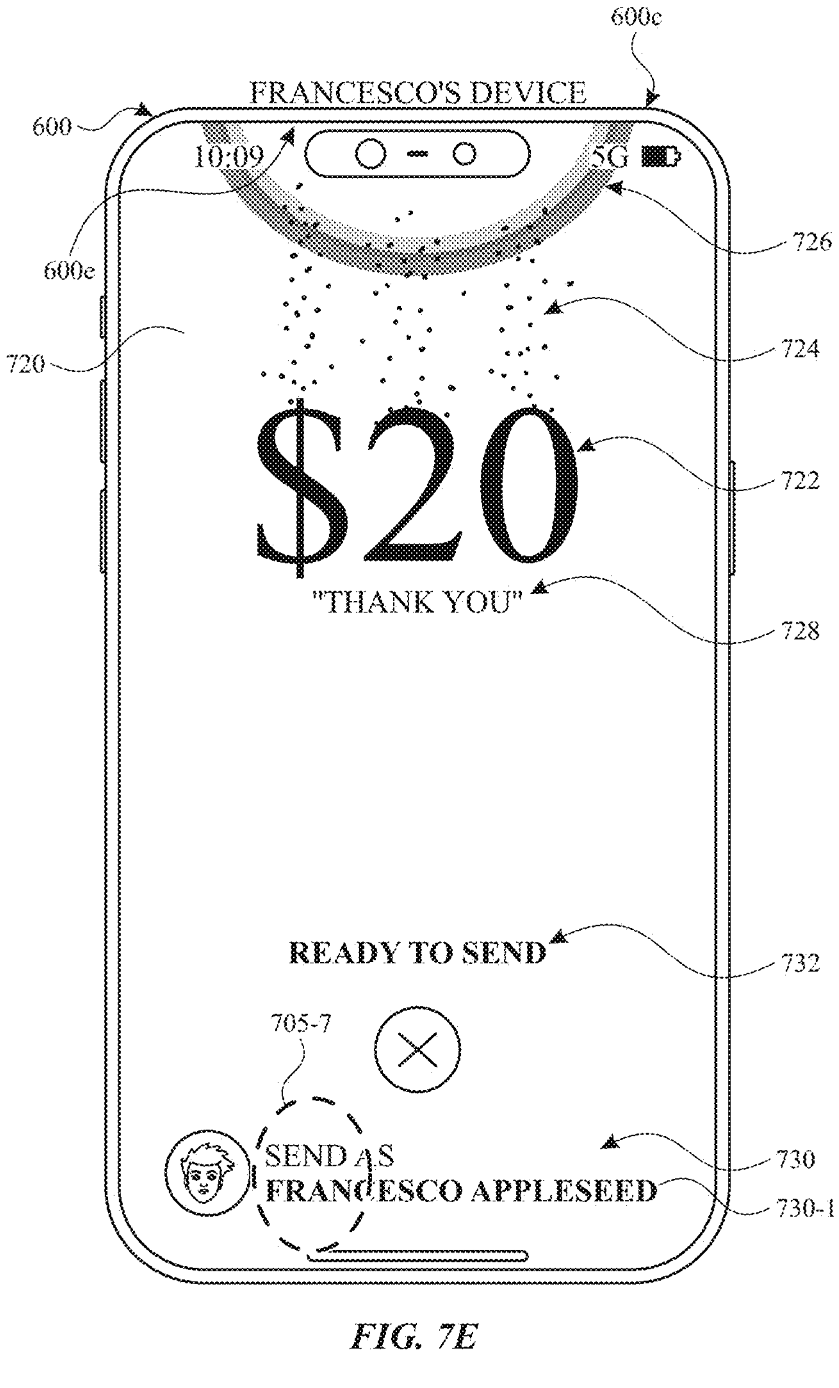
Figure 7F:
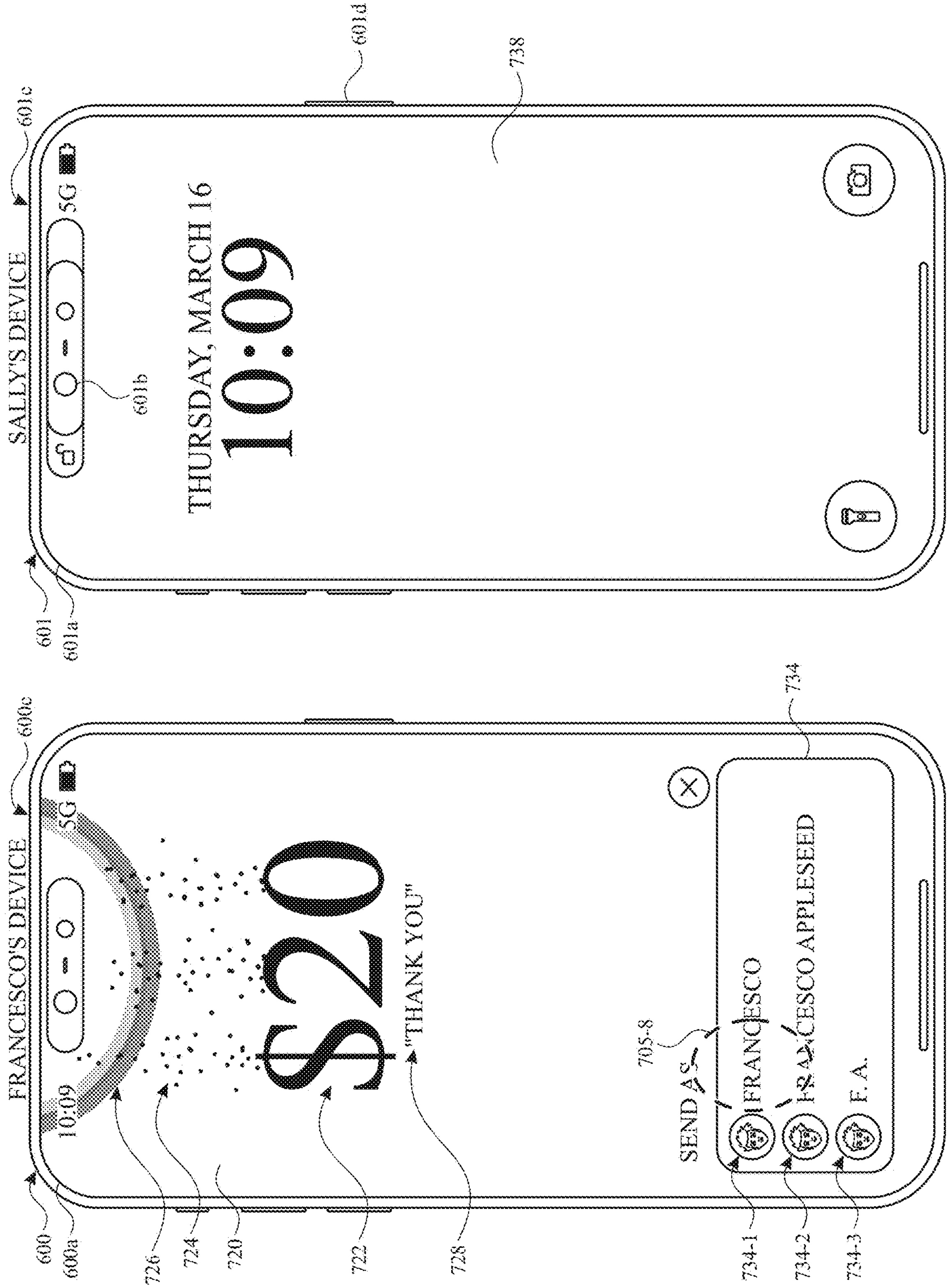
Figure 7G:
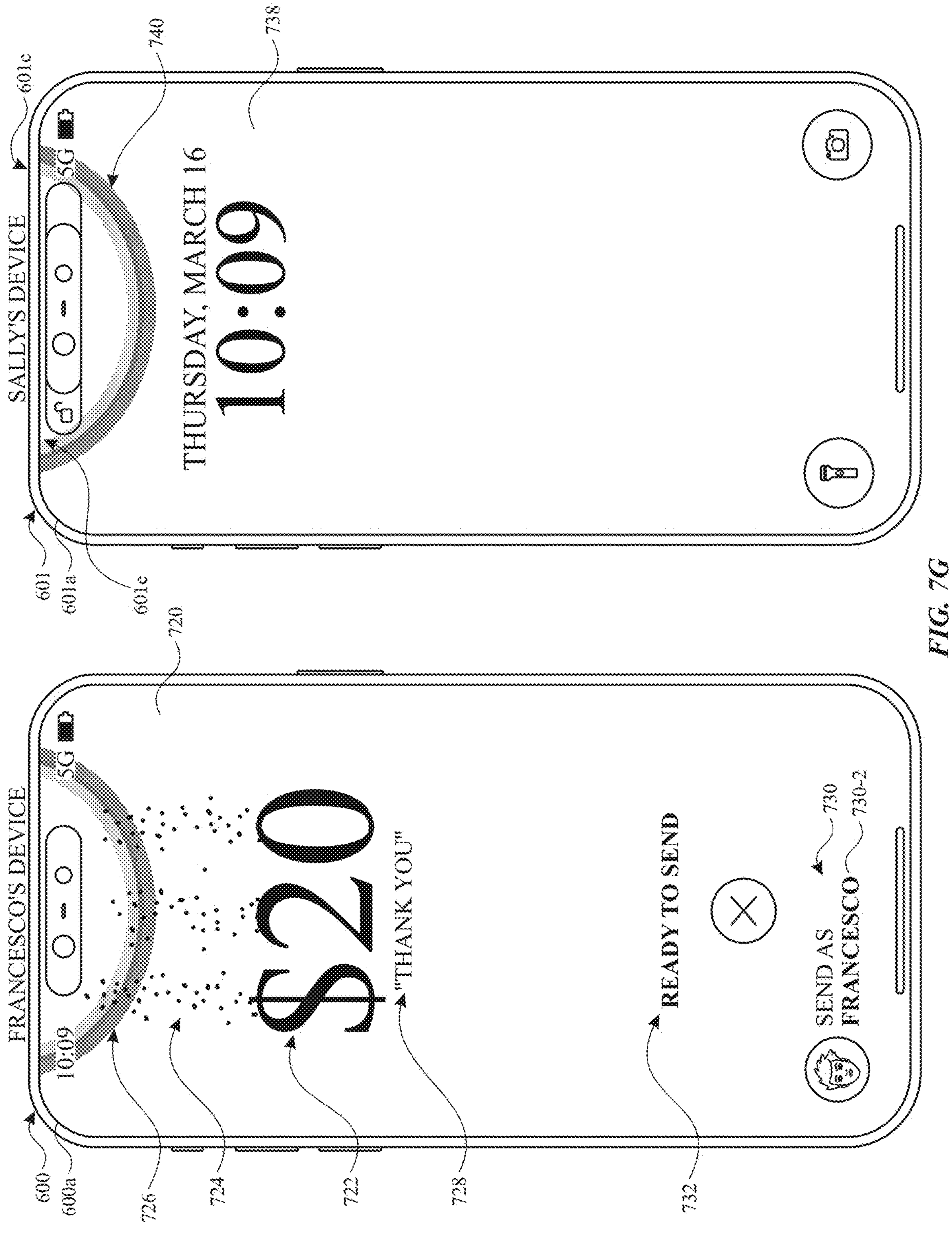
Figure 7H:
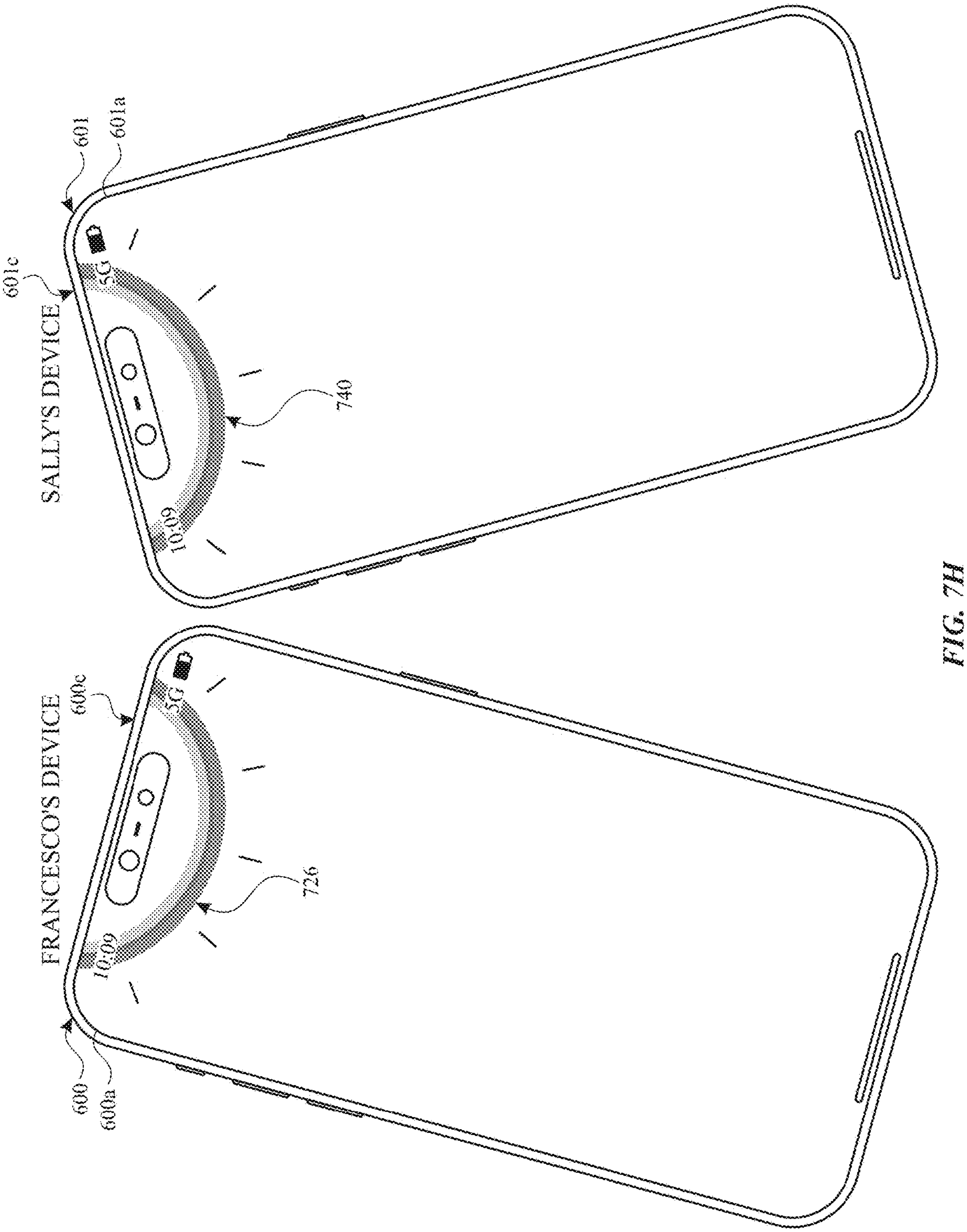
Figure 7I:
Figure 7J:
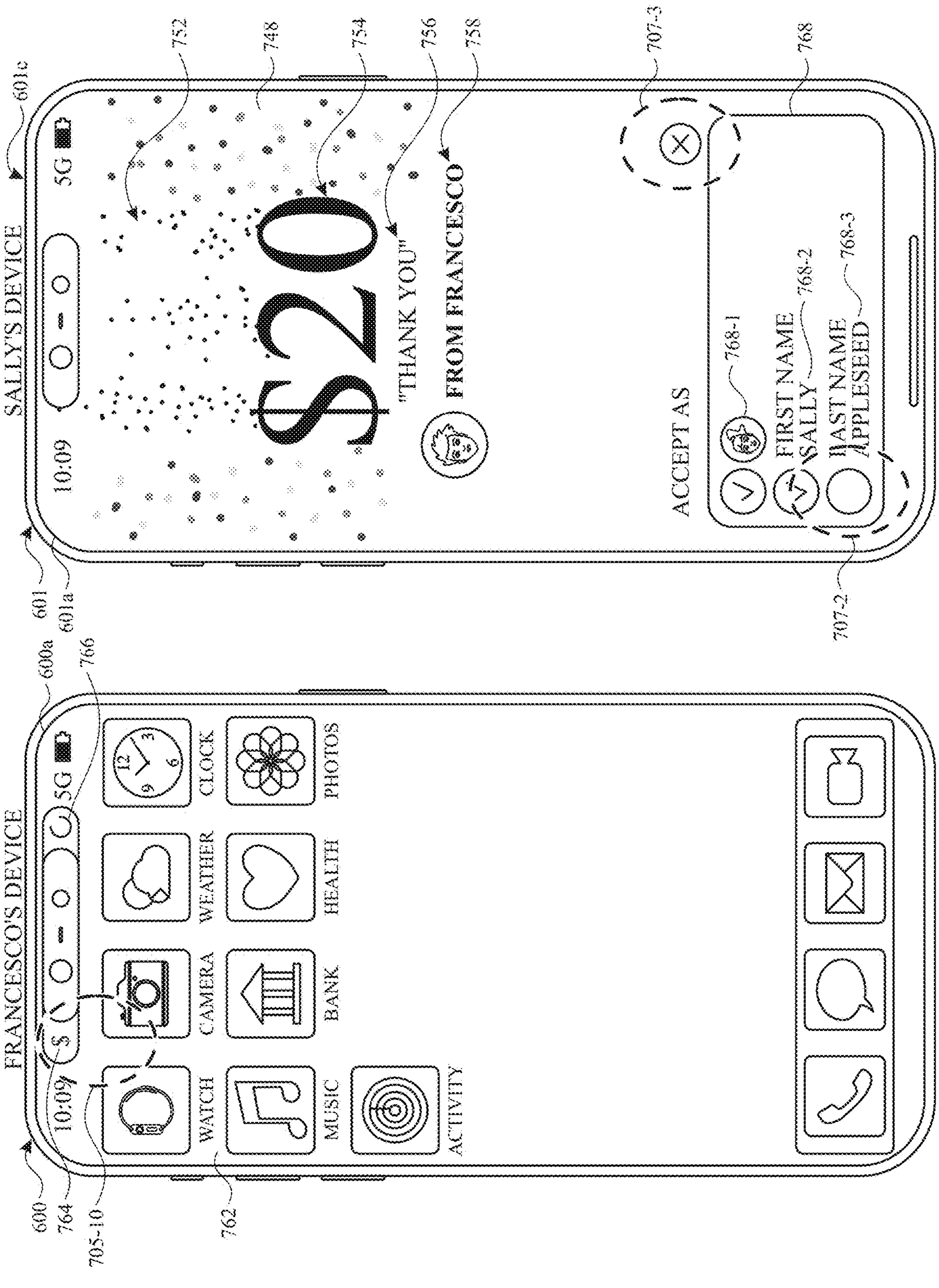
Figure 7K:
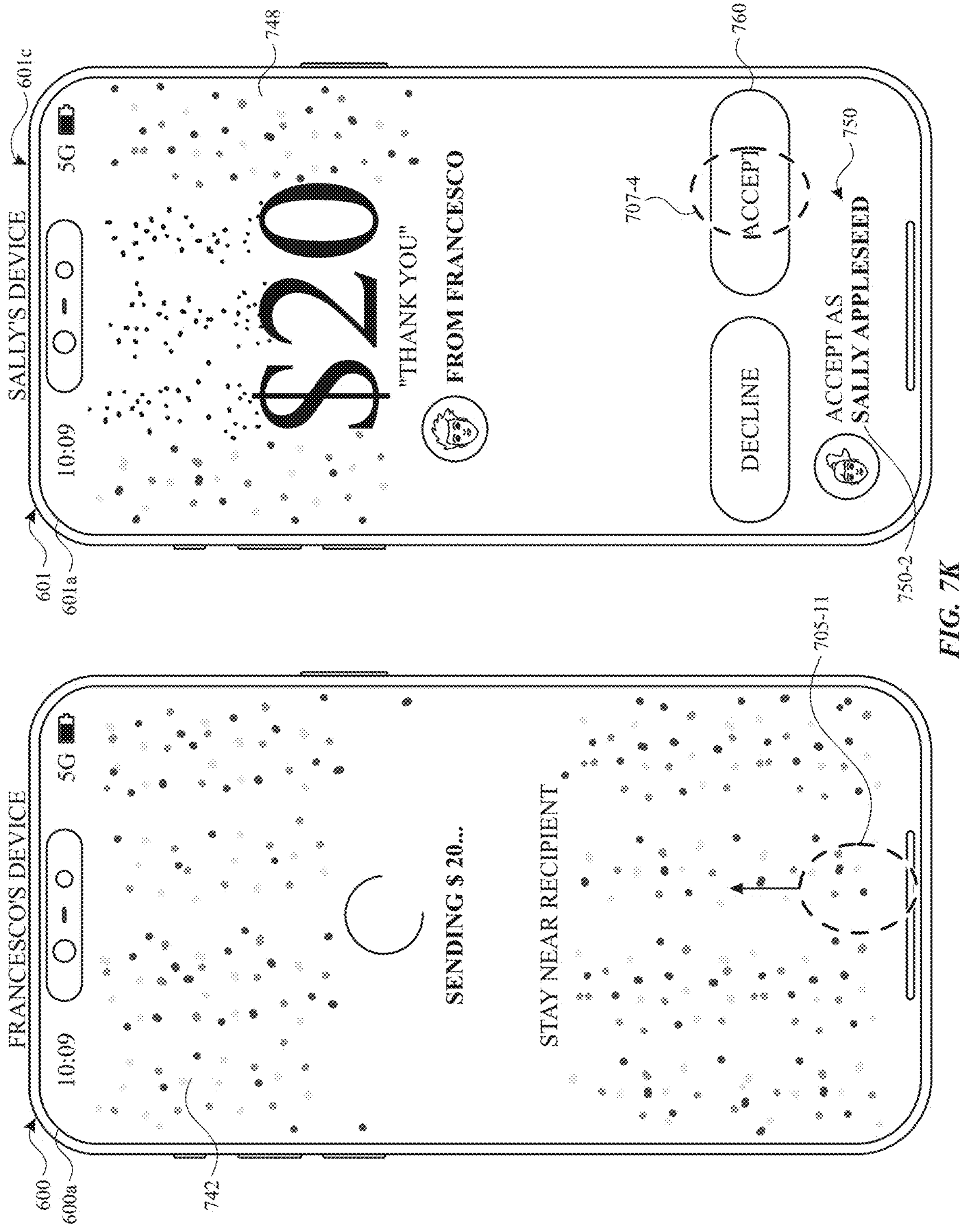
Figure 7L:
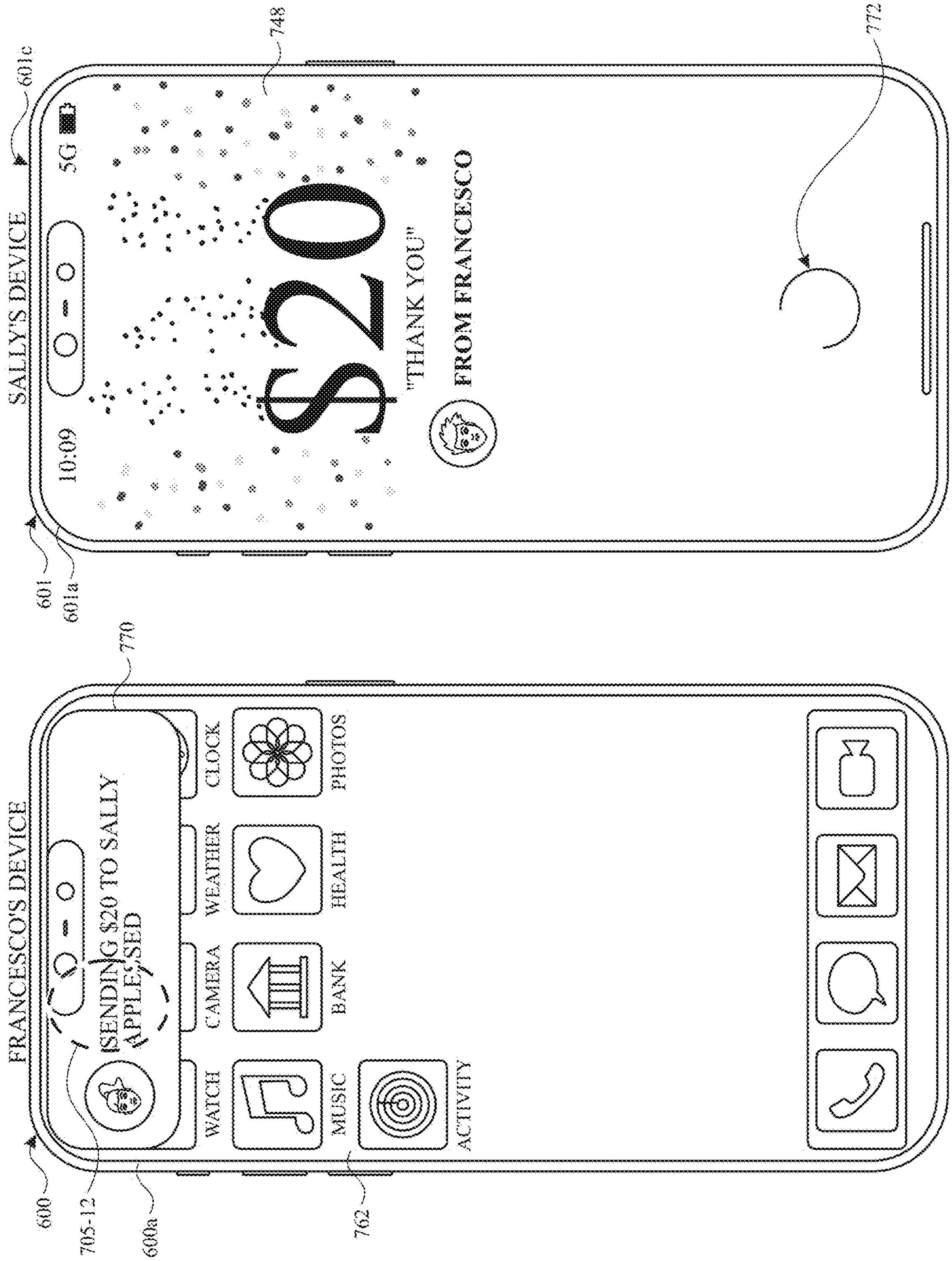
Figure 7M:
Figure 7N:
Figure 7O:
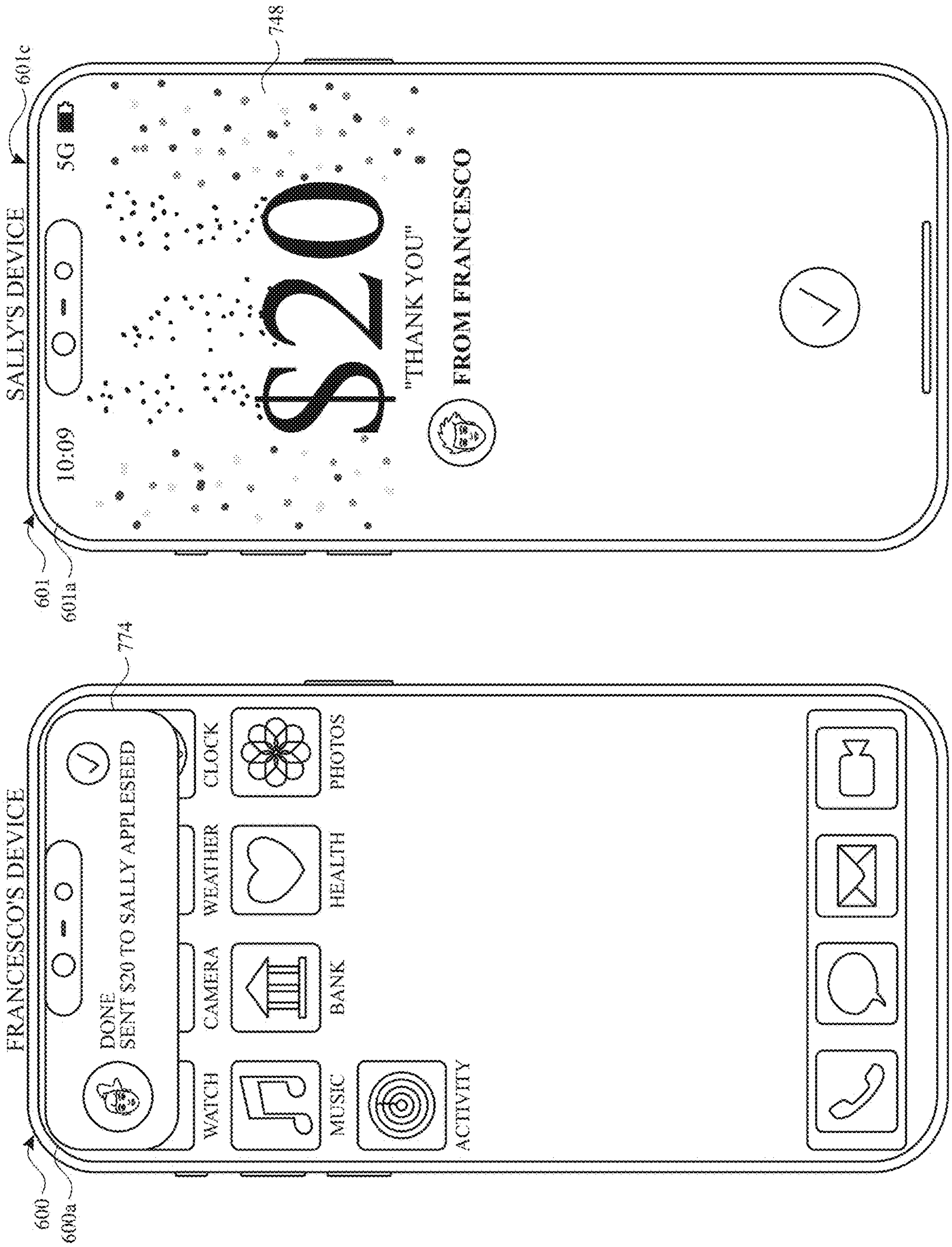
Figure 7P:
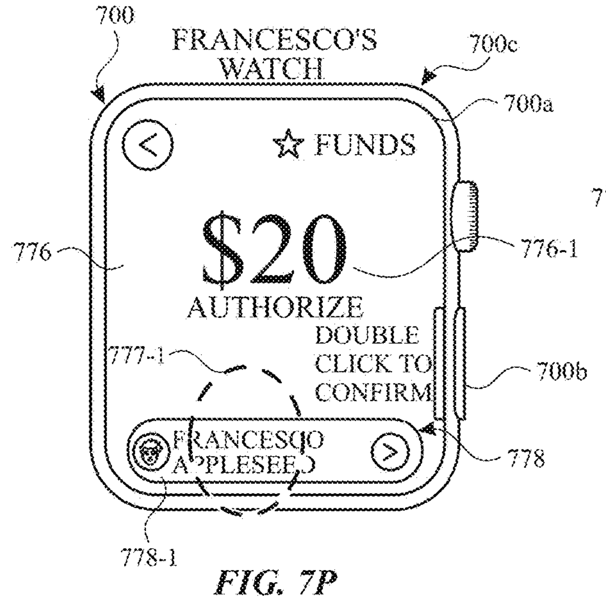
Figure 7Q:
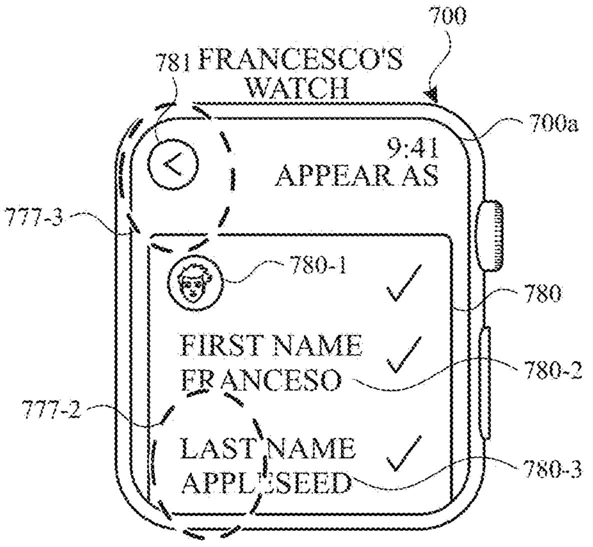
Figure 7R:
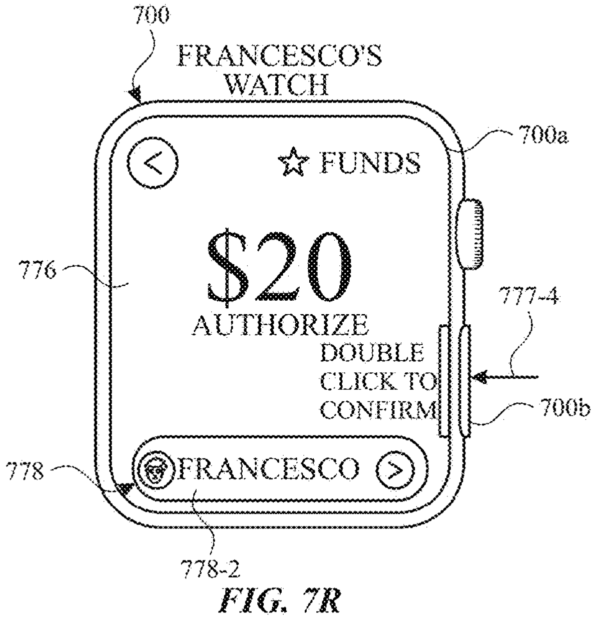
Figure 7S:
Figure 7T:
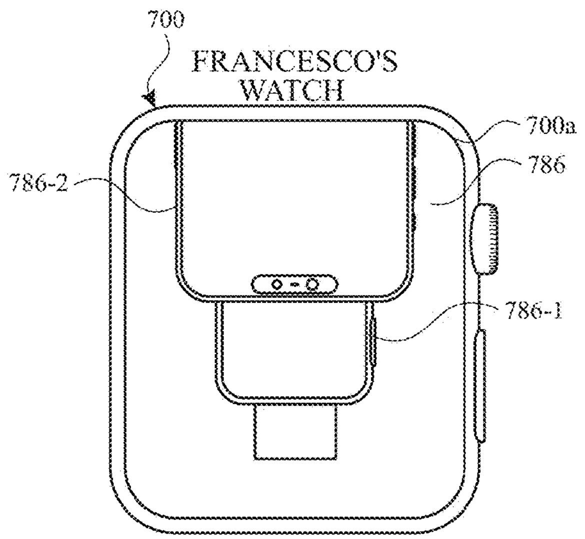
Figure 7U:
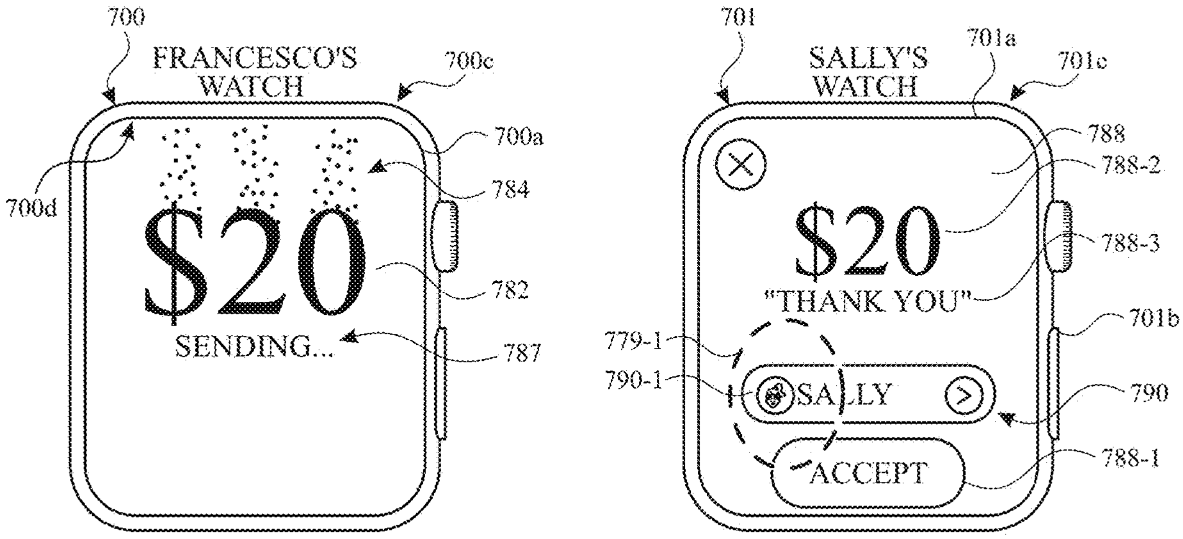
Figure 7V:
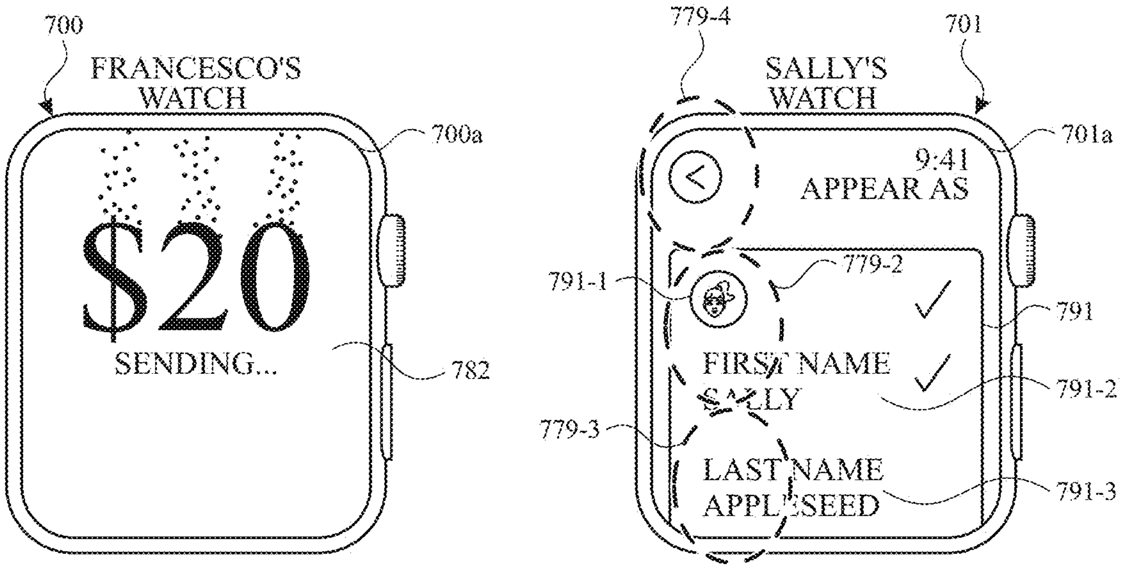
Figure 7W:
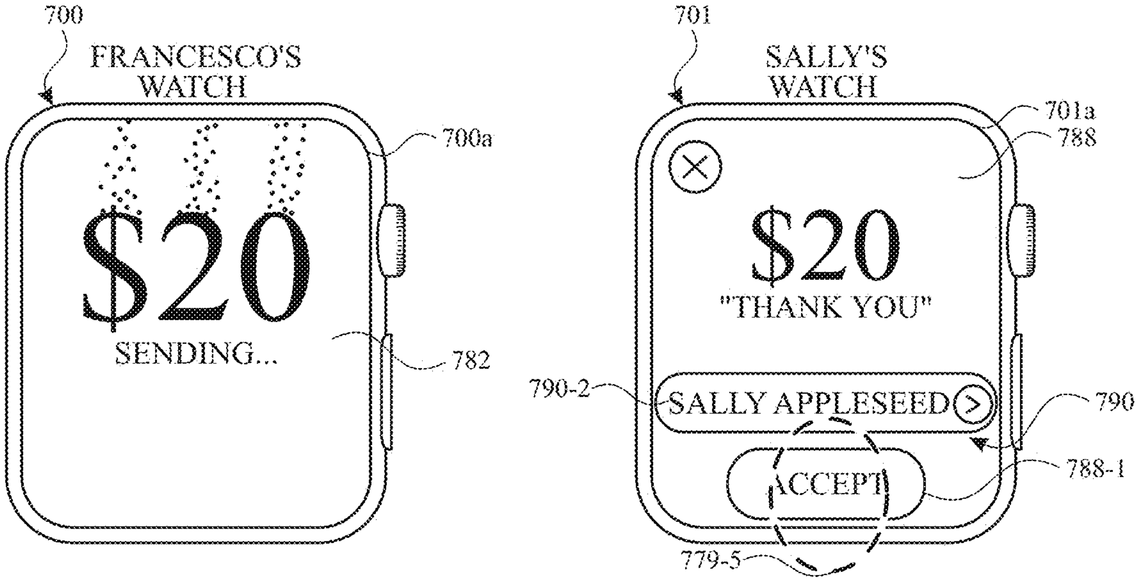
Figure 7X:
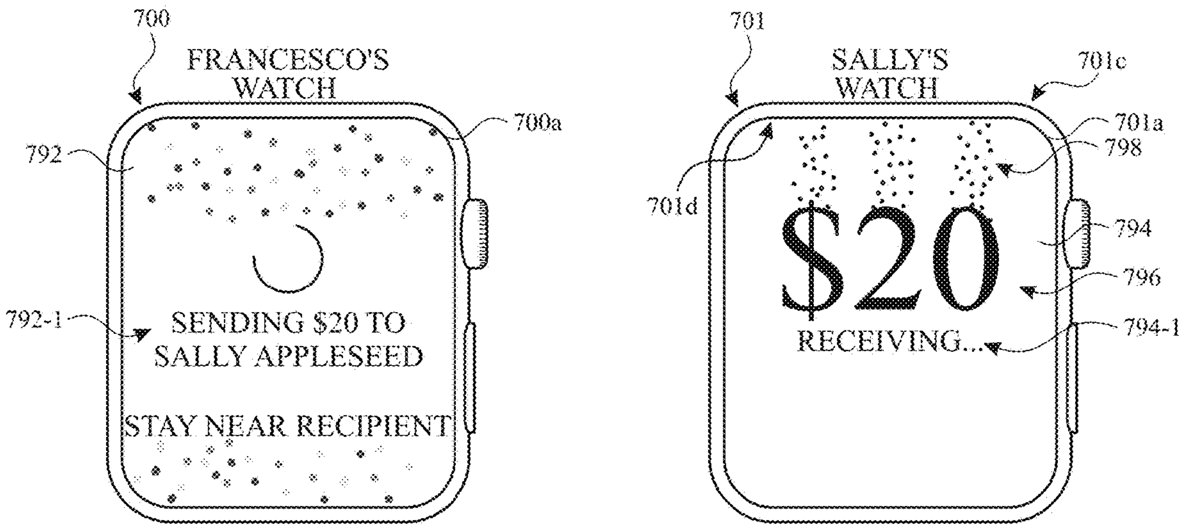
Figure 7Y:
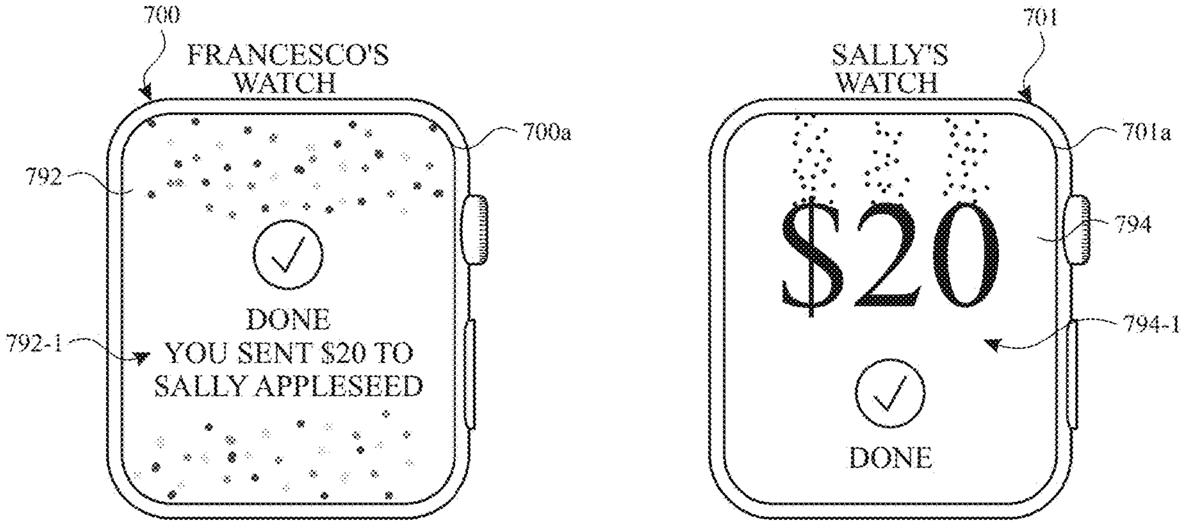
Figure 7Z:

FIGS. 6A-6E and 7A-7Z illustrate example user interfaces for transferring account resources, in accordance with some embodiments. In some embodiments, the account resources can include an amount of allocated memory, digital data, digital photos, digital videos, an account balance, funds, or any combination thereof. For example, FIGS. 6A-6E depict example user interfaces for embodiments for transferring digital photos from a first resource account (e.g., a first photos account) to a different resource account (e.g., a second photos account). As another example, FIGS. 7A-7Z depict example user interfaces for embodiments for transferring funds from a first resource account (e.g., a first funds account) to a different resource account (e.g., a second funds account). The user interfaces in these figures are used to illustrate the processes described below, including the processes in FIGS. 8 and 9.

The embodiments illustrated in FIGS. 6A-6E and 7A-7Z depict example computer systems for transferring account resources, in accordance with some embodiments. These computer systems include Francesco's device 600 (also referred to herein as device 600), Francesco's watch 700 (also referred to herein as watch 700), Sally's device 601 (also referred to herein as device 601), and Sally's watch 701 (also referred to herein as watch 701), which are shown concurrently in some figures to illustrate concurrent states of the respective devices, including the user interfaces and inputs at the respective devices. In the embodiments provided herein, Francesco's devices (e.g., device 600 and/or watch 700) can be described as performing a set of functions (e.g., functions associated with the resource transfer or other functions described herein), and Sally's devices (e.g., device 601 and/or watch 701) can be described as performing a different set of functions (e.g., a different set of functions associated with the resource transfer or other functions described herein). These descriptions are not intended to limit the functions performed by the respective devices but, rather, are provided to illustrate various aspects of the embodiments described herein. Thus, unless specified otherwise, the functions that are described as being performed using one or more of Francesco's devices are similarly capable of being performed using one or more of Sally's devices. Likewise, the functions that are described as being performed by one or more of Sally's devices are similarly capable of being performed by one or more of Francesco's devices, unless specified otherwise.

FIG. 6A depicts Francesco's device 600, which is a computer system that, in some embodiments, comprises touchscreen display 600*a*, camera 600*b*, and other hardware, such as processors, memory, and other components for operating device 600, such as near-field circuitry 600*c* and physical button 600*d*. In some embodiments, near-field circuitry 600*c* is located near region 600*e* of the device, which is an end or top edge or surface of the device. Francesco's device is depicted as a smartphone; however, it should be appreciated that Francesco's device can be a different type of computer system, such as a desktop computer, tablet computer, smartwatch (e.g., such as watch 700), laptop computer, or a head-mounted device. Furthermore, Francesco's device can include other display components, such as a projector or head-mounted display system. Francesco's device can also include other input components, such as a microphone for detecting audio input and/or other sensors for detecting finger gestures, hand gestures, eye gaze, and/or other inputs. In some embodiments, Francesco's device 600 includes one or more elements of devices 100, 300, and/or 500.

FIG. 6A also depicts Sally's device 601, which is a computer system that, in some embodiments, comprises touchscreen display 601*a*, camera 601*b*, and other hardware, such as processors, memory, and other components for operating Sally's device 601, such as near-field circuitry 601*c* and physical button 601*d*. In some embodiments, near-field circuitry 601*c* is located near region 601*e* of the device, which is an end or top edge or surface of the device. In the embodiment depicted in FIG. 6A, Sally's device 601 is a smartphone; however, it should be appreciated that Sally's device can be a different type of computer system, such as a desktop computer, tablet computer, smartwatch (e.g., such as watch 701), laptop computer, or a head-mounted device. Furthermore, Sally's device can include other display components, such as a projector or head-mounted display system. Sally's device can also include other input components, such as a microphone for detecting audio input and/or other sensors for detecting finger gestures, hand gestures, eye gaze, and/or other inputs. In some embodiments, Sally's device 601 includes one or more elements of devices 100, 300, and/or 500.

In FIG. 6A, Francesco's device 600 displays, via display 600*a*, interface 602, which is a user interface for transferring digital photos from Francesco's photo library, which is a photos account associated with Francesco's device 600. In some embodiments, photos in Francesco's photo library are stored at Francesco's device 600 and/or in a cloud-based storage medium. In the embodiments depicted in FIGS. 6A-6E, the photos are being transferred to Sally's photo library, which is a photos account associated with Sally's device 601. In some embodiments, photos in Sally's photo library are stored at Sally's device 601 and/or in a cloud-based storage medium.

Francesco's device 600 displays interface 602 including a collection of selected photos 604, text 606, status information 608, cancel option 614, and sender information region 615. Photos 604 is a preview of photographs that have been selected by Francesco's device to transfer to a recipient. Text 606 is information or a note provided by Francesco's device to accompany the photo transfer. Cancel option 614 is selectable to cancel the photo transfer process. Status information 608 indicates that Francesco's device 600 is in a ready state for transferring (e.g., sending) photos 604 to a recipient account. Sender information region 615 provides an indication of the sender information that will be provided (e.g., to the recipient) as a part of the photo transfer to identify the sender of the photos. Sally's device 601 displays, via display 601*a*, interface 618, which is a lockscreen interface for Sally's device.

In some embodiments, when sending resources to a recipient account, device 600 can permit the sender to customize the identifying information (e.g., personal information) that is shared with the recipient account or device, thereby providing customized control over the information that is used to identify, to the recipient, the sender of the resources. In FIG. 6A, sender information region 615 indicates the sender information that will be provided from Francesco's device 600 to the recipient's device (e.g., Sally's device 601) during the photo transfer. As depicted in FIG. 6A, sender information 615-1 is currently selected as the sender information that will be shared as part of the photo transfer. Sender information 615-1 includes an avatar representing Francesco and Francesco's first and last names, "Francesco Appleseed." Thus, if the photo transfer is performed when sender information 615-1 is indicated in sender information region 615, the recipient of the photo transfer will receive identifying information that includes Francesco's first and last names and avatar as a part of the photo transfer process.

The sender information can be changed by selecting sender information region 615 and choosing different identifying information. For example, in FIG. 6A, device 600 detects input 605-1 (e.g., a tap input, an air gesture, and/or a cursor input) selecting sender information region 615 and, in response, displays information options region 616, as shown in FIG. 6B. Information options region 616 includes different options for selecting the identifying information to be used for the photo transfer. In some embodiments, the options are preconfigured options that contain a combination of different identifying information elements such as a first name, last name, middle name, first name initial, last name initial, middle name initial, suffix, prefix, avatar, and photo used to identify the sender. For example, in FIG. 6B, options 616-1 to 616-3 are preconfigured personal identification options that can be selected by the sender. Specifically, option 616-1 includes an avatar and Francesco's first name; option 616-2 corresponds to sender information 615-1 and includes an avatar and Francesco's first and last names; and option 616-3 includes an avatar and the initials of Francesco's first and last names. In some embodiments, the identifying information can be customized by the user by selecting or deselecting different items from a list of identifying information elements. In FIG. 6B, Francesco's device 600 detects input 605-2 selecting option 616-1 and, in response, updates sender information region 615 with sender information 615-2 that corresponds to option 616-1, as shown in FIG. 6C.

In some embodiments, when device 600 is in the ready state, interface 602 includes one or more visual effects to provide feedback for instructing Francesco to use device 600 to initiate the photo transfer. In the embodiments described herein, the photo transfer process is initiated, at least in part, by positioning near-field circuitry 600*c* of device 600 near corresponding near-field circuitry of a recipient device (e.g., near-field circuitry 601*c* of Sally's device 601). Accordingly, Francesco's device 600 displays glowing effect 610 at an upper portion of display 600*a* that is near or around region 600*e* of Francesco's device 600. Because near-field circuitry 600*c* is located near region 600*e* of device 600, device 600 displays glowing effect 610 at an upper region of display 600*a* (e.g., near region 600*e* at the top of device 600), as shown in FIG. 6A, to indicate the portion of device 600 that should be properly positioned to initiate the photo transfer.

As shown in FIGS. 6A-6C, Francesco's device 600 also displays particle animation effect 612, which is a visual effect that provides feedback about the state of device 600 and the photo transfer process. Particle animation effect 612 is an animated visual effect that gives the appearance of particles originating from photos 604 and moving towards the top of device 600, which is near the portion of device 600 that includes near-field circuitry 600*c* for performing the photo transfer. Thus, particle animation effect 612 provides the appearance of photos 604 disintegrating into particles that are moving towards near-field circuitry 600*c* to be transferred from Francesco's device 600 to a recipient device or account. In some embodiments, the display of glowing effect 610 and particle animation effect 612 provide a synergistical effect that provides visual feedback and instruction to the user of device 600 for initiating a photo transfer with a recipient device, as depicted in FIGS. 6C-6E.

In FIG. 6C, Sally's device 601 detects Francesco's device 600 in close proximity and in the ready state. In response, Sally's device 601 displays glowing effect 620, which is similar to glowing effect 610. Sally's device 601 displays glowing effect 620 at an upper portion of display 601*a* that is near or around region 601*e* of Sally's device 601. Because near-field circuitry 601*c* is located near region 601*e* of device 601, Sally's device displays glowing effect 620 at an upper region of display 601*a* (e.g., near region 601*e* at the top of device 601), to indicate the portion of device 601 that should be properly positioned to initiate the photo transfer. Thus, glowing effect 620 provides feedback to Sally to position the top region of Sally's device 601, which contains near-field circuitry 601*c*, close to the top region of Francesco's device 600.

In FIG. 6D, the near-field circuitry 601*c* of Sally's device 601 is positioned close to near-field circuitry 600*c* of Francesco's device 600 in order to initiate the resource transfer process between the two devices. In some embodiments, the devices are properly positioned when the tops of the respective devices are touching each other and/or are positioned in an overlapping arrangement such that the near-field circuitry of the respective devices are in communication with each other. In some embodiments, devices 600 and 601 perform a handshake process when the devices are properly positioned and exchange relevant information (e.g., account information, identifying information, etc.) to perform the resource transfer. In some embodiments, devices 600 and 601 modify the displayed visual feedback based on the positioning of the devices. For example, as shown in FIG. 6D, Francesco's device 600 displays a visual change to glowing effect 610 such as increasing the brightness and/or expanding the glowing effect, and Sally's device 601 displays a similar visual change to glowing effect 620, to provide feedback confirming that the devices are positioned properly or are moving to the proper positioning to initiate the resource transfer.

In FIG. 6E, the photo transfer is in progress. Francesco's device 600 displays interface 624, which indicates a waiting state of device 600 while the photo transfer is in progress. Interface 624 includes status information 626 indicating that nine photos are being transferred, and instructions 628 instructing Francesco to keep device 600 close to device 601 while the photo transfer is in progress. Sally's device 601 displays interface 621, which is a recipient interface for the photo transfer. Interface 621 includes photos 630 showing a preview of the photos being transferred to the photo account associated with Sally's device 601, text 632 provided by Francesco's device 600, and sender identifying information 634. Sender identifying information 634 is the identifying information that was selected by Francesco's device 600 to identify the sender of the photos. As shown in FIG. 6E, sender identifying information 634 includes Francesco's avatar and first name, which is the identifying information that was included in option 616-1 that was selected by Francesco's device 600 in FIG. 6B and included in sender information region 615 (as sender information 615-2), as shown in FIG. 6C.

Interface 621 indicates that a request is received from Francesco to accept photos 630. In some embodiments, the request is not automatically accepted by Sally's device 601, and Sally has to manually accept the request in order to receive the photos. In such embodiments, interface 621 includes recipient information region 640, decline option 636, which is selectable to decline the request received from Francesco's device 600, and accept option 638, which is selectable to accept the request and thereby initiate (e.g., from the perspective of device 601) the transfer of the photos from Francesco's photos account to Sally's photo account. In some embodiments, Sally's device 601 automatically accepts the request from Francesco to receive the photos without displaying decline option 636, accept option 638, and recipient information region 640 in interface 621. For example, if Sally's account and Francesco's account are known to each other (e.g., they are both listed as contacts in each other's respective devices) and/or the two accounts have previously interacted with each other (e.g., they have previously processed a resource transfer with each other), then Sally's device 601 automatically accepts the request from Francesco to receive the photos. In some embodiments, when the photo transfer is automatically accepted by Sally's device 601, Sally's device displays interface 621 in a state in which the photo transfer is being processed and without including decline option 636, accept option 638, and recipient information region 640.

In some embodiments, Sally's device 601 also displays recipient information region 640 as a part of interface 621. Recipient information region 640 provides an indication (e.g., a preview) of the recipient information that will be provided (e.g., to the sender) as a part of the photo transfer to identify the recipient of the photos. In some embodiments, when receiving resources sent from a sender account, device 601 can permit the recipient to customize the identifying information (e.g., personal information) that is shared with the sender account or device, thereby providing customized control over the information that is used to identify, to the sender, the recipient of the resources. In FIG. 6E, recipient information region 640 indicates the recipient information that will be provided from Sally's device 601 to Francesco's device 600 during the photo transfer process. As depicted in FIG. 6E, recipient information 640-1 is currently selected as the recipient information that will be shared as part of the photo transfer. Recipient information 640-1 includes an avatar representing Sally and Sally's first name. Thus, if the photo transfer is performed (e.g., in response to detecting selection of accept option 638) when recipient information 640-1 is shown in recipient information region 640, the sender of the photos (e.g., Francesco's device 600) will receive identifying information that includes Sally's first name and avatar as a part of the photo transfer process. In some embodiments, the recipient information can be changed by selecting recipient information region 640 and choosing different identifying information in a manner similar to that described above with respect to FIGS. 6B-6C. Example interfaces for changing the recipient information are also described in greater detail below with respect to the embodiments in FIGS. 7I-7K and FIGS. 7U-7W.

In FIG. 6E, Sally's device 601 is in a ready state to receive the photos being transferred from Francesco's device 600. In some embodiments, when device 601 is in the ready state, device 601 displays interface 621 with particle animation effect 622, which is a visual effect that provides feedback about the state of device 601 and the photo transfer process. Particle animation effect 622 is an animated visual effect that gives the appearance of particles originating from region 601*e* at the top of device 601 (e.g., which is near the portion of device 601 that includes near-field circuitry 601*c* for performing the photo transfer) and moving towards photos 630 to "form" or "build" photos 630 being displayed at device 601. Because Francesco's device 600 displays a similar animated effect (e.g., with photos 604 disintegrating into particles that move in an opposite direction towards region 600*e* at the top of device 600), the respective particle animation effects 612 and 622 at Francesco's device 600 and Sally's device 601 collectively provide a visual representation of the photos being transferred from Francesco's device 600 to Sally's device 601 via the resource transfer process. The photos are depicted, via the particle animation effect 612 at Francesco's device 600, as disintegrating into particles that are then transferred to Sally's device 601 and used to create the photos 630 at Sally's device 601. Thus, the display of particle animation effect 622 at Sally's device 601 provides a visual indication of the photos being transferred from Francesco's device 600 to Sally's device 601. In some embodiments (e.g., prior to accepting the request to transfer photos), particle animation effect 622 provides visual feedback that Sally's device 601 is ready to receive the photos from Francesco's device 600 and prompts the user of device 601 to accept the request in order to receive the photos. In some embodiments, Sally's device 601 displays particle animation effect 622 after accepting the request to transfer the photos (e.g., automatically or via selection of accept option 638), and the particle animation effect 622 is displayed while the photo transfer is being processed, thereby providing visual feedback that Sally's device 601 is receiving the photos that are being transferred from Francesco's device 600.

FIGS. 7A-7Z illustrate example user interfaces for transferring account resources, in accordance with some embodiments. Specifically, the user interfaces in FIGS. 7A-7Z depict embodiments for transferring funds from a first resource account (e.g., a first funds account) to a different resource account (e.g., a second funds account). The user interfaces in these figures are used to illustrate the processes described below, including the processes in FIGS. 8 and 9. In some embodiments, the funds can be an account balance, a digital currency, or an account credit. Although the embodiments in FIGS. 7A-7Z depict user interfaces for techniques for transferring funds from Francesco's funds account to Sally's funds account, it should be appreciated that the techniques can be implemented in a similar manner to transfer funds from Sally's funds account to Francesco's funds account. In some embodiments, Francesco's funds account is managed using Francesco's device 600 and/or watch 700, and Sally's funds account is managed using Sally's device 601 and/or watch 701. In some embodiments, the techniques described with respect to FIGS. 7A-7Z can be used to transfer other resources such as photos, as illustrated at least in part by the user interfaces depicted in FIGS. 6A-6E.

In FIG. 7A, Francesco's device 600 displays interface 702, which is an interface that can be used to select an option for sending funds to a recipient. In some embodiments, interface 702 can be accessed from a digital wallet of Francesco's device. In some embodiments, interface 702 can be accessed from an application such as a messaging application or contacts application at the device. As shown in FIG. 7A, interface 702 includes a list of suggested contact options 704. The suggested contact options can include contacts that are associated with accounts that can be selected to receive funds from Francesco's funds account such as Sally, John, Lenny, or Moe. The suggested contact options 704 can also include application or account options that can be selected to use a respective application and/or account for transferring funds. For example, option 704-1 can be selected to transfer funds from a funds account using Francesco's device 600, as depicted in FIGS. 7A-7O. In some embodiments, option 704-1 can be selected to transfer funds to a recipient using the techniques depicted in FIGS. 7A-7Z (e.g., using near-field circuitry 600*c*). In some embodiments, option 704-1 is used to send funds to a recipient account that is not associated with a contact stored at Francesco's device 600. In some embodiments, option 704-1 can be used to transfer funds to a recipient account, regardless of whether or not the recipient account is associated with a contact stored at Francesco's device.

In response to detecting input 705-1 (e.g., a tap input, an air gesture, and/or a cursor input) selecting option 704-1, Francesco's device 600 displays interface 706, as shown in FIG. 7B. Interface 706 is a payment interface that can be used to specify a payment amount (e.g., an amount of funds to be transferred) and, in some embodiments, to provide a note or message that is transmitted with the funds to the recipient account. For example, in response to detecting input 705-2 selecting note region 710, Francesco's device can display a keyboard for typing a message to be displayed in note region 710. As an example, FIG. 7C shows the message "Thank You" has been added to note region 710. Interface 706 also includes payment amount 708 and keypad 712, which can be used to enter a value for the payment amount. In FIG. 7B, the default payment amount is shown as $1, but in response to detecting inputs 705-3 and 705-4 selecting, respectively, the "2" and "0" from keypad 712, Francesco's device 600 updates payment amount 708 to show $20, as illustrated in FIG. 7C.

In FIG. 7C, Francesco's device 600 detects input 705-5 selecting the next option 714 and, in response, displays an authorization interface as shown in FIG. 7D. The authorization interface includes region 716, indicating that a Funds application is being used to transfer $20 in funds. Region 716 also includes account indication 718, which can be selected to display accounts that can be selected for the funds transfer and, optionally, to change which account is selected to provide the funds for the transfer. In the embodiment depicted in FIG. 7D, FUNDS account is selected as the account that will be used to provide the funds for the transfer. In response to detecting input 705-6, which is a double-click input on button 600*d*, Francesco's device 600 continues with the process for transferring funds, as described below. In some embodiments, Francesco's device 600 performs an authentication process to authenticate the user of Francesco's device before proceeding with the process for transferring funds.

In FIG. 7E, Francesco's device 600 displays, via display 600*a*, interface 720, which is a user interface for transferring funds from Francesco's funds account, in accordance with some embodiments. In the embodiments depicted in FIGS. 7E-7Z, the funds are being transferred to Sally's funds account, which is a funds account associated with Sally's device 601. Francesco's device 600 displays interface 720 including funds amount 722, text 728, status information 732, a cancel option, and sender information region 730. Funds amount 722 indicates the amount of funds that have been selected by Francesco's device (e.g., as shown in FIGS. 7B-7D) to transfer to a recipient. Text 728 is the "Thank You" note provided by Francesco's device to accompany the funds transfer (as described with respect to FIGS. 7B and 7C). The cancel option is selectable to cancel the funds transfer process. Status information 732 indicates that Francesco's device 600 is in a ready state for transferring (e.g., sending) the funds to a recipient account. Sender information region 730 provides an indication of the sender information that will be provided (e.g., to the recipient) as a part of the funds transfer to identify the sender of the funds.

In some embodiments, when sending resources to a recipient account, device 600 can permit the sender to customize the identifying information (e.g., personal information) that is shared with the recipient account or device, thereby providing customized control over the information that is used to identify, to the recipient, the sender of the resources. In FIG. 7E, sender information region 730 indicates the sender information that will be provided from Francesco's device 600 to the recipient's device (e.g., Sally's device 601) during the funds transfer. As depicted in FIG. 7E, sender information 730-1 is currently selected as the sender information that will be shared as part of the funds transfer. Sender information 730-1 includes an avatar representing Francesco and Francesco's first and last names, "Francesco Appleseed." Thus, if the funds transfer is performed when sender information 730-1 is shown in sender information region 730, the recipient of the funds transfer will receive identifying information that includes Francesco's first and last names and avatar as a part of the funds transfer process.

The sender information can be changed by selecting sender information region 730 and choosing different identifying information. For example, in FIG. 7E, device 600 detects input 705-7 selecting sender information region 730 and, in response, displays information options region 734, as shown in FIG. 7F. Information options region 734 includes different options for selecting the identifying information to be used for identifying the sender for the funds transfer. In some embodiments, the options are preconfigured options that contain a combination of different identifying information elements such as a first name, last name, middle name, first name initial, last name initial, middle name initial, suffix, prefix, avatar, and photo used to identify the sender. For example, in FIG. 7F, options 734-1 to 734-3 are preconfigured personal identification options that can be selected by the sender. Specifically, option 734-1 includes an avatar and Francesco's first name; option 734-2 corresponds to sender information 730-1 and includes an avatar and Francesco's first and last names; and option 734-3 includes an avatar and the initials of Francesco's first and last names. In some embodiments, the identifying information can be customized by the user by selecting or deselecting different items from a list of identifying information elements (e.g., as shown by options region 768 in FIG. 7J). In FIG. 7F, Francesco's device 600 detects input 705-8 selecting option 734-1 and, in response, updates sender information region 730 with sender information 730-2 that corresponds to option 734-1, as shown in FIG. 7G.

In some embodiments, when device 600 is in the ready state, interface 720 includes one or more visual effects to provide feedback for instructing Francesco to use device 600 to initiate the funds transfer. In the embodiments described herein, the funds transfer process is initiated, at least in part, by positioning near-field circuitry 600*c* of device 600 near corresponding near-field circuitry of a recipient device (e.g., near-field circuitry 601*c* of Sally's device 601). Accordingly, Francesco's device 600 displays glowing effect 726 at an upper portion of display 600*a* that is near or around region 600*e* of Francesco's device 600. Because near-field circuitry 600*c* is located near region 600*e* of device 600, device 600 displays glowing effect 726 at an upper region of display 600*a* (e.g., near region 600*e* at the top of device 600), as shown in FIG. 7G, to indicate the portion of device 600 that should be properly positioned to initiate the funds transfer.

As shown in FIGS. 7E-7G, Francesco's device 600 also displays particle animation effect 724, which is a visual effect that provides feedback about the state of device 600 and the funds transfer process. Particle animation effect 724 is an animated visual effect that gives the appearance of particles originating from funds amount 722 and moving towards region 600*e* at the top of device 600, which is near the portion of device 600 that includes near-field circuitry 600*c* for performing the funds transfer. Thus, particle animation effect 724 provides the appearance of funds amount 722 disintegrating into particles that are moving towards near-field circuitry 600*c* to be transferred from Francesco's device 600 to a recipient device or account. In some embodiments, the display of glowing effect 726 and particle animation effect 724 provide a synergistical effect that provides visual feedback and instruction to the user of device 600 for initiating a funds transfer with a recipient device, as depicted in FIGS. 7G-7O.

In FIG. 7G, Sally's device 601 detects Francesco's device 600 in close proximity and in the ready state. In response, Sally's device 601 displays glowing effect 740, which is similar to glowing effect 726. Sally's device 601 displays glowing effect 740 at an upper portion of display 601*a* that is near or around region 601*e* of Sally's device 601. Because near-field circuitry 601*c* is located near region 601*e* of device 601, Sally's device displays glowing effect 740 at an upper region of display 601*a* (e.g., near region 601*e* at the top of device 601) to indicate the portion of device 601 that should be properly positioned to initiate the funds transfer. Thus, glowing effect 740 provides feedback to Sally to position the top region of Sally's device 601, which contains near-field circuitry 601*c*, close to the top region of Francesco's device 600.

In FIG. 7H, the near-field circuitry 601*c* of Sally's device 601 is positioned close to near-field circuitry 600*c* of Francesco's device 600 in order to initiate the resource transfer process between the two devices. In some embodiments, the devices are properly positioned when the tops of the respective devices are touching each other and/or are positioned in an overlapping arrangement such that the near-field circuitry of the respective devices are in communication with each other. In some embodiments, devices 600 and 601 perform a handshake process when the devices are properly positioned and exchange relevant information (e.g., account information, identifying information, etc.) to perform the resource transfer. In some embodiments, devices 600 and 601 modify the displayed visual feedback based on the positioning of the devices. For example, as shown in FIG. 7H, Francesco's device 600 displays a visual change to glowing effect 726 such as increasing the brightness and/or expanding the glowing effect, and Sally's device 601 displays a similar visual change to glowing effect 740, to provide feedback confirming that the devices are positioned properly or are moving to the proper positioning to initiate the resource transfer.

In FIG. 7I, the funds transfer is in progress. Francesco's device 600 displays interface 742, which indicates a waiting state of device 600 while the funds transfer is in progress. Interface 742 includes status information 744, indicating that $20 in funds is being transferred and providing instruction to keep device 600 close to device 601 while the funds transfer is in progress. Sally's device 601 displays interface 748, which is a recipient interface for the funds transfer. Interface 748 includes transfer amount 754 indicating that $20 in funds are in the process of being transferred to the funds account associated with Sally's device 601. Interface 748 also includes text 756 which is the "Thank You" note provided by Francesco's device 600, and sender identifying information 758. Sender identifying information 758 is the identifying information that was selected by Francesco's device 600 to identify the sender of the funds. As shown in FIG. 7I, sender identifying information 758 includes Francesco's avatar 758-1 and first name 758-2, which is the identifying information that was included in option 734-1 that was selected by Francesco's device 600 in FIG. 7F and included in sender information region 730 (as sender information 730-2), as shown in FIG. 7G.

Interface 748 indicates that a request is received from Francesco to accept $20 in funds. In some embodiments, the request is not automatically accepted by Sally's device 601, and Sally has to manually accept the request in order to receive the funds. In such embodiments, interface 748 includes recipient information region 750, decline option 759, which is selectable to decline the request received from Francesco's device 600, and accept option 760, which is selectable to accept the request and thereby initiate (e.g., from the perspective of device 601) the transfer of the funds from Francesco's funds account to Sally's funds account. In some embodiments, Sally's device 601 automatically accepts the request from Francesco to receive the funds without displaying decline option 759, accept option 760, and recipient information region 750 in interface 748. For example, if Sally's account and Francesco's account are known to each other (e.g., they are both listed as contacts in each other's respective devices) and/or the two accounts have previously interacted with each other (e.g., they have previously processed a resource transfer with each other), then Sally's device 601 automatically accepts the request from Francesco to receive the funds. In some embodiments, if the funds transfer is automatically accepted by Sally's device 601, Sally's device displays interface 748 in a state in which the funds transfer is being processed and without including decline option 759, accept option 760, and recipient information region 750 (e.g., as depicted in FIG. 7L).

In some embodiments, Sally's device 601 also displays recipient information region 750 as a part of interface 748. Recipient information region 750 provides an indication (e.g., a preview) of the recipient information that will be provided (e.g., to the sender) as a part of the funds transfer to identify the recipient of the funds. In some embodiments, when receiving resources sent from a sender account, device 601 can permit the recipient to customize the identifying information (e.g., personal information) that is shared with the sender account or device, thereby providing customized control over the information that is used to identify, to the sender, the recipient of the resources. In FIG. 7I, recipient information region 750 indicates the recipient information that will be provided from Sally's device 601 to Francesco's device 600 during the funds transfer process. As depicted in FIG. 7I, recipient information 750-1 is currently selected as the recipient information that will be shared as part of the funds transfer. Recipient information 750-1 includes an avatar representing Sally and Sally's first name. Thus, if the funds transfer is performed (e.g., in response to detecting selection of accept option 760) when recipient information 750-1 is shown in recipient information region 750, the sender of the funds (e.g., Francesco's device 600) will receive identifying information that includes Sally's first name and avatar as a part of the funds transfer process.

In some embodiments, the recipient information can be changed by selecting recipient information region 750 and choosing different identifying information in a manner similar to that described above with respect to FIGS. 7E-7G. For example, in FIG. 7I, Sally's device 601 detects input 707-1 (e.g., a tap input, an air gesture, and/or a cursor input) selecting recipient information region 750 and, in response, displays information options region 768, as shown in FIG. 7J. Information options region 768 includes different options for selecting the identifying information to be used for identifying the recipient of the funds transfer. In some embodiments, the options include a listing of different identifying information elements such as a first name, last name, middle name, first name initial, last name initial, middle name initial, suffix, prefix, avatar, and photo used to identify the sender. For example, in FIG. 7J, options 768-1 to 768-3 correspond to different identifying information elements that can be selected by the recipient. Specifically, option 768-1 corresponds to Sally's avatar; option 768-2 corresponds to Sally's first name; and option 768-3 corresponds to Sally's last name. In some embodiments, the identifying information can be customized by the user by selecting or deselecting different items from the list of identifying information elements. For example, in FIG. 7J, Sally's device 601 detects input 707-2 selecting option 768-2, followed by input 707-3 to close information options region 768 and, in response, updates recipient information region 750 with sender information 750-2, as shown in FIG. 7K. Sender information 750-2 includes the identification elements that were selected from information options region 768, which are Sally's avatar, Sally's first name, and Sally's last name. It should be appreciated that Sally can customize the recipient information as desired using identification options region 768. For example, if Sally wanted to remove her avatar from the recipient information, Sally can deselect option 768-1. It should be appreciated that the user identification options depicted in regions 734 and 768 are provided as non-limiting examples of identification options. Other identification options can be provided, including identification options that contain one or more a first name, last name, middle name, first name initial, last name initial, middle name initial, suffix, prefix, avatar, and photo.

In FIGS. 7I-7K, Sally's device 601 is in a ready state to receive the funds being transferred from Francesco's device 600. In some embodiments, when device 601 is in the ready state, device 601 displays interface 748 with particle animation effect 752, which is a visual effect that provides feedback about the state of device 601 and the funds transfer process. Particle animation effect 752 is an animated visual effect that gives the appearance of particles originating from region 601*e* at the top of device 601 (e.g., which is near the portion of device 601 that includes near-field circuitry 601*c* for performing the funds transfer) and moving towards funds amount 754 to "form" or "build" the $20 funds amount being displayed at device 601. Because Francesco's device 600 displays a similar animated effect (e.g., with funds amount 722 disintegrating into particles that move in an opposite direction towards region 600*e* at the top of device 600), the respective particle animation effects 724 and 752 at Francesco's device 600 and Sally's device 601 collectively provide a visual representation of the funds being transferred from Francesco's device 600 to Sally's device 601 via the resource transfer process. The $20 in funds shown in funds amount 722 are depicted, via the particle animation effect 724 at Francesco's device 600, as disintegrating into particles that are then transferred to Sally's device 601 and used to create funds amount 754 at Sally's device 601. Thus, the display of particle animation effect 752 at Sally's device 601 provides a visual indication of the funds being transferred from Francesco's device 600 to Sally's device 601. In some embodiments (e.g., prior to accepting the request to transfer funds), particle animation effect 752 provides visual feedback that Sally's device 601 is ready to receive the funds from Francesco's device 600 and prompts the user of device 601 to accept the request in order to receive the funds. In some embodiments, Sally's device 601 displays particle animation effect 752 after accepting the request to transfer the funds (e.g., automatically or via selection of accept option 760), and the particle animation effect 752 is displayed while the funds transfer is being processed, thereby providing visual feedback that Sally's funds account and/or device 601 is receiving the funds that are being transferred from Francesco's funds account and/or device 600. For example, particle animation effect 752 is depicted in FIGS. 7L-7O after Sally's device 601 has accepted the funds transfer.

In FIG. 7K, Francesco's device 600 is still in the waiting state, and Sally's device 601 is updated to display recipient information 750-2 in recipient information region 750. Sally's device 601 detects input 707-4 selecting accept option 760, which accepts the request to receive $20 in funds from Francesco. After accepting the request, Sally's device 601 transitions to a waiting state while the funds transfer is being processed, as shown in FIGS. 7L-7M. During the waiting state, Sally's device 601 continues to display the particle animation effect 752 and displays status indicator 772 with a rotating circle graphic indicating that the funds transfer is processing. In FIGS. 70 and 7P, the funds transfer is complete, and Sally's device 601 displays status indicator 772 with a checkmark to indicate the funds transfer is complete. In some embodiments, Sally's device 601 continues to display particle animation effect 752 after the funds transfer is complete.

In some embodiments, information about the funds transfer can be displayed while a user navigates away from the transfer interface. For example, while Francesco is waiting for Sally to accept the funds transfer in FIG. 7I, Francesco's device 600 detects input 705-9 on bar 746 (e.g., a swipe gesture and/or other input corresponding to a request to display the home screen of device 600) and, in response, displays home screen 762 as shown in FIG. 7J. Because Francesco's device no longer displays interface 742, device 600 displays status indicators 764 and 766 in a status region of the display. For example, status indicator 764 indicates that Francesco's device 600 is using the funds application, and indicator 766 indicates that a funds transfer is currently in progress. In some embodiments, indicator 766 indicates device 600 is in the waiting state. In some embodiments, indicator 766 updates dynamically to indicate a status of the funds transfer. For example, indicator 766 can indicate that the funds transfer is in progress, has failed, or is cancelled. In some embodiments, the user can return to the funds transfer interface by selecting indicator 764 or indicator 766. For example, in response to detecting input 705-10 selecting indicator 764, Francesco's device 600 displays interface 742, as shown in FIGS. 7J and 7K.

As another example, in FIG. 7K, Francesco's device 600 detects input 705-11 (e.g., similar to input 705-9) and, in response, displays home screen 762 in FIG. 7L. In FIG. 7L, Sally has accepted the funds transfer request, so Francesco's device 600 displays notification 770 indicating that the funds transfer is now in progress and that Francesco's device 600 is sending $20 to Sally Appleseed. Because Sally's device 601 has communicated the recipient identification information to Francesco's device 600 as a part of the funds transfer process, notification 770 includes the recipient identification information that was specified by Sally in FIG. 7J. In response to detecting input 705-12 selecting notification 770, Francesco's device 600 returns to interface 742, which shows status information 744 is updated with the recipient identification information 744-1 indicating that $20 is being sent to Sally Appleseed.

As depicted in FIG. 7N, the funds transfer process is complete, and Francesco's device 600 updates status information 744 to indicate that $20 has been sent to Sally Appleseed. In some embodiments, Francesco's device displays a notification to indicate the transfer is complete. For example, in response to detecting input 705-13, Francesco's device 600 displays the home screen with notification 774 indicating that the transfer of $20 to Sally Appleseed has been completed, as shown in FIG. 7O. In some embodiments, a device can display other notifications such as notifications indicating that the transaction failed. In some embodiments, a transaction can fail if the recipient does not accept the request (e.g., by selecting decline option 759), if the sender does not have sufficient funds or if the funds account is otherwise restricted from completing the transfer, or if a connection is lost between the devices (e.g., if the devices move away from each other before the transaction is complete).

FIGS. 7P-7Z depict example user interfaces for performing a funds transfer using a smartwatch. The embodiments depicted in FIGS. 7P-7Z are similar to those described above, except shown with corresponding user interfaces on a smartwatch instead of a smartphone. For the sake of brevity, some details are not repeated in the description of the user interfaces depicted in FIGS. 7P-7Z.

FIG. 7P depicts Francesco's watch 700, which is a computer system that, in some embodiments, comprises touchscreen display 700*a*, and other hardware such as processors, memory, and other components for operating watch 700 such as physical button 700*b* and near-field circuitry 700*c*. In some embodiments, near-field circuitry 700*c* is located near region 700*d* of the device, which is an end or top edge or surface of the device. In some embodiments, Francesco's watch 700 includes one or more elements of devices 100, 300, 500, and/or 600.

In FIG. 7P, Francesco's watch 700 displays interface 776 with funds transfer amount 776-1 and sender information region 778 (e.g., similar to sender information region 730). Sender information region 778 includes sender information 778-1 (e.g., similar to sender information 730-1) showing Francesco's avatar, first name, and last name are currently selected for sending to the recipient as part of the funds transfer process. In response to detecting input 777-1 (e.g., a tap input, an air gesture, and/or a cursor input) selecting sender information region 778, Francesco's watch 700 displays identification options region 780, which includes options 780-1 to 780-3, each corresponding to different information elements that can be selected or deselected to specify the sender information to be included with the funds transfer. In FIG. 7Q, watch 700 detects input 777-2 deselecting option 780-3 (e.g., Francesco's last name) and input 777-3 selecting back option 781 and, in response, displays interface 776 with updated sender information 778-2 that includes Francesco's avatar and first name (without his last name), as shown in FIG. 7R.

In FIG. 7R, watch 700 detects input 777-4 pressing button 700*b* and, in response, transitions to the ready state as shown in FIG. 7S. When in the waiting state, Francesco's watch 700 displays interface 782 with funds amount 783, status information 787, and particle animation effect 784. Particle animation effect 784 is similar to particle animation effect 724 and shows particles moving from funds amount 783 towards region 701*d*. In some embodiments, when Francesco's watch 700 is in the ready state, the watch also displays animation 786, which depicts a device representation 786-2 placed relative to device representation 786-1. Animation 786 provides visual feedback of instructions for positioning Francesco's watch 700 relative to another device (e.g., a smartphone or smartwatch) in order to initiate the funds transfer.

FIG. 7U depicts Francesco's watch 700 and Sally's watch 701 after the two devices have been properly positioned to initiate the funds transfer process. Sally's watch 701 is a computer system that, in some embodiments, comprises touchscreen display 701*a* and other hardware, such as processors, memory, and other components for operating watch 701, such as physical button 701*b* and near-field circuitry 701*c*. In some embodiments, near-field circuitry 701*c* is located near region 701*d* of the device, which is an end or top edge or surface of the device. In some embodiments, Sally's watch 701 includes one or more elements of devices 100, 300, 500, and/or 601.

In FIG. 7U, Francesco's watch 700 is shown in a waiting state while Sally's watch 701 is prompting Sally to accept the funds transfer. Specifically, Sally's watch 701 displays interface 788, which includes funds amount 788-2, note 788-3, accept option 788-1, and recipient information region 790. In some embodiments, interface 788 includes an animated particle effect similar to animated particle effect 752. In some embodiments, interface 788 includes a decline option that can be selected to decline the funds transfer request. In some embodiments, interface 788 includes a representation of the sender information that was selected by Francesco (e.g., Francesco's avatar and first name as indicated by sender information 778-2 in FIG. 7R). In FIG. 7U, Sally's watch 701 displays recipient information 790-1 in recipient information region 790. Recipient information 790-1 includes Sally's avatar and first name.

In FIG. 7U, Sally's watch 701 detects input 779-1 (e.g., a tap input, an air gesture, and/or a cursor input) selecting recipient information region 790 and, in response, displays recipient identification options region 791 in FIG. 7V with options 791-1 to 791-3, each corresponding to Sally's avatar, first name, and last name, respectively. In response to inputs 779-2, 779-3, and 779-4, Sally's watch 701 deselects the avatar option 791-1, selects the last name option 791-3, and displays interface 788 having updated recipient information 790-2 in recipient information region 790, as shown in FIG. 7W. Updated recipient information 790-2 includes Sally's first and last name without her avatar.

In FIG. 7W, Sally's watch 701 detects input 779-5 selecting accept option 788-1 and, in response, accepts the request to transfer funds from Francesco's funds account to Sally's funds account. In FIG. 7X, the funds transfer has been accepted and is in progress. Francesco's watch 700 displays interface 792 having status information 792-1 indicating that Francesco is sending $20 in funds to Sally Appleseed. Sally's watch 701 displays interface 794 showing a representation of the funds amount 796, status information 794-1 showing the funds are being received, and particle animation effect 798 (e.g., similar to particle animation effect 752) indicating the funds are being received. Particle animation effect 798 depicts particles moving from region 701*d* of watch 701 towards funds amount 796.

In FIG. 7Y, the funds transfer is complete. Francesco's watch 700 displays interface 792 with status information 792-1 updated to indicate the funds have been transferred to Sally Appleseed. Sally's watch 701 displays interface 794 with status information 794-1 updated to indicate the transfer is complete.

In some embodiments, a recipient of a resource transfer is prompted to setup an account for the resources if the resource account has not already been setup for the user. For example, as depicted in FIG. 7Z, if Sally has not yet setup a funds account, Sally's watch 701 displays notification 797 after the resource transfer has been performed (e.g., the steps described above have been performed, but the funds have not yet been finally deposited in a funds account for Sally). In some embodiments, notification 797 prompts Sally to user her phone to complete setup of a funds account within an amount of time (e.g., seven days) in order to receive the funds. In some embodiments, Sally's device 601 also displays a similar notification. For example, in FIG. 7Z, Sally's device 601 also displays notification 799 prompting Sally to setup her account in order to receive the funds. In some embodiments, the notifications (e.g., notification 797 and/or 799) include an indication of the sender of the funds, a note, and/or the amount of the funds transfer. In some embodiments, notification 799 can be selected to access an application or website for setting up the funds account.

FIG. 8 is a flow diagram illustrating a method for customizing information that is shared when transferring account resources, in accordance with some embodiments. Method 800 is performed at a computer system (e.g., 100, 300, 500, 600, 601, 700, and/or 701) (e.g., a smartphone, a wearable device (e.g., a smartwatch), a tablet computer, a desktop computer, a laptop computer, and/or a head-mounted device (e.g., a head-mounted augmented reality and/or extended reality device)) that is in communication with (e.g., includes and/or is connected to) one or more display generation components (e.g., 112, 340, 504, 600*a*, 601*a*, 700*a*, and/or 701*a*) (e.g., a display controller, a touch-sensitive display system, a display screen, a monitor, a projector, a holographic display, and/or a head-mounted display system) and one or more input devices (e.g., 112, 350, 355, 508, 522, 600*a*, 600*c*, 600*d*, 601*a*, 601*c*, 601*d*, 700*a*, 700*b*, 700*c*, 701*a*, 701*b*, and/or 701*c*) (e.g., a touch-sensitive surface, RF circuitry (e.g., 108), a near-field communication (NFC) reader, a keyboard, mouse, trackpad, one or more optical sensors for detecting a QR code, barcode, a gaze, and/or gestures, one or more capacitive sensors for detecting hover inputs, a microphone, and/or accelerometer/gyroscope/inertial measurement units). Some operations in method 800 are, optionally, combined, the orders of some operations are, optionally, changed, and some operations are, optionally, omitted.

As described below, method 800 provides an intuitive way for customizing information that is shared when transferring account resources. The method reduces the cognitive burden on a user for customizing information that is shared when transferring account resources, thereby creating a more efficient human-machine interface. For battery-operated computing devices, enabling a user to customize information that is shared when transferring account resources faster and more efficiently conserves power and increases the time between battery charges.

At method 800, while displaying a resource transfer interface (e.g., 602, 621, 720, 748, 782, and/or 788) (e.g., a memory transfer interface, a data transfer interface, a photo transfer interface, a balance transfer interface, and/or a funds transfer interface) that includes a resource transfer amount (e.g., 604, 630, 722, 754, 783, and/or 788-2) (e.g., an amount of allocated memory, data, photos, a balance, and/or funds to be transferred) (e.g., for sending the resource or for receiving the resource) and user identification information (e.g., 615, 615-1, 615-2, 640, 640-1, 640-2, 730, 730-1, 730-2, 750, 750-1, 750-2, 778, 778-1, 778-2, 790, 790-1, and/or 790-2) for a first party of the resource transfer (e.g., an identification of a sender or an identification of a recipient), the computer system (e.g., 600, 601, 700, and/or 701) receives (802), via the one or more input devices, a first set of one or more inputs that includes a selection (e.g., 605-2, 705-8, 707-2, 777-2, 779-2, and/or 779-3) of one or more user identification options (e.g., 616-1, 616-2, 616-3, 734-1, 734-2, 734-3, 768-1, 768-2, 768-3, 780-1, 780-2, 780-3, 791-1, 791-2, and/or 791-3) for the first party (e.g., a first name, a last name, initials, and/or an avatar). In some embodiments, the first set of one or more inputs includes selection (e.g., 707-4 and/or 779-5) of a send element, an accept element (e.g., 760 and/or 788-1), and/or other input for initiating the resource transfer such as, for example, positioning the computer system in proximity to an external computer system that is associated with a second party of the resource transfer (e.g., as depicted in FIGS. 6D and/or 7H). In some embodiments, the user identification information for the first party of the resource transfer is personal information for the first party of the resource transfer such as a first name, last name, initials, and/or a picture of the first party. In some embodiments, the first party is a user of the computer system. In some embodiments, the first set of one or more inputs includes a selection (e.g., 605-1, 705-7, 707-1, 777-1, and/or 779-1) of the user identification information.

In response (804) to receiving the first set of one or more inputs, the computer system (e.g., 600, 601, 700, and/or 701) performs (e.g., conditionally performs) the following steps. In accordance with a determination that the first set of one or more inputs corresponds to selection of a first set of user identification options for the first party of the resource transfer (e.g., the first set of inputs includes selection (and/or deselection) of one or more user identification options (e.g., 616-1, 616-2, 616-3, 734-1, 734-2, 734-3, 768-1, 768-2, 768-3, 780-1, 780-2, 780-3, 791-1, 791-2, and/or 791-3) that correspond to first identification information of the first party), the computer system initiates (806) a process to perform a resource transfer (e.g., sending or receiving the resources) that includes transmitting user identification information for the first party (e.g., 615, 640, 730, 750, 778, and/or 790) with a first set of identification information (e.g., 615-2, 640-2, 730-2, 750-2, 778-2, and/or 790-2) that is based on the selected first set of user identification options for the first party of the resource transfer (e.g., without including a second set of identification information for the first party of the resource transfer), wherein the first set of identification information includes first identification information (e.g., a last name of the first party, a first name of the first party, or an avatar of the first party). In some embodiments, in accordance with a determination that the selected first set of user identification options includes a first subset of options, the first set of identification information includes the first subset of options; and in accordance with a determination that the selected first set of user identification options includes a second subset of options, the first set of identification information includes the second subset of options. In accordance with a determination that the first set of one or more inputs corresponds to selection of a second set of user identification options, different from the first set of user identification options, for the first party of the resource transfer (e.g., the first set of inputs includes selection (and/or deselection) of one or more user identification options (e.g., 616-1, 616-2, 616-3, 734-1, 734-2, 734-3, 768-1, 768-2, 768-3, 780-1, 780-2, 780-3, 791-1, 791-2, and/or 791-3) that correspond to second identification information of the first party that is different from the first identification information), the computer system initiates (808) a process to perform a resource transfer (e.g., sending or receiving the resources) that includes transmitting user identification information for the first party (e.g., 615, 640, 730, 750, 778, and/or 790) with a second set of identification information (e.g., 615-2, 640-2, 730-2, 750-2, 778-2, and/or 790-2 that is different from the first set of identification information) that is based on the selected second set of user identification options for the first party of the resource transfer, without including the first identification information (e.g., the second set of identification information does not include the first identification information and/or is different from the first identification information). Transmitting user identification information for the first party with a first set of identification information that is based on the selected first set of user identification options for the first party of the resource transfer in accordance with a determination that the first set of one or more inputs corresponds to selection of the first set of user identification options for the first party of the resource transfer, and transmitting user identification information for the first party with the second set of identification information that is based on the selected second set of user identification options for the first party in accordance with a determination that the first set of one or more inputs corresponds to selection of the second set of user identification options, provides additional control options for selecting user identification information for the resource transfer without cluttering the user interface with additional displayed controls, and improves privacy and security for the transaction by allowing the user to determine what user identification information is included as part of the resource transfer process. In some embodiments, initiating the resource transfer that includes transmitting the user identification information for the first party without including the first set of identification information includes initiating the resource transfer with the user identification information for the first party having a second set of identification information that is different from the first set of identification information and is based on the selected second set of user identification options for the first party of the resource transfer. In some embodiments, in accordance with a determination that the selected second set of user identification options includes a third subset of options, the second set of identification information includes the third subset of options; and in accordance with a determination that the selected second set of user identification options includes a fourth subset of options, the second set of identification information includes the fourth subset of options.

In some embodiments, as a part of the resource transfer, the computer system (e.g., 600, 601, 700, and/or 701) transfers an amount of resources indicated by the resource transfer amount (e.g., 604, 630, 722, 754, 783, and/or 788-2) to a second party of the resource transfer and includes, with the resource transfer, the user identification information (e.g., 600, 601, 700, and/or 701) (e.g., having the first set of identification information (e.g., 615-2, 640-2, 730-2, 750-2, 778-2, and/or 790-2) or the second set of identification information (e.g., 615-2, 640-2, 730-2, 750-2, 778-2, and/or 790-2)) for the first party of the resource transfer. In some embodiments, as a part of the resource transfer, the computer system receives, from a second party of the resource transfer, an amount of resources indicated by the resource transfer amount and transmits, as a part of the resource transfer process, the user identification information (e.g., having the first set of identification information or the second set of identification information) for the first party of the resource transfer to the second party of the resource transfer. In some embodiments, the second party of the resource transfer is a user of a remote computer system.

In some embodiments, the resource transfer is a transfer of media items (e.g., 604 and/or 630) (e.g., digital photos and/or videos) between a first resource account associated with the computer system (e.g., 600 and/or 700, or 601 and/or 701) (e.g., a resource account of the first party of the resource transfer) and a second resource account associated with an external computer system (e.g., 601 and/or 701, or 600 and/or 700) (e.g., digital photos and/or videos are transferred from an account of the computer system to a different account of the external computer system, or digital photos and/or videos are transferred from the account of the external computer system to the account of the computer system). Transferring media items between the first resource account associated with the computer system and the second resource account associated with the external computer system improves how digital media items are managed and reduces user input to manually transfer media items between user accounts.

In some embodiments, the resource transfer is a transfer of funds (e.g., 722, 754, 783, and/or 788-2) (e.g., digital currency and/or account credit) between a first resource account associated with the computer system (e.g., 600 and/or 700, or 601 and/or 701) (e.g., a resource account of the first party of the resource transfer) and a second resource account associated with an external computer system (e.g., 601 and/or 701, or 600 and/or 700) (e.g., funds are transferred from an account of the computer system to a different account of the external computer system, or funds are transferred from the account of the external computer system to the account of the computer system). Transferring funds between the first resource account associated with the computer system and the second resource account associated with the external computer system improves how funds are managed and reduces user input to manually transfer funds between user accounts.

In some embodiments, the resource transfer is a process for transmitting resources to a second party (e.g., a recipient of the resources having a resource account associated with an external computer system (e.g., 601 and/or 701)) and as a part of displaying the resource transfer interface (e.g., 602, 720, and/or 782), the computer system (e.g., 600 and/or 700) displays (e.g., prior to receiving the first set of one or more inputs that includes a selection of one or more user identification options for the first party), via the one or more display generation components (e.g., 600*a* and/or 700*a*), a representation of the user identification information for the first party (e.g., 615, 730, and/or 778) having an initial set of sender identification information (e.g., 615-1, 730-1, and/or 778-1) (e.g., an initial set of identification information that is different from the first set of identification information and the second set of identification information). Displaying the representation of the user identification information for the first party having the initial set of sender identification information provides improved feedback about a state of the computer system when displaying the resource transfer interface (e.g., a state in which an initial set of sender identification information is currently selected to be included as part of the resource transfer). In some embodiments, the initial set of sender identification information is a default set of identification information or a previously selected set of identification information. In some embodiments, the first set of one or more inputs includes a selection of an option that is selectable to display a plurality of user identification options for the first party of the resource transfer. In some embodiments, the first set of one or more inputs is received while displaying the resource transfer interface including the representation of the user identification information for the first party having the initial set of sender identification information, and the first set of one or more inputs includes a selection (e.g., 605-1, 705-7, and/or 777-1) of the representation of the user identification information having the initial set of sender identification information (e.g., a selection of the currently selected identification information). In some embodiments, the sender can select the currently selected identification information to view options for changing the sender's identification information that is included as part of the resource transfer process. In response to detecting the selection of the representation of the user identification information having the initial set of sender identification information, the computer system displays, via the one or more display generation components, the user identification options (e.g., 616, 734, and/or 780) for the first party (e.g., a plurality of user identification options). Displaying the user identification options for the first party in response to detecting the selection of the representation of the user identification information having the initial set of sender identification information provides additional control options for changing the identification information of the sender of the resource transfer without cluttering the user interface with additional displayed controls. In some embodiments, the plurality of user identification options are selectable to change the initial set of sender identification information (e.g., to the first set of identification information or to the second set of identification information). In some embodiments, the plurality of user identification options include a first name, a last name, a first initial, a middle initial, a last initial, a profile picture, an avatar, or any combination thereof.

In some embodiments, the resource transfer is a process for receiving resources from a second party (e.g., a sender of the resources having a resource account associated with an external computer system) and, as part of the process for displaying the resource transfer interface (e.g., 621, 748, and/or 788), the computer system (e.g., 601 and/or 701) displays (e.g., prior to receiving the first set of one or more inputs that includes a selection of one or more user identification options for the first party), via the one or more display generation components (e.g., 601*a* and/or 701*a*), a representation of the user identification information for the first party (e.g., 640, 750, and/or 790) having an initial set of recipient identification information (e.g., 640-1, 750-1, and/or 790-1) (e.g., different from the first set of identification information and the second set of identification information). Displaying the representation of the user identification information for the first party having the initial set of recipient identification information provides improved feedback about a state of the computer system when displaying the resource transfer interface (e.g., a state in which an initial set of recipient identification information is currently selected to be included as part of the resource transfer). In some embodiments, the initial set of identification information is a default set of identification information or a previously selected set of identification information. In some embodiments, the recipient can select the currently selected identification information to view options for changing the recipient's identification information that is included as a part of the resource transfer process. In some embodiments, the first set of one or more inputs includes a selection of an option that is selectable to display a plurality of user identification options for the first party of the resource transfer. In some embodiments, the first set of one or more inputs is received while displaying the resource transfer interface including the representation of the user identification information for the first party having the initial set of recipient identification information, and the first set of one or more inputs includes a selection (e.g., 707-1 and/or 779-1) of the representation of the user identification information having the initial set of recipient identification information (e.g., a selection of the currently selected identification information). In response to detecting the selection of the representation of the user identification information having the initial set of recipient identification information, the computer system displays, via the one or more display generation components, the user identification options (e.g., 768 and/or 791) for the first party (e.g., a plurality of user identification options). Displaying the user identification options for the first party in response to detecting the selection of the representation of the user identification information having the initial set of recipient identification information provides additional control options for changing the identification information of the recipient of the resource transfer without cluttering the user interface with additional displayed controls. In some embodiments, the plurality of user identification options are selectable (and/or de-selectable) to change the initial set of recipient identification information (e.g., to the first set of identification information or to the second set of identification information). In some embodiments, the plurality of user identification options include a first name, a last name, a first initial, a middle initial, a last initial, a profile picture, an avatar, or any combination thereof.

In some embodiments, in accordance with a determination that a first set of criteria is satisfied, wherein the first set of criteria includes a placement criterion that is satisfied when the computer system has a respective placement relative to an external computer system (e.g., as depicted in FIG. 6D and/or FIG. 7H) (e.g., the computer system is or has been positioned at a respective location relative to the external computer system in order to satisfy criteria for performing the resource transfer), the computer system (e.g., 600, 601, 700, and/or 701) performs the resource transfer (e.g., accepting the transfer of resources or transferring the resources). In some embodiments, the resource transfer interface is displayed in response to detecting the placement criterion has been satisfied. In some embodiments, the placement criterion is satisfied after the resource transfer interface has been displayed or while the resource transfer interface is being displayed. In some embodiments, the placement criterion is satisfied when a region of the computer system having respective circuitry (e.g., an NFC circuitry) has been positioned near (e.g., within wireless communication range such as near-field wireless communication range and/or being placed within a respective distance of) corresponding circuitry of an external computer system (e.g., NFC circuitry of the external computer system). In some embodiments, the first set of criteria includes a criterion that is satisfied when a recipient of the resource transfer has accepted a request to receive the resources. In some embodiments, when performing the resource transfer, the computer system performs (e.g., conditionally performs) the following steps. In accordance with a determination that the first set of user identification options (e.g., one or more user identification options (e.g., 616-1, 616-2, 616-3, 734-1, 734-2, 734-3, 768-1, 768-2, 768-3, 780-1, 780-2, 780-3, 791-1, 791-2, and/or 791-3)) have been selected for the first party of the resource transfer, the computer system performs the resource transfer and transmits the user identification information for the first party (e.g., 615, 640, 730, 750, 778, and/or 790) with the first set of identification information (e.g., 615-2, 640-2, 730-2, 750-2, 778-2, and/or 790-2) that is based on the selected first set of user identification options and includes the first identification information. In accordance with a determination that the second set of user identification options (e.g., one or more user identification options (e.g., 616-1, 616-2, 616-3, 734-1, 734-2, 734-3, 768-1, 768-2, 768-3, 780-1, 780-2, 780-3, 791-1, 791-2, and/or 791-3) different from the first set of user identification options) have been selected for the first party of the resource transfer, the computer system performs the resource transfer and transmits the user identification information for the first party (e.g., 615, 640, 730, 750, 778, and/or 790) with the second set of identification information (e.g., 615-2, 640-2, 730-2, 750-2, 778-2, and/or 790-2 that is different from the first set of identification information) that is based on the selected second set of user identification options and does not include the first identification information. Performing the resource transfer and transmitting the user identification information for the first party with the first set of identification information or the second set of identification information when the first set of criteria is satisfied, including the placement criterion, performs an operation when a set of conditions has been met without requiring further user input. In some embodiments, in response to determining that the computer system has been placed relative to the device of a second party of the resource transfer (e.g., and in some embodiments, in response to detecting other criteria has been met such as accepting a request to receive the resource transfer or determining that the external computer system has accepted or has been previously authorized to accept a request to receive the resource transfer), the computer system performs the resource transfer (e.g., accepts the receipt of resources or transfers the resources) and transmits the user-specified user information (e.g., the first or second set of identification information). In some embodiments, the computer system transmits the user-specified user information while transferring the resources to an account of an external computer system. In some embodiments, the computer system transmits the user-specified user information when accepting a request (e.g., from an account of the external computer system) to receive resources. In some embodiments, as a part of performing the resource transfer, the computer system accepts a transfer of resources (e.g., from a sender associated with a user account of an external computer system). As a part of the process for accepting the transfer of resources (e.g., after accepting the transfer of resources, while receiving the resources, and/or after indicating the computer system is ready and/or approved to receive the resources), the computer system displays, via the one or more display generation components (e.g., 600*a*, 601*a*, 700*a*, and/or 701*a*), a representation of accepted transfer details including a resource transfer amount (e.g., 630, 754, and/or 788-2) and user identification information (e.g., 634 and/or 758) for a sender of the resources (e.g., sender-specified identification information). Displaying a representation of accepted transfer details including the resource transfer amount and user identification information for the sender of the resources provides feedback about a state of the computer system (e.g., a state in which resources were received) and feedback about a transaction performed using the computer system. In some embodiments, when the computer system receives the resources of the resource transfer, the computer system displays the transaction amount and sender-specified personal information. In some embodiments, the representation of accepted transfer details includes a note or message (e.g., 632, 756, and/or 788-3) from the sender of the resources.

In some embodiments, performing the resource transfer includes accepting a transfer of resources (e.g., 630, 754, and/or 788-2) (e.g., from a sender associated with a user account of an external computer system). After determining that the placement criterion is satisfied, and prior to performing the resource transfer, the computer system (e.g., 600, 601, 700, and/or 701) displays, via the one or more display generation components (e.g., 600*a*, 601*a*, 700*a*, and/or 701*a*): a first element (e.g., 638, 760, and/or 788-1) that is selectable to accept (e.g., approve) a request (e.g., from the sender of the resources) to perform the resource transfer (e.g., a request for the computer system to receive the resource transfer); and a second element (e.g., 636 and/or 759) that is selectable to decline (e.g., deny) a request to perform the resource transfer. Displaying a first element for accepting a request to perform the resource transfer and a second element for declining the request to perform the resource transfer provides improved security by enabling a user of the computer system to manually accept or decline a request to receive resources. In some embodiments, in response to detecting a selection of the first element, the computer system transmits (e.g., to the sender) user-specified identification information for the recipient and performs the resource transfer by accepting the transfer of the resources from the sender. In some embodiments, accepting the transfer of the resources from the sender includes indicating that the computer system is ready and/or approved to receive the resources. In some embodiments, in response to detecting a selection of the second element, the computer system forgoes performing the resource transfer (and transmitting user-specified identification information for the recipient). In some embodiments, the computer system displays options to manually accept or decline the resource transfer if respective criteria are not satisfied. For example, in some embodiments, the respective criteria are satisfied if the parties of the resource transfer (e.g., the sender and the recipient) are known to each other (e.g., listed as contacts in each other's respective computer systems) and have previously performed one or more transactions with each other. In some embodiments, if the respective criteria are satisfied, the computer system automatically accepts the resource transfer without displaying the options to manually accept or decline the resource transfer. In some embodiments, performing the resource transfer includes transferring resources (e.g., from a user account associated with the computer system) to an external computer system (e.g., a recipient associated with a user account of an external computer system). As a part of the process for transferring the resources (e.g., after transferring the resources, while transferring the resources, and/or after the recipient of the resource transfer has accepted a request to receive the resources), the computer system displays, via the one or more display generation components, a representation of accepted transfer details including a resource transfer amount (e.g., 626, 744, 770, 774, and/or 792-1) and user identification information for a recipient of the resources (e.g., 744-1, 774, and/or 792-1) (e.g., recipient-specified identification information). Displaying a representation of accepted transfer details including the resource transfer amount and user identification information for the recipient of the resources provides feedback confirming the resource transfer was accepted. In some embodiments, when the computer system transfers the resources, the computer system displays the transaction amount and recipient-specified personal information (e.g., name information and, optionally, a photo). In some embodiments, the representation of accepted transfer details includes a note or message from the recipient of the resources.

In some embodiments, performing the resource transfer includes: while the resource transfer process is in progress (e.g., pending and/or incomplete) (e.g., the computer system is in the process of transferring the memory allocation, data, photos, a balance, and/or funds) (e.g., the computer system is waiting for the external computer system to accept a request to transfer resources), the computer system (e.g., 600, 601, 700, and/or 701) receives, via the one or more input devices (e.g., 600*a*, 600*c*, 601*a*, 601*c*, 700*a*, 700*c*, 701*a*, and/or 701*c*), data indicating a status of the resource transfer process. In response to receiving the data indicating a status of the resource transfer process, the computer system displays (e.g., concurrently displays), via the one or more display generation components (e.g., 600*a*, 601*a*, 700*a*, and/or 701*a*), a representation of the status of the resource transfer process (e.g., 626, 744, 764, 766, 770, and/or 792-1) and a representation of the resource transfer amount (e.g., 626, 744, 770, and/or 792-1). Displaying the representation of the status of the resource transfer process and the representation of the resource transfer amount in response to receiving the data indicating the status of the resource transfer process provides feedback about a state of the computer system and the resource transfer process. In some embodiments, in accordance with a determination that the data indicates the status of the resource transfer process is a first status state (e.g., in progress), the computer system displays the representation of the status of the resource transfer process indicating the first status state; and in accordance with a determination that the data indicates the status of the resource transfer process is a second status state different from the first status state (e.g., transmitting, completed, failed), the computer system displays the representation of the status of the resource transfer process indicating the second status state.

In some embodiments, prior to receiving the first set of one or more inputs that includes a selection (e.g., 605-2, 705-8, 707-2, 777-2, 779-2, and/or 779-3) of one or more user identification options (e.g., 616-1, 616-2, 616-3, 734-1, 734-2, 734-3, 768-1, 768-2, 768-3, 780-1, 780-2, 780-3, 791-1, 791-2, and/or 791-3) for the first party, the computer system (e.g., 600, 601, 700, and/or 701) performs (e.g., conditionally performs) the following steps. In accordance with a determination that account relationship criteria are satisfied between a first account for receiving the resource transfer (e.g., the first resource account) and a second account for sending the resource transfer (e.g., the second resource account), the computer system performs the resource transfer (e.g., automatically processing the resource transfer) without prompting the first account (or second account) to approve the resource transfer (e.g., without displaying elements 636, 638, 759, 760, and/or 788-1). Performing the resource transfer without prompting the first account to approve the resource transfer when the account relationship criteria are satisfied between the first account and the second account performs an operation when a set of conditions has been met without requiring further user input. In some embodiments, the account relationship criteria include a first account relationship criterion that is satisfied when the first account and the second account are known to each other (e.g., the first account is a contact in a list of contacts for the second account and the second account is a contact in a list of contacts for the first account). In some embodiments, the account relationship criteria include a second account relationship criterion that is satisfied when the first account and the second account have previously interacted (e.g., have previously performed a resource transfer with each other or have previously interacted in another way such as having a video call or sharing data with each other). In some embodiments, performing the resource transfer without prompting the first account to approve the resource transfer includes performing the resource transfer and transmitting user identification information for the first party without displaying the one or more user identification options (e.g., 640, 750, 768, 790, and/or 791) for the first party for selection (e.g., for changing the user identification information). Performing the resource transfer and transmitting user identification information for the first party without displaying the one or more user identification options for the first party for selection reduces the number of inputs needed to perform an operation by forgoing the selection of user identification information (e.g., because the users have satisfied account relationship criteria and, presumably, are therefore well enough acquainted that the option to customize the user identification information is less desirable). In some embodiments, if the automatic acceptance of the resource transfer is enabled, the computer system processes the resource transfer without displaying options to change personal information included with the resource transfer.

Note that details of the processes described above with respect to method 800 (e.g., FIG. 8) are also applicable in an analogous manner to the methods described below. For example, methods 900, 1200, 1400, and/or 1600 optionally include one or more of the characteristics of the various methods described above with reference to method 700. For example, techniques as described with reference to method 800 for customizing personal information to be shared for resource transfers can be included when making a resource transfer as described in other embodiments. For brevity, these details are not repeated below.

FIG. 9 is a flow diagram illustrating a method for providing visual feedback for instructing a resource transfer process, in accordance with some embodiments. Method 900 is performed at a computer system (e.g., 100, 300, 500, 600, 601, 700, and/or 701) (e.g., a smartphone, a wearable device (e.g., a smartwatch), a tablet computer, a desktop computer, a laptop computer, and/or a head-mounted device (e.g., a head-mounted augmented reality and/or extended reality device)) that is in communication with (e.g., includes and/or is connected to) one or more display generation components (e.g., 112, 340, 504, 600*a*, 601*a*, 700*a*, and/or 701*a*) (e.g., a display controller, a touch-sensitive display system, a display screen, a monitor, a projector, a holographic display, and/or a head-mounted display system) and one or more input devices (e.g., 112, 350, 355, 508, 522, 600*a*, 600*c*, 600*d*, 601*a*, 601*c*, 601*d*, 700*a*, 700*b*, 700*c*, 701*a*, 701*b*, and/or 701*c*) (e.g., a touch-sensitive surface, a keyboard, mouse, trackpad, one or more optical sensors for detecting a QR code, barcode, a gaze, and/or gestures, one or more capacitive sensors for detecting hover inputs, a microphone, and/or accelerometer/gyroscope/inertial measurement units), wherein the one or more input devices includes a first component (e.g., 600*c*, 601*c*, 700*c*, and/or 701*c*) (e.g., RF circuitry (e.g., 108) and/or a near-field communication (NFC) reader) that is located at a first region (600*e*, 601*e*, 700*d*, and/or 701*d*) of the computer system (e.g., an end surface of the computer system and/or a side surface of the computer system). Some operations in method 900 are, optionally, combined, the orders of some operations are, optionally, changed, and some operations are, optionally, omitted.

As described below, method 900 provides an intuitive way for providing visual feedback for instructing a resource transfer process. The method reduces the cognitive burden on a user for providing visual feedback for instructing a resource transfer process, thereby creating a more efficient human-machine interface. For battery-operated computing devices, enabling a user to provide visual feedback for instructing a resource transfer process faster and more efficiently conserves power and increases the time between battery charges.

At method 900, the computer system (e.g., 600, 601, 700, and/or 701) receives (902), via the one or more input devices (e.g., 600*a*, 600*c*, 600*d*, 601*a*, 601*c*, 601*d*, 700*a*, 700*b*, 700*c*, 701*a*, 701*b*, and/or 701*c*), one or more inputs (e.g., 705-1, 705-2, 705-3, 705-4, 705-5, 705-6, and/or a positioning of respective devices near each other) corresponding to a request to initiate a process for performing a resource transfer (e.g., a transfer of memory allocation, data, photos, a balance, and/or funds) between a first resource account (e.g., an allocated memory account, a data storage account, a digital library, a digital wallet, and/or a bank account) associated with the computer system (e.g., 600 and/or 700, or 601 and/or 701) and a second resource account (e.g., an allocated memory account, a data storage account, a digital library, a digital wallet, and/or a bank account) associated with an external computer system (e.g., 601 and/or 701, or 600 and/or 700) (e.g., the computer system is logged into a service using a first account, and the external computer system is logged into the same service using a second account).

In response to receiving the one or more inputs corresponding to the request to initiate the process for performing the resource transfer, the computer system (e.g., 600, 601, 700, and/or 701) displays (904), via the one or more display generation components (e.g., 600*a*, 601*a*, 700*a*, and/or 701*a*), a resource transfer interface (e.g., 602, 621, 720, 748, 782, and/or 788) (e.g., a memory transfer interface, a data transfer interface, a photo transfer interface, a balance transfer interface, and/or a funds transfer interface) that is associated with a process for (e.g., the resource transfer interface includes instructions and/or visual cues for) positioning the first component of the computer system (e.g., 600*c*, 601*c*, 700*c*, and/or 701*c*) to initiate the resource transfer between the first resource account associated with the computer system and the second resource account associated with the external computer system. As a part of displaying the resource transfer interface, the computer system performs (e.g., conditionally performs) the following steps. In accordance with a determination (906) that the computer system is initiating a resource transfer from the first resource account to the second resource account (e.g., the computer system is transferring the memory allocation, data, photos, a balance, and/or funds) (e.g., the external computer system is receiving the memory allocation, data, photos, a balance, and/or funds), the computer system displays (908), via the one or more display generation components, a representation of a resource transfer amount (e.g., 604, 630, 722, 754, 783, and/or 796) (e.g., a first representation of a resource transfer amount) (e.g., an amount or number of allocated memory, data, photos, a balance, and/or funds to be transferred); and displays (910), via the one or more display generation components, a first visual effect (e.g., a particle animation (e.g., 612, 622, 724, 752, 784, and/or 798) and/or a glowing visual effect (e.g., 610, 620, 726, and/or 740)) that includes animated movement of particles (e.g., 612, 622, 724, 752, 784, and/or 798) from the representation of the resource transfer amount towards (e.g., in a direction closer to) the first region (e.g., 600*e*, 601*e*, 700*d*, and/or 701*d*) of the computer system (e.g., a location on the one or more display generation components that is near (e.g., proximate and/or adjacent) the first region of the computer system) (e.g., the animated visual effect provides feedback indicating that a resource transfer can be initiated and/or has been initiated using the first component computer system). Displaying the first visual effect that includes animated movement of particles from the representation of the resource transfer amount towards the first region of the computer system provides feedback indicating instructions for positioning the first component of the computer system to initiate the resource transfer between the first resource account and the second resource account, wherein the resource transfer includes transmitting the resources. In some embodiments, the first visual effect includes particles that are displayed moving towards a region of the display (e.g., a top region of the display and/or a side region of the display) that is located near the first region (e.g., 600*e*, 601*e*, 700*d*, and/or 701*d*) of the computer system having the first component (e.g., 600*c*, 601*c*, 700*c*, and/or 701*c*) (e.g., an NFC reader and/or other components used to detect proximity to an external device) used to initiate the resource transfer (thereby providing feedback to a user of the computer system that the first component of the computer system can be used to initiate the resource transfer). In some embodiments, the first visual effect includes a glowing visual effect (e.g., 610, 620, 726, and/or 740) that is displayed at a region on the display (e.g., a top region of the display and/or a side region of the display) that is located near the first region of the computer system having the first component used for initiating the resource transfer (thereby providing feedback to a user of the computer system that the first component of the computer system can be used to initiate the resource transfer). In some embodiments, the first visual effect is visually associated with the displayed resource transfer amount. For example, the first animated visual effect includes an animation that gives an appearance of the resource transfer amount disintegrating into particles and moving towards the first region of the computer system.

In some embodiments, the resource transfer is a transfer of media items (e.g., 604 and/or 630) (e.g., digital photos and/or videos) between the first resource account associated with the computer system (e.g., 600 and/or 700, or 601 and/or 701) and the second resource account associated with the external computer system (e.g., 601 and/or 701, or 600 and/or 700) (e.g., digital photos and/or videos are transferred from an account of the computer system to a different account of the external computer system, or digital photos and/or videos are transferred from the account of the external computer system to the account of the computer system). Transferring media items between the first resource account associated with the computer system and the second resource account associated with the external computer system improves how digital media items are managed and reduces user input to manually transfer media items between user accounts.

In some embodiments, the resource transfer is a transfer of funds (e.g., 722, 754, 783, and/or 788-2) (e.g., digital currency and/or account credit) between the first resource account associated with the computer system (e.g., 600 and/or 700, or 601 and/or 701) and the second resource account associated with the external computer system (e.g., 601 and/or 701, or 600 and/or 700) (e.g., funds are transferred from an account of the computer system to a different account of the external computer system, or funds are transferred from the account of the external computer system to the account of the computer system). Transferring funds between the first resource account associated with the computer system and the second resource account associated with the external computer system improves how funds are managed and reduces user input to manually transfer funds between user accounts.

In some embodiments, the first visual effect includes a first set of visual characteristics (e.g., a displayed appearance and location) (e.g., a glowing effect (e.g., 610, 620, 726, and/or 740) displayed at a region (e.g., 600*e*, 601*e*, 700*c*, and/or 701*c*) of the display that is near the first component (e.g., 600*c*, 601*c*, 700*c*, and/or 701*c*)) that are indicative of an action for positioning the first component of the computer system (e.g., 600, 601, 700, and/or 701) relative to the external computer system (e.g., relative to a corresponding component of the external computer system) to initiate the resource transfer between the first resource account and the second resource account. In some embodiments, the first visual effect includes a glowing effect that is displayed at a location on the display screen that is near components of the computer system that are used to initiate the resource transfer. Displaying the first visual effect with the first set of visual characteristics that are indicative of an action for positioning the first component of the computer system relative to the external computer system to initiate the resource transfer between the first resource account and the second resource account provides feedback indicating instructions for using the computer system with the external computer system for initiating the resource transfer.

In some embodiments, as a part of displaying the resource transfer interface (e.g., 602, 621, 720, 748, 782, and/or 788), the computer system (e.g., 600, 601, 700, and/or 701) performs (e.g., conditionally performs) the following steps. In accordance with a determination that the computer system is initiating a resource transfer from the second resource account to the first resource account (e.g., the computer system (e.g., 601 and/or 701) is receiving the memory allocation, data, photos, a balance, and/or funds) (e.g., the external computer system (e.g., 600 and/or 700) is transferring the memory allocation, data, photos, a balance, and/or funds), the computer system displays, via the one or more display generation components (e.g., 601*a* and/or 701*a*), a second representation of the resource transfer amount (e.g., 630, 754, and/or 796); and displays, via the one or more display generation components, a second visual effect (e.g., a particle animation (e.g., 622, 752, and/or 798) and/or a glowing visual effect (e.g., 620 and/740)) that includes animated movement of particles from a location on the one or more display generation components that is near (e.g., proximate and/or adjacent) the first region (e.g., 601*e* and/or 701*d*) of the computer system (e.g., 601 and/or 701) towards (e.g., in a direction closer to) the second representation of the resource transfer amount. Displaying the second visual effect that includes animated movement of particles from the location on the one or more display generation components that is near the first region of the computer system towards the second representation of the resource transfer amount provides feedback indicating instructions for positioning the first component of the computer system to initiate the resource transfer between the first resource account and the second resource account, wherein the resource transfer includes receiving the resources. In some embodiments, the second representation of the resource transfer amount is different from the first representation of the resource transfer amount. In some embodiments, the second representation of the resource transfer amount is the same as the first representation of the resource transfer amount. In some embodiments, the second visual effect is a reverse animation of the first visual effect. For example, the first visual effect depicts a representation of the transfer amount disintegrating into particles, whereas the second visual effect depicts the particles coming together to form the representation of the transfer amount. In some embodiments, the second visual effect includes particles that are displayed moving from a region of the display (e.g., a top region of the display and/or a side region of the display) that is located near the first region (e.g., 601*e* and/or 701*d*) of the computer system having the first component (e.g., an NFC reader and/or other components used to detect proximity to an external device) used to initiate the resource transfer (thereby providing feedback to a user of the computer system that the first component of the computer system can be used to initiate the resource transfer). In some embodiments, the second visual effect includes a glowing visual effect that is displayed at a region on the display (e.g., a top region of the display and/or a side region of the display) that is located near the first region of the computer system having the first component used for initiating the resource transfer (thereby providing feedback to a user of the computer system that the first component of the computer system can be used to initiate the resource transfer). In some embodiments, the second visual effect is visually associated with a representation of a resource transfer amount. For example, the second visual effect includes an animation that gives an appearance of particles coming together to form or "build" a representation of the resource transfer amount.

In some embodiments, as a part of displaying the resource transfer interface (e.g., 602, 621, 720, 748, 782, and/or 788), the computer system (e.g., 700 and/or 701) performs (e.g., conditionally performs) the following steps. In accordance with a determination that the computer system is a first type of computer system (e.g., 700 and/or 701) (e.g., a wearable device and/or a smartwatch) (and, in some embodiments, in accordance with a determination that the computer system is initiating a resource transfer from the first resource account to the second resource account resource), the computer system displays, via the one or more display generation components (e.g., 700*a* and/or 701*a*), an animation (e.g., 786) that depicts a representation of a first computer system (e.g., 786-1) (e.g., the computer system or a generic computer system) interacting with a representation of a second computer system (e.g., 786-2) (e.g., the external computer system or a different generic computer system) (e.g., an animation instructing the user of the computer system how to position the computer system relative to the external computer system to initiate the resource transfer). Displaying the animation that depicts a representation of the first computer system interacting with a representation of a second computer system provides improved feedback for positioning the computer system relative to the external computer system to initiate the resource transfer.

In some embodiments, as a part of displaying the resource transfer interface (e.g., 602, 621, 720, 748, 782, and/or 788), the computer system (e.g., 600, 601, 700, and/or 701) performs (e.g., conditionally performs) the following steps. In accordance with a determination that the resource transfer is in progress (e.g., pending and/or incomplete) (e.g., the computer system is in the process of transferring the memory allocation, data, photos, a balance, and/or funds) (e.g., the computer system is waiting for the external computer system to accept a request to transfer resources), the computer system displays, via the one or more display generation components (e.g., 600*a*, 601*a*, 700*a*, and/or 701*a*), a waiting animation effect (e.g., 624, 626, 742, 744, 766, 772, 792, 792-1, 794, and/or 794-1) (e.g., an animation indicating that the computer system is waiting for the resource transfer to be completed, accepted, and/or initiated). In some embodiments, the computer system displays a status of the resource transfer process while displaying the waiting animation effect. In accordance with a determination that the resource transfer is not in progress (e.g., the resource transfer has been completed or accepted), the computer system ceases display of the waiting animation effect. Displaying a waiting animation effect when the resource transfer is in progress, and ceasing display of the waiting animation effect when the resource transfer is not in progress, provides improved feedback about a state of the computer system and the resource transfer.

In some embodiments, the computer system (e.g., 700 and/or 701) (e.g., a wearable device and/or a smartwatch) is associated with (e.g., paired with and/or shares a user account with) a second type of computer system (e.g., 600 and/or 601) (e.g., a non-wearable device, a smartphone, and/or a tablet computer). In some embodiments, as a part of displaying the resource transfer interface (e.g., 602, 621, 720, 748, 782, and/or 788), the computer system performs (e.g., conditionally performs) the following steps. In accordance with a determination that the first resource account is not authorized to accept the resource transfer (e.g., the first resource account is not setup and/or authorized to receive funds) (and, in some embodiments, in accordance with a determination that the resource transfer has been initiated), the computer system displays, via the one or more display generation components (e.g., 700*a* and/or 701*a*), a prompt (e.g., 797) to authorize the first resource account using the second type of computer system (e.g., 600 and/or 601) (e.g., a prompt instructing the user to complete setup of the first resource account using a phone or tablet). Displaying the prompt to authorize the first resource account using the second type of computer system when the first resource account is not authorized to accept the resource transfer provides improved feedback about a state of the first resource account and provides instructions for authorizing the account (e.g., to complete the resource transfer). In some embodiments, in accordance with a determination that the resource transfer has been initiated and the first resource account is not authorized to accept the resource transfer, the second type of computer system displays an indication (e.g., 799) of the resource transfer (e.g., a notification that the resource transfer has been received) and a prompt to authorize the first resource account to accept the resource transfer (e.g., a prompt instructing the user to complete setup of the first resource account (e.g., using the phone or tablet) in order to process or accept the transfer of resources). Displaying, at the second type of computer system, an indication of the resource transfer and a prompt to authorize the first resource account to accept the resource transfer provides improved feedback about a state of the first resource account and provides instructions for completing the resource transfer.

Note that details of the processes described above with respect to method 900 (e.g., FIG. 9) are also applicable in an analogous manner to the methods described above and/or below. For example, methods 700, 1200, 1400, and/or 1600 optionally include one or more of the characteristics of the various methods described above with reference to method 900. For example, animations that provide instruction for performing a resource transfer as described with respect to method 900 can be included when making a resource transfer as described in other embodiments. For brevity, these details are not repeated below.

Figure 10A:
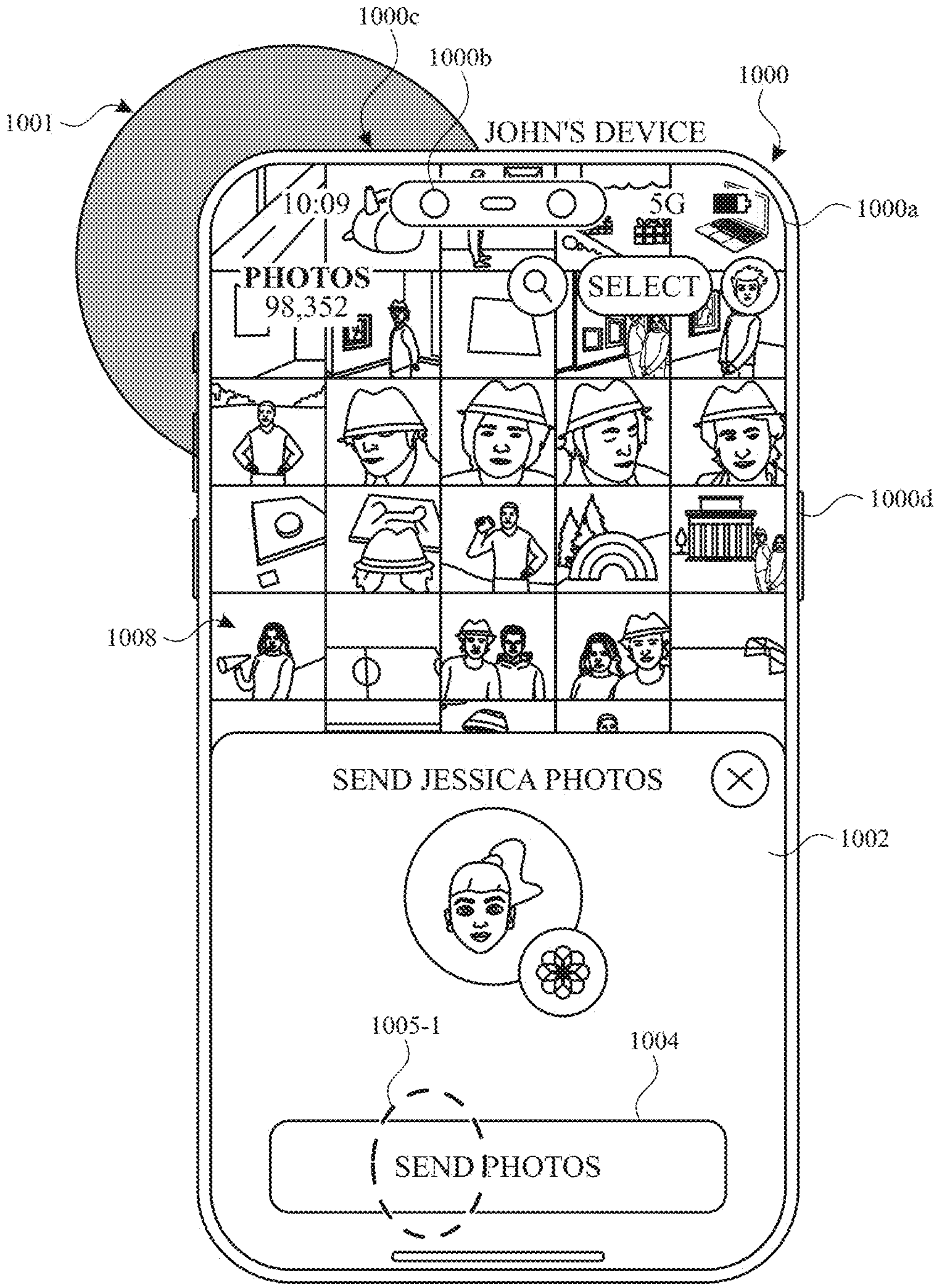
FIGS. 10A-10B illustrate exemplary user interfaces for performing a resource transfer process, in accordance with some embodiments.
Figure 10B:
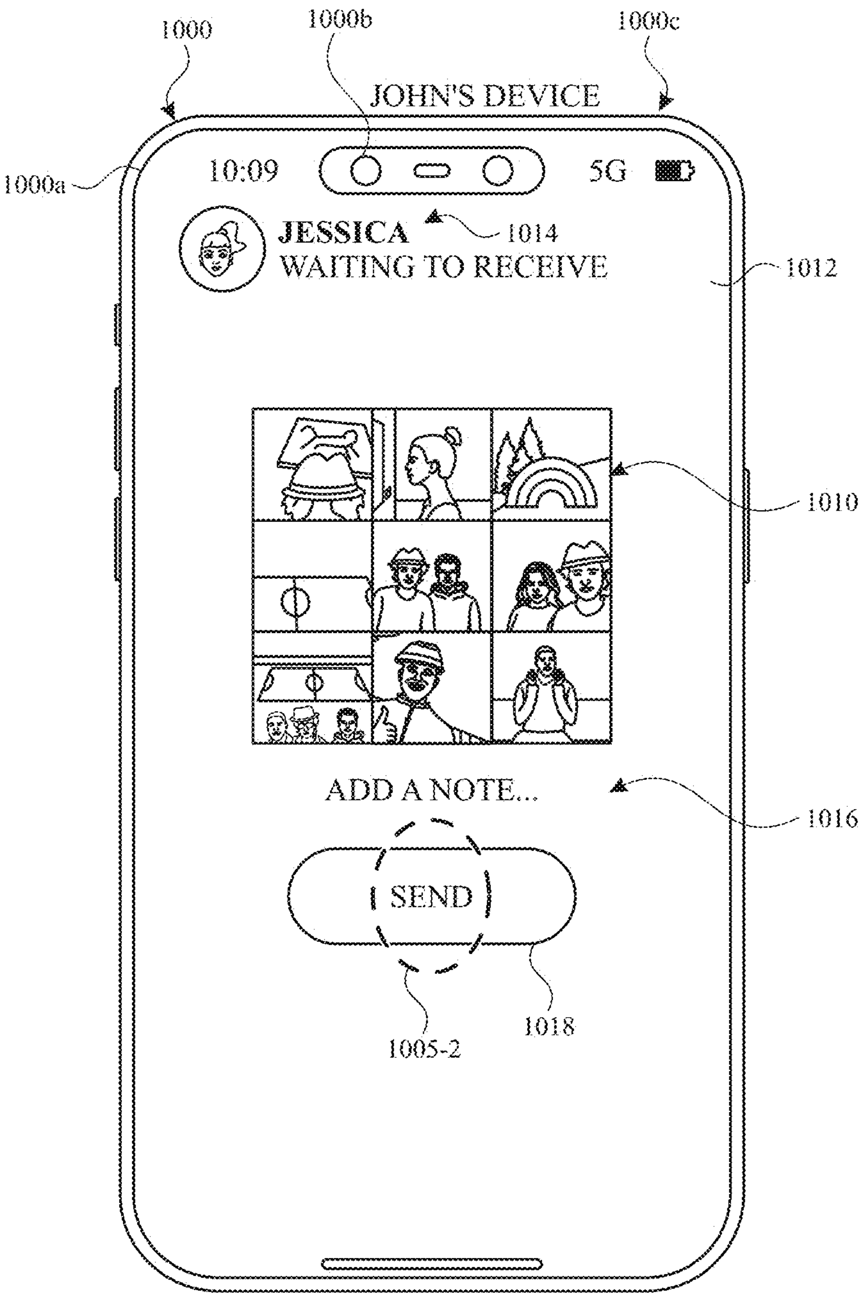
Figure 11A:
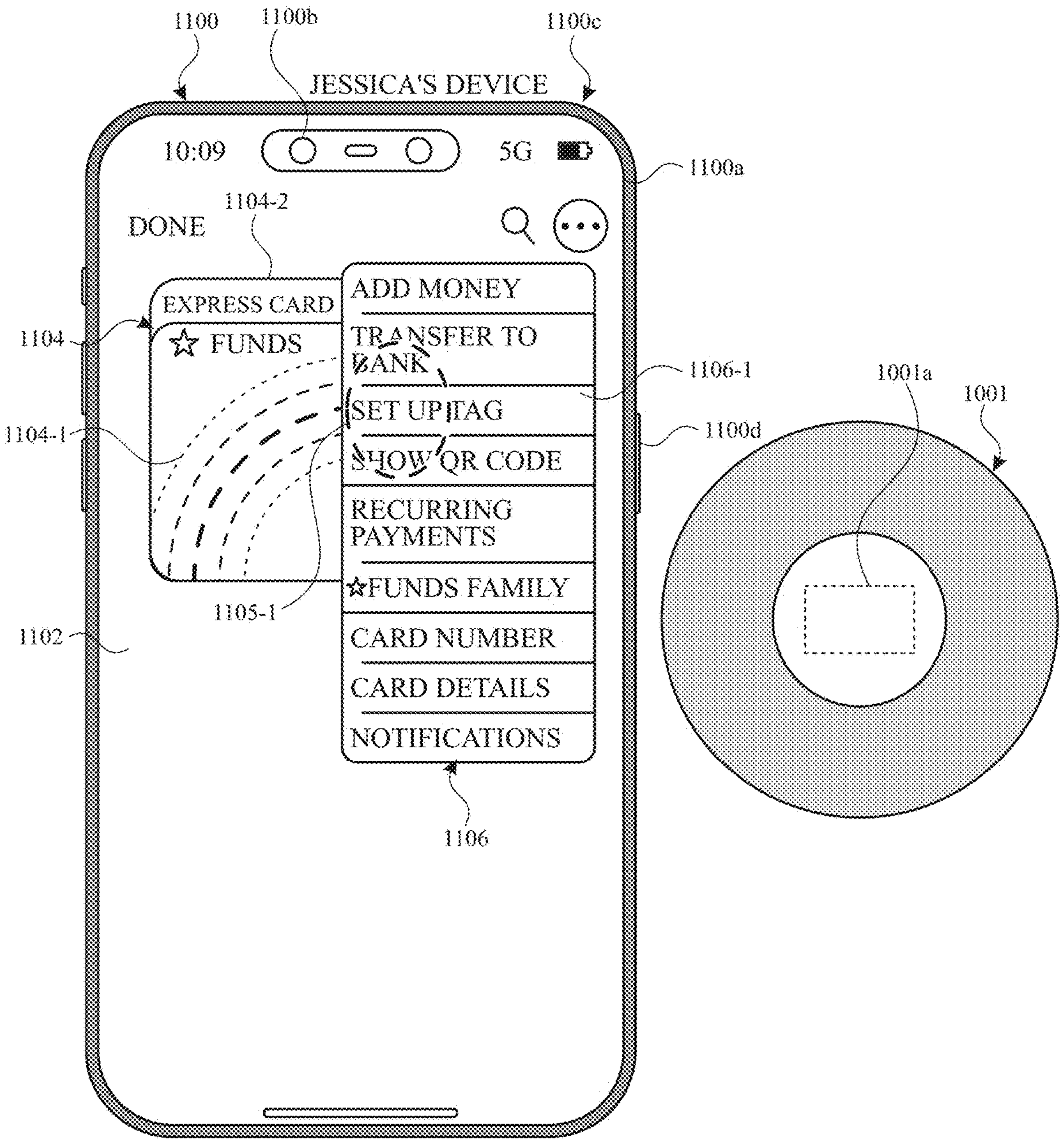
FIGS. 11A-11N illustrate exemplary user interfaces for performing a resource transfer process, in accordance with some embodiments.
Figure 11B:
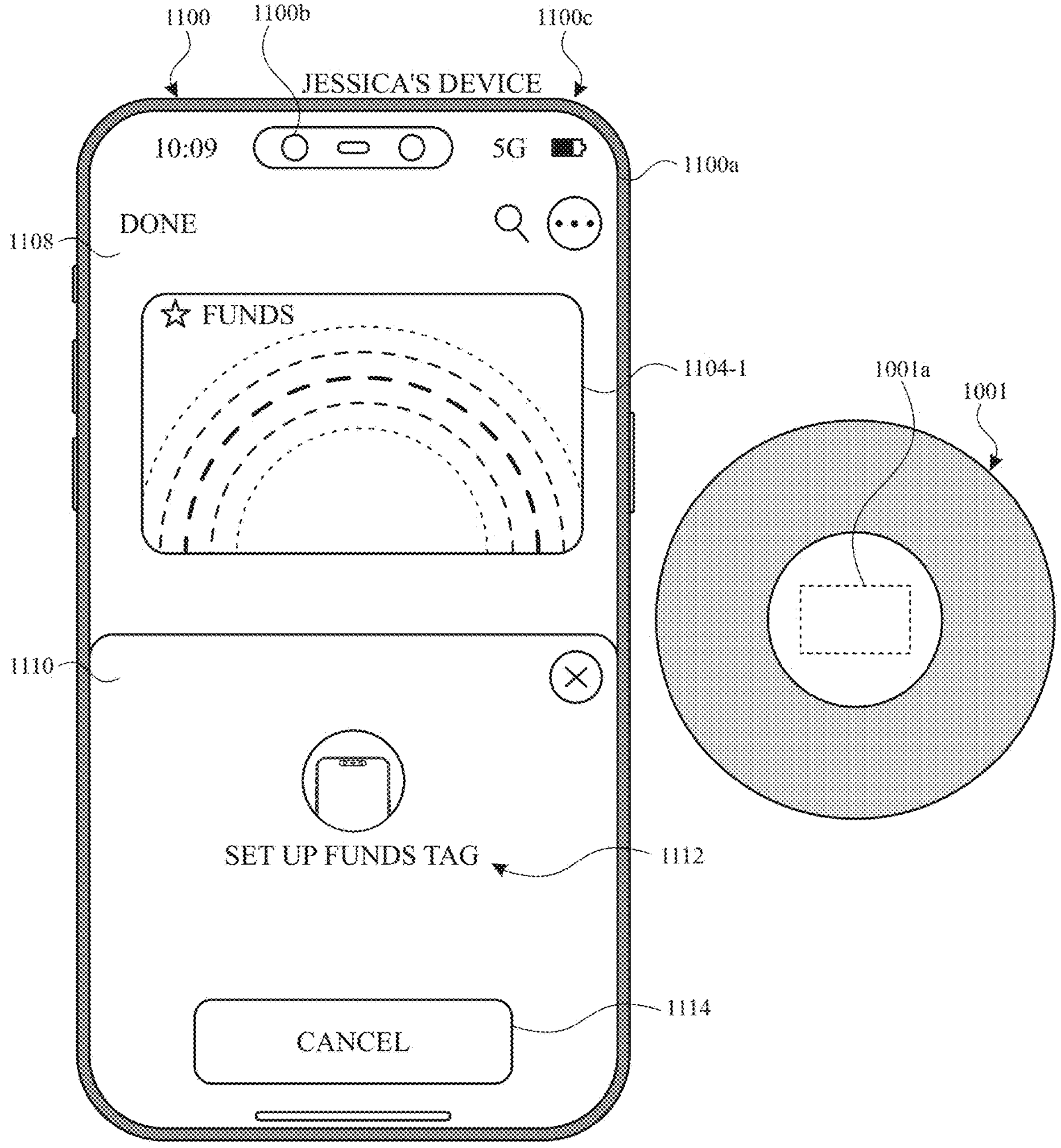
Figure 11C:
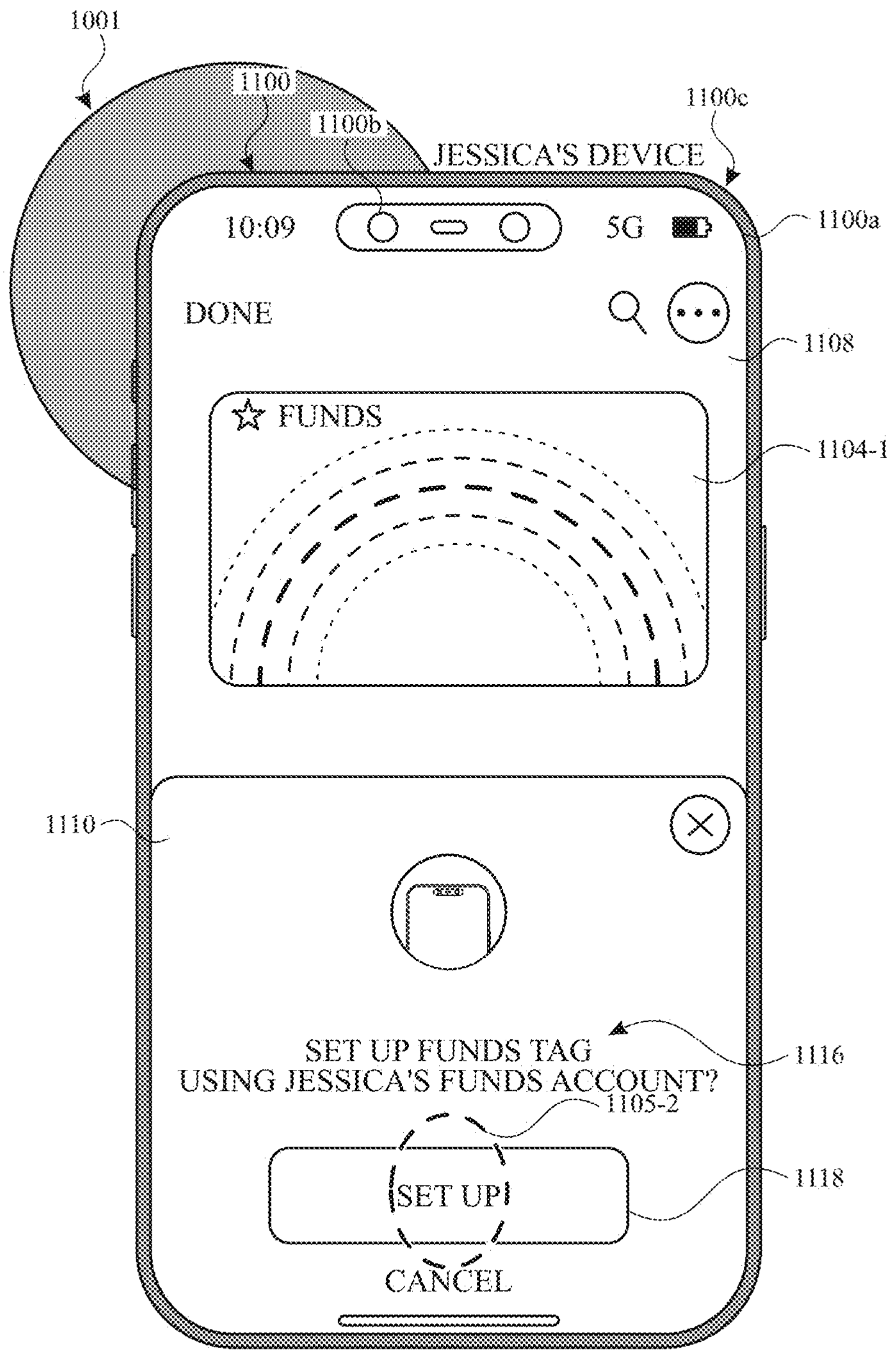
Figure 11D:
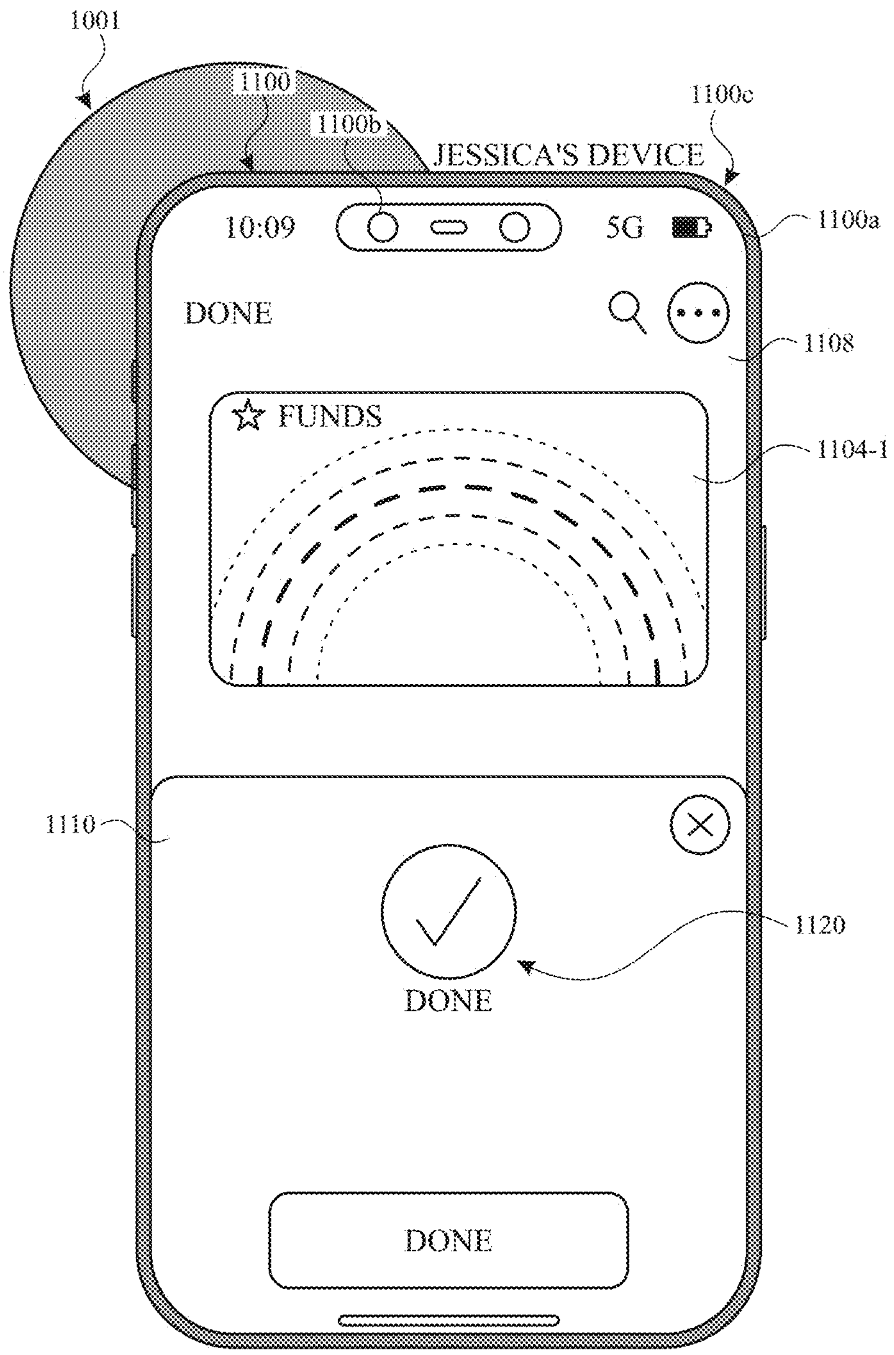
Figure 11E:
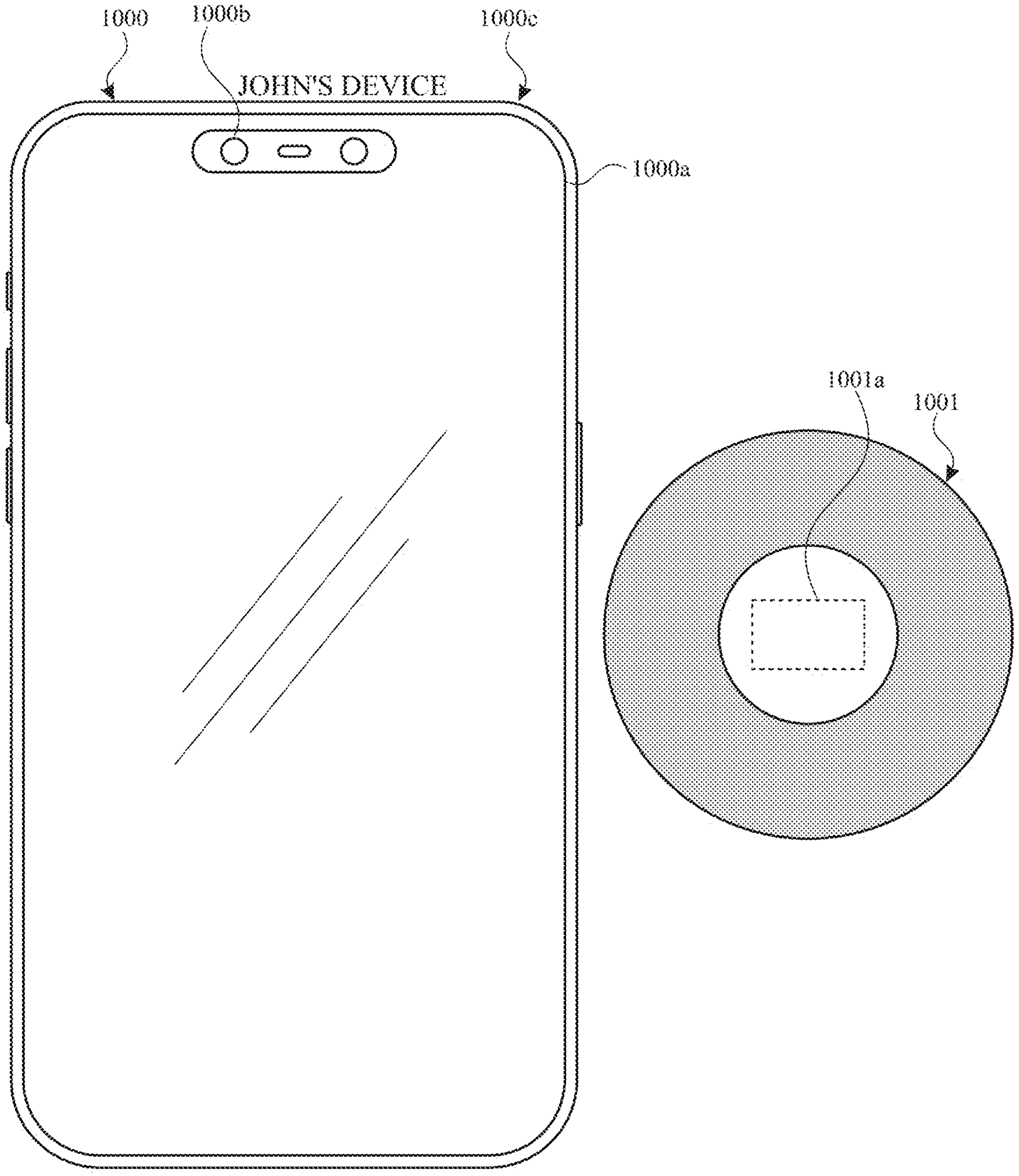
Figure 11F:
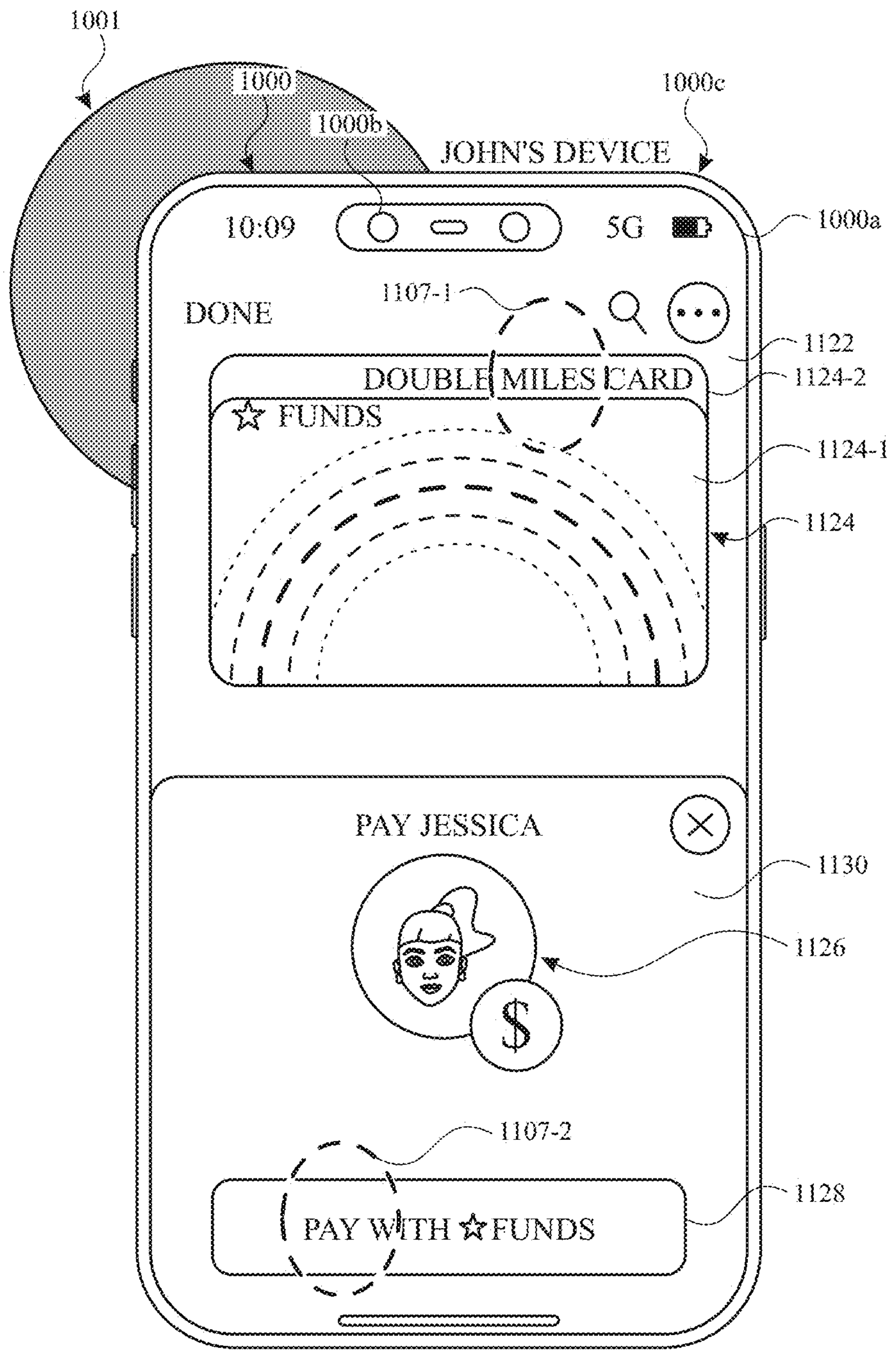
Figure 11H:
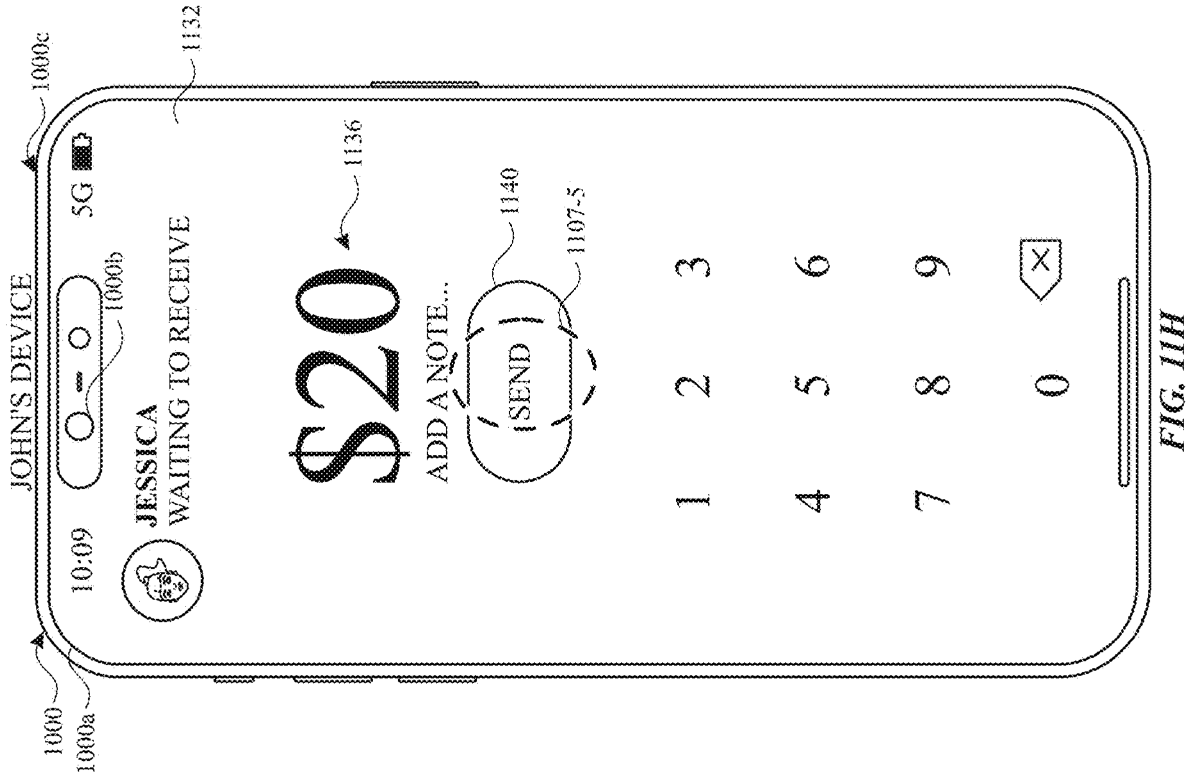
Figure 11G:
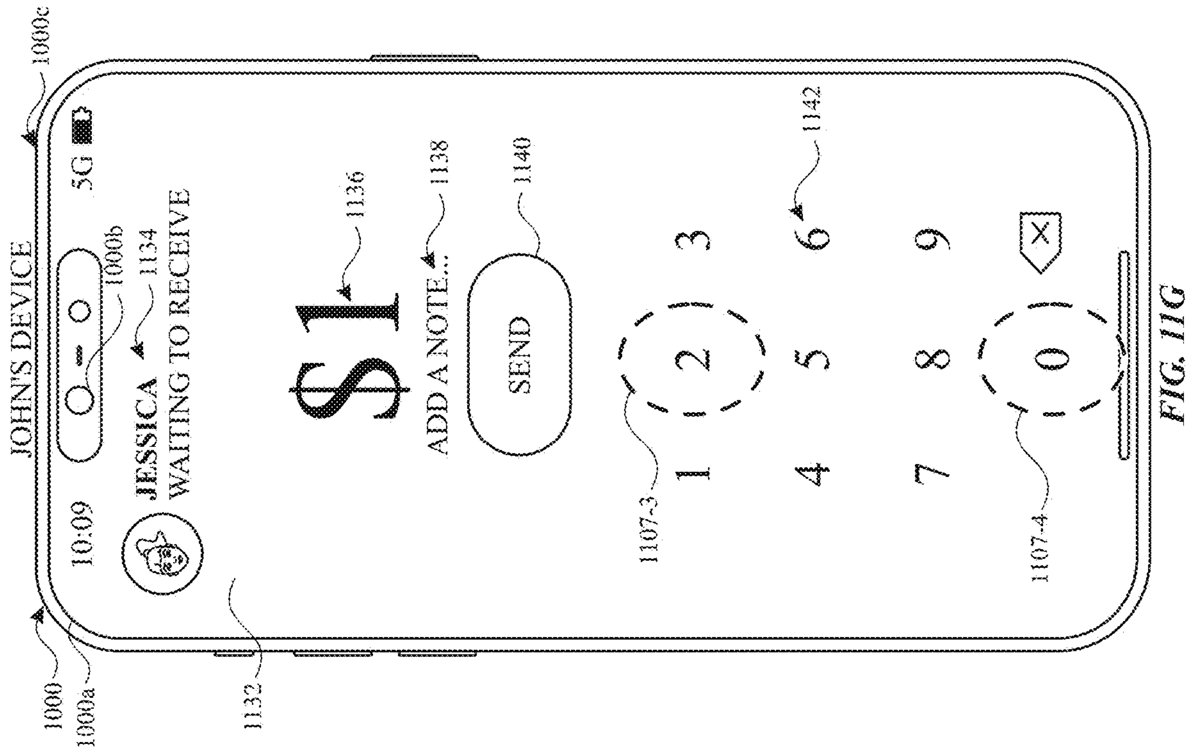
Figure 11I:
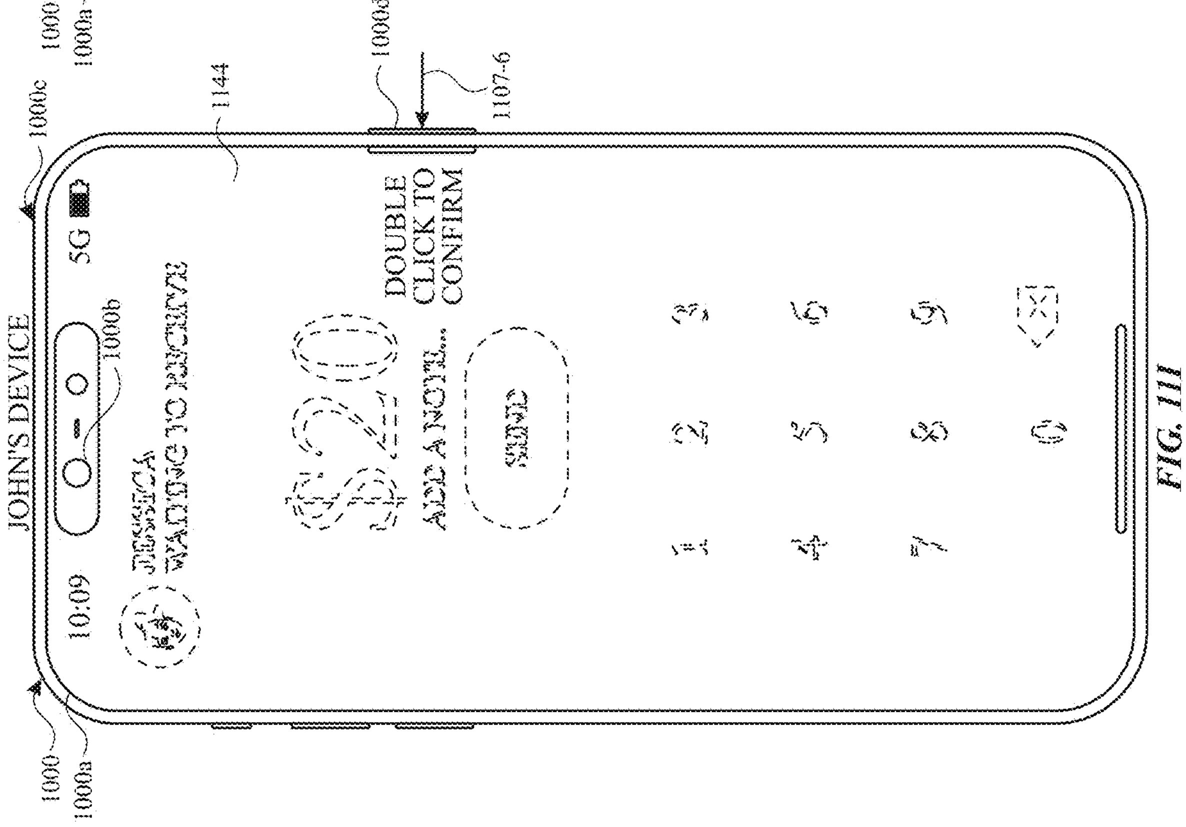
Figure 11J:
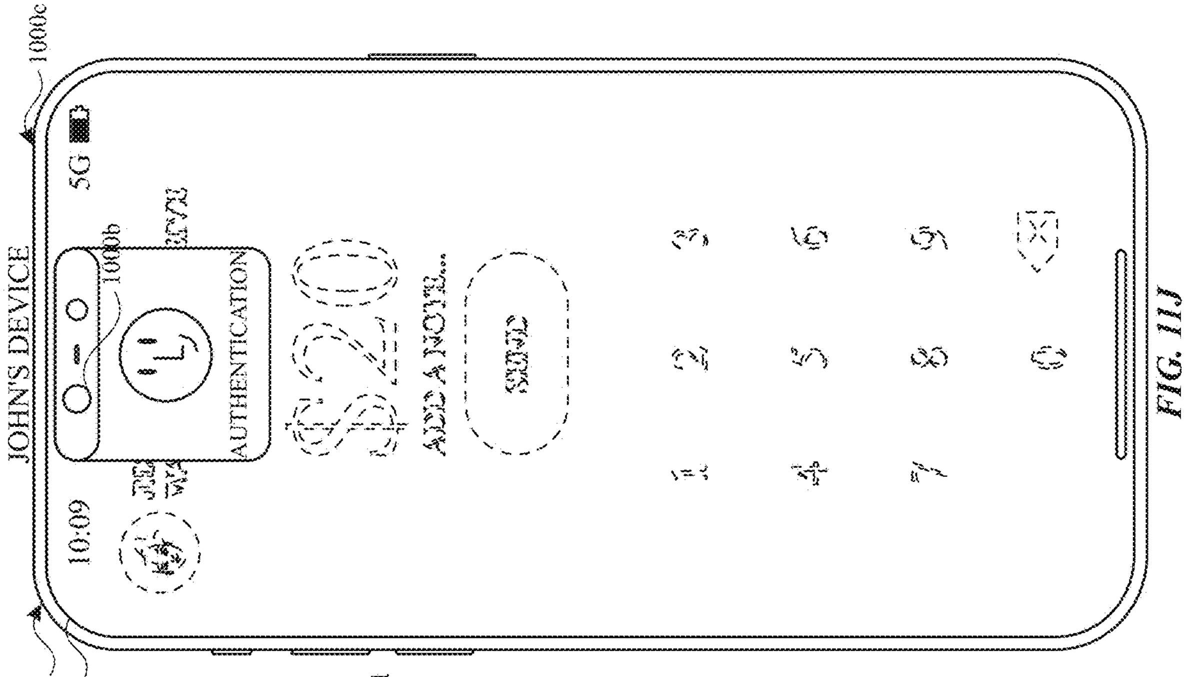
Figure 11L:
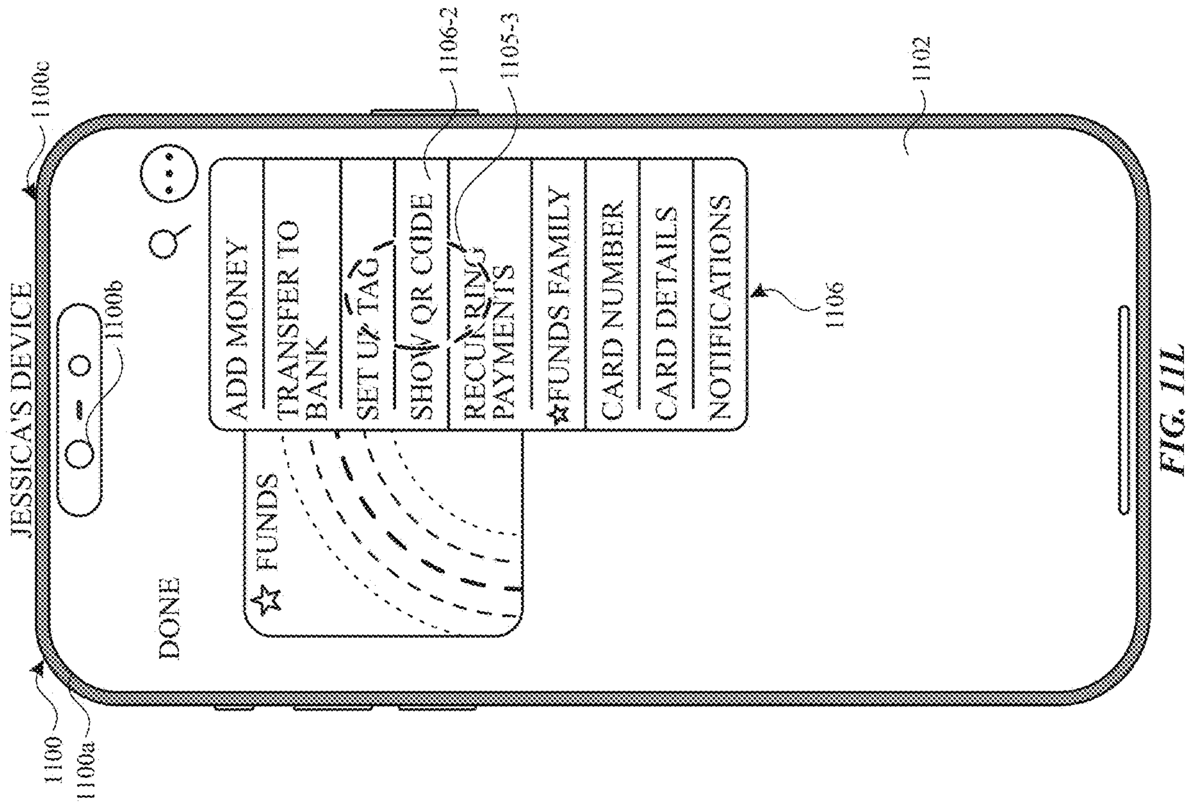
Figure 11K:
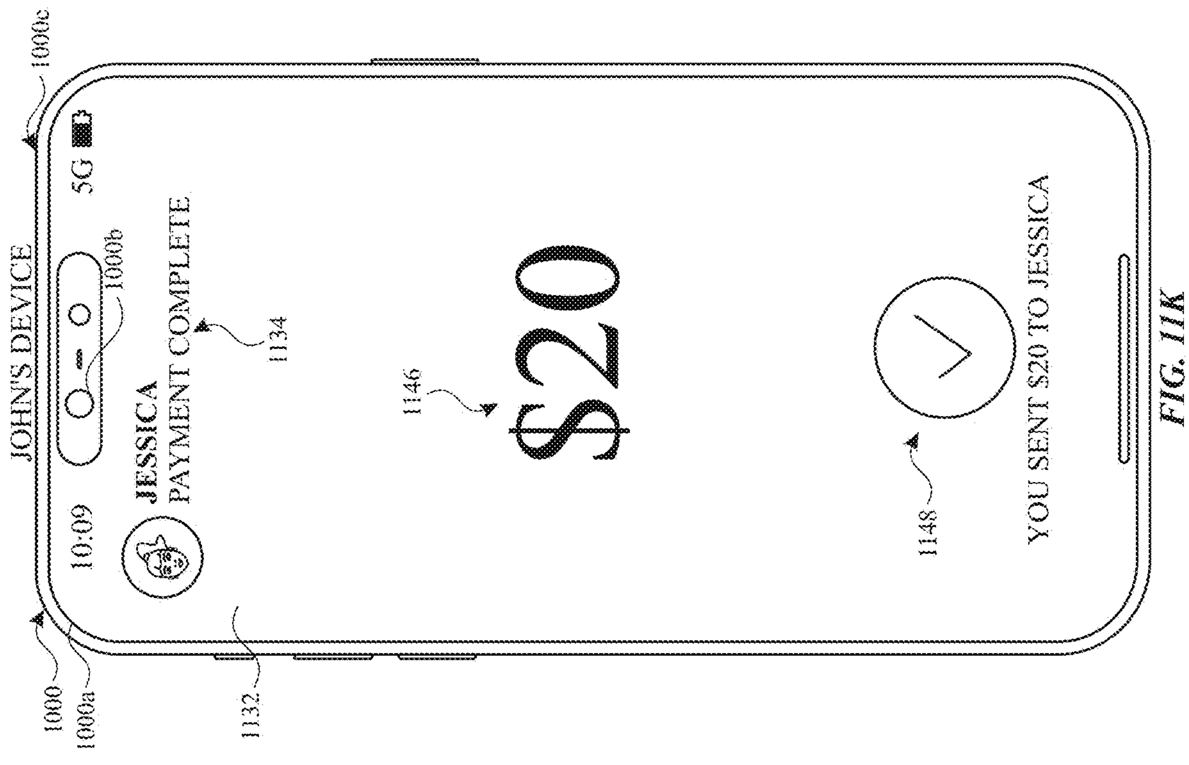
Figure 11M:
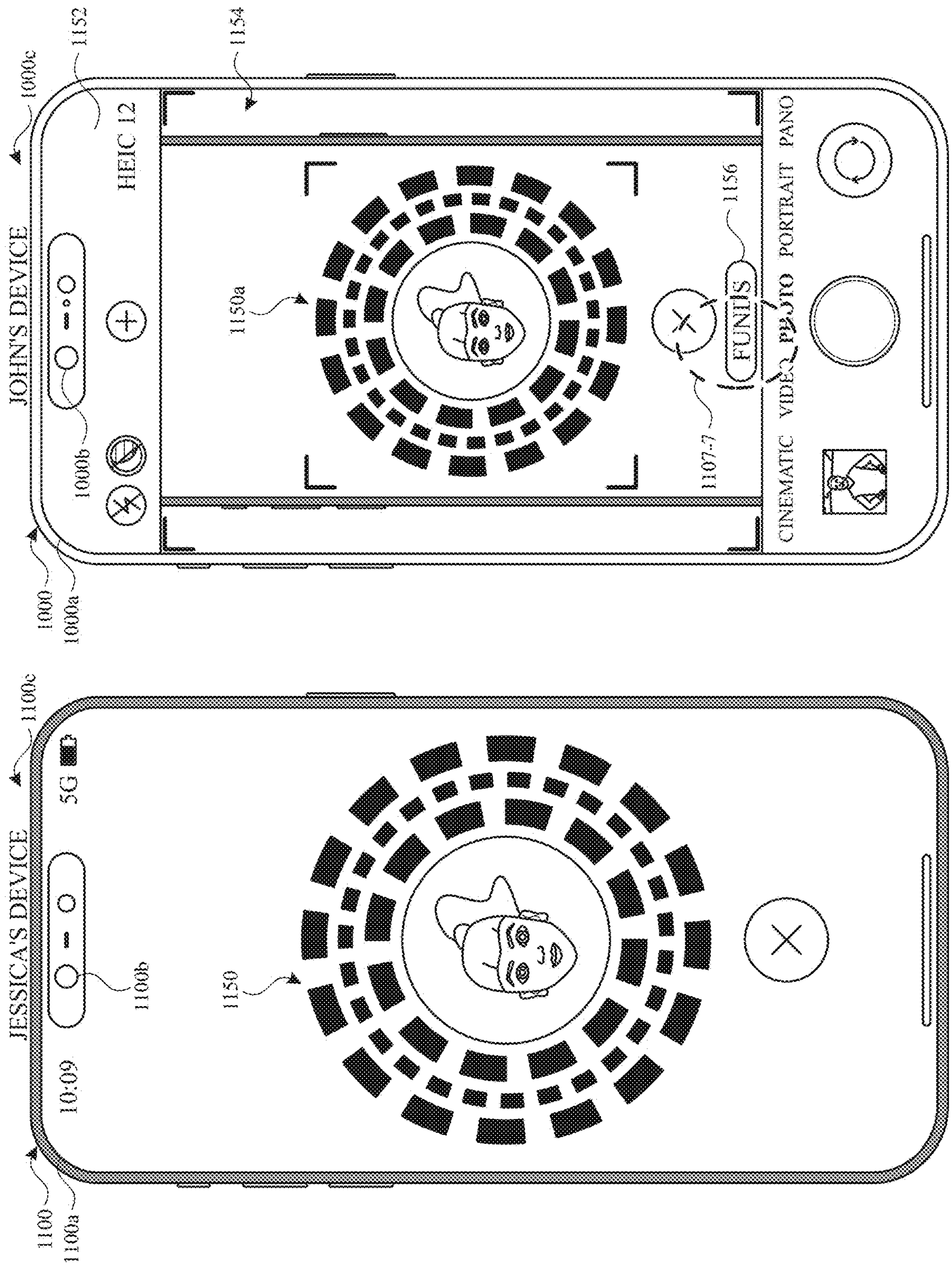
Figure 11N:
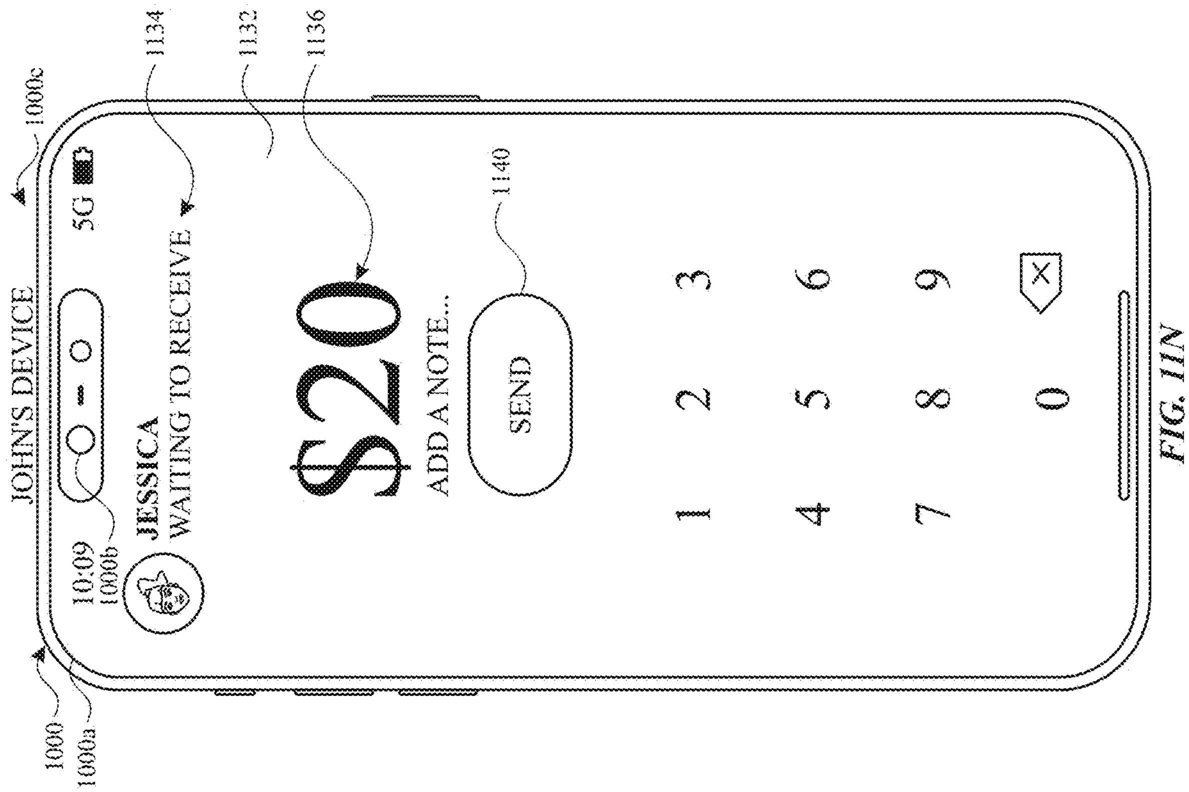

FIGS. 10A-10B and 11A-11N illustrate exemplary user interfaces for performing a resource transfer process, in accordance with some embodiments. In some embodiments, the resources being transferred can include an amount of allocated memory, digital data, digital photos, digital videos, an account balance, funds, or any combination thereof. For example, FIGS. 10A-10B depict example user interfaces for embodiments for transferring digital photos from a first resource account (e.g., a first photos account) to a different resource account (e.g., a second photos account). As another example, FIGS. 11A-11N depict example user interfaces for embodiments for transferring funds from a first resource account (e.g., a first funds account) to a different resource account (e.g., a second funds account). The user interfaces in these figures are used to illustrate the processes described below, including the processes in FIGS. 12A-12B.

The embodiments illustrated in FIGS. 10A-10B and 11A-11N depict example computer systems for transferring account resources, in accordance with some embodiments. These computer systems include John's device 1000 (also referred to herein as device 1000) and Jessica's device 1100 (also referred to herein as device 1100), which are shown concurrently in some figures to illustrate concurrent states of the respective devices, including the user interfaces and inputs at the respective devices. In the embodiments provided herein, John's device 1000 can be described as performing a set of functions (e.g., functions associated with the resource transfer or other functions described herein), and Jessica's device 1100 can be described as performing a different set of functions (e.g., a different set of functions associated with the resource transfer or other functions described herein). These descriptions are not intended to limit the functions performed by the respective devices, but rather, are provided to illustrate various aspects of the embodiments described herein. Thus, unless specified otherwise, the functions that are described as being performed using John's device are similarly capable of being performed using Jessica's device. Likewise, the functions that are described as being performed by Jessica's device are similarly capable of being performed by John's device, unless specified otherwise.

As shown in FIG. 10A, John's device 1000 is a computer system that, in some embodiments, comprises touchscreen display 1000*a*, camera 1000*b*, and other hardware such as processors, memory, and other components for operating device 1000 such as near-field circuitry 1000*c* and physical button 1000*d*. John's device 1000 is depicted as a smartphone, however, it should be appreciated that the device can be a different type of computer system such as a desktop computer, tablet computer, smartwatch, laptop computer, or a head-mounted device. Furthermore, John's device can include other display components such as a projector or head-mounted display system. John's device can also include other input components such as a microphone for detecting audio input and/or other sensors for detecting finger gestures, hand gestures, eye gaze, and/or other inputs. In some embodiments, John's device 1000 includes one or more elements of devices 100, 300, 500, 600, and/or 700.

FIGS. 10A and 10B depict example user interfaces for an embodiment in which a resource transfer is initiated by reading NFC tag 1001 (e.g., also referred to herein as an "NFC sticker") using John's device 1000. In the embodiments described herein, NFC tag 1001 is a physical sticker that includes near-field circuitry 1001*a* (e.g., depicted in FIG. 11A) embedded within the sticker. A device (e.g., John's device 1000 or Jessica's device 1100) reads the NFC sticker by detecting the near-field circuitry 1001*a* of NFC tag 1001 using near-field circuitry of the device (e.g., using near-field circuitry 1000*c* of John's device 1000 or using near-field circuitry 1100*c* of Jessica's device 1100). In some embodiments, when a device reads the NFC sticker, the NFC sticker and device perform a handshake process, exchange data, and/or otherwise communicate information (e.g., account information, identifying information, etc.) to initiate the resource transfer. In the embodiments described herein, the act of reading the NFC sticker can be described as scanning the NFC sticker or tapping the device to the NFC sticker. In some embodiments, if the NFC sticker is not registered to a resource account, a device that reads the NFC sticker is prompted to register a resource account with the NFC sticker. When a device reads the NFC sticker after the sticker is registered to a resource account, the device is prompted to transfer resources to the resource account that is registered to the NFC sticker. In some embodiments, the sticker can be placed at a location providing convenient access for various devices to scan the sticker and transfer resources to the account registered to the sticker. For example, the sticker can be placed on a school laptop, and friends of the user can conveniently scan the sticker using their respective devices and receive a prompt to send photos to the photos account associated with the sticker. As another example, the sticker can be placed at a food vendor or a valet stand and can be scanned to prompt a scanning device (e.g., a customer's device) to provide a payment or tip to the resource account that is registered to the sticker.

In the embodiments depicted in FIGS. 10A and 10B, Jessica's resource account is already registered to NFC tag 1001. Thus, FIGS. 10A and 10B depict user interfaces that are displayed at John's device 1000 for transferring resources to Jessica's resource account when John's device scans NFC tag 1001.

In the embodiment depicted in FIG. 10A, John's device 1000 is scanning NFC tag 1001 (e.g., near-field circuitry 1001*a* of the NFC sticker is detected using near-field circuitry 1000*c* of John's device 1000 in order to read the NFC sticker as described above). In response to scanning the NFC sticker, John's device 1000 is prompted to transfer photos to Jessica's photos account. Specifically, John's device 1000 displays, via display 1000*a*, interface 1002, which prompts John to select one or more photos 1008 for sending to Jessica's photos account. Photos 1008 can be selected by tapping on the photos or providing other input to select the photos to be sent to Jessica's photos account. Interface 1002 includes send option 1004, which can be selected to continue with the photo transfer process (e.g., after John has selected photos for sending to Jessica).

In response to detecting input 1005-1 (e.g., a tap input, an air gesture, and/or a cursor input) selecting send option 1004, John's device displays interface 1012, as shown in FIG. 10B. Interface 1012 is a sending interface that includes photos 1010, which is a visual representation of the photos that have been selected for sending to Jessica's photos account. Interface 1012 also includes note information 1016, send option 1018, and status information 1014. Note information 1016 can be selected to add a note or other text to be included with the photos transferred to Jessica's account. Status information 1014 provides information about the account transfer. In FIG. 10B, status information 1014 indicates that the photos will be transferred to Jessica's account and that her account is waiting to receive the photos. In response to detecting input 1005-2 selecting send option 1018, John's device 1000 begins transmitting the selected photos to Jessica's photo account.

FIGS. 11A-11N illustrate exemplary user interfaces for performing a resource transfer process, in accordance with some embodiments. Specifically, the user interfaces in FIGS. 11A-11N depict embodiments for transferring funds from a first resource account (e.g., a first funds account) to a different resource account (e.g., a second funds account). The user interfaces in these figures are used to illustrate the processes described below, including the processes in FIGS. 12A-12B. In some embodiments, the funds can be an account balance, a digital currency, or an account credit. Although the embodiments in FIGS. 11A-11N depict user interfaces for techniques for transferring funds from John's funds account to Jessica's funds account, it should be appreciated that the techniques can be implemented in a similar manner to transfer funds from Jessica's funds account to John's funds account. In some embodiments, John's funds account is managed using John's device 1000, and Jessica's funds account is managed using Jessica's device 1100. In some embodiments, the techniques described with respect to FIGS. 11A-11N can be used to transfer other resources such as photos, as illustrated at least in part by the user interfaces depicted in FIGS. 10A-10B.

As shown in FIG. 11A, Jessica's device 1100 is a computer system that, in some embodiments, comprises touch-screen display 1100*a*, camera 1100*b*, and other hardware such as processors, memory, and other components for operating device 1100 such as near-field circuitry 1100*c* and physical button 1100*d*. Jessica's device is depicted as a smartphone, however, it should be appreciated that the device can be a different type of computer system such as a desktop computer, tablet computer, smartwatch, laptop computer, or a head-mounted device. Furthermore, Jessica's device can include other display components such as a projector or head-mounted display system. Jessica's device can also include other input components such as a microphone for detecting audio input and/or other sensors for detecting finger gestures, hand gestures, eye gaze, and/or other inputs. In some embodiments, Jessica's device 1100 includes one or more elements of devices 100, 300, 500, 600, and/or 700.

FIGS. 11A-11D depict example user interfaces for an embodiment in which Jessica is registering her funds account with NFC tag 1001. In other words, Jessica is configuring the NFC sticker such that the NFC code generated using near-field circuitry 1001*a* of NFC tag 1001 provides information that can be communicated to a scanning device in order to facilitate the transfer of funds from a sending account (e.g., associated with the scanning device) to Jessica's funds account.

In FIG. 11A, Jessica's device 1100 displays, via display 1100*a*, interface 1102, which includes account cards 1104 and menu 1106. Interface 1102 is a user interface for a digital wallet. In FIG. 11A, account cards 1104 are shown in the wallet interface and represent the different accounts (e.g., payment accounts, debit accounts, credit account, loyalty accounts, live event passes, and/or transit accounts) stored in the wallet. Card 1104-1 is associated with Jessica's funds account and card 1104-2 is associated with a different account. Menu 1106 includes various menu options that can be selected for managing the accounts stored in the wallet. In FIG. 11A, card 1104-1 is currently selected (e.g., because it is displayed in front of card 1104-2), and the menu options shown in menu 1106 can be selected for managing the funds account associated with card 1104-1. For example, menu option 1106-1 can be selected to register Jessica's funds account with an NFC sticker, as shown in FIGS. 11B-11D.

In response to detecting input 1105-1 (e.g., a tap input, an air gesture, and/or a cursor input) selecting menu option 1106-1, Jessica's device 1100 displays interface 1108 as shown in FIG. 11B. Interface 1108 includes card 1104-1 and region 1110. The display of card 1104-1 indicates that the funds account associated with card 1104-1 will be used to setup NFC tag 1001. In other words, Jessica's funds account for card 1104-1 will be registered with NFC tag 1001 such that funds from other accounts can be deposited into Jessica's funds account by simply tapping a device to the NFC sticker to initiate the funds transfer, as described herein. Region 1110 includes prompt 1112 which provides feedback to Jessica, instructing her to setup an NFC sticker (e.g., by scanning the NFC sticker while displaying the interface in FIG. 11B). Region 1110 includes cancel option 1114, which can be selected to cancel the setup process.

In FIG. 11C, Jessica taps device 1100 to NFC tag 1001 to continue the process for registering her funds account to NFC tag 1001. Specifically, Jessica's device 1100 reads near-field circuitry 1001*a* of NFC tag 1001 using near-field circuitry 1100*c* and, in response, updates region 1110 to display setup option 1118 and text 1116 asking Jessica to confirm that she wants to register her funds account to NFC tag 1001. In response to detecting input 1105-2 selecting setup option 1118, Jessica's device 1100 writes her account information to NFC tag 1001, such that subsequent scans of NFC tag 1001 prompt payment to Jessica's funds account. In FIG. 11D, Jessica's device 1100 displays confirmation information 1120 to indicate that the funds account was successfully written to NFC tag 1001. In some embodiments, the write process is only performed one time for a respective NFC sticker. In other words, once an account has been assigned to the NFC sticker, the account information cannot be changed or otherwise rewritten. This enhances security by preventing manipulation of the NFC sticker so that it cannot be used for other purposes. In some embodiments, Jessica's device 1100 displays region 1110 as depicted in FIG. 11B or 11C in response to scanning NFC tag 1001 (e.g., without previously selecting menu option 1106-1). For example, if no account has been written to NFC tag 1001, Jessica can scan the tag with device 1100 and, in response, Jessica's device 1100 displays the user interfaces depicted in FIG. 11B or 11C.

FIGS. 11E-11K depict example user interfaces for an embodiment in which John's device 1000 scans NFC tag 1001 and is prompted to transfer funds to Jessica's funds account, which was written to NFC tag 1001 as shown in FIGS. 11A-11D.

In FIG. 11E, John's device 1000 is not yet scanning NFC tag 1001. In FIG. 11F, John's device 1000 is scanning NFC tag 1001 and, in response, displays interface 1122. In some embodiments, interface 1122 is a wallet interface. Interface 1122 includes account cards 1124, including funds account card 1124-1 and miles account card 1124-2. In the embodiment depicted in FIG. 11F, John's funds account card 1124-1 is automatically selected (e.g., by default) as the account to be used for the funds transfer. In some embodiments, John can select a different account for the funds transfer. For example, John can select miles account card 1124-2 via input 1107-1 (e.g., a tap input, an air gesture, and/or a cursor input) to choose the account associated with miles account card 1124-2.

In FIG. 11F, John's device 1000 displays region 1130 including information 1126 and pay option 1128. Information 1126 provides an indication of the account that is registered with NFC tag 1001 and provides feedback to indicate that the account will be paid using the funds account. For example, in FIG. 11F, information 1126 includes Jessica's name, an avatar that Jessica uses to represent herself to other users, a dollar-sign glyph, and text that indicates Jessica is to be paid using the interface displayed at John's device 1000. Pay option 1128 also indicates that Jessica will be paid using the funds account. In response to detecting input 1107-2 selecting pay option 1128, John's device continues with the funds transfer process by displaying payment interface 1132, as shown in FIG. 11G.

Payment interface 1132 includes status information 1134 which indicates Jessica is the recipient of the funds and that her account is waiting to receive the funds. Payment interface 1134 also includes payment amount 1136, note 1138, send option 1140, and keypad 1142. Note 1138 can be selected to add a note or other text to be transmitted to Jessica's account or device 1100 as a part of the funds transfer. Keypad 1142 can be used to enter the payment amount. For example, in response to detecting inputs 1107-3 and 1107-4 selecting the "2" and "0" keys, respectively, John's device 1000 updates payment amount 1136, as shown in FIG. 11H. In response to detecting input 1107-5 selecting send option 1140, John's device 1000 continues with the funds transfer as shown in FIGS. 11I and 11J.

In FIG. 11I, John's device 1000 displays confirmation interface 1144. In response to detecting input 1107-6, which is a selection of button 1000*d*, John's device begins to process the funds transfer from John's funds account to Jessica's funds account. Specifically, John is sending $20 to Jessica's funds account. In some embodiments, prior to processing the funds transfer, John's device performs an authentication process to authenticate the user of John's device 1000, as shown in FIG. 11J.

In FIG. 11K, John's device 1000 again displays payment interface 1132 after processing the funds transfer. Status information 1134 is updated to indicate that the payment to Jessica is complete. John's device 1000 also displays payment amount 1146 and confirmation information 1148 confirming that John sent $20 to Jessica.

In some embodiments, Jessica's device 1100 can generate a digital code such as a QR code to be used with her funds account. The QR code can be scanned to prompt the scanning device to send funds to Jessica's funds account, similar to the scanning of NFC tag 1001 described above. FIGS. 11L-11N depict example user interfaces for such an embodiment.

In FIG. 11L, Jessica's device 1100 displays interface 1102 with menu 1106, similar to that shown in FIG. 11A. Menu 1106 includes menu option 1106-2, which can be selected to generate a QR code that is registered with Jessica's funds account, similar to the way NFC tag 1001 is registered to Jessica's funds account. In response to detecting input 1105-3 selecting menu option 1106-2, Jessica's device 1100 generates QR code 1150, as shown in FIG. 11M. In some embodiments, QR code 1150 includes identification information to associate the QR code with Jessica's account. For example, as shown in FIG. 11M, QR code 1150 includes a representation of Jessica's avatar displayed within QR code 1150.

In FIG. 11M, John is scanning Jessica's QR code using a camera of device 1000. John's device 1000 displays camera interface 1152, including camera preview region 1154 showing the video feed from a camera (e.g., 1000*b*) of John's device 1000. Jessica's phone and QR code 1150 are within the field of view of John's camera. Therefore, the camera preview region 1154 shows Jessica's phone and representation 1150*a* of Jessica's QR code. In response to detecting the QR code, John's device displays funds option 1156, which can be selected to transfer funds to Jessica's funds account that is associated with the QR code. John's device 1000 detects input 1107-7 selecting funds option 1156 and, in response, displays payment interface 1132 as shown in FIG. 11N for transmitting a payment to Jessica's funds account in a manner similar to that described above with respect to FIGS. 11G-11K. In some embodiments, in response to detecting input 1107-7, John's device 1000 displays a user interface similar to that shown in FIG. 11F before proceeding to interface 1132 in FIG. 11N.

FIGS. 12A-12B are a flow diagram illustrating a method for performing a resource transfer process, in accordance with some embodiments. Method 1200 is performed at a computer system (e.g., 100, 300, 500, 600, 1000, and/or 1100) (e.g., a smartphone, a wearable device (e.g., a smartwatch), a tablet computer, a desktop computer, a laptop computer, and/or a head-mounted device (e.g., a head-mounted augmented reality and/or extended reality device)) that is in communication with (e.g., includes and/or is connected to) one or more display generation components (e.g., 112, 340, 504, 1000*a*, and/or 1100*a*) (e.g., a display controller, a touch-sensitive display system, a display screen, a monitor, a projector, a holographic display, and/or a head-mounted display system) and one or more input devices (e.g., 112, 350, 355, 508, 522, 1000*a*, and/or 1100*a*) (e.g., a touch-sensitive surface, a keyboard, mouse, trackpad, one or more optical sensors for detecting a QR code, barcode, a gaze, and/or gestures, one or more capacitive sensors for detecting hover inputs, a microphone, and/or accelerometer/gyroscope/inertial measurement units), wherein the one or more input devices includes a short-range communication component (e.g., 1000*c* and/or 1100*c*) (e.g., RF circuitry (e.g., 108) and/or a near-field communication (NFC) reader). Some operations in method 1200 are, optionally, combined, the orders of some operations are, optionally, changed, and some operations are, optionally, omitted.

As described below, method 1200 provides an intuitive way for performing a resource transfer process. The method reduces the cognitive burden on a user for performing a resource transfer process, thereby creating a more efficient human-machine interface. For battery-operated computing devices, enabling a user to perform a resource transfer process faster and more efficiently conserves power and increases the time between battery charges.

At method 1200, the computer system (e.g., 1000 and/or 1100) receives (1202), via the short-range communication component (e.g., 1000*c* and/or 1100*c*), short-range communication data corresponding to a request (e.g., an NFC request) to transfer resources (e.g., memory allocation, data, photos, a balance, and/or funds) to a resource account (e.g., an allocated memory account, a data storage account, a digital library, a digital wallet, and/or a bank account) associated with (e.g., corresponding to) a short-range communication code (e.g., 1001*a*) (e.g., an NFC code) (e.g., the communication code was configured for the resource account). In some embodiments, the resource account is assigned to the short-range communication code during an initial setup process (e.g., as depicted in FIGS. 11A-11D). In some embodiments, the short-range communication data is received by scanning an NFC code (e.g., 1001*a*) that is embedded within a physical object (e.g., a sticker, a tag, and/or other physical item).

After receiving the short-range communication data (e.g., in response to receiving the short-range communication data and, in some embodiments, in response to one or more inputs received after receiving the short-range communication data) corresponding to the request to transfer resources to the resource account associated with the short-range communication code (e.g., 1001*a*), the computer system (e.g., 1000 and/or 1100) displays (1204), via the one or more display generation components (e.g., 1000*a* and/or 1100*a*), a resource transfer interface (e.g., 1002, 1008, 1012, 1130, and/or 1132) (e.g., a memory transfer interface, a data transfer interface, a photo transfer interface, a balance transfer interface, and/or a funds transfer interface). The resource transfer interface includes (1206) an indication (e.g., 1002, 1014, 1126, 1130, and/or 1134) of the resource account associated with the short-range communication code (e.g., identifying information such as a username, account name, profile picture, avatar, business name, phone number, email address, account number, and/or other identifying information). The resource transfer interface includes (1208) a resource transfer amount interface (e.g., 1008 and/or 1142) (e.g., a numeric keypad, keyboard, and/or input field) that is selectable (e.g., the resource transfer amount is configurable by the user account that is transferring the resources) to specify an amount of the resource transfer (e.g., an amount of allocated memory, data, photos, a balance, and/or funds to be transferred).

While displaying the resource transfer interface (e.g., 1002, 1012, 1130, and/or 1132), the computer system (e.g., 1000 and/or 1100) receives (1210), via the one or more input devices (e.g., 1000*a* and/or 1100*a*), a set of one or more inputs (e.g., 1005-1, 1005-2, 1107-2, 1107-3, 1107-4, 1107-5, and/or 1107-6), wherein the set of one or more inputs includes a request to initiate the resource transfer (e.g., a selection of a "send" element (e.g., 1018 and/or 1140), activation of a button (e.g., 1000*d* and/or 1100*d*) to confirm the transfer, and/or input to complete an authorization process). In response to receiving (1212) the set of one or more inputs, the computer system performs (e.g., conditionally performs) the following steps. In accordance with a determination that the set of one or more inputs specify a first amount for the resource transfer (e.g., the set of one or more inputs indicate, for example via input at the resource transfer amount interface, the amount of the resource transfer is the first amount), the computer system initiates (1214) a process for transferring the first amount of resources to the resource account associated with the short-range communication code (e.g., 1001*a*). In accordance with a determination that the set of one or more inputs specify a second amount for the resource transfer different from the first amount (e.g., the set of one or more inputs indicate, for example via input at the resource transfer amount interface, the amount of the resource transfer is the second amount), the computer system initiates (1216) a process for transferring the second amount of resources to the resource account associated with the short-range communication code. Initiating a process for transferring the first amount of resources to the resource account associated with the short-range communication code when the set of one or more inputs specify a first amount for the resource transfer and initiating a process for transferring the second amount of resources to the resource account associated with the short-range communication code when the set of one or more inputs specify a second amount for the resource transfer provides additional control options for transferring different amounts of resources to the resource account associated with the short-range communication code without cluttering the user interface with additional displayed controls.

In some embodiments, the resource transfer is a transfer of media items (e.g., 1008) (e.g., digital photos and/or videos) to the resource account associated with the short-range communication code (e.g., 1001*a*) (e.g., digital photos and/or videos are transferred from an account of the computer system to a different account associated with the short-range communication code). Transferring media items to the resource account associated with the short-range communication code improves how digital media items are managed and reduces user input to manually transfer media items between user accounts.

In some embodiments, the resource transfer is a transfer of funds (e.g., 1136) (e.g., digital currency and/or account credit) to the resource account associated with the short-range communication code (e.g., 1001*a*) (e.g., funds are transferred from an account of the computer system to a different account associated with the short-range communication code). Transferring funds to the resource account associated with the short-range communication code improves how funds are managed and reduces user input to manually transfer funds between user accounts.

In some embodiments, the computer system (e.g., 1100) is associated with the resource account (e.g., the computer system is logged into the resource account). Prior to receiving the short-range communication data corresponding to the request to transfer resources to the resource account associated with the short-range communication code (e.g., 1001*a*), the computer system receives, via the short-range communication component (e.g., 1100*c*), a first set of short-range communication data (e.g., scanning the NFC code). In response to receiving the first set of short-range communication data, and in accordance with a determination that the first set of short-range communication data corresponds to an initial activation (e.g., a first activation) of the short-range communication code, the computer system initiates a process for assigning the resource account to the short-range communication code (e.g., as depicted in FIGS. 11A-11D). Initiating a process for assigning the resource account to the short-range communication code when the first set of short-range communication data corresponds to an initial activation of the short-range communication code reduces the number of inputs needed to register the resource account to the short-range communication code and performs an operation when a set of conditions has been met without requiring further user input. In some embodiments, the resource account is assigned to the NFC code (e.g., 1001*a*) the first time the NFC code is scanned. In some embodiments, the NFC code can only be assigned a single resource account and cannot be reassigned to a different resource account. In some embodiments, the first set of short-range communication data corresponds to an initial activation of the short-range communication code if no resource account has been assigned to the short-range communication code. In some embodiments, assigning the resource account to the short-range communication code includes registering the resource account with the short-range communication code such that the short-range communication code is authorized to be used for initiating a transfer of resources to the resource account.

In some embodiments, as a part of initiating the process for assigning the resource account to the short-range communication code, the computer system (e.g., 1000 and/or 1100) displays, via the one or more display generation components (e.g., 1000*a* and/or 1100*a*), a setup interface (e.g., 1108 and/or 1110) for assigning the resource account (e.g., 1104-1) to the short-range communication code (e.g., an interface for instructing the computer system to register the resource account of the computer system with the near-field communication code). Displaying the setup interface for assigning the resource account to the short-range communication code when the first set of short-range communication data corresponds to an initial activation of the short-range communication code reduces the number of inputs needed to register the resource account to the short-range communication code and performs an operation when a set of conditions has been met without requiring further user input.

In some embodiments, in response to receiving the first set of short-range communication data, and in accordance with a determination that the first set of short-range communication data corresponds to a subsequent activation (e.g., an activation after the initial activation and/or after the resource account is assigned to the short-range communication code) of the short-range communication code (e.g., 1001*a*), the computer system (e.g., 1000 and/or 1100) displays, via the one or more display generation components (e.g., 1000*a* and/or 1100*a*), the resource transfer interface (e.g., 1002, 1008, 1012, 1122, 1130, and/or 1132). Displaying the resource transfer interface when the first set of short-range communication data corresponds to a subsequent activation of the short-range communication code reduces the number of inputs needed to display the resource transfer interface for transferring resources to the resource account assigned to the short-range communication code and performs an operation when a set of conditions has been met without requiring further user input. In some embodiments, an initial scan of the NFC code (e.g., 1001*a*) initiates registration of a resource account with the NFC code, and subsequent scans of the NFC code prompt a resource transfer (e.g., payment) to the resource account that is registered with the NFC code. In some embodiments, the short-range communication data corresponding to the request to transfer resources to the resource account is a subsequent activation of the short-range communication code.

In some embodiments, the short-range communication code is provided by short-range circuitry (e.g., 1001*a*) (e.g., RF circuitry and/or near-field communication (NFC) circuitry) embedded within a physical object (e.g., 1001) (e.g., a sticker, tag, and/or other physical item). In some embodiments, the short-range communication code is included in short-range communication data that is obtained by scanning an NFC chip located in a physical object.

In some embodiments, the computer system (e.g., 1100) is associated with the resource account (e.g., 1104-1) (e.g., the computer system is logged into the resource account). In some embodiments, the computer system receives, via the one or more input devices (e.g., 1100*a*), a second set of one or more inputs (e.g., 1105-3) corresponding to a request to generate a second code (e.g., a QR code, barcode, or other digital code) that is associated with the resource account. In response to receiving the second set of one or more inputs, the computer system displays (and, in some embodiments, generates), via the one or more display generation components (e.g., 1100*a*), a representation (e.g., 1150) of the second code (e.g., a digital QR code) that, when accessed (e.g., activated, scanned, detected, read, and/or received), initiates a process for displaying the resource transfer interface (e.g., 1002, 1012, 1122, 1130, and/or 1132) (e.g., the resource transfer interface is displayed at a computer system that accesses the second code). Displaying a representation of the second code that, when accessed, initiates a process for displaying the resource transfer interface in response to receiving the second set of one or more inputs provides additional control options for enabling a computer system to access the resource transfer interface for initiating a resource transfer to the resource account without cluttering the user interface with additional displayed controls. In some embodiments, the computer system can generate a QR code for the resource account that, when scanned, prompts the device that scanned the QR code to make a payment to the resource account of the QR code.

In some embodiments, the resource account (e.g., 1104-1) is one of a plurality of accounts (e.g., 1104-1 and/or 1104-2) (e.g., payment accounts, debit accounts, credit accounts, loyalty accounts, transit accounts, and/or live event passes) that are stored in an electronic wallet (e.g., 1102) of the computer system (e.g., 1000 and/or 1100) (e.g., the electronic wallet includes credentials for one or more accounts).

In some embodiments, after receiving the short-range communication data corresponding to the request to transfer resources to the resource account associated with the short-range communication code (e.g., 1001*a*) (e.g., before displaying or, in some embodiments, after displaying the resource transfer interface), the computer system (e.g., 1000 and/or 1100) receives, via the set of one or more input devices (e.g., 1000*a* and/or 1100*a*), a third set of one or more inputs (e.g., 1107-1) that includes to a request to change from using a first transfer account (e.g., 1124-1) (e.g., a default or initial payment account) for the resource transfer to using a second transfer account (e.g., 1124-2) for the resource transfer (e.g., a second payment account), wherein the second transfer account is different from the first transfer account. In response to receiving the third set of one or more inputs, the computer system changes from using the first transfer account for the resource transfer to using the second transfer account for the resource transfer, including: in accordance with a determination that the third set of one or more inputs includes a request to perform the resource transfer while the second transfer account is being used for the resource transfer, initiating a process for transferring resources from the second transfer account to the resource account associated with the short-range communication code. Changing from using the first transfer account to using the second transfer account for the resource transfer in response to receiving the third set of one or more inputs, and initiating a process for transferring resources from the second transfer account to the resource account associated with the short-range communication code when the third set of one or more inputs includes a request to perform the resource transfer while the second transfer account is being used for the resource transfer, provides additional control options for selecting a transfer account for the resource transfer without cluttering the user interface with additional displayed controls. In some embodiments, the computer system displays a user interface (e.g., 1102 and/or 1122) that includes one or more options for changing a transfer account (e.g., a payment account) that is used for the resource transfer. In some embodiments, the computer system receives user input for changing from an initial transfer account to a different transfer account before authorizing or processing the resource transfer to the resource account associated with the short-range communication code.

In some embodiments, the computer system authorizes or performs the resource transfer after the short-range communication code has been scanned. In some embodiments, while the computer system (e.g., 1000 and/or 1100) displays, via the one or more display generation components (e.g., 1000*a* and/or 1100*a*), the resource transfer interface (e.g., 1012 and/or 1132), the computer system receives, via the one or more input devices (e.g., 1000*a* and/or 1100*a*), a set of one or more inputs (e.g., 1005-2, 1107-5, and/or 1107-6) that includes a request to perform the resource transfer. In response to receiving the set of one or more inputs that includes the request to perform the resource transfer, and in accordance with a determination that the resource transfer interface was displayed after (e.g., in response to) receiving the short-range communication data corresponding to the request to transfer resources to the resource account associated with the short-range communication code (e.g., 1001*a*), the computer system initiates a process for transferring resources to the resource account associated with the short-range communication code. Initiating the process for transferring resources to the resource account associated with the short-range communication code when the resource transfer interface was displayed after receiving the short-range communication data corresponding to the request to transfer resources to the resource account provides increased security by ensuring that the resource transfer is authorized after receiving data for the resource account that receives the resources.

In some embodiments, the computer system (e.g., 1000 and/or 1100) does not authorize or perform the resource transfer until after the short-range communication code (e.g., 1001*a*) has been scanned. Thus, authorization of the resource transfer is not valid before the short-range communication code has been scanned. In some embodiments, in response to receiving the set of one or more inputs that includes the request to perform the resource transfer, and in accordance with a determination that the resource transfer interface was displayed prior to receiving the short-range communication data corresponding to the request to transfer resources to the resource account associated with the short-range communication code (e.g., or was displayed after a predetermined amount of time after receiving the short-range communication data such as after the request to transfer resources has expired), the computer system forgoes transferring resources to the resource account associated with the short-range communication code (e.g., declining the request to transfer the resources). Forgoing transferring resources to the resource account associated with the short-range communication code when the resource transfer interface was displayed prior to receiving the short-range communication data corresponding to the request to transfer resources to the resource account provides increased security by ensuring that the resource transfer is not authorized prior to receiving data for the resource account that receives the resources or when the data is invalid.

Note that details of the processes described above with respect to method 1200 (e.g., FIGS. 12A-12B) are also applicable in an analogous manner to the methods described above and/or below. For example, methods 800, 900, 1400, and/or 1600 optionally include one or more of the characteristics of the various methods described above with reference to method 1200. For example, the wallet interface described in method 1200 can include resource accounts described with respect to method 1200 and live event passes as described with methods 1400 and/or 1600. For brevity, these details are not repeated below.

FIGS. 13A-130 illustrate exemplary user interfaces for managing a digital pass, in accordance with some embodiments. The user interfaces in these figures are used to illustrate the processes described below, including the processes in FIG. 14.

FIG. 13A illustrates John's device 1300, which is a computer system that, in some embodiments, comprises touchscreen display 1300*a*, camera 1300*b*, and other hardware such as processors, memory, and other components for operating device 1300 such as near-field circuitry and physical button(s). John's device 1300 is depicted as a smartphone, however, it should be appreciated that the device can be a different type of computer system such as a desktop computer, tablet computer, smartwatch, laptop computer, or a head-mounted device. Furthermore, John's device can include other display components such as a projector or head-mounted display system. John's device can also include other input components such as a microphone for detecting audio input and/or other sensors for detecting finger gestures, hand gestures, eye gaze, and/or other inputs. In some embodiments, John's device 1300 includes one or more elements of devices 100, 300, 500, 600, 700, and/or 1000.

In FIG. 13A, John's device 1300 displays, via display 1300*a*, home screen interface 1302, which includes various application icons corresponding to applications that are available at John's device. The application icons can be selected to launch corresponding applications. As depicted in FIG. 13A, the application icons include calendar application icon 1304, camera application icon 1306, music application icon 1308, wallet application icon 1310, maps application icon 1312, photos application icon 1314, and live event application icon 1316. As described in greater detail below, live event application icon 1316 corresponds to an application developed to provide information for a live sporting event. In some embodiments, the live event application can be developed for other events such as a concert, play, ballet, or other live event. Calendar application icon 1304 indicates that the current date is Monday, August $10^{th}$. John's device 1300 also displays clock 1303, which indicates that the current time is 10:09 am.

Figure 13B:
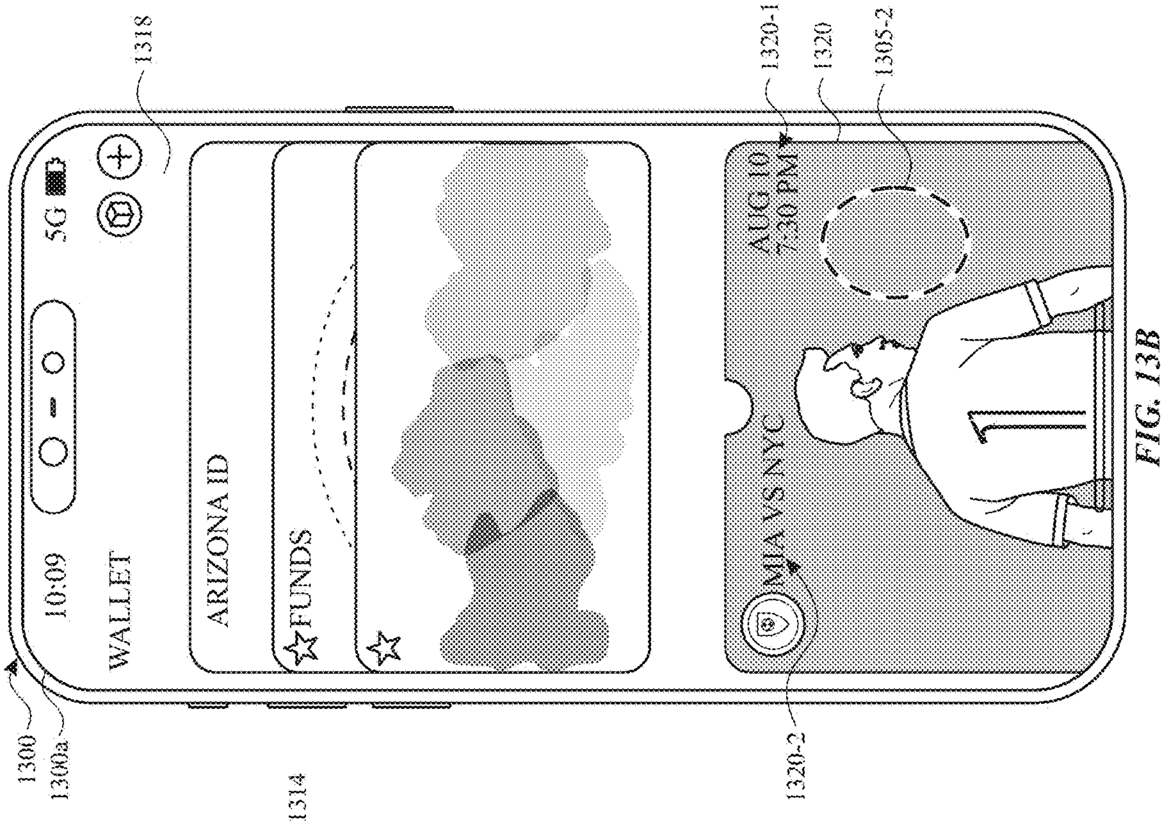

In FIG. 13A, John's device 1300 detects input 1305-1 (e.g., a tap input, an air gesture, and/or a cursor input) selecting wallet application icon 1310 and, in response, displays wallet interface 1318, as depicted in FIG. 13B. Wallet interface 1318 includes credentials for various accounts, which are stored at John's device 1300. In some embodiments, the credentials can include identification cards, payment account cards, transit cards, and digital passes for events. In the embodiment depicted in FIG. 13B, wallet interface 1318 includes digital ticket 1320, which is a digital pass to a live sporting event. Digital ticket 1320 includes information about the live sporting event such as event date/time information 1320-1 and team information 1320-2. The information displayed with digital ticket 1320 indicates that the ticket is a digital pass for a live soccer match between Miami and New York City, which occurs August $10^{th}$ at 7:30 pm. In some embodiments, wallet interface 1318 can be scrolled to reveal additional displayed content, including content of digital ticket 1320 and, in some embodiments, information for the live event. In some embodiments, digital ticket 1320 can be selected to view additional information for the live event. In the embodiments depicted in FIGS. 13A-130, the live event is a soccer match and the information for the live event includes information that is specific to the soccer match. It should be appreciated, however, that the soccer match is one example of a live event and the embodiments described herein can be implemented for other events and the information for the live event can include different information that corresponds to the live event.

Figure 13C:
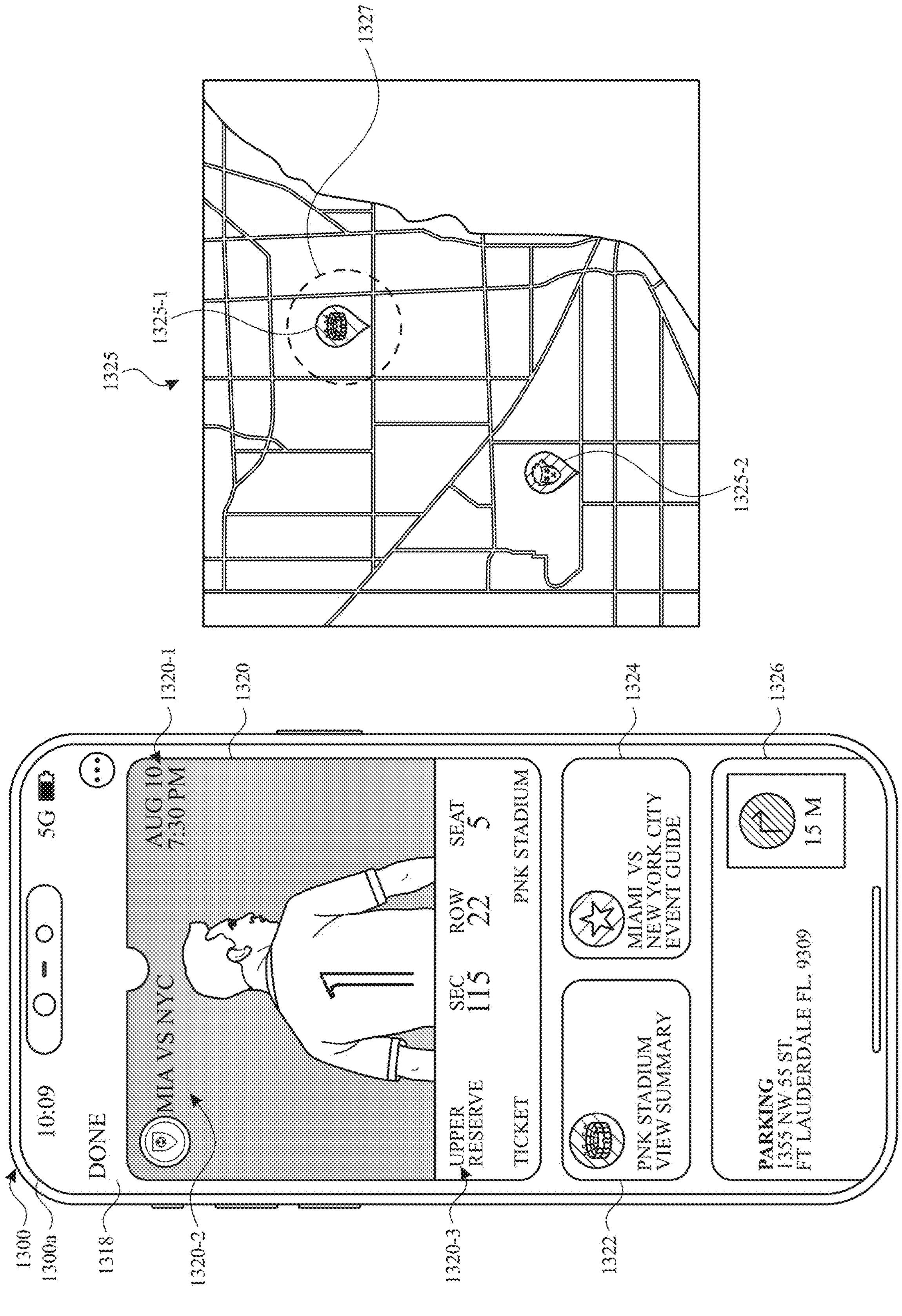

For example, in response to detecting input 1305-2 selecting digital ticket 1320, John's device 1300 displays, via display 1300*a*, wallet interface 1318 with an expanded view of digital ticket 1320 and additional information for the live event such as stadium information element 1322, event guide element 1324, and parking information element 1326. As shown in FIG. 13C, digital ticket 1320 includes seating information region 1320-3, which includes information about the assigned seating associated with the digital ticket. In the embodiment depicted in FIG. 13C, digital ticket 1320 includes seating in section 115, row 22, seat 5, which is located in the upper reserve area of PNK stadium.

In some embodiments, the information elements can be selected to display additional information and, in some embodiments, to launch an application associated with the element. For example, stadium information element 1322 can be selected to display additional information for the stadium hosting the live event such as, for example, vendor information, a stadium map, parking information, local weather, timing information, and event policies and procedures. In some embodiments, the additional information for the stadium is provided by the live event application associated with live event application icon 1316 and selecting stadium information element 1322 causes John's device 1300 to launch the live event application. In some embodiments, event guide element 1324 can be selected to display additional information about the live event such as, for example, rosters, player profiles, sponsorship information, vendor information, game information, map information, and city information. In some embodiments, selecting event guide element 1324 causes John's device 1300 to display a map, an event guide, and/or options to visit a website or launch an application (e.g., the live event application) to view additional event guide information. In some embodiments, parking information element 1326 can be selected to display additional information for parking such as, for example, parking lot opening/closing times, parking lot maps, and parking costs. In some embodiments, the additional parking information can be selected to display a map for navigating to a parking location.

FIG. 13C also depicts schematic map 1325, which includes stadium location marker 1325-1, user location marker 1325-2, and geofence boundary 1327. Stadium location marker 1325-1 represents a location of PNK stadium on the map. User location marker 1325-2 represents a current location of John's device 1300 on the map. Geofence boundary 1327 represents a geographical boundary around PNK stadium. When user location marker 1325-2 is located within geofence boundary 1327, John's device 1300 is determined to be located at PNK stadium. As shown in FIG. 13C, John is not at PNK stadium (e.g., the location of the live event) because user location marker 1325-2 is located outside of geofence boundary 1327.

Figure 13D:
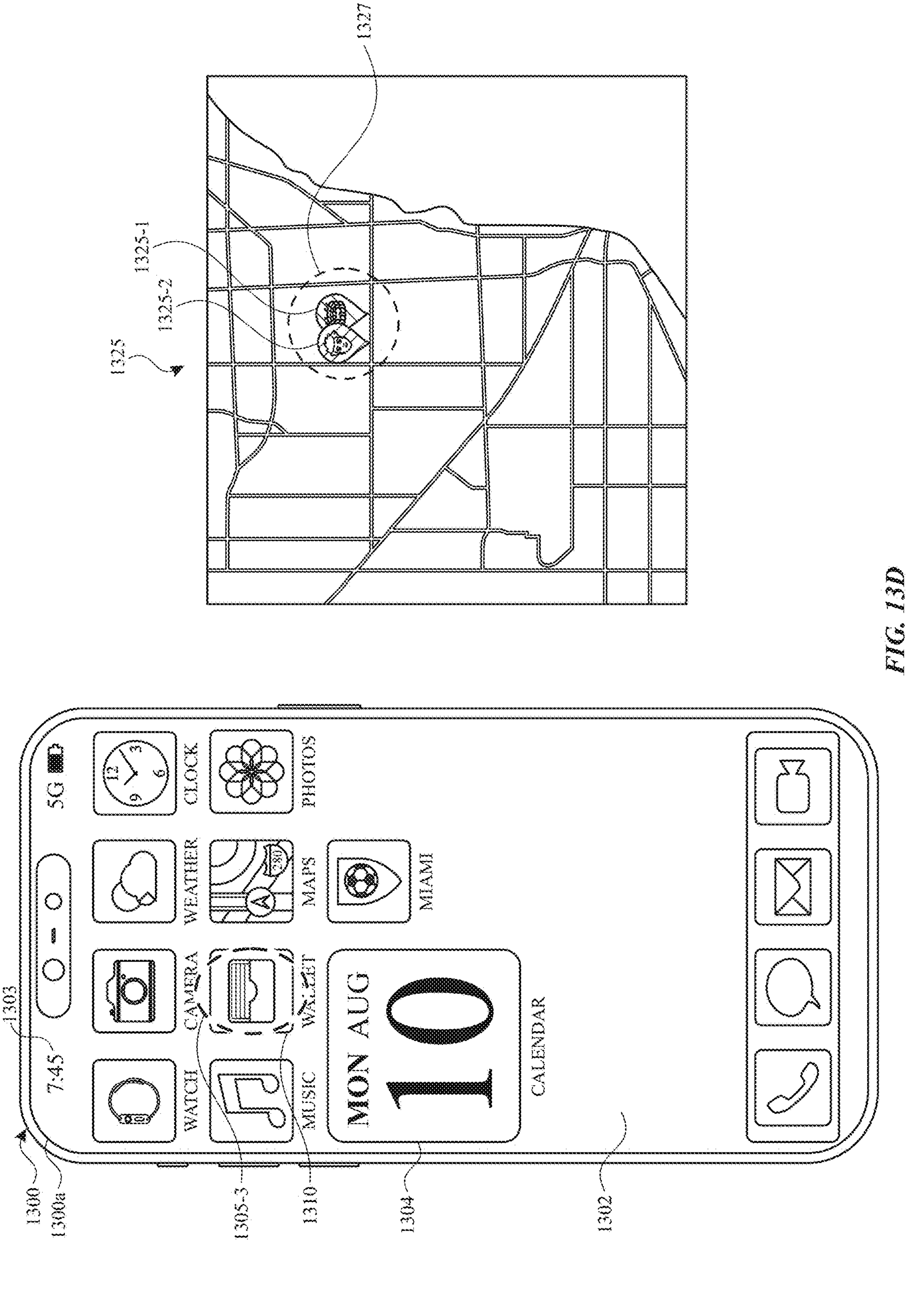

In some embodiments, John's device 1300 updates digital pass 1320 in real time based on information related to the live event. FIGS. 13D-130 depict example user interfaces for such embodiments.

Figures 13E, 13F:
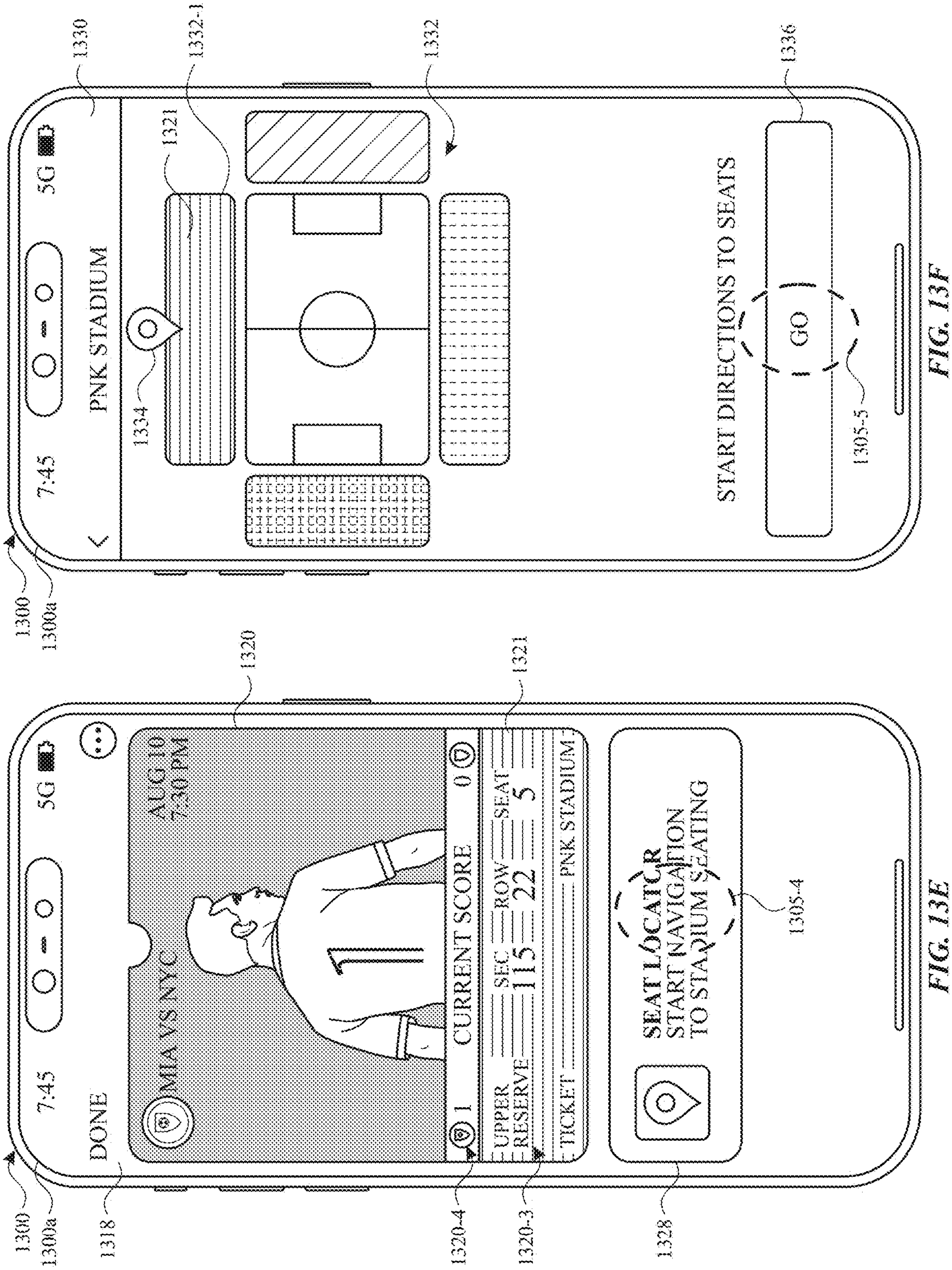

FIG. 13D depicts John's device 1300 located at the live event after the event has started, as indicated by clock 1303 showing the current time of 7:45 pm, calendar application icon 1304 showing the date as August $10^{th}$, and schematic map 1325 showing user location marker 1325-1 within geofence boundary 1327. John's device 1300 detects input 1305-3 selecting wallet application icon 1310 and, in response, displays wallet interface 1318, as shown in FIG. 13E.

Because the live event has started, John's device 1300 displays digital ticket 1320 with updated information based on the live event. In the embodiment depicted in FIG. 13E, digital ticket 1320 is displayed with scoring information 1320-4, and seating information region 1320-3 is updated to include color 1321, which corresponds to a color assigned to the seating section for John's ticket in PNK stadium. Updating seating information region 1320-3 with color 1321 assists John with locating his assigned seat by displaying a color that represents the location (e.g., upper reserve and/or section 115) of the assigned seat. In some embodiments, digital ticket 1320 is not updated with the color 1321 until the user arrives at the event and/or the event starts. In some embodiments, scoring information 1320-4 is updated in real time to provide a convenient display of the score for John, based on data received about the live event.

In some embodiments, when John's device 1300 has detected that the event has started, wallet interface 1318 is updated with additional information received for the live event. For example, in FIG. 13E, John's device 1300 displays seat locator element 1328, which can be selected to display seat location information to assist John with navigating to his assigned seat. In FIG. 13E, John's device 1300 detects input 1305-4 selecting seat locator element 1328 and, in response, displays interface 1330, which includes stadium map 1332, seat location indicator 1334, and navigation option 1336. Stadium map 1332 includes region 1332-1 corresponding to the assigned seating section for John's ticket. Region 1332-1 is depicted in color 1321 to assist John with identifying the location of his assigned seat. Seat location indicator 1334 shows the location of John's assigned seat within the stadium and, more specifically, within region 1332-1. In some embodiments, John's device 1300 displays instructions for navigating to the assigned seat in response to detecting input 1305-5 selecting navigation option 1336. In some embodiments, selecting navigation option 1336 displays a map with specific instructions for navigating to the assigned seat based on the current location of John's device 1300. In some embodiments, selecting navigation option 1336 launches a map application for navigating to the assigned seat. In some embodiments, interface 1330 is a user interface of the live event application. In some embodiments, interface 1330 is not a user interface of the live event application.

Figure 13H:
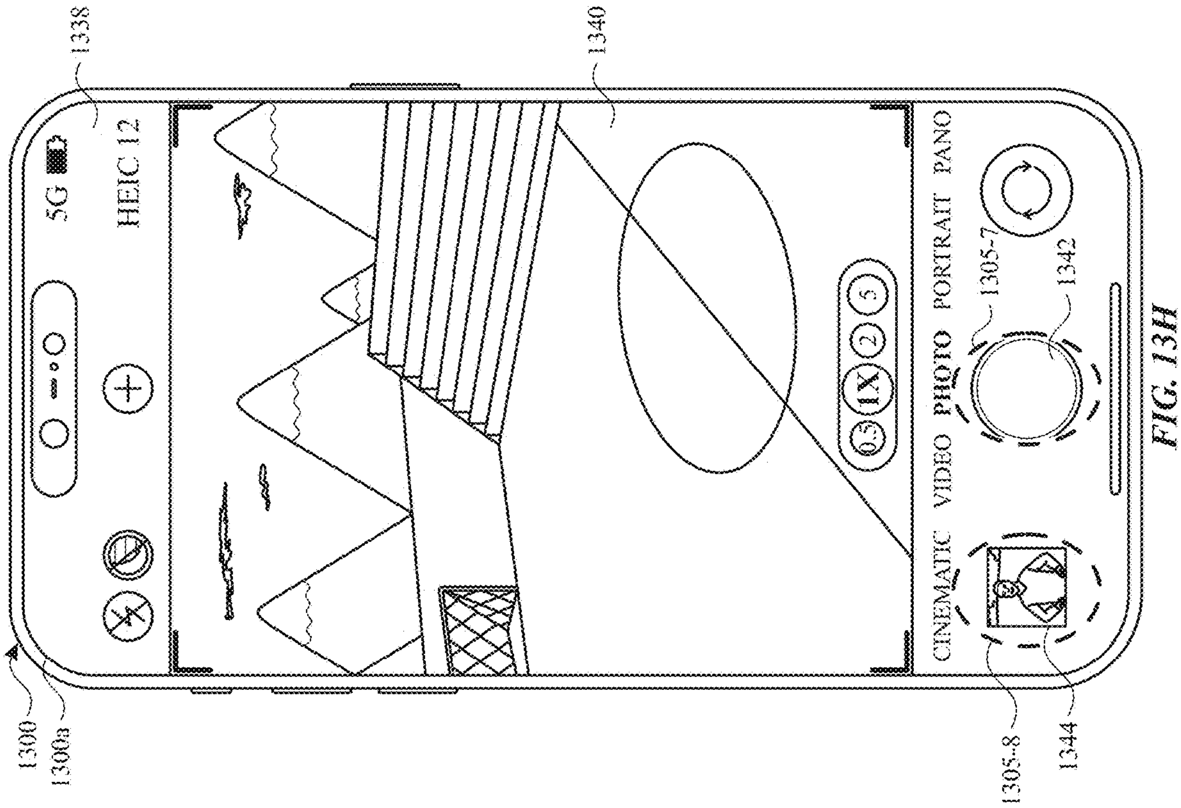
Figure 13G:
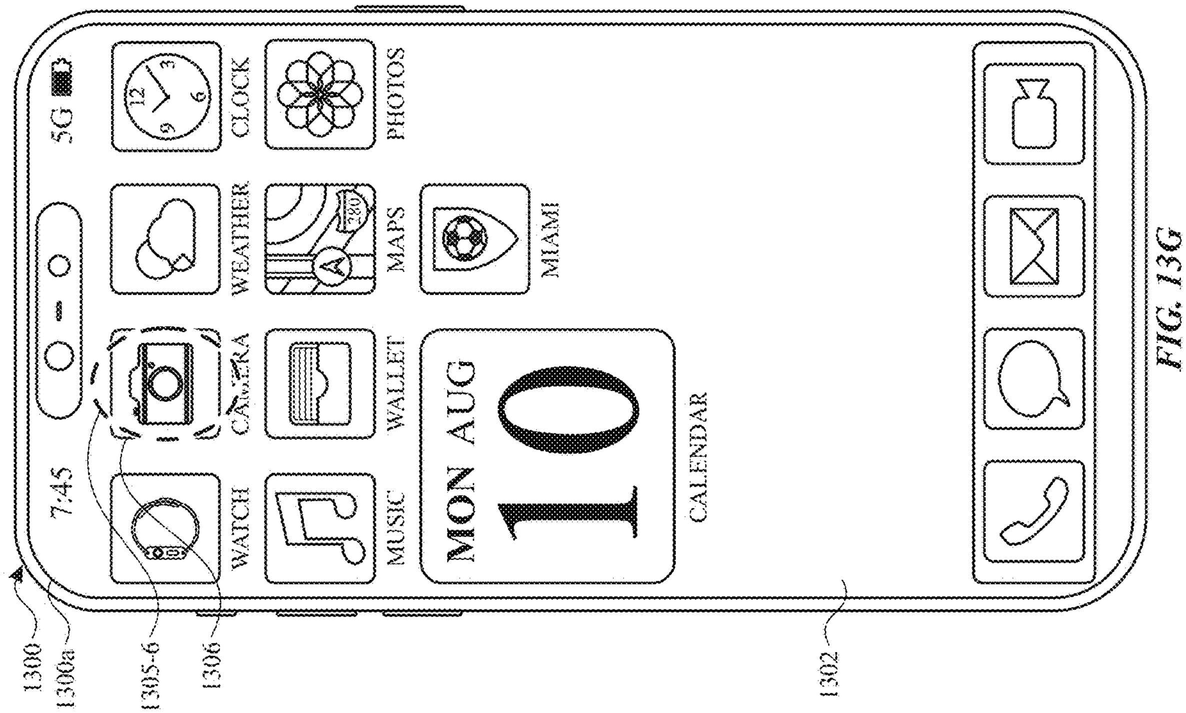

In some embodiments, John's device 1300 displays the digital ticket 1320 with information that is based on data captured using an application of John's device 1300 during the live event. For example, FIGS. 13G-13L depict example user interfaces for an embodiment in which John's device 1300 is used to take pictures at the soccer match, and the pictures are used to create a memory of the soccer match. In FIG. 13G, John's device 1300 detects input 1305-6 selecting camera application icon 1306 and, in response, John's device 1300 launches the camera application (e.g., corresponding to camera application icon 1306) and displays camera interface 1338 as shown in FIG. 13H. Camera interface 1338 includes camera preview region 1340 showing the current field-of-view of the camera, capture affordance 1342 for capturing a photo that includes the image data in camera preview region 1340, and camera roll element 1344. In response to detecting input 1305-7 selecting capture affordance 1342, John's device 1300 captures a photo using a camera of John's device (e.g., camera 1300*b*). In response to detecting input 1305-8 selecting camera roll element 1344, John's device 1300 displays photo library interface 1346, as shown in FIG. 13I. Photo library interface 1346 includes photos 1348, including photos captured at the soccer match. In some embodiments, photo library interface 1346 is a user interface of the photos application associated with photos application icon 1314.

Figure 13J:
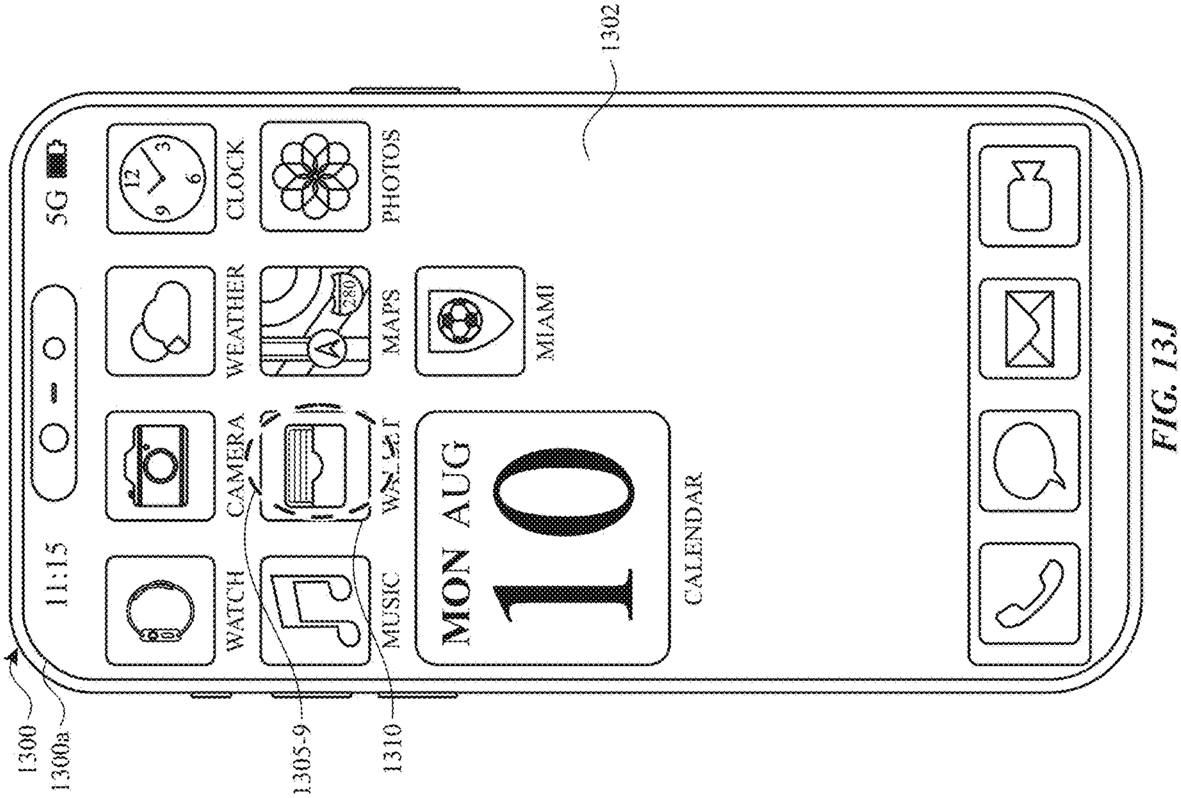
Figure 13I:
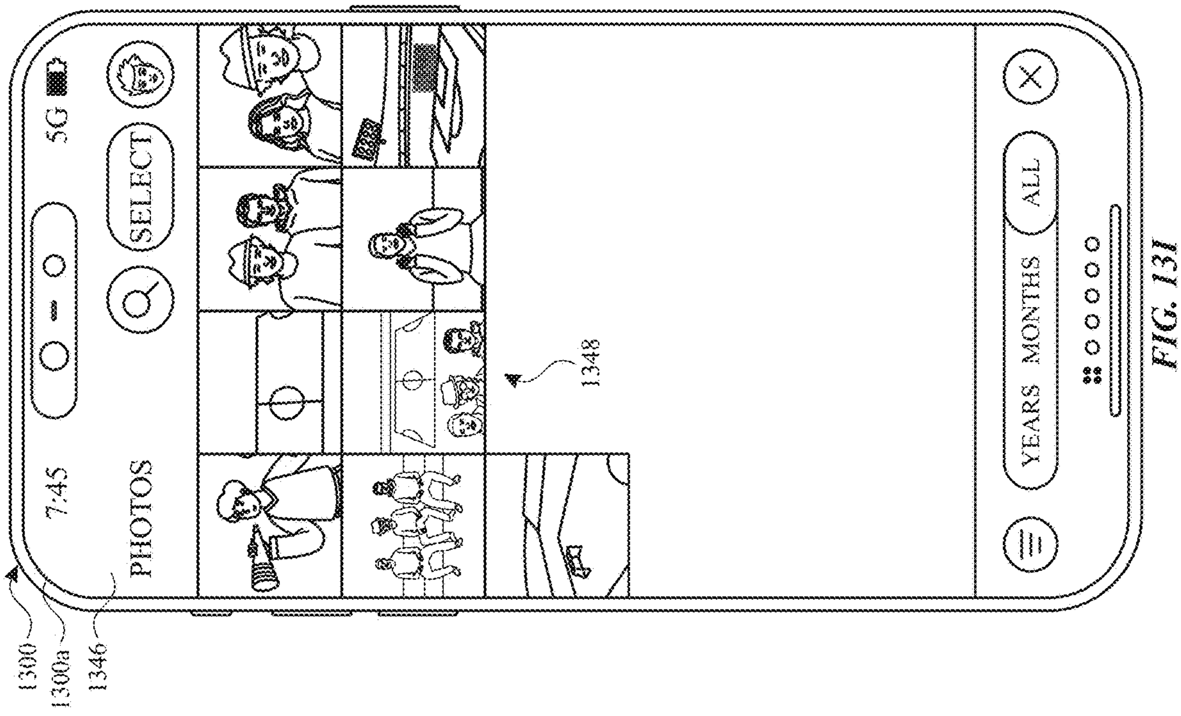
Figure 13K:
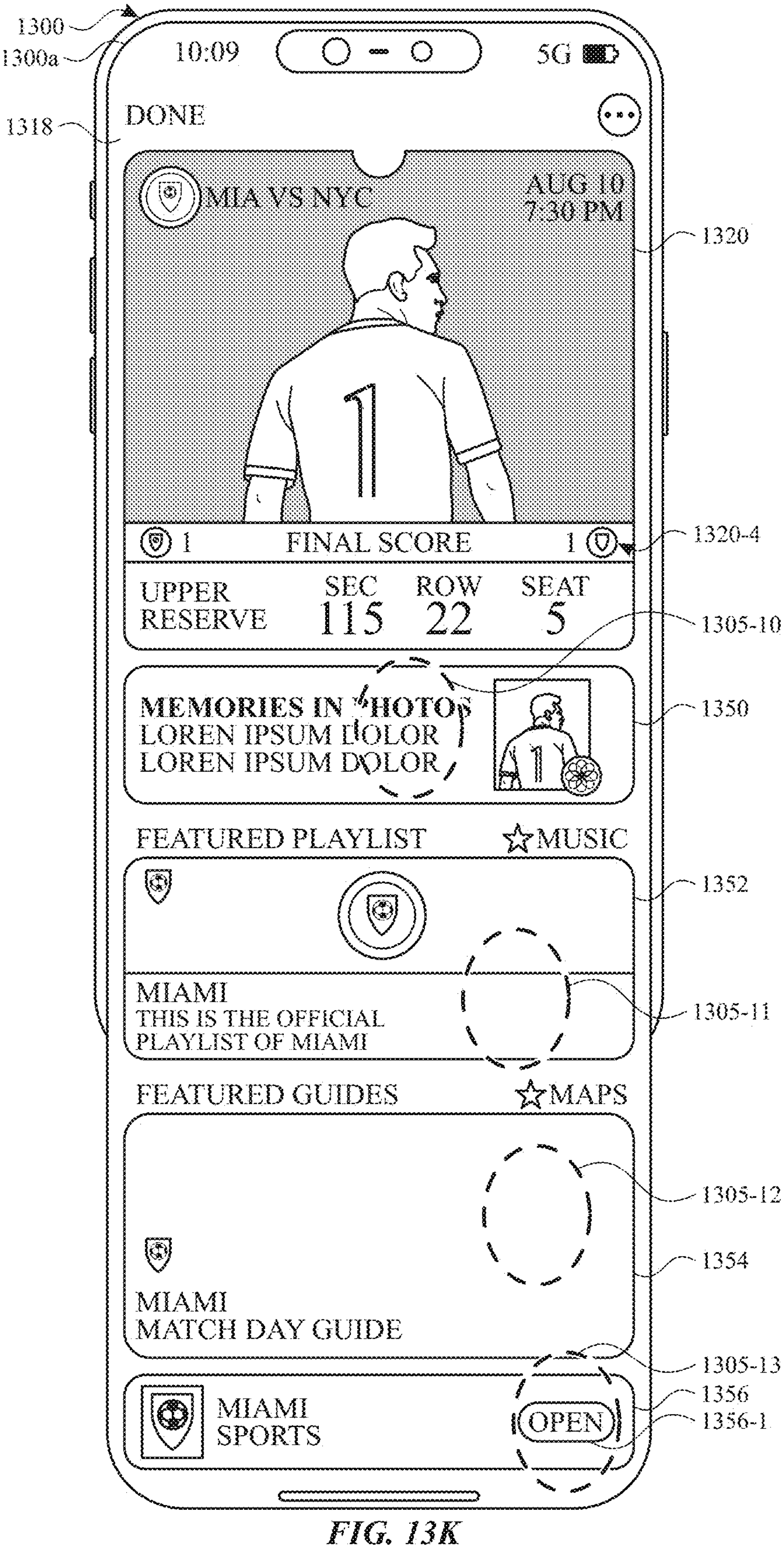

In FIG. 13J, the current time is 11:15 μm and the soccer match has ended. In response to detecting input 1305-9 selecting wallet application icon 1310, John's device 1300 displays wallet interface 1318, as shown in FIG. 13K. John's device 1300 displays digital ticket 1300 having an updated appearance that includes removing color 1321 from seat information region 1320-3 and updating scoring information 1320-4 to indicate the final score of the soccer match. John's device 1300 also displays other items in wallet interface 1318 that are based on information from the live event and, in some embodiments, based on information captured using an application of John's device 1300 during the live event. Examples of such items are described below with respect to FIGS. 13K-130. In some embodiments, items displayed in wallet interface 1318 are displayed concurrently with digital ticket 1320. In some embodiments, the items displayed in wallet interface 1318 are displayed in a different arrangement or order.

Figure 13M:
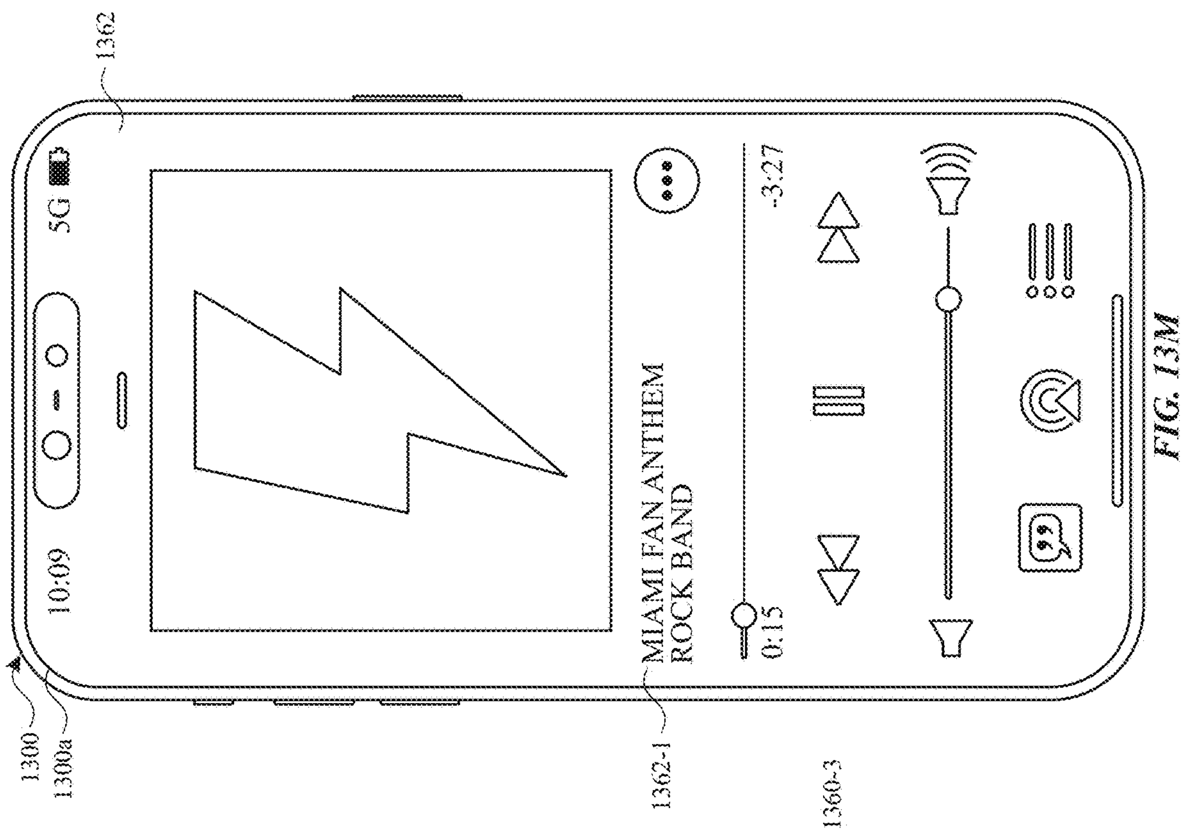
Figure 13L:
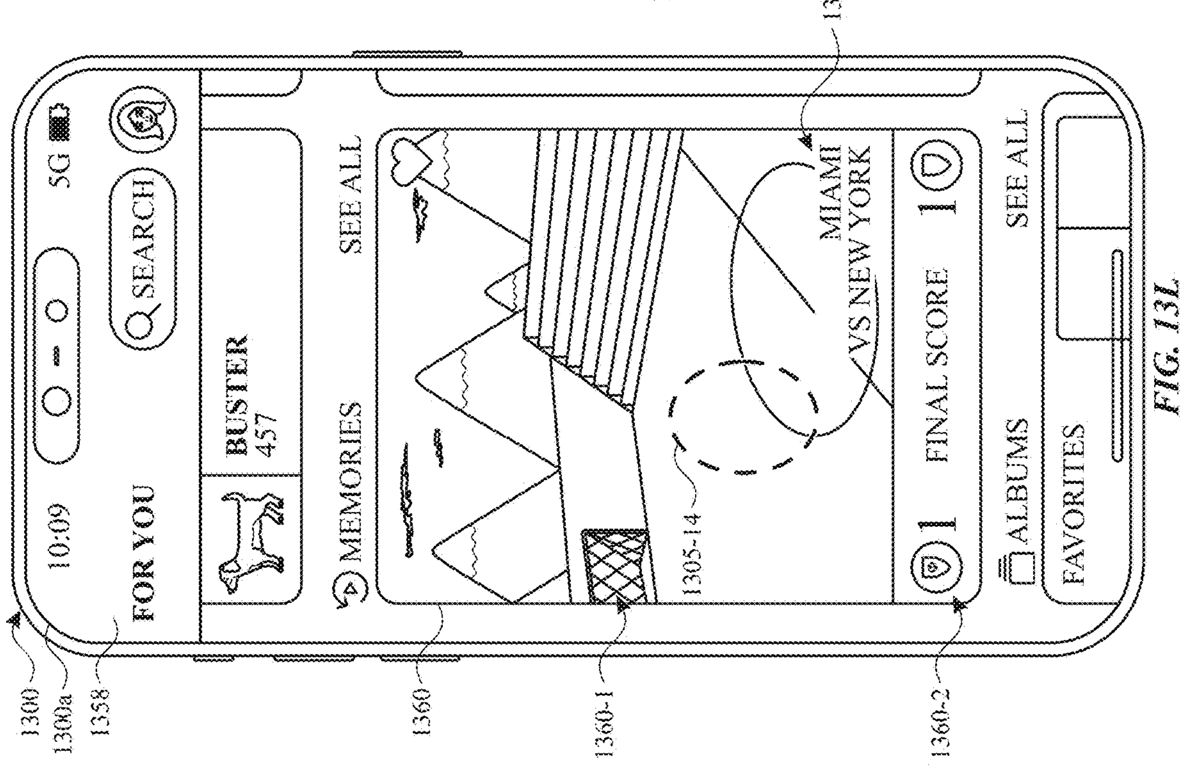

As previously mentioned, in some embodiments, John's device 1300 generates a memory of the live event using the photos application. In FIG. 13K, John's device 1300 displays memory item 1350, which is a representation of the memory created using the photos application. In some embodiments, memory item 1350 includes a preview of one or more photos in the memory and/or information from the live event. In response to detecting input 1305-10 selecting memory item 1350, John's device 1300 launches the photos application associated with photos application icon 1314 and displays interface 1358 as shown in FIG. 13L, which is a user interface of the photos application. Interface 1358 includes memory item 1360, which is a curated collection of photos (e.g., one or more of photos 1348) taken at the soccer match using the camera application associated with camera application icon 1306. Memory item 1360 includes photo preview 1360-1, which is a preview of one or more of the photos taken at the soccer match, and information from the live event including scoring information 1360-2 and team information 1360-3. In some embodiments, in response to detecting input 1305-14, John's device 1300 initiates playback of the memory, which includes displaying the curated collection of photos while optionally playing curated music for the memory. In some embodiments, while playing the memory, John's device 1300 concurrently displays the information from the live event such as, for example, scoring information 1360-2 and team information 1360-3. It should be appreciated that the information from the live event shown in FIG. 13L is an example of live event information and that other information can be included in addition to or in lieu of the live event information depicted in FIG. 13L.

In some embodiments, John's device 1300 generates a playlist for the live event using the music application associated with music application icon 1308. In FIG. 13K, John's device 1300 displays playlist item 1352, which is a representation of the music playlist created for playback using the music application. In some embodiments, playlist item 1352 includes a representation of one or more songs of the playlist and/or information from the live event. In response to detecting input 1305-11 selecting playlist item 1352, John's device 1300 launches the music application associated with music application icon 1308 and displays interface 1362 as shown in FIG. 13M, which is a user interface of the music application. In some embodiments, the music playlist is a collection of songs that are associated with the live event. For example, the songs can include music played at the stadium during the match, music associated with a respective player and/or team, or other songs selected for the playlist. In some embodiments, selecting playlist item 1352 begins playback of a song of the playlist using the music application such as, for example, song 1362-1 in FIG. 13M.

Figure 13O:
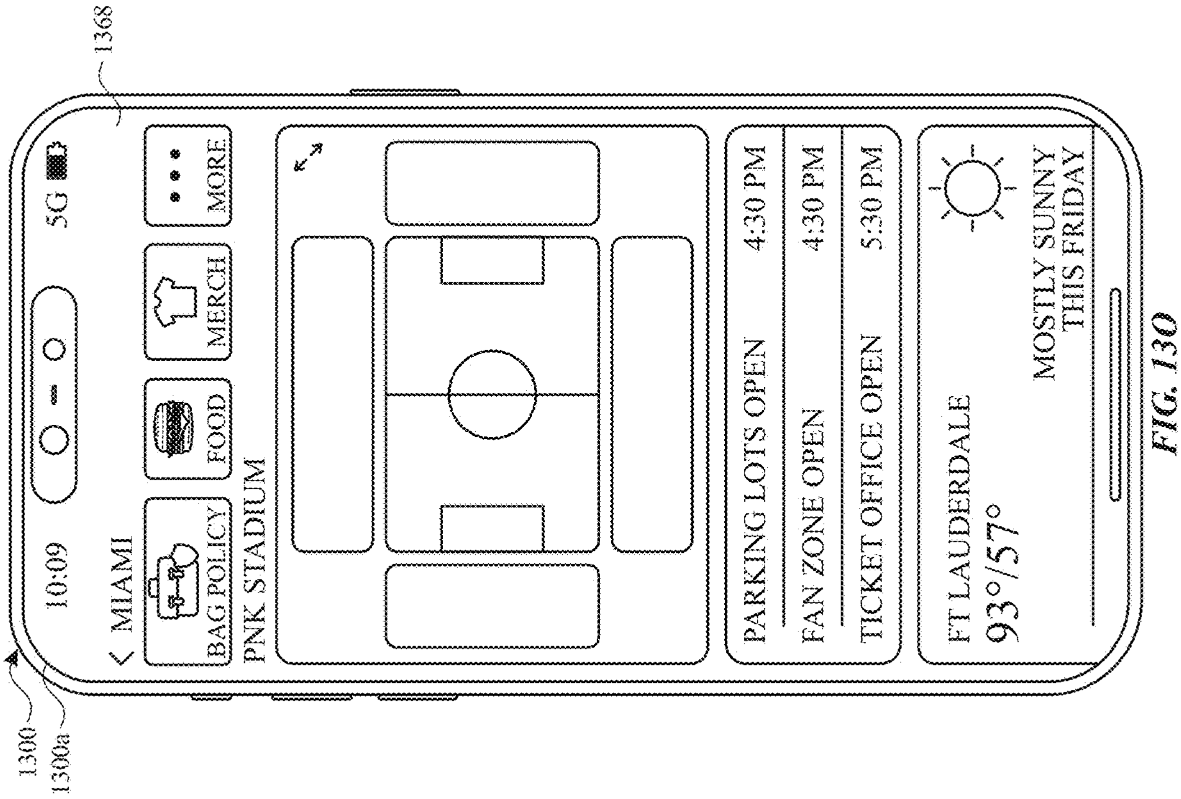
Figure 13N:
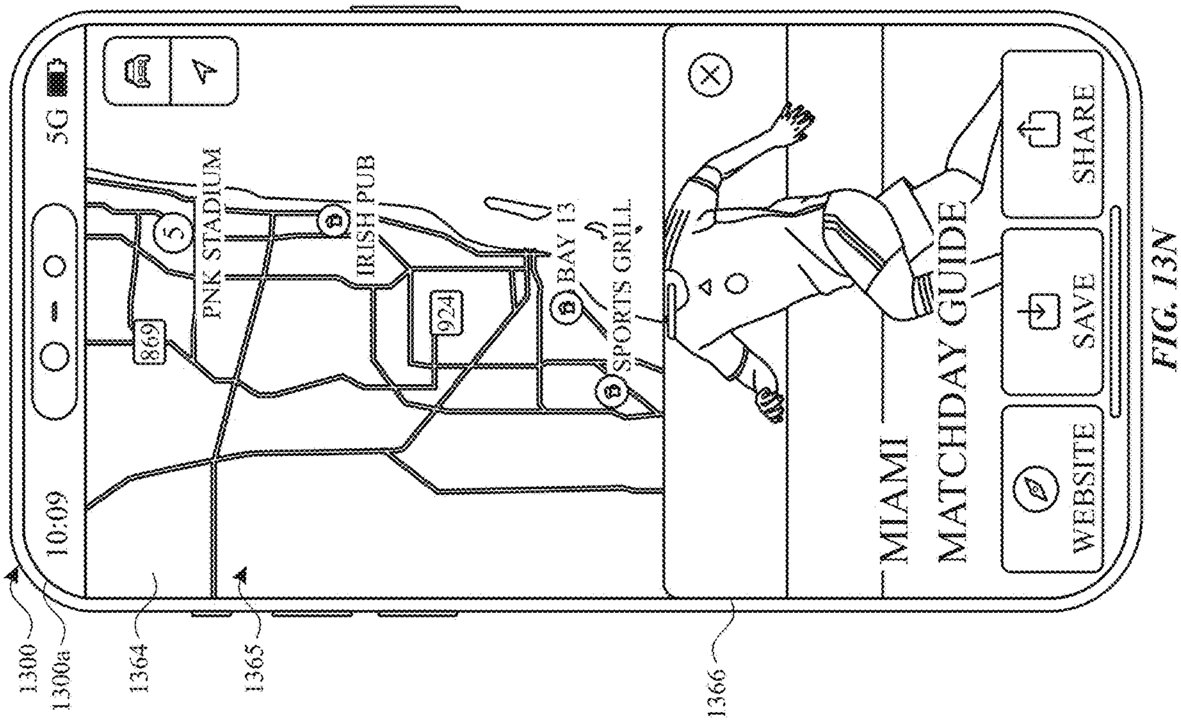

In some embodiments, John's device 1300 generates an event guide using the maps application associated with maps application icon 1312. In FIG. 13K, John's device 1300 displays event guide item 1354, which is a representation of an event guide for the live event. In some embodiments, event guide item 1354 includes information from the live event. In response to detecting input 1305-12 selecting event guide item 1354, John's device 1300 launches the maps application associated with maps application icon 1312 and displays interface 1364 as shown in FIG. 13N, which is a user interface of the maps application. Interface 1364 includes map 1365 of the area surrounding the live event and region 1366, which includes options that can be selected to access additional information for the live event. For example, region 1366 includes an option that can be selected to access a website for the live event, an option that can be selected to save the event guide, and an option that can be selected to share the event guide. In some embodiments, the event guide is an electronic resource that provides information for the live event and/or a city hosting the live event such as recommendations, places of interest, restaurants, hotels, shopping, and/or attractions.

In some embodiments, John's device 1300 generates an item that can be used to download or open the live event application associated with live event application icon 1316. In FIG. 13K, John's device 1300 displays live event item 1356, which includes element 1356-1 that can be selected to open the live event application or to download the live event application if the live event application is not downloaded to John's device 1300. In response to detecting input 1305-13 selecting live event item 1356 or element 1356-1, John's device 1300 launches the live event application and displays interface 1368 as shown in FIG. 13O. In some embodiments, the live event application provides information for the stadium or venue hosting the live event such as, for example, vendor information, a stadium map, parking information, local weather, timing information, and event policies and procedures.

FIG. 14 is a flow diagram illustrating a method for managing a digital pass, in accordance with some embodiments. Method 1400 is performed at a computer system (e.g., 100, 300, 500, 600, 1000, 1100, and/or 1300) (e.g., a smartphone, a wearable device (e.g., a smartwatch), a tablet computer, a desktop computer, a laptop computer, and/or a head-mounted device (e.g., a head-mounted augmented reality and/or extended reality device)) that is in communication with (e.g., includes and/or is connected to) one or more display generation components (e.g., 112, 340, 504, and/or 1300*a*) (e.g., a display controller, a touch-sensitive display system, a display screen, a monitor, a projector, a holographic display, and/or a head-mounted display system) and one or more input devices (e.g., 112, 350, 355, 508, 522, and/or 1300*a*) (e.g., a touch-sensitive surface, RF circuitry (e.g., 108), a near-field communication (NFC) reader, a keyboard, mouse, trackpad, one or more optical sensors for detecting a QR code, barcode, a gaze, and/or gestures, one or more capacitive sensors for detecting hover inputs, a microphone, and/or accelerometer/gyroscope/inertial measurement units). Some operations in method 1400 are, optionally, combined, the orders of some operations are, optionally, changed, and some operations are, optionally, omitted.

As described below, method 1400 provides an intuitive way for managing a digital pass. The method reduces the cognitive burden on a user for managing a digital pass, thereby creating a more efficient human-machine interface. For battery-operated computing devices, enabling a user to manage a digital pass faster and more efficiently conserves power and increases the time between battery charges.

At method 1400, the computer system (e.g., 1300) displays (1402), via the one or more display generation components (e.g., 1300*a*), a graphical representation (e.g., 1320) of a digital pass (e.g., an electronic ticket, credentials, and/or a digital access card) for a live event (e.g., a sporting event, a concert, and/or a live performance), wherein the digital pass is stored in an electronic wallet (e.g., 1310) of the computer system (e.g., the electronic wallet includes credentials for one or more accounts) (e.g., the graphical representation of the digital pass is displayed prior to the start of the live event). In some embodiments, the graphical representation of the digital pass includes information for the event such as assigned seating information (e.g., 1320-3), parking information (e.g., 1326), event times (e.g., 1320-1), team information (e.g., 1320-2), and venue information (e.g., 1322 and/or 1324).

The computer system (e.g., 1300) receives (1404), via the one or more input devices (e.g., 1300*a*), data corresponding to the digital pass (e.g., 1320) for the live event. In some embodiments, the data corresponding to the live event includes updated information for the live event such as scoring information for a sporting event, updated performance times for artists at a concert, and/or a countdown to intermission at a live performance. In some embodiments, the data corresponding to the live event includes data collected at the live event using an application available at the computer system such as a camera application (e.g., 1306), a photos application (e.g., 1314), a maps application (e.g., 1312), a music application (e.g., 1308), and/or an application designed for the live event (e.g., 1316).

After receiving the data corresponding to the digital pass (e.g., 1320) for the live event, the computer system (e.g., 1300) detects (1406), via the one or more input devices (e.g., 1300*a*), a request (e.g., 1305-3 and/or 1305-9) to display (e.g., redisplay) the graphical representation of the digital pass. In response to detecting the request to display the graphical representation of the digital pass, the computer system displays (1408), via the one or more display generation components (e.g., 1300*a*), the graphical representation of the digital pass having an updated appearance (e.g., based on the received data). Displaying the graphical representation of the digital pass having the updated appearance includes performing (e.g., conditionally performing) the following steps. In accordance with a determination that the received data includes updated information for the live event (e.g., scoring information for a sporting event, updated performance times for artists at a concert, and/or a countdown to intermission at a live performance), the computer system displays (1410) the graphical representation of the digital pass (e.g., 1320) including a representation of the updated information for the live event (e.g., 1320-3, 1320-4, and/or 1321) (e.g., a live, updated score for a sporting event, a final score at the end of a sporting event, updated performance times for artists at a concert, and/or a live countdown timer for intermission at a live performance). In accordance with a determination that the received data includes data collected at the live event using a respective application available at the computer system (e.g., a camera application (e.g., 1306), a photos application (e.g., 1314), a maps application (e.g., 1312), a music application (e.g., 1308), and/or an application designed for the live event (e.g., 1316)), the computer system displays (1412) an item (e.g., 1328, 1350, 1352, 1354, and/or 1356) associated with the live event (e.g., created or generated using data that was collected at the live event and, in some embodiments, using data that includes updated information from the live event) generated using the data collected at the live event using the respective application (e.g., a digital memory of the live event that includes photographs taken at the event, a recommended playlist based on information from the event such as artists performing at the live event, a digital city guide based on the location of the live event, a link to an application that is associated with the live event, a map of the venue for assisting the user with finding assigned seats). Displaying the graphical representation of the digital pass including the representation of the updated information for the live event provides feedback about the received data corresponding to the digital pass for the live event and reduces inputs at the computer system by automatically providing a representation of the updated information without requiring further user input. Displaying an item associated with the live event generated using the data collected at the live event using the respective application provides feedback about the received data corresponding to the digital pass for the live event and reduces inputs at the computer system by providing convenient access to the item without requiring further user input to create and/or locate the item.

In some embodiments, the item associated with the live event (e.g., 1328, 1350, 1352, 1354, and/or 1356) is generated using the updated information for the live event (e.g., the item is generated using both the updated information for the live event and the data collected at the live event using the respective application). In some embodiments, the item includes the updated information for the live event. For example, if the item is a memory (e.g., 1350 and/or 1360) created using the photos application (e.g., 1314), the memory includes photos (e.g., 1348) taken at the live event and a representation of the updated information from the live event (e.g., 1360-2 and/or 1360-3), such as a final score of a game.

In some embodiments, the updated information for the live event includes scoring information (e.g., 1320-4 and/or 1360-2) for a live sporting event (e.g., a current score of a game and/or a final score of a game). In some embodiments, displaying the graphical representation of the digital pass (e.g., 1320) including a representation of the updated information for the live event includes displaying the graphical representation of the digital pass having a representation of the scoring information for the live sporting event (e.g., a representation of the current score and/or a representation of a final score) (e.g., as depicted in FIG. 13E and/or FIG. 13K). Displaying the graphical representation of the digital pass having the representation of the scoring information for the live sporting event provides feedback about the received data corresponding to the digital pass for the live event and reduces inputs at the computer system by automatically providing scoring information without requiring further user input. In some embodiments, in accordance with a determination that the scoring information for the live sporting event includes a first score, the computer system displays the graphical representation of the digital pass having a representation of the first score; and in accordance with a determination that the scoring information for the live sporting event includes a second score different from the first score, the computer system displays the graphical representation of the digital pass having a representation of the second score (e.g., without displaying the representation of the first score).

In some embodiments, the item (e.g., 1350 and/or 1360) associated with the live event includes a collection of media items (e.g., 1348) captured at the live event (e.g., a curated collection of photographs and/or videos taken at the live event) (e.g., the data collected at the live event includes photographs and/or videos) (e.g., the respective application is a camera application and/or a photos application) and information (e.g., 1360-2 and/or 1360-3) associated with the live event (e.g., information from the event such as seating information, scoring information from the event, a representation of event participants (e.g., teams, artists, and/or performers), location information, venue information, and/or sponsorship information). Displaying the item associated with the live event having a collection of media items captured at the live event and information associated with the live event provides feedback about the received data corresponding to the digital pass for the live event and reduces inputs at the computer system by providing convenient access to the item without requiring further user input to create and/or locate the item. In some embodiments, in response to detecting a selection (e.g., 1305-10) of the item (e.g., 1350) associated with the live event, the computer system (e.g., 1300) launches a media application (e.g., a photos application (e.g., 1314)) and displays a media application user interface (e.g., 1358) that includes the collection of media items (e.g., 1360) captured at the live event (e.g., a curated collection of photographs (e.g., 1348) and/or videos taken at the live event) and a representation (e.g., 1360-2 and/or 1360-3) of the information associated with the live event (e.g., a representation of the seating information, scoring information, event participants (e.g., teams, artists, and/or performers), location information, venue information, and/or sponsorship information). Launching a media application and displaying the media application interface that includes the collection of media items captured at the live event and a representation of the information associated with the live event, in response to detecting a selection of the item associated with the live event, provides additional control options for accessing the collection of media items and information from the event without cluttering the user interface with additional displayed controls and reduces inputs at the computer system by providing convenient access to the collection of media items without requiring further user input to navigate to the collection of media items.

In some embodiments, the item associated with the live event includes a representation (e.g., 1352) of a music playlist (e.g., a curated collection of songs) associated with the live event (e.g., the data collected at the live event includes an indication of songs played at the live event and/or songs associated with participants of the live event) (e.g., the respective application is a music application). Displaying the item associated with the live event having a representation of a music playlist associated with the live event provides feedback about the received data corresponding to the digital pass for the live event and reduces inputs at the computer system by providing convenient access to the item without requiring further user input to create and/or locate the item. In some embodiments, in response to detecting a selection (e.g., 1350-11) of the item (e.g., 1352) associated with the live event, the computer system (e.g., 1300) launches a music application (e.g., 1308) and displays a music application user interface (e.g., 1362) that includes a representation (e.g., 1362-1) of one or more songs from the music playlist associated with the live event (e.g., displaying a music application interface with a listing of songs from the music playlist and/or playing one or more songs from the music playlist). Launching a music application and displaying the music application interface that includes a representation of one or more songs from the music playlist associated with the live event, in response to detecting a selection of the item associated with the live event, provides additional control options for accessing the songs from the music playlist without cluttering the user interface with additional displayed controls and reduces inputs at the computer system by providing convenient access to play the songs from the playlist without requiring further user input to navigate to the music application to play the songs.

In some embodiments, the item associated with the live event includes a representation of a city guide (e.g., 1354) (e.g., an electronic resource that provides information about a location such as recommendations, places of interest, restaurants, hotels, shopping, and/or attractions) for a location associated with the live event (e.g., a city hosting or near the live event). Displaying the item associated with the live event having a representation of a city guide for a location associated with the live event provides feedback about the received data corresponding to the digital pass for the live event and reduces inputs at the computer system by providing convenient access to the item without requiring further user input to create and/or locate the item. In some embodiments, the item is a city guide for a city hosting the live event. In some embodiments, in response to detecting a selection (e.g., 1305-12) of the item (e.g., 1354) associated with the live event, the computer system (e.g., 1300) launches a navigation application (e.g., a map application (e.g., 1312)) and displays a navigation application user interface (e.g., 1364) that includes a representation of a map (e.g., 1365) of the location associated with the live event (e.g., displaying a map application interface with a digital map of the city hosting or near the live event). Launching a navigation application and displaying the navigation application interface that includes a representation of a map of the location associated with the live event, in response to detecting a selection of the item associated with the live event, provides additional control options for accessing the map of the location associated with the live event without cluttering the user interface with additional displayed controls and reduces inputs at the computer system by providing convenient access to access the map without requiring further user input to navigate to the navigation application to access the map.

In some embodiments, as a part of displaying the graphical representation of the digital pass (e.g., 1320) including a representation of the updated information for the live event (e.g., 1320-3), the computer system (e.g., 1300) displays the graphical representation of the digital pass having an updated appearance (e.g., 1320 as depicted in FIG. 13E) that includes a color (e.g., 1321) (or, in some embodiments, an animal, name, or other moniker) that corresponds to a location (e.g., 1334) of assigned seats for the live event (e.g., the graphical representation of the digital pass is updated to include a color or other visual indicator that corresponds to a section and/or level in which seats that are assigned to the digital pass are located). Displaying the graphical representation of the digital pass having the updated appearance that include a color that corresponds to a location of assigned seats for the live event provides feedback about the location of the seats assigned to the digital pass and assists the user in locating their assigned seats. In some embodiments, the updated information for the live event includes information about the location of the assigned seats such as a color (or, in some embodiments, an animal, name, or other moniker) representing a section in which the assigned seats are located. In some embodiments, the graphical representation of the digital pass is updated to include the color (or, in some embodiments, a representation of the animal, name, or other moniker) representing the section in which the assigned seats are located. In some embodiments, the graphical representation of the digital pass is not updated to include the color until the user arrives at the event and/or until a start time of the event. In some embodiments, in accordance with a determination that the updated information for the live event includes a first color, the computer system displays the graphical representation of the digital pass having a representation of the first color; and in accordance with a determination that the updated information for the live event includes a second color different from the first color, the computer system displays the graphical representation of the digital pass having a representation of the second color (e.g., without displaying the representation of the first color).

In some embodiments, as a part of displaying the graphical representation of the digital pass (e.g., 1320) having the updated appearance, the computer system (e.g., 1300) displays a representation of an application (e.g., 1316) associated with the live event (e.g., 1356 and/or 1356-1) (e.g., an application designed for the live event), wherein the representation of the application associated with the live event is selectable (or, in some embodiments, includes an graphical user interface object (e.g., 1356-1) that is selectable) to access the application associated with the live event (e.g., 1316) (e.g., to open the application associated with the live event, and/or to access an application store to download the application associated with the live event). Displaying the representation of the digital pass including a representation of an application associated with the event that is selectable to access the application associated with the live event provides control options for accessing the application associated with the live event without cluttering the user interface with additional displayed controls.

In some embodiments, as a part of displaying the graphical representation of the digital pass (e.g., 1320) having the updated appearance, the computer system (e.g., 1300) includes displaying a graphical element (e.g., 1328) that is selectable to display a map (e.g., 1332) (e.g., a venue map) (in some embodiments, including launching a map application or an application associated with the live event) that includes instructions (e.g., directions) (or, in some embodiments, an option (e.g., 1336) for obtaining instructions) for navigating to a location (e.g., 1334) of assigned seats for the live event. Displaying the representation of the digital pass including a graphical element that is selectable to display a map that includes instructions for navigating to a location of assigned seats for the live event provides control options for accessing a map for locating assigned seats without cluttering the user interface with additional displayed controls. In some embodiments, the map is displayed using a map application (e.g., 1312) of the computer system. In some embodiments, the map is displayed using an application associated with the live event (e.g., 1316) (e.g., an application for the live event or for the venue hosting the live event).

Note that details of the processes described above with respect to method 1400 (e.g., FIG. 14) are also applicable in an analogous manner to the methods described above and/or below. For example, methods 800, 900, 1200, and/or 1600 optionally include one or more of the characteristics of the various methods described above with reference to method 1400. For example, the digital pass and related techniques for managing the digital pass described with respect to method 1400 can be implemented in a digital wallet of the devices described with respect to methods 800, 900, 1200, and/or 1600. For brevity, these details are not repeated below.

FIGS. 15A-15G illustrate exemplary user interfaces for managing a digital pass, in accordance with some embodiments. The user interfaces in these figures are used to illustrate the processes described below, including the processes in FIG. 16.

Figures 15A, 15B:
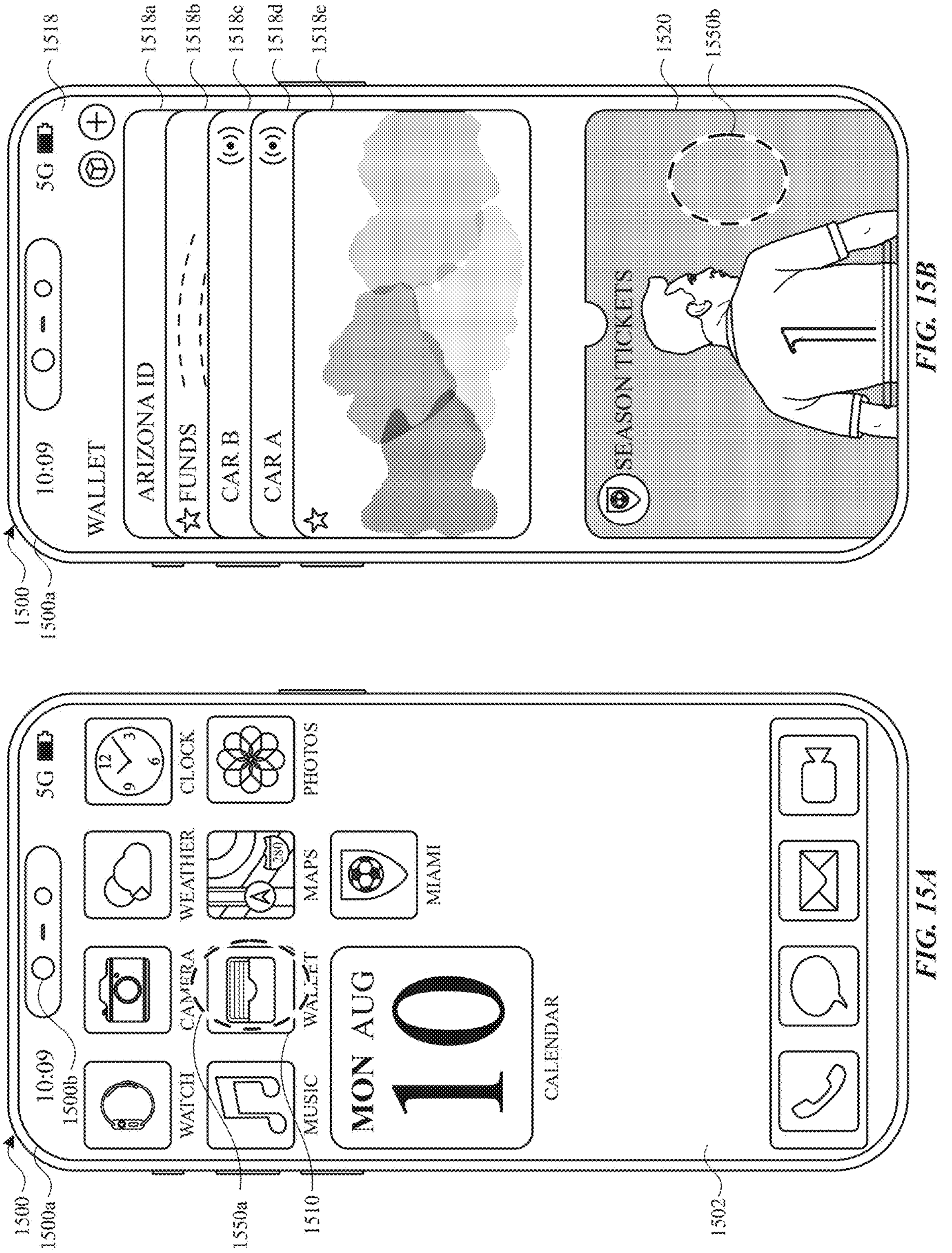
FIGS. 15A-15G illustrate exemplary user interfaces for managing a digital pass, in accordance with some embodiments.
Figure 16:
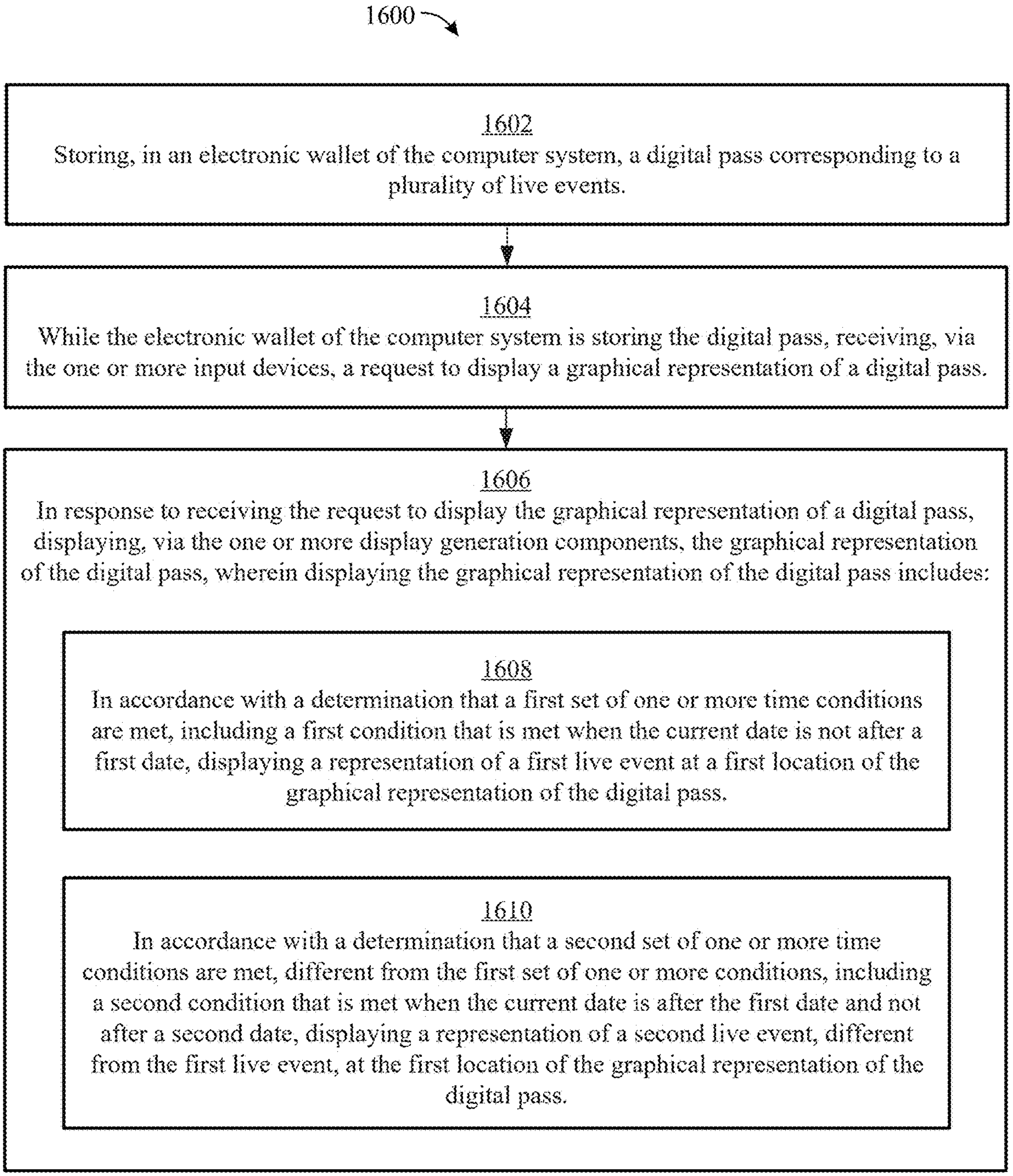
FIG. 16 is a flow diagram illustrating a method for managing a digital pass, in accordance with some embodiments.

FIG. 15A illustrates John's device 1500 (e.g., the same as or different from device 1300), which is a computer system that, in some embodiments, comprises touchscreen display 1500*a*, camera 1500*b*, and other hardware such as processors, memory, and other components for operating device 1500 such as near-field circuitry and physical button(s). John's device 1500 is depicted as a smartphone, however, it should be appreciated that the device can be a different type of computer system such as a desktop computer, tablet computer, smartwatch, laptop computer, or a head-mounted device. Furthermore, John's device 1500 can include other display components such as a projector or head-mounted display system. John's device 1500 also optionally includes other input components such as a microphone for detecting audio input and/or other sensors for detecting finger gestures, hand gestures, eye gaze, and/or other inputs. In some embodiments, John's device 1500 includes one or more elements of devices 100, 300, 500, 600, 700, 1000, and/or 1300.

At FIG. 15A, device 1500 displays, via display 1500*a*, home screen interface 1502, which includes various application icons corresponding to applications that are available at device 1500. The application icons can be selected to launch corresponding applications. As depicted in FIG. 15A, the application icons include a calendar application icon, a camera application icon, a music application icon, wallet application icon 1510, a maps application icon, a photos application icon, and a live event application icon. As described in greater detail above, the live event application icon corresponds to an application developed to provide information for a live sporting event. In some embodiments, the live event application can be developed for other events such as a concert, play, ballet, or other live event.

In FIG. 15A, device 1500 detects input 1550*a* (e.g., a tap input and/or an air gesture) selecting wallet application icon 1510 and, in response, displays wallet interface 1518, as depicted in FIG. 15B. Wallet interface 1518 includes (e.g., displays elements that correspond to) credentials for various accounts, which are stored at device 1500 (e.g., are provisioned onto device 1500, such as on a secure element of device 1500). In some embodiments, the credentials include identification cards (e.g., 1518*a*), payment account cards (e.g., 1518*b* and 1518*e*), vehicle key cards (e.g., 1518*c* and 1518*d*), and digital passes for events (e.g., 1520). In the embodiment depicted in FIG. 15B, wallet interface 1518 includes digital ticket 1520, which is a digital pass to one or more live sporting events. In some embodiments, digital ticket 1520 is a season pass to attend (e.g., gain access to a stadium of) live sports events for a particular team. In some embodiments, digital ticket 1520 includes information about the next upcoming live event, such as event date/time information and team information. In some embodiments, wallet interface 1518 can be scrolled to reveal additional content, including content of digital ticket 1520 and, in some embodiments, information for the next upcoming live event corresponding to the digital pass. In some embodiments, digital ticket 1520 can be selected to view additional information for the live events. In the embodiments depicted in FIGS. 15A-15G, the live events are soccer matches and information for the live events includes information that is specific to the various soccer matches. It should be appreciated, however, that soccer matches are merely one example of a live event and that the embodiments described herein can be implemented for other events and the information for the live events can include different information that corresponds to the other events (e.g., non-soccer and/or non-sports events). At FIG. 15B, device 1500 detects input 1550*b* (e.g., a tap input, an air gesture, and/or a cursor input) directed to digital ticket 1520.

Figure 15C:
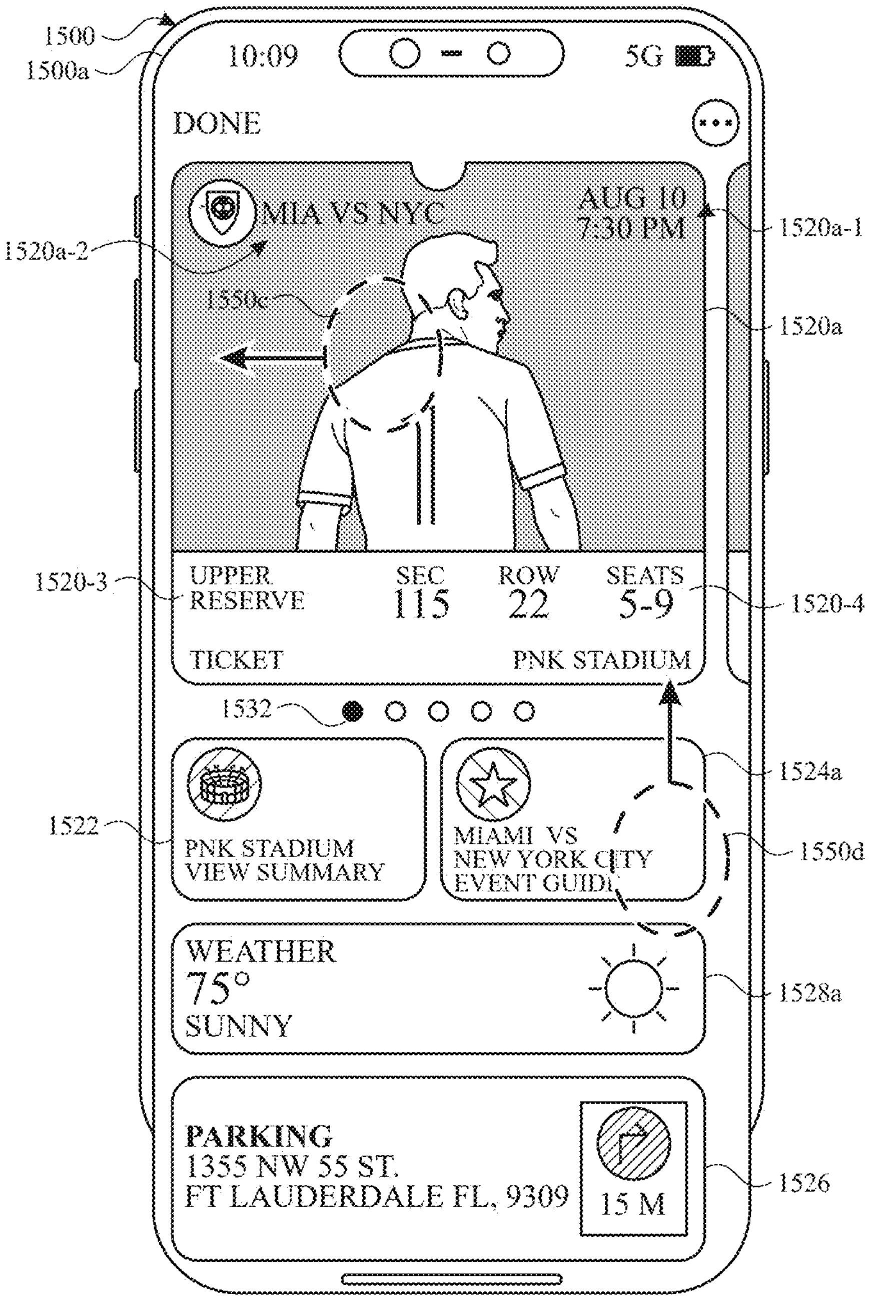
Figure 15D:
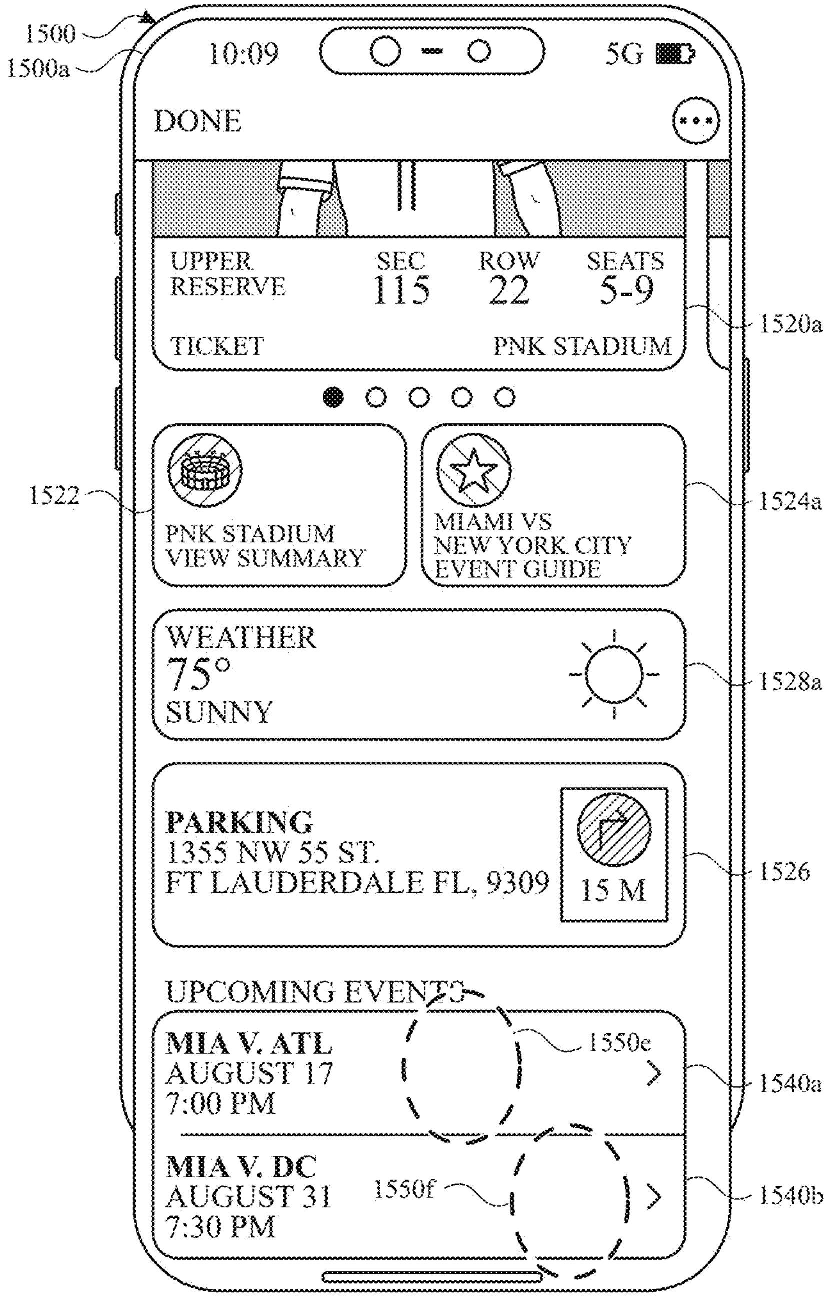
Figure 15E:
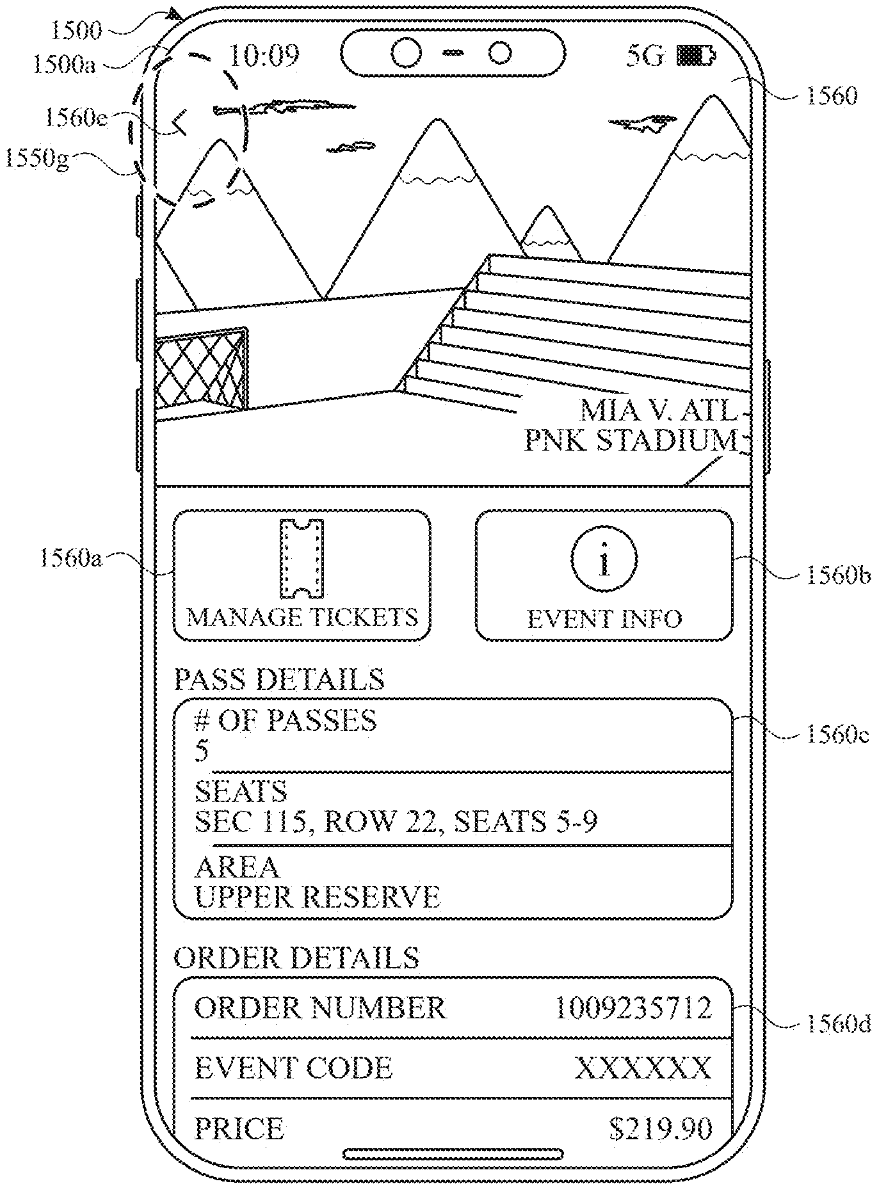
Figure 15F:
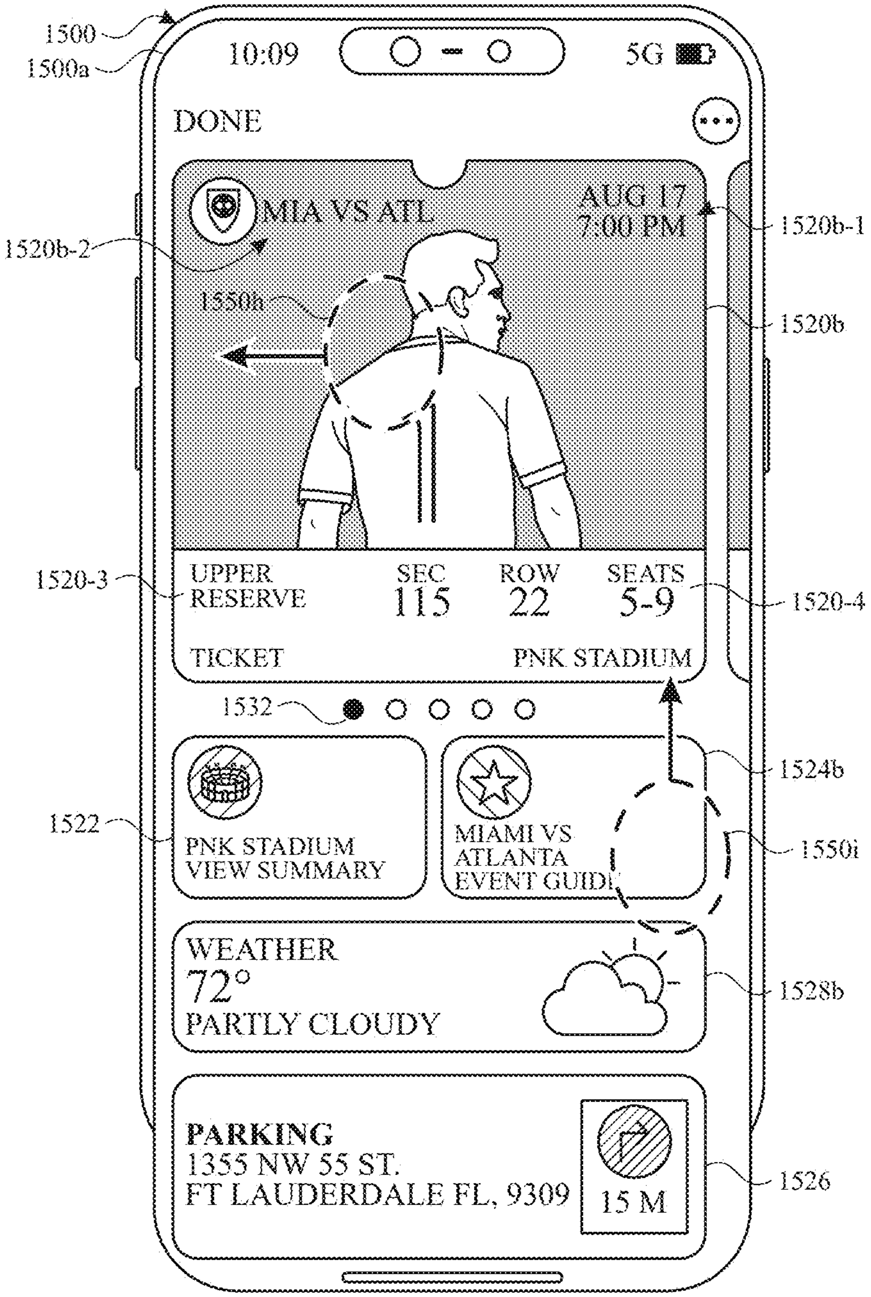

In response to detecting input 1550*b* directed to digital ticket 1520, device 1500 displays, via display 1500*a*, wallet interface 1530 (e.g., the same as or similar to 1318), either as shown at FIG. 15C or as shown at FIG. 15F. For example, in response to detecting input 1550*b* directed to digital ticket 1520 and in accordance with a determination that the current date is August 10 (e.g., at 10:09 am and therefore the MIA vs NYC game has not started), device 1500 displays wallet interface 1530, as shown in FIG. 15C, with indication 1520*a* of digital ticket 1520 indicating that the next upcoming live event is "MIA vs NYC" on August 10 at 7:30 μm. For another example, in response to detecting input 1550*b* directed to digital ticket 1520 and in accordance with a determination that the current date is August 15 (e.g., and therefore the MIA vs NYC game has completed), device 1500 displays wallet interface 1530, as shown in FIG. 15F, with indication 1520*b* of digital ticket 1520 indicating that the next upcoming live event is "MIA vs ATL" on August 17 at 7:00 pm. Notably, indication 1520*a* of digital ticket 1520 and indication 1520*b* of digital ticket 1520 are displayed at the same location within wallet interface 1530 and optionally differ in appearance. In some embodiments, device 1500 is configured to provide (e.g., via short-range communication radio and/or NFC) credentials to a terminal (e.g., a contactless terminal and/or a remote device) of one or more digital tickets (provisioned onto device 1500) for an event (e.g., for entry into the event) (e.g., based on the currently selected (and/or displayed) digital ticket).

Turning back to FIG. 15C, wallet interface 1530 includes additional information for the live event (e.g., MIA vs NYC), such as stadium information element 1522 (e.g., indicating a location of the event), event guide element 1524*a* (e.g., indicating performance information about the event), parking information element 1526 (e.g., including parking options, address, and/or directions for the live event), and weather element 1528*a* (e.g., indicating the expected weather at the day, time, and location of the live event). As shown in FIG. 15C, wallet interface 1530 includes seating information region 1520-3, which includes information about the assigned seating associated with the digital ticket. In the embodiment depicted in FIG. 15C, indication 1520*a* of digital ticket 1520 includes seating 1520-4 in section 115, row 22, seats 5-9, which is located in the upper reserve area of PNK stadium (e.g., as indicated by 1520-3).

As indicated by the five paging dots 1532, digital ticket 1520 includes credentials for multiple (e.g., five) different entries (different people to entry) for the MIA vs NYC live event. In some embodiments, in response to detecting input 1550*c* (e.g., a swipe input and/or a swipe air gesture) at FIG. 15C directed to indication 1520*a* of digital ticket 1520, device 1500 replaces indication 1520*a* with a different indication corresponding to a digital pass (e.g., that is also provisioned onto device 1500) for the same event (e.g., different tickets for different seats for the same live event).

In some embodiments, elements of wallet interface 1530 can be selected to display additional information about the event (e.g., MIA vs NYC) and, in some embodiments, to launch an application associated with the element. For example, in response to detecting selection of stadium information element 1522, device 1500 displays additional information for the stadium hosting the live event (e.g., MIA vs NYC) such as, for example, vendor information, a stadium map, parking information, local weather, timing information, and event policies and procedures. In some embodiments, the additional information for the stadium is provided by the live event application associated with the live event application icon and selecting stadium information element 1522 causes device 1500 to launch the live event application. In some embodiments, when event guide element 1524*a* is selected, device 1500 displays additional information about the live event (e.g., MIA vs NYC) such as, for example, rosters, player profiles, sponsorship information, vendor information, game information, map information, and city information. In some embodiments, parking information element 1526, when selected, displays additional information for parking such as, for example, parking lot opening/closing times, parking lot maps, and parking costs. In some embodiments, in response to detecting selection of the additional parking information, device 1500 displays a map for navigating to a parking location. Thus, the information displayed as part of wallet interface 1530 reflects the next live event for which the digital pass is valid.

At FIG. 15C, device 1500 detects input 1550*d* (e.g., a swipe input and/or an air gesture). In response to detecting input 1550*d*, device 1500 scrolls wallet interface 1530 upwards to display additional information (e.g., 1540*a* and/or 1540*b*), as shown in FIG. 15D. At FIG. 15D, device 1500 displays first upcoming event 1540*a* and second upcoming event 1540*b*. In some embodiments, first upcoming event 1540*a* and second upcoming event 1540*b* are for upcoming events for which digital ticket 1520 is valid. In some embodiments, first upcoming event 1540*a* and second upcoming event 1540*b* are displayed concurrently with indication 1520*a*. At FIG. 15D, device 1500 detects an input (e.g., 1550*e* and/or 1550*f*). In response to detecting the input and in accordance with a determination that the input (e.g., 1550*e*) is directed to first upcoming event 1540*a*, device 1500 displays additional information 1560 about the first upcoming event, as shown in FIG. 15E (e.g., without displaying additional information about the second upcoming event). In response to detecting the input and in accordance with a determination that the input (e.g., 1550*f*) is directed to second upcoming event 1540*b*, device 1500 displays additional information about the second upcoming event (e.g., without displaying additional information about the first upcoming event).

At FIG. 15E, device 1500 displays additional information 1560 about the first upcoming event, including manage option 1560*a* for managing the ticket(s) for the first upcoming event (e.g., to resell the tickets, to cancel the tickets, and/or to upgrade the tickets), event information option 1560*b* for access information about the first upcoming event (e.g., parking information for the first upcoming event, pass details 1560*c* for the first upcoming event, and order details 1560*d* (e.g., including an order number, an event code, and/or a price for the tickets). At FIG. 15E, device 1500 detects input 1550*g* (e.g., a tap input and/or an air gesture) directed to back option 1560*e* and, in response, returns to displaying wallet interface 1530 as shown in FIGS. 15C and/or 15D.

Turning back to FIG. 15F, wallet interface 1530 includes indication 1520*b* corresponding to the live event (e.g., MIA vs ATL) along with additional information for the live event, such as stadium information element 1522 (e.g., indicating a location of the event), event guide element 1524*b* (e.g., indicating performance information about the event), parking information element 1526 (e.g., including parking options, address, and/or directions for the live event), and weather element 1528*b* (e.g., indicating the expected weather at the day, time, and location of the live event, which is different from weather element 1528*a*). As shown, some information of wallet interface 1530 at FIG. 15F differs from wallet interface 1530 at FIG. 15C. For example, opponents 1520*a*-2 and 1520*b*-2 are different for the two different events. For another example, date and time 1520*a*-1 and 1520*b*-2 are different for the two different events. As shown in FIG. 15F, wallet interface 1530 includes seating information region 1520-3, which includes information about the assigned seating associated with the digital ticket.

As indicated by the five paging dots 1532 at FIG. 15F, digital ticket 1520 includes credentials for five different entries for the MIA vs ATL live event. In some embodiments, different live events have different number of credentials/permissible entries. In some embodiments, in response to detecting input 1550*h* (e.g., a swipe input and/or a swipe air gesture) at FIG. 15F directed to indication 1520*b* of digital ticket 1520, device 1500 replaces indication 1520*b* with a different indication corresponding to a digital pass (e.g., that is also provisioned onto device 1500) for the same event (e.g., different tickets for different seats for the same live event).

In some embodiments, elements of wallet interface 1530 can be selected to display additional information and, in some embodiments, to launch an application associated with the element. For example, in response to detecting selection of stadium information element 1522, device 1500 displays additional information for the stadium hosting the live event (e.g., MIA vs ATL) such as, for example, vendor information, a stadium map, parking information, local weather, timing information, and event policies and procedures. In some embodiments, the additional information for the stadium is provided by the live event application associated with the live event application icon and selecting stadium information element 1522 causes device 1500 to launch the live event application. In some embodiments, when event guide element 1524*a* is selected, device 1500 displays additional information about the live event (e.g., MIA vs ATL) such as, for example, rosters, player profiles, sponsorship information, vendor information, game information, map information, and city information. In some embodiments, parking information element 1526, when selected, displays additional information for parking such as, for example, parking lot opening/closing times, parking lot maps, and parking costs. In some embodiments, in response to detecting selection of the additional parking information, device 1500 displays a map for navigating to a parking location. Thus, the information displayed as part of wallet interface 1530 reflects the next live event for which the digital pass is valid.

Figure 15G:
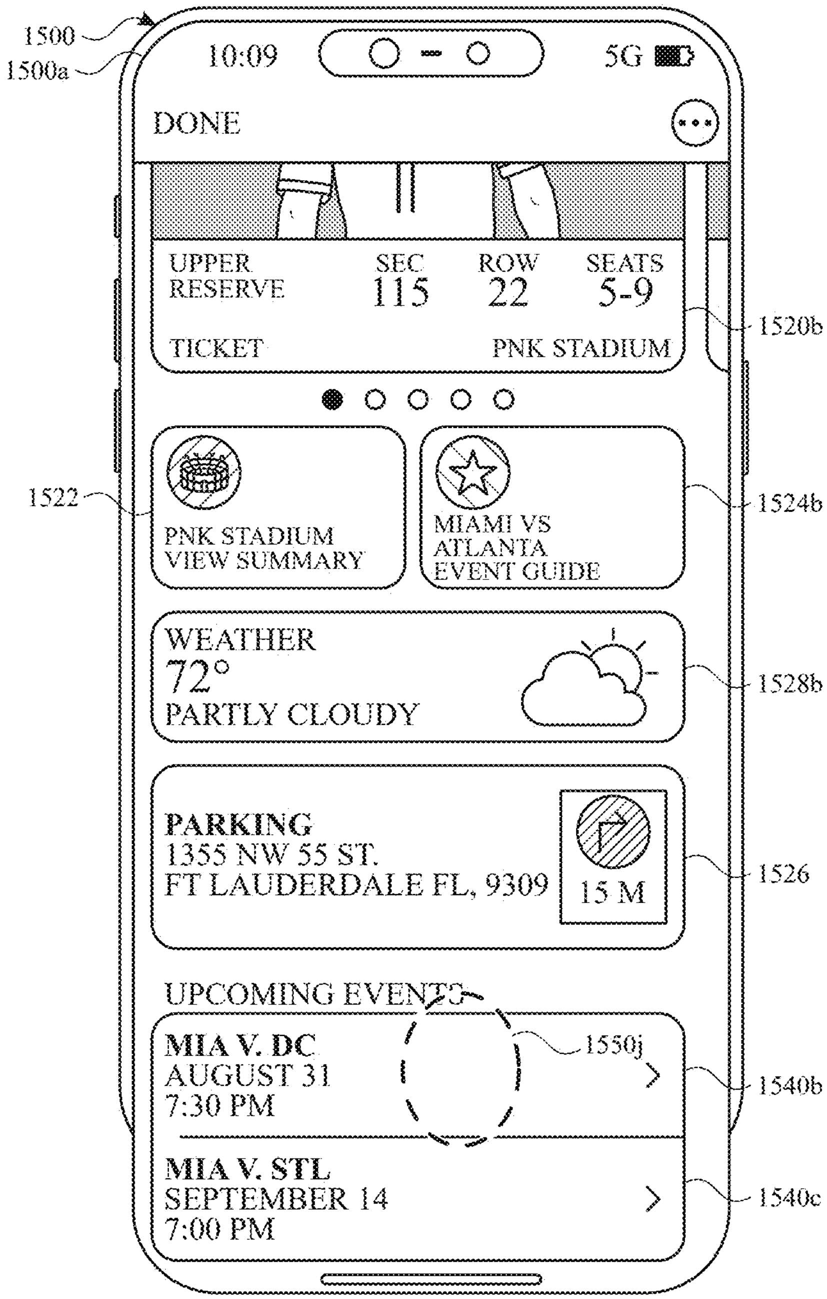

At FIG. 15F, device 1500 detects input 1550*i* (e.g., a swipe input and/or an air gesture). In response to detecting input 1550*i*, device 1500 scrolls wallet interface 1530 upwards to display additional information (e.g., 1540*b* and/or 1540*c*), as shown in FIG. 15G. At FIG. 15G, device 1500 displays second upcoming event 1540*b* and third upcoming event 1540*c*. In some embodiments, second upcoming event 1540*b* and third upcoming event 1540*c* are for upcoming events for which digital ticket 1520 is valid. In some embodiments, second upcoming event 1540*b* and third upcoming event 1540*c* are displayed concurrently with indication 1520*a*. At FIG. 15G, device 1500 detects an input (e.g., 1550*j*). In response to detecting the input and in accordance with a determination that the input (e.g., 1550*j*) is directed to second upcoming event 1540*b*, device 1500 displays additional information about the second upcoming event (e.g., without displaying additional information about the third upcoming event). In response to detecting the input and in accordance with a determination that the input is directed to third upcoming event 1540*c*, device 1500 displays additional information about the third upcoming event (e.g., without displaying additional information about the second upcoming event).

FIG. 16 is a flow diagram illustrating a method for managing a digital pass using a computer system, in accordance with some embodiments. Method 1600 is performed at a computer system (e.g., 100, 300, 500, 1300, and/or 1500) (e.g., a smartphone, a wearable device (e.g., a smartwatch), a tablet computer, a desktop computer, a laptop computer, and/or a head-mounted device (e.g., a head-mounted augmented reality and/or extended reality device)) that is in communication with (e.g., includes and/or is connected to) one or more display generation components (e.g., display 1500*a*) (e.g., a display controller, a touch-sensitive display system, a display screen, a monitor, a projector, a holographic display, and/or a head-mounted display system) and one or more input devices (e.g., touch-sensitive surface of 1500*a*) (e.g., a touch-sensitive surface, RF circuitry (e.g., 108), a near-field communication (NFC) reader, a keyboard, mouse, trackpad, one or more optical sensors for detecting a QR code, barcode, a gaze, and/or gestures, one or more capacitive sensors for detecting hover inputs, a microphone, and/or accelerometer/gyroscope/inertial measurement units). Some operations in method 1600 are, optionally, combined, the orders of some operations are, optionally, changed, and some operations are, optionally, omitted.

As described below, method 1600 provides an intuitive way for managing a digital pass. The method reduces the cognitive burden on a user for accessing and/or managing a digital pass, thereby creating a more efficient human-machine interface. For battery-operated computing devices, enabling a user to access and/or manage a digital pass faster and more efficiently conserves power and increases the time between battery charges.

The computer system (e.g., 1500) stores (1602) (e.g., based on a provisioning process), in an electronic wallet of the computer system (e.g., the electronic wallet includes credentials for one or more accounts, such as loyalty accounts, transit accounts, and/or payment accounts), a digital pass (e.g., corresponding to 1520) (e.g., one or more electronic tickets, an electronic season pass, credentials, and/or a digital access card) corresponding to a plurality of live events (e.g., sporting events, concerts, and/or live performances).

While the electronic wallet of the computer system (e.g., 1500) is storing the digital pass, the computer system (e.g., 1500) receives (1604), via the one or more input devices, a request (e.g., 1550*b* at FIG. 15B) (e.g., user input, touch input, a gesture, and/or a wireless signal) to display a graphical representation of a digital pass.

In response to receiving the request (e.g., 1550*b* at FIG. 15B) to display the graphical representation of a digital pass, the computer system (e.g., 1500) displays (1606), via the one or more display generation components (e.g., 1500*a*), the graphical representation (e.g., 1520*a* and/or 1520*b*) of the digital pass, wherein displaying the graphical representation of the digital pass includes: in accordance with a determination that a first set of one or more time conditions are met (e.g., that a first live event that is part of the digital pass has not started yet, has not occurred yet, and/or has not completed yet), including a first condition that is met when the current date is not after a first date (e.g., the current date is on or before the date of the first live event), displaying (1608) a representation (e.g., 1520*a* at FIGS. 15C-15D) of a first live event (e.g., credentials for entering the first live event) at a first location of the graphical representation (e.g., 1530 at FIGS. 15C-15D) of the digital pass (e.g., based on the graphical representation of the digital pass being displayed prior to the start and/or end of the first live event); and in accordance with a determination that a second set of one or more time conditions are met (e.g., that the first live event that is part of the digital pass has completed and a second live event that is part of the digital pass has not started yet, has not occurred yet, and/or has not completed yet), different from the first set of one or more conditions, including a second condition that is met when the current date is after the first date (e.g., after the date of the first live event) and not after a second date (e.g., the current date is on or before the date of the second live event), displaying (1610) a representation (e.g., 1520*b* at FIGS. 15F-15G) of a second live event (e.g., credentials for entering the second live event), different from the first live event, at the first location of the graphical representation (e.g., 1530 at FIGS. 15F-15G) of the digital pass (e.g., based on the graphical representation of the digital pass being displayed after the first live event and before the start and/or end of the second live event). Updating the graphical representation of the digital pass to display representations of different live events based on the current date provides the user with quick access to digital pass for the next upcoming live event of the plurality of live events and provides the user with visual feedback about the next live event, thereby providing improved visual feedback.

In some embodiments, the digital pass (e.g., represented by 1530) corresponds to (e.g., represents) a ticket (e.g., an entry ticket) for live events (e.g., sporting events, concerts, and/or live performances) of a series of live events (e.g., the digital pass is a season pass, such as for a sporting team and/or a live performance). Updating the graphical representation of the digital pass to display representations of different live events based on the current date provides the user with quick access to digital pass for the next upcoming live event of the plurality of live events and provides the user with visual feedback about the next live event, thereby providing improved visual feedback.

In some embodiments, prior to storing the digital pass (e.g., represented by 1530), the computer system (e.g., 1500) receives, via the one or more input devices, a request to provision, onto the electronic wallet of the computer system (e.g., 1500), a digital pass for a single live event (e.g., of one event of the plurality of live events and/or excluding some events of the plurality of live events). In some embodiments, storing the digital pass corresponding to the plurality of live events is in response to receiving the request to provision the digital pass for the singe live event. Provisioning digital pass information for a plurality of live events when a user requests to provision a digital pass corresponding to a single event of the plurality of live events enables the computer system to provide the user with information about (and access to) additional live events, thereby improving the man-machine interface.

In some embodiments, in response to receiving the request (e.g., 1550*b* at FIG. 15B) to display the graphical representation of the digital pass, the computer system (e.g., 1500) displays, via the one or more display generation components (e.g., 1500*a*), event information, including: in accordance with a determination that the first set of one or more time conditions are met (e.g., that a first live event that is part of the digital pass has not started yet, has not occurred yet, and/or has not completed yet), displaying, concurrently with the representation (e.g., 1520*a*) of the first live event, first information (e.g., seat information, section information, event address information) about the first live event; and in accordance with a determination that the second set of one or more time conditions are met (e.g., that the first live event that is part of the digital pass has completed and a second live event that is part of the digital pass has not started yet, has not occurred yet, and/or has not completed yet), displaying, concurrently with the representation (e.g., 1520*b*) of the second live event (e.g., credentials for entering the second live event), second information (e.g., seat information, section information, event address information) about the second live event, wherein the first information and the second information are the same information (e.g., the seat location/information is the same for both the first live event and the second live event and/or the venue parking information is the same for both the first live event and the second live event). Maintaining some information in the digital pass for different live events provides the user with visual feedback that the various live events are part of a single season pass, thereby providing the user with improved visual feedback.

In some embodiments, in response to receiving the request (e.g., 1550*b* at FIG. 15B) to display the graphical representation of the digital pass, the computer system (e.g., 1500) displays, via the one or more display generation components (1500*a*), event parking information (e.g., 1526 at FIGS. 15C and 15F), including: in accordance with a determination that the first set of one or more time conditions are met (e.g., that a first live event that is part of the digital pass has not started yet, has not occurred yet, and/or has not completed yet), displaying, concurrently with the representation of the first live event, first parking information (e.g., 1526 at FIG. 15C) (e.g., parking privileges, parking lot location, and/or parking directions) for the first live event (e.g., without displaying the second parking information); and in accordance with a determination that the second set of one or more time conditions are met (e.g., that the first live event that is part of the digital pass has completed and a second live event that is part of the digital pass has not started yet, has not occurred yet, and/or has not completed yet), displaying, concurrently with the representation of the second live event (e.g., credentials for entering the second live event), second parking information (e.g., 1526 at FIG. 15F) (e.g., parking privileges, parking lot location, and/or parking directions), different from the first parking information, for the second live event (e.g., without displaying the first parking information). Updating parking information based on which live event is the next upcoming event provides the user with visual feedback about the parking for the upcoming event, thereby providing improved visual feedback, and reduces the number of inputs required to access parking information for the next upcoming event.

In some embodiments, in response to receiving the request (e.g., 1550*b* at FIG. 15B) to display the graphical representation of the digital pass, the computer system (e.g., 1500) displays, via the one or more display generation components, event time information (e.g., 1520*a*-1 and 1520*b*-1), including: in accordance with a determination that the first set of one or more time conditions are met (e.g., that a first live event that is part of the digital pass has not started yet, has not occurred yet, and/or has not completed yet), displaying, concurrently with the representation of the first live event, first date (e.g., the day on which the first live event starts) information (e.g., 1520*a*-1) and/or first time information (e.g., 1520*a*-1) (e.g., the start time and/or the end time) for the first live event (e.g., without displaying the second date information and/or the second time information); and in accordance with a determination that the second set of one or more time conditions are met (e.g., that the first live event that is part of the digital pass has completed and a second live event that is part of the digital pass has not started yet, has not occurred yet, and/or has not completed yet), displaying, concurrently with the representation of the second live event (e.g., credentials for entering the second live event), second date (e.g., the day on which the second live event starts) information (e.g., 1520*b*-1, different from the first date information, and/or second time information (e.g., 1520*b*-1 (e.g., the start time and/or the end time), different from the first time information, for the second live event (e.g., without displaying the first date information and/or the first time information). Updating date and time information based on which live event is the next upcoming event provides the user with visual feedback about the date/time for the upcoming event, thereby providing improved visual feedback, and reduces the number of inputs required to access date/time information for the next upcoming event.

In some embodiments, in response to receiving the request (e.g., 1550*b* at FIG. 15B) to display the graphical representation of the digital pass, the computer system (e.g., 1500) displays, via the one or more display generation components (1500*a*), event participant information, including: in accordance with a determination that the first set of one or more time conditions are met (e.g., that a first live event that is part of the digital pass has not started yet, has not occurred yet, and/or has not completed yet), displaying, concurrently with the representation of the first live event, first event participant information (e.g., 1520*a*-2) (e.g., sport participants, sport opponent, performing artist information, and/or performance type) for the first live event (e.g., without displaying the second event participant information); and in accordance with a determination that the second set of one or more time conditions are met (e.g., that the first live event that is part of the digital pass has completed and a second live event that is part of the digital pass has not started yet, has not occurred yet, and/or has not completed yet), displaying, concurrently with the representation of the second live event (e.g., credentials for entering the second live event), second event participant information (e.g., 1520*b*-2) (e.g., sport participants, sport opponent, performing artist information, and/or performance type), different from the first event participant information, for the second live event (e.g., without displaying the first event participant information). Updating participant information based on which live event is the next upcoming event provides the user with visual feedback about the participants for the upcoming event, thereby providing improved visual feedback, and reduces the number of inputs required to access participant information for the next upcoming event.

In some embodiments, in response to receiving the request (e.g., 1550*b* at FIG. 15B) to display the graphical representation of the digital pass, the computer system (e.g., 1500) displays, via the one or more display generation components, weather information, including: in accordance with a determination that the first set of one or more time conditions are met (e.g., that a first live event that is part of the digital pass has not started yet, has not occurred yet, and/or has not completed yet), displaying, concurrently with the representation of the first live event, first weather information (e.g., 1528*a*) (e.g., predicted weather for the time of the first live event) corresponding to the first live event (e.g., without displaying the second weather information); and in accordance with a determination that the second set of one or more time conditions are met (e.g., that the first live event that is part of the digital pass has completed and a second live event that is part of the digital pass has not started yet, has not occurred yet, and/or has not completed yet), displaying, concurrently with the representation of the second live event (e.g., credentials for entering the second live event), second weather information (e.g., 1528*b*) (e.g., predicted weather for the time of the second live event), different from the second weather information, for the second live event (e.g., without displaying the first weather information). Updating weather information based on a date/location of the live event that is the next upcoming event provides the user with visual feedback about the weather for the upcoming event, thereby providing improved visual feedback, and reduces the number of inputs required to access weather information for the next upcoming event.

In some embodiments, in response to receiving the request (e.g., 1550*b* at FIG. 15B) to display the graphical representation of the digital pass, the computer system (e.g., 1500) displays, via the one or more display generation components, event guide information, including: in accordance with a determination that the first set of one or more time conditions are met (e.g., that a first live event that is part of the digital pass has not started yet, has not occurred yet, and/or has not completed yet), displaying, concurrently with the representation of the first live event, first event guide information (e.g., 1524*a*) (e.g., city guide for a location associated with the first live event and/or information about the venue of the first live event) corresponding to the first live event (e.g., without displaying the second event guide information); and in accordance with a determination that the second set of one or more time conditions are met (e.g., that the first live event that is part of the digital pass has completed and a second live event that is part of the digital pass has not started yet, has not occurred yet, and/or has not completed yet), displaying, concurrently with the representation of the second live event (e.g., credentials for entering the second live event), second event guide information (e.g., 1524*b*) (e.g., city guide for a location associated with the second live event and/or information about the venue of the second live event) corresponding to the second live event (e.g., without displaying the first event guide information). Updating event guide information based on which live event is the next upcoming event provides the user with visual feedback about the location/venue for the upcoming event, thereby providing improved visual feedback, and reduces the number of inputs required to access event guide information for the next upcoming event.

In some embodiments, displaying the graphical representation of the digital pass includes: in accordance with a determination that a third set of one or more time conditions are met, including a third condition that is met when there are no remaining live events, of the plurality of live events, set to start after the current date (e.g., that all events that are part of the digital pass have completed), displaying a representation of a ticket placeholder (e.g., that are not credentials for entering any live event) at the first location of the graphical representation of the digital pass. In some embodiments, in accordance with a determination that tickets for the plurality of live events have not yet loaded (e.g., are being downloaded from a server), the computer system displays a representation of a ticket placeholder (e.g., indicating that credentials have not finished loading) at the first location of the graphical representation of the digital pass. Displaying a placeholder ticket provides the user with visual feedback that there are no further live events for the current digital pass, thereby providing improved visual feedback.

In some embodiments, in response to receiving the request (e.g., 1550*b* at FIG. 15B) to display the graphical representation of the digital pass, the computer system (e.g., 1500) displays, via the one or more display generation components (e.g., 1500*a*), upcoming event information, including: in accordance with a determination that the first set of one or more time conditions are met (e.g., that a first live event that is part of the digital pass has not started yet, has not occurred yet, and/or has not completed yet), displaying in a first area (e.g., of the user interface and/or in an upcoming event area of the user interface) an indication (e.g., 1540*a* and 1540*b* at FIG. 15D) that the second live event and a third live event, different from the first live event, are upcoming events (e.g., of the plurality of live events, after the first live event); and in accordance with a determination that the second set of one or more time conditions are met (e.g., that the first live event that is part of the digital pass has completed and a second live event that is part of the digital pass has not started yet, has not occurred yet, and/or has not completed yet), displaying in the first area (e.g., of the user interface and/or in the upcoming event area of the user interface) an indication (e.g., 1540*b* at FIG. 15G) that the third live event is an upcoming event (e.g., of the plurality of live events) without displaying an indication in the first area that the second live event (and/or the first live event) is an upcoming event. Displaying information about upcoming events that are beyond the next event provides the user with visual feedback that the digital pass corresponds to multiple events and what those events are, thereby providing improved visual feedback.

Note that details of the processes described above with respect to method 1600 (e.g., FIG. 16) are also applicable in an analogous manner to the methods described above. For example, method 1600 optionally includes one or more of the characteristics of the various methods described above. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the management of account user interfaces. The present disclosure contemplates that in some instances, this gathered data may include personal information data that uniquely identifies or can be used to contact or locate a specific person. Such personal information data can include demographic data, location-based data, telephone numbers, email addresses, social network IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to identify a sender or recipient of account resources being transferred between resource accounts. Accordingly, use of such personal information data enables users to have calculated control of the delivered user identification information. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of account transfers, the present technology can be configured to allow users to select to "opt in" or "opt out" of participation in the collection of personal information data during registration for services or anytime thereafter. In another example, users can select not to provide personally identifiable information for the resource transfer process. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, other identifying information can be used for the resource transfer such as a pseudonym or company name based on non-personal information data or a bare minimum amount of personal information, such as the content being requested by the device associated with a user, other non-personal information available to the computer system, or publicly available information.

What is claimed is:

1. A computer system configured to communicate with one or more display generation components and one or more input devices, comprising:

one or more processors; and memory storing one or more programs configured to be executed by the one or more processors, the one or more programs including instructions for:

while displaying a resource transfer interface that includes a resource transfer amount and user identification information for a first party of a resource transfer, receiving, via the one or more input devices, a first set of one or more inputs that includes a selection of one or more user identification options for the first party;

in response to receiving the first set of one or more inputs:

in accordance with a determination that the first set of one or more inputs corresponds to selection of a first set of user identification options for the first party of the resource transfer, initiating a process to perform the resource transfer, wherein the resource transfer includes transmitting user identification information for the first party with a first set of identification information that is based on the selected first set of user identification options for the first party of the resource transfer, wherein the first set of identification information includes first identification information; and in accordance with a determination that the first set of one or more inputs corresponds to selection of a second set of user identification options, different from the first set of user identification options, for the first party of the resource transfer, initiating a process to perform the resource transfer, wherein the resource transfer includes transmitting user identification information for the first party with a second set of identification information that is based on the selected second set of user identification options for the first party of the resource transfer, without including the first identification information; and in accordance with a determination that a first set of criteria is satisfied, wherein the first set of criteria includes a placement criterion that is satisfied when the computer system has a respective placement relative to an external computer system, performing the resource transfer, including:

in accordance with a determination that the first set of user identification options have been selected for the first party of the resource transfer, performing the resource transfer and transmitting the user identification information for the first party with the first set of identification information that is based on the selected first set of user identification options and includes the first identification information; and in accordance with a determination that the second set of user identification options have been selected for the first party of the resource transfer, performing the resource transfer and transmitting the user identification information for the first party with the second set of identification information that is based on the selected second set of user identification options and does not include the first identification information.

2. The computer system of claim 1, wherein the resource transfer is a transfer of media items between a first resource account associated with the computer system and a second resource account associated with an external computer system.

3. The computer system of claim 1, wherein the resource transfer is a transfer of funds between a first resource account associated with the computer system and a second resource account associated with an external computer system.

4. The computer system of claim 1, wherein the resource transfer is a process for transmitting resources to a second party, and displaying the resource transfer interface includes:

displaying, via the one or more display generation components, a representation of the user identification information for the first party having an initial set of sender identification information.

5. The computer system of claim 4, wherein the first set of one or more inputs is received while displaying the resource transfer interface including the representation of the user identification information for the first party having the initial set of sender identification information, and wherein the first set of one or more inputs includes a selection of the representation of the user identification information having the initial set of sender identification information, the one or more programs further including instructions for:

in response to detecting the selection of the representation of the user identification information having the initial set of sender identification information, displaying, via the one or more display generation components, the user identification options for the first party.

6. The computer system of claim 1, wherein the resource transfer is a process for receiving resources from a second party, and displaying the resource transfer interface includes:

displaying, via the one or more display generation components, a representation of the user identification information for the first party having an initial set of recipient identification information.

7. The computer system of claim 6, wherein the first set of one or more inputs is received while displaying the resource transfer interface including the representation of the user identification information for the first party having the initial set of recipient identification information, and wherein the first set of one or more inputs includes a selection of the representation of the user identification information having the initial set of recipient identification information, the one or more programs further including instructions for:

in response to detecting the selection of the representation of the user identification information having the initial set of recipient identification information, displaying, via the one or more display generation components, the user identification options for the first party.

8. The computer system of claim 1, wherein performing the resource transfer includes accepting a transfer of resources, the one or more programs further including instructions for:

as a part of the process for accepting the transfer of resources, displaying, via the one or more display generation components, a representation of accepted transfer details including a resource transfer amount and user identification information for a sender of the resources.

9. The computer system of claim 1, wherein performing the resource transfer includes accepting a transfer of resources, the one or more programs further including instructions for:

after determining that the placement criterion is satisfied, and prior to performing the resource transfer, displaying, via the one or more display generation components:

a first element that is selectable to accept a request to perform the resource transfer; and a second element that is selectable to decline a request to perform the resource transfer.

10. The computer system of claim 1, wherein performing the resource transfer includes transferring resources to an external computer system, the one or more programs further including instructions for:

as a part of the process for transferring the resources, displaying, via the one or more display generation components, a representation of accepted transfer details including a resource transfer amount and user identification information for a recipient of the resources.

11. The computer system of claim 1, wherein performing the resource transfer includes:

while the resource transfer process is in progress:

receiving, via the one or more input devices, data indicating a status of the resource transfer process; and in response to receiving the data indicating a status of the resource transfer process, displaying, via the one or more display generation components, a representation of the status of the resource transfer process and a representation of the resource transfer amount.

12. The computer system of claim 1, the one or more programs further including instructions for:

prior to receiving the first set of one or more inputs that includes a selection of one or more user identification options for the first party:

in accordance with a determination that account relationship criteria are satisfied between a first account for receiving the resource transfer and a second account for sending the resource transfer, performing the resource transfer without prompting the first account to approve the resource transfer.

13. The computer system of claim 12, wherein performing the resource transfer without prompting the first account to approve the resource transfer includes performing the resource transfer and transmitting user identification information for the first party without displaying the one or more user identification options for the first party for selection.

14. A non-transitory computer-readable storage medium storing one or more programs configured to be executed by one or more processors of a computer system that is in communication with one or more display generation components and one or more input devices, the one or more programs including instructions for:

while displaying a resource transfer interface that includes a resource transfer amount and user identification information for a first party of a resource transfer, receiving, via the one or more input devices, a first set of one or more inputs that includes a selection of one or more user identification options for the first party;

in response to receiving the first set of one or more inputs:

in accordance with a determination that the first set of one or more inputs corresponds to selection of a first set of user identification options for the first party of the resource transfer, initiating a process to perform the resource transfer, wherein the resource transfer includes transmitting user identification information for the first party with a first set of identification information that is based on the selected first set of user identification options for the first party of the resource transfer, wherein the first set of identification information includes first identification information; and in accordance with a determination that the first set of one or more inputs corresponds to selection of a second set of user identification options, different from the first set of user identification options, for the first party of the resource transfer, initiating a process to perform the resource transfer, wherein the resource transfer includes transmitting user identification information for the first party with a second set of identification information that is based on the selected second set of user identification options for the first party of the resource transfer, without including the first identification information; and in accordance with a determination that a first set of criteria is satisfied, wherein the first set of criteria includes a placement criterion that is satisfied when the computer system has a respective placement relative to an external computer system, performing the resource transfer, including:

in accordance with a determination that the first set of user identification options have been selected for the first party of the resource transfer, performing the resource transfer and transmitting the user identification information for the first party with the first set of identification information that is based on the selected first set of user identification options and includes the first identification information; and in accordance with a determination that the second set of user identification options have been selected for the first party of the resource transfer, performing the resource transfer and transmitting the user identification information for the first party with the second set of identification information that is based on the selected second set of user identification options and does not include the first identification information.

15. The non-transitory computer-readable storage medium of claim 14, wherein the resource transfer is a transfer of media items between a first resource account associated with the computer system and a second resource account associated with an external computer system.

16. The non-transitory computer-readable storage medium of claim 14, wherein the resource transfer is a transfer of funds between a first resource account associated with the computer system and a second resource account associated with an external computer system.

17. The non-transitory computer-readable storage medium of claim 14, wherein the resource transfer is a process for transmitting resources to a second party, and displaying the resource transfer interface includes:

displaying, via the one or more display generation components, a representation of the user identification information for the first party having an initial set of sender identification information.

18. The non-transitory computer-readable storage medium of claim 17, wherein the first set of one or more inputs is received while displaying the resource transfer interface including the representation of the user identification information for the first party having the initial set of sender identification information, and wherein the first set of one or more inputs includes a selection of the representation of the user identification information having the initial set of sender identification information, the one or more programs further including instructions for:

in response to detecting the selection of the representation of the user identification information having the initial set of sender identification information, displaying, via the one or more display generation components, the user identification options for the first party.

19. The non-transitory computer-readable storage medium of claim 14, wherein the resource transfer is a process for receiving resources from a second party, and displaying the resource transfer interface includes:

displaying, via the one or more display generation components, a representation of the user identification information for the first party having an initial set of recipient identification information.

20. The non-transitory computer-readable storage medium of claim 19, wherein the first set of one or more inputs is received while displaying the resource transfer interface including the representation of the user identification information for the first party having the initial set of recipient identification information, and wherein the first set of one or more inputs includes a selection of the representation of the user identification information having the initial set of recipient identification information, the one or more programs further including instructions for:

in response to detecting the selection of the representation of the user identification information having the initial set of recipient identification information, displaying, via the one or more display generation components, the user identification options for the first party.

21. The non-transitory computer-readable storage medium of claim 14, wherein performing the resource transfer includes accepting a transfer of resources, the one or more programs further including instructions for:

as a part of the process for accepting the transfer of resources, displaying, via the one or more display generation components, a representation of accepted transfer details including a resource transfer amount and user identification information for a sender of the resources.

22. The non-transitory computer-readable storage medium of claim 14, wherein performing the resource transfer includes accepting a transfer of resources, the one or more programs further including instructions for:

after determining that the placement criterion is satisfied, and prior to performing the resource transfer, displaying, via the one or more display generation components:

a first element that is selectable to accept a request to perform the resource transfer; and a second element that is selectable to decline a request to perform the resource transfer.

23. The non-transitory computer-readable storage medium of claim 14, wherein performing the resource transfer includes transferring resources to an external computer system, the one or more programs further including instructions for:

as a part of the process for transferring the resources, displaying, via the one or more display generation components, a representation of accepted transfer details including a resource transfer amount and user identification information for a recipient of the resources.

24. The non-transitory computer-readable storage medium of claim 14, wherein performing the resource transfer includes:

while the resource transfer process is in progress:

receiving, via the one or more input devices, data indicating a status of the resource transfer process; and in response to receiving the data indicating a status of the resource transfer process, displaying, via the one or more display generation components, a representation of the status of the resource transfer process and a representation of the resource transfer amount.

25. The non-transitory computer-readable storage medium of claim 14, the one or more programs further including instructions for:

prior to receiving the first set of one or more inputs that includes a selection of one or more user identification options for the first party:

in accordance with a determination that account relationship criteria are satisfied between a first account for receiving the resource transfer and a second account for sending the resource transfer, performing the resource transfer without prompting the first account to approve the resource transfer.

26. The non-transitory computer-readable storage medium of claim 25, wherein performing the resource transfer without prompting the first account to approve the resource transfer includes performing the resource transfer and transmitting user identification information for the first party without displaying the one or more user identification options for the first party for selection.

27. A method, comprising:

at a computer system that is in communication with one or more display generation components and one or more input devices:

while displaying a resource transfer interface that includes a resource transfer amount and user identification information for a first party of a resource transfer, receiving, via the one or more input devices, a first set of one or more inputs that includes a selection of one or more user identification options for the first party;

in response to receiving the first set of one or more inputs:

in accordance with a determination that the first set of one or more inputs corresponds to selection of a first set of user identification options for the first party of the resource transfer, initiating a process to perform the resource transfer, wherein the resource transfer includes transmitting user identification information for the first party with a first set of identification information that is based on the selected first set of user identification options for the first party of the resource transfer, wherein the first set of identification information includes first identification information; and in accordance with a determination that the first set of one or more inputs corresponds to selection of a second set of user identification options, different from the first set of user identification options, for the first party of the resource transfer, initiating a process to perform the resource transfer, wherein the resource transfer includes transmitting user identification information for the first party with a second set of identification information that is based on the selected second set of user identification options for the first party of the resource transfer, without including the first identification information; and in accordance with a determination that a first set of criteria is satisfied, wherein the first set of criteria includes a placement criterion that is satisfied when the computer system has a respective placement relative to an external computer system, performing the resource transfer, including:

in accordance with a determination that the first set of user identification options have been selected for the first party of the resource transfer, performing the resource transfer and transmitting the user identification information for the first party with the first set of identification information that is based on the selected first set of user identification options and includes the first identification information; and in accordance with a determination that the second set of user identification options have been selected for the first party of the resource transfer, performing the resource transfer and transmitting the user identification information for the first party with the second set of identification information that is based on the selected second set of user identification options and does not include the first identification information.

28. The method of claim 27, wherein the resource transfer is a transfer of media items between a first resource account associated with the computer system and a second resource account associated with an external computer system.

29. The method of claim 27, wherein the resource transfer is a transfer of funds between a first resource account associated with the computer system and a second resource account associated with an external computer system.

30. The method of claim 27, wherein the resource transfer is a process for transmitting resources to a second party, and displaying the resource transfer interface includes:

displaying, via the one or more display generation components, a representation of the user identification information for the first party having an initial set of sender identification information.

31. The method of claim 30, wherein the first set of one or more inputs is received while displaying the resource transfer interface including the representation of the user identification information for the first party having the initial set of sender identification information, and wherein the first set of one or more inputs includes a selection of the representation of the user identification information having the initial set of sender identification information, the method further comprising:

in response to detecting the selection of the representation of the user identification information having the initial set of sender identification information, displaying, via the one or more display generation components, the user identification options for the first party.

32. The method of claim 27, wherein the resource transfer is a process for receiving resources from a second party, and displaying the resource transfer interface includes:

displaying, via the one or more display generation components, a representation of the user identification information for the first party having an initial set of recipient identification information.

33. The method of claim 32, wherein the first set of one or more inputs is received while displaying the resource transfer interface including the representation of the user identification information for the first party having the initial set of recipient identification information, and wherein the first set of one or more inputs includes a selection of the representation of the user identification information having the initial set of recipient identification information, the method further comprising:

in response to detecting the selection of the representation of the user identification information having the initial set of recipient identification information, displaying, via the one or more display generation components, the user identification options for the first party.

34. The method of claim 27, wherein performing the resource transfer includes accepting a transfer of resources, the method further comprising:

as a part of the process for accepting the transfer of resources, displaying, via the one or more display generation components, a representation of accepted transfer details including a resource transfer amount and user identification information for a sender of the resources.

35. The method of claim 27, wherein performing the resource transfer includes accepting a transfer of resources, the method further comprising:

after determining that the placement criterion is satisfied, and prior to performing the resource transfer, displaying, via the one or more display generation components:

a first element that is selectable to accept a request to perform the resource transfer; and a second element that is selectable to decline a request to perform the resource transfer.

36. The method of claim 27, wherein performing the resource transfer includes transferring resources to an external computer system, the method further comprising:

as a part of the process for transferring the resources, displaying, via the one or more display generation components, a representation of accepted transfer details including a resource transfer amount and user identification information for a recipient of the resources.

37. The method of claim 27, wherein performing the resource transfer includes: while the resource transfer process is in progress:

receiving, via the one or more input devices, data indicating a status of the resource transfer process; and in response to receiving the data indicating a status of the resource transfer process, displaying, via the one or more display generation components, a representation of the status of the resource transfer process and a representation of the resource transfer amount.

38. The method of claim 27, further comprising:

prior to receiving the first set of one or more inputs that includes a selection of one or more user identification options for the first party:

in accordance with a determination that account relationship criteria are satisfied between a first account for receiving the resource transfer and a second account for sending the resource transfer, performing the resource transfer without prompting the first account to approve the resource transfer.

39. The method of claim 38, wherein performing the resource transfer without prompting the first account to approve the resource transfer includes performing the resource transfer and transmitting user identification information for the first party without displaying the one or more user identification options for the first party for selection.

* * * * *